United States Patent
Jung et al.

(10) Patent No.: US 9,704,122 B2
(45) Date of Patent: Jul. 11, 2017

(54) FOOD SUPPLY CHAIN AUTOMATION FARM TRACKING SYSTEM AND METHOD

(71) Applicant: Elwha LLC, Bellevue, WA (US)

(72) Inventors: Edward K. Y. Jung, Bellevue, WA (US); Royce A. Levien, Lexington, MA (US); Mark A. Malamud, Seattle, WA (US)

(73) Assignee: Elwha LLC, Bellevue, WA (US)

( * ) Notice: Subject to any disclaimer, the term of this patent is extended or adjusted under 35 U.S.C. 154(b) by 1034 days.

(21) Appl. No.: 13/663,137

(22) Filed: Oct. 29, 2012

(65) Prior Publication Data

US 2014/0122156 A1    May 1, 2014

Related U.S. Application Data

(63) Continuation of application No. 13/663,095, filed on Oct. 29, 2012.

(51) Int. Cl.
*G06F 17/30* (2006.01)
*G06Q 10/08* (2012.01)
(Continued)

(52) U.S. Cl.
CPC ..... *G06Q 10/087* (2013.01); *G06Q 10/06313* (2013.01); *G06Q 50/02* (2013.01)

(58) Field of Classification Search
CPC .. G06Q 10/087; G06Q 30/0201; G06Q 50/12; G06Q 10/0637; G06Q 10/083;
(Continued)

(56) References Cited

U.S. PATENT DOCUMENTS 4,187,491 A * 2/1980 Lindstrum ............. G01S 15/66
    342/418
5,478,989 A   12/1995 Shepley
(Continued)

FOREIGN PATENT DOCUMENTS

WO    WO 01/27577 A2    4/2001
WO    WO 01/59736 A3    8/2001
(Continued)

OTHER PUBLICATIONS

PCT International Search Report; International App. No. PCT/US2014/013664; Apr. 29, 2014; pp. 1-2.
(Continued)

*Primary Examiner* — Yong Hang Jiang

(57) ABSTRACT

A computationally implemented system and method that is designed to, but is not limited to: electronically receiving monitoring information related to one or more farming related production factors involved with farming related production of one or more ingestible materials; and electronically associating at least a portion of said monitoring information one or more farming related production factors involved with farming related production of one or more ingestible materials with one or more identifiers accessible through one or more tracers, said one or more tracers logged as being at least momentarily in physical proximity with said one or more ingestible materials. In addition to the foregoing, other method aspects are described in the claims, drawings, and text forming a part of the present disclosure.

41 Claims, 82 Drawing Sheets

(51) Int. Cl.
*G06Q 50/02* (2012.01)
*G06Q 10/06* (2012.01)

(58) Field of Classification Search
CPC .... G06Q 30/0623; G06Q 50/02; G06Q 10/00;
G06Q 10/06; G06Q 10/06313; G06Q
10/0639; G06F 17/30477; G06F
17/30554; A01K 11/00; A01K 29/00
See application file for complete search history.

(56) References Cited

U.S. PATENT DOCUMENTS

| | | | |
|---|---|---|---|
| 5,478,990 A | 12/1995 | Montanari et al. |
| 5,592,561 A | 1/1997 | Moore |
| 5,711,160 A | 1/1998 | Namisniak et al. |
| 5,768,384 A | 6/1998 | Berson |
| 5,900,801 A | 5/1999 | Heagle et al. |
| 5,913,170 A | 6/1999 | Wortham |
| 5,939,974 A | 8/1999 | Heagle et al. |
| 5,974,150 A | 10/1999 | Kaish et al. |
| 5,986,550 A | 11/1999 | Rapaport et al. |
| 6,005,960 A | 12/1999 | Moore |
| 6,069,955 A | 5/2000 | Coppersmith et al. |
| 6,226,619 B1 | 5/2001 | Halperin et al. |
| 6,375,077 B1 | 4/2002 | Hankins |
| 6,381,583 B1 | 4/2002 | Kenney |
| 6,409,082 B1 | 6/2002 | Davis et al. |
| 6,442,276 B1 | 8/2002 | Doljack |
| 6,456,729 B1 | 9/2002 | Moore |
| 6,591,252 B1 | 7/2003 | Young |
| 6,788,800 B1 | 9/2004 | Carr et al. |
| 6,796,504 B2 | 9/2004 | Robinson |
| 6,806,478 B1 | 10/2004 | Hatfield |
| 6,859,672 B2 | 2/2005 | Roberts et al. |
| 6,874,000 B2 | 3/2005 | Sholl et al. |
| 6,973,437 B1 | 12/2005 | Olewicz et al. |
| 6,982,640 B2 | 1/2006 | Lindsay et al. |
| 6,995,675 B2 | 2/2006 | Curkendall et al. |
| 6,996,543 B1 | 2/2006 | Coppersmith et al. |
| 7,062,513 B2 | 6/2006 | Beck et al. |
| 7,085,777 B2 | 8/2006 | Beck et al. |
| 7,089,420 B1 | 8/2006 | Durst et al. |
| 7,170,391 B2 | 1/2007 | Lane et al. |
| 7,171,415 B2 | 1/2007 | Kan et al. |
| 7,182,257 B2 | 2/2007 | Ogihara et al. |
| 7,222,791 B2 | 5/2007 | Heilper et al. |
| 7,271,719 B2 | 9/2007 | Ku et al. |
| 7,283,630 B1 | 10/2007 | Doljack |
| 7,372,003 B2 | 5/2008 | Kates |
| 7,372,262 B2 | 5/2008 | Bertozzi et al. |
| 7,387,239 B2 | 6/2008 | Thomas et al. |
| 7,409,221 B2 | 8/2008 | Obradovich et al. |
| 7,472,274 B2 | 12/2008 | Moreaux et al. |
| 7,490,054 B2 | 2/2009 | Reade et al. |
| 7,497,379 B2 | 3/2009 | Chen et al. |
| 7,580,895 B2 | 8/2009 | Wilde et al. |
| 7,680,691 B2 | 3/2010 | Kimball et al. |
| 7,681,527 B2 | 3/2010 | Pratt |
| 7,705,735 B2 | 4/2010 | Pape et al. |
| 7,797,327 B2 | 9/2010 | Kataria et al. |
| 7,810,726 B2 | 10/2010 | de la Huerga |
| 7,861,542 B2 | 1/2011 | Rozendaal et al. |
| 7,874,489 B2 | 1/2011 | Mercolino |
| 7,878,396 B2 | 2/2011 | Wishnatzki et al. |
| 7,878,398 B2 | 2/2011 | Chen et al. |
| 7,909,239 B2 | 3/2011 | Grant et al. |
| 7,941,376 B2 | 5/2011 | Peckover |
| 7,949,154 B2 | 5/2011 | DeLuca |
| 7,973,642 B2 | 7/2011 | Schackmuth et al. |
| 7,995,196 B1 | 8/2011 | Fraser |
| 7,996,319 B2 | 8/2011 | Dillon |
| 8,019,662 B2 | 9/2011 | Lucas |
| 8,028,891 B2 | 10/2011 | Harjani |
| 8,078,875 B2 | 12/2011 | Cowburn et al. |
| 8,087,585 B2 | 1/2012 | Greene |
| 8,101,892 B2 | 1/2012 | Kates |
| 8,103,046 B2 | 1/2012 | Cowburn |
| 8,108,309 B2 | 1/2012 | Tan |
| 8,152,063 B1 | 4/2012 | Grant et al. |
| 8,155,313 B2 | 4/2012 | Grant |
| 8,171,567 B1 | 5/2012 | Fraser et al. |
| 8,174,369 B2 | 5/2012 | Jones et al. |
| 8,196,827 B1 | 6/2012 | Grant |
| 8,210,430 B1 | 7/2012 | Grant et al. |
| 8,220,716 B2 | 7/2012 | Mercolino |
| 8,240,564 B2 | 8/2012 | Grant et al. |
| 8,243,930 B2 | 8/2012 | Harris |
| 8,244,747 B2 | 8/2012 | Agrawal et al. |
| 8,245,927 B2 | 8/2012 | Grant et al. |
| 8,249,350 B2 | 8/2012 | Voloshynovskyy et al. |
| 8,281,899 B2 | 10/2012 | Sutcliffe |
| 8,285,593 B2 | 10/2012 | Bhatt et al. |
| 8,485,285 B2 | 7/2013 | Ferrigni |
| 8,553,886 B2 | 10/2013 | Sakai et al. |
| 8,635,179 B2 | 1/2014 | Cao et al. |
| 8,651,058 B1 | 2/2014 | Pierce |
| 8,862,107 B2 | 10/2014 | Uland |
| 2001/0023410 A1 | 9/2001 | Hayes et al. |
| 2002/0007307 A1 | 1/2002 | Miller et al. |
| 2002/0012445 A1* | 1/2002 | Perry ............... G06Q 10/00 382/100 |
| 2002/0026325 A1 | 2/2002 | Hirahara et al. |
| 2002/0027164 A1 | 3/2002 | Mault et al. |
| 2002/0059175 A1 | 5/2002 | Nakano |
| 2002/0095232 A1 | 7/2002 | Jorgenson et al. |
| 2002/0099771 A1 | 7/2002 | Ookushi |
| 2002/0158765 A1 | 10/2002 | Pape et al. |
| 2002/0191817 A1 | 12/2002 | Sato et al. |
| 2003/0034208 A1 | 2/2003 | Winfree et al. |
| 2003/0074239 A1 | 4/2003 | Hoffman et al. |
| 2003/0114173 A1 | 6/2003 | Carroll |
| 2003/0177025 A1* | 9/2003 | Curkendall ........ A01K 11/007 340/573.3 |
| 2003/0178561 A1* | 9/2003 | Neda ............... G01N 21/65 250/281 |
| 2003/0182260 A1 | 9/2003 | Pickett et al. |
| 2003/0226787 A1* | 12/2003 | Buisman ........... G06Q 10/087 209/3.3 |
| 2003/0236768 A1 | 12/2003 | Sribhibhadh et al. |
| 2004/0015477 A1 | 1/2004 | Beck et al. |
| 2004/0049476 A1 | 3/2004 | Sai et al. |
| 2004/0080330 A1 | 4/2004 | Kunikiyo |
| 2004/0088330 A1 | 5/2004 | Pickett et al. |
| 2004/0100380 A1 | 5/2004 | Lindsay et al. |
| 2004/0103043 A1 | 5/2004 | Reade et al. |
| 2004/0107141 A1 | 6/2004 | Conkel et al. |
| 2004/0177011 A1 | 9/2004 | Ramsay et al. |
| 2004/0185154 A1 | 9/2004 | Garwood |
| 2004/0195318 A1 | 10/2004 | Silverbrook et al. |
| 2004/0209312 A1 | 10/2004 | Harding et al. |
| 2004/0210621 A1 | 10/2004 | Antonellis |
| 2004/0264441 A1* | 12/2004 | Jalkanen ........... G06K 7/0008 370/352 |
| 2005/0004682 A1 | 1/2005 | Gaddis et al. |
| 2005/0075900 A1 | 4/2005 | Arguimbau, III |
| 2005/0090233 A1 | 4/2005 | Chambers et al. |
| 2005/0156032 A1 | 7/2005 | Milstein |
| 2005/0177466 A1* | 8/2005 | Willins ............... G06K 7/0008 705/28 |
| 2005/0216349 A1 | 9/2005 | Vaseloff et al. |
| 2005/0240610 A1 | 10/2005 | Tani et al. |
| 2005/0261991 A1 | 11/2005 | Kennamer |
| 2005/0273345 A1 | 12/2005 | Castillejo Romero |
| 2006/0005018 A1 | 1/2006 | Alculumbre |
| 2006/0015416 A1 | 1/2006 | Hoffman et al. |
| 2006/0069586 A1 | 3/2006 | Sutcliffe |
| 2006/0081653 A1 | 4/2006 | Boland et al. |
| 2006/0091220 A1 | 5/2006 | Fukui et al. |
| 2006/0168644 A1 | 7/2006 | Richter et al. |
| 2006/0185609 A1 | 8/2006 | Sato |
| 2006/0190494 A1 | 8/2006 | Beck et al. |
| 2006/0201432 A1 | 9/2006 | Pratt |
| 2006/0202009 A1 | 9/2006 | Austin |
| 2006/0213904 A1 | 9/2006 | Kates |

(56) References Cited

U.S. PATENT DOCUMENTS

| | | |
|---|---|---|
| 2006/0265290 A1 | 11/2006 | Perrier et al. |
| 2006/0266817 A1 | 11/2006 | Leger |
| 2006/0266827 A1 | 11/2006 | Hamilton |
| 2006/0271555 A1 | 11/2006 | Beck et al. |
| 2006/0282274 A1 | 12/2006 | Bennett |
| 2007/0022024 A1 | 1/2007 | Dowty et al. |
| 2007/0036470 A1 | 2/2007 | Piersol et al. |
| 2007/0058777 A1 | 3/2007 | Kondo |
| 2007/0059672 A1 | 3/2007 | Shaw |
| 2007/0148306 A1 | 6/2007 | Mattson et al. |
| 2007/0150371 A1 | 6/2007 | Gangji |
| 2007/0162325 A1 | 7/2007 | Singer-Harter |
| 2007/0185749 A1 | 8/2007 | Anderson et al. |
| 2007/0203818 A1 | 8/2007 | Farmer et al. |
| 2007/0208629 A1 | 9/2007 | Jung et al. |
| 2007/0208631 A1 | 9/2007 | Jung et al. |
| 2007/0210155 A1 | 9/2007 | Swartz et al. |
| 2007/0212789 A1* | 9/2007 | Havens ............... G01M 3/226 436/138 |
| 2007/0222596 A1 | 9/2007 | Kleijn et al. |
| 2007/0260347 A1 | 11/2007 | Mirtsching et al. |
| 2007/0269557 A1 | 11/2007 | Culver et al. |
| 2007/0294129 A1 | 12/2007 | Froseth et al. |
| 2008/0010172 A1 | 1/2008 | Magill |
| 2008/0059263 A1 | 3/2008 | Stroman et al. |
| 2008/0059330 A1 | 3/2008 | Stroman et al. |
| 2008/0144880 A1 | 6/2008 | DeLuca |
| 2008/0262923 A1 | 10/2008 | Farmer et al. |
| 2008/0300872 A1 | 12/2008 | Basu et al. |
| 2009/0038552 A1 | 2/2009 | Baker et al. |
| 2009/0065579 A1 | 3/2009 | Grant et al. |
| 2009/0187583 A1 | 7/2009 | Pape et al. |
| 2009/0254460 A1 | 10/2009 | Farmer et al. |
| 2009/0307599 A1 | 12/2009 | Davies et al. |
| 2009/0326687 A1 | 12/2009 | Mccoy |
| 2009/0327104 A1 | 12/2009 | Sanders et al. |
| 2010/0012045 A1 | 1/2010 | Larose et al. |
| 2010/0027849 A1 | 2/2010 | Mirtsching et al. |
| 2010/0030036 A1 | 2/2010 | Mottram et al. |
| 2010/0049661 A1 | 2/2010 | Lima |
| 2010/0102082 A1 | 4/2010 | Ebrom et al. |
| 2010/0103241 A1 | 4/2010 | Linaker |
| 2010/0106607 A1 | 4/2010 | Riddiford et al. |
| 2010/0161082 A1 | 6/2010 | Ebrom et al. |
| 2010/0169196 A1 | 7/2010 | De Luca |
| 2010/0179857 A1 | 7/2010 | Kalaboukis et al. |
| 2010/0211477 A1 | 8/2010 | Jung et al. |
| 2010/0218407 A1 | 9/2010 | Kahng |
| 2010/0231358 A1 | 9/2010 | Mello |
| 2010/0249530 A1 | 9/2010 | Rankers et al. |
| 2010/0268620 A1 | 10/2010 | Angert et al. |
| 2010/0280895 A1 | 11/2010 | Mottola |
| 2011/0007946 A1 | 1/2011 | Liang et al. |
| 2011/0022211 A1 | 1/2011 | Mcintyre et al. |
| 2011/0029413 A1* | 2/2011 | Ben-Tzur ............... G06Q 10/08 705/28 |
| 2011/0035326 A1 | 2/2011 | Sholl et al. |
| 2011/0089235 A1 | 4/2011 | Wishnatzki et al. |
| 2011/0093400 A1 | 4/2011 | Waite |
| 2011/0093401 A1 | 4/2011 | Waite |
| 2011/0098026 A1 | 4/2011 | Uland |
| 2011/0218885 A1 | 9/2011 | Manski et al. |
| 2011/0251868 A1 | 10/2011 | Mikurak |
| 2011/0291806 A1 | 12/2011 | Hoofman et al. |
| 2012/0005105 A1 | 1/2012 | Beier et al. |
| 2012/0005222 A1 | 1/2012 | Bhagwan et al. |
| 2012/0073243 A1 | 3/2012 | Garrett et al. |
| 2012/0074027 A1 | 3/2012 | Nagpal et al. |
| 2012/0085828 A1 | 4/2012 | Ziegler |
| 2012/0085829 A1 | 4/2012 | Ziegler |
| 2012/0101972 A1 | 4/2012 | Cao et al. |
| 2012/0135383 A1 | 5/2012 | Jang et al. |
| 2012/0136731 A1 | 5/2012 | Kidron et al. |
| 2012/0191817 A1 | 7/2012 | Sayan |
| 2012/0254058 A1 | 10/2012 | Walker et al. |
| 2012/0273568 A1 | 11/2012 | Dlott et al. |
| 2012/0284264 A1 | 11/2012 | Lankford et al. |
| 2012/0323809 A1 | 12/2012 | Fukui |
| 2012/0323948 A1 | 12/2012 | Li et al. |
| 2013/0041833 A1 | 2/2013 | Paikray et al. |
| 2013/0060813 A1 | 3/2013 | Eckberg et al. |
| 2013/0085599 A1 | 4/2013 | Nicol et al. |
| 2013/0103593 A1 | 4/2013 | Watts et al. |
| 2013/0105565 A1 | 5/2013 | Kamprath |
| 2013/0110580 A1 | 5/2013 | Sholl et al. |
| 2013/0125835 A1 | 5/2013 | Sinn et al. |
| 2013/0140357 A1 | 6/2013 | Ure |
| 2013/0149677 A1 | 6/2013 | Slone et al. |
| 2013/0185104 A1 | 7/2013 | Klavins |
| 2013/0214938 A1 | 8/2013 | Kim et al. |
| 2013/0262262 A1 | 10/2013 | Aminia |
| 2013/0270341 A1 | 10/2013 | Janneh |
| 2013/0282625 A1 | 10/2013 | Chiu |
| 2013/0290852 A1 | 10/2013 | Silverman et al. |
| 2013/0337477 A1 | 12/2013 | Kuhr et al. |
| 2014/0012511 A1 | 1/2014 | Mensinger et al. |
| 2014/0074742 A1 | 3/2014 | Pratt |
| 2014/0204401 A1 | 7/2014 | Salerno |
| 2014/0292490 A1 | 10/2014 | Butler et al. |
| 2014/0373727 A1 | 12/2014 | McIntyre et al. |

FOREIGN PATENT DOCUMENTS

| | | |
|---|---|---|
| WO | WO 01/97555 A2 | 12/2001 |
| WO | WO 03/090036 A2 | 10/2003 |
| WO | WO 2006/036978 A2 | 4/2006 |
| WO | WO 2007/103886 A2 | 9/2007 |
| WO | WO 2008/057988 A2 | 5/2008 |
| WO | WO 2009/047652 A1 | 4/2009 |

OTHER PUBLICATIONS

PCT International Search Report; International App. No. PCT/US2014/013654; Apr. 22, 2014; pp. 1-2.

PCT International Search Report; International App. No. PCT/US14/13649; May 22, 2014; pp. 1-3.

Beulens et al.; "Food safety and transparency in food chains and networks—Relationships and challenges"; Food Control; Oct. 13, 2003; pp. 481-486; vol. 16; Elsevier Ltd.

Pang et al.; "Global Fresh Food Tracking Service Enabled by Wide Area Wireless Sensor Network"; Royal Institute of Technology—Forum 120; 2009; 4 pages; IEEE.

Puigjaner et al; "Tracking the Dynamics of the Supply Chain for Enhanced Production Sustainability"; Ind. Eng. Chem. Res.; Jul. 22, 2009; pp. 9556-9570; vol. 48, No. 21; American Chemical Society.

Ruiz-Garcia et al.; "A model and prototype implementation for tracking and tracing agricultural batch products along the food chain"; Food Control; 2010; pp. 112-121; vol. 21; Elsevier Ltd.

Stringer et al.; "A generic model of the integrated food supply chain to aid the investigation of food safety breakdowns"; Food Control; Jan. 11, 2006; pp. 755-765; vol. 18; Elsevier Ltd.

Wognum et al.; "Systems for sustainability and transparency of food supply chains—Current status and challenges"; Advanced Engineering Informatics; Jul. 2, 2010; pp. 65-76; vol. 25; Elsevier Ltd.

Yam et al; "Intelligent Packaging: Concepts and Applications"; Journal of Food Science; Dec. 22, 2004; pp. R1-R10; vol. 70, No. 1; Institute of Food Technologists.

"A Review of the Beef Food Chain"; Safefood, Ireland Safe Food Board; bearing a date of Feb. 2008; pp. 1-119.

Akkaranggoon, Supalak; "Supply Chain Management Practices in the Hotel Industry: An Examination of Hotel Food Supply Chains in South West England"; University of Exeter, Exeter, South West England, United Kingdom; bearing a date of Oct. 2010; pp. 1-288.

Brown, Gregory B.; "A Quantitative Method for Evaluating Alternative Plant Layouts", published by Georgia Institute of Technology for Master's Thesis disclosure; bearing a date of Sep. 1970; pp. 1-126.

Chopra et al.; "Which e-Business Is Right for Your Supply Chain?"; Supply Chain Management Review; bearing a date of Jul./Aug. 2000; pp. 32-40; vol. 4 No. (3).

(56) References Cited

OTHER PUBLICATIONS

Exadaktylos et al.; "Real-time Recognition of sick pig cough sounds"; Computers and Electronics in Agriculture; bearing a date of Feb. 28, 2008; pp. 207-214; vol. 63; Science Direct; Elsevier.
James, Jennylynd; "Overview of Microbial Hazards in Fresh Fruit and Vegetables Operations"; from: Jennylynd James, Ed., "Microbial Hazard Identification in Fresh Fruit and Vegetables"; John Wiley & Sons; New York; bearing a date of 2006; pp. 1-36.
Raspor, P. et al.; "Novel Food Safety Concepts for Safe Food: Case Meat Processing Industry"; International 55th Meat Industry Conference; Tara, Serbia; tehnologija mesa 50; bearing a date of Jun. 17, 2009; pp. 1-10.
Schwagele et al.; "Tracking and Tracing in the Meat Area"; International 55$^{th}$ Meat Industry Conference (held from Jun. 15-17); tehnologija mesa 50, bearing a date of 2009; pp. 11-20.
Smith et al.; "Traceability from a US Perspective"; Meat Science; bearing a date of 2005; pp. 174-193; vol. 71.
Svensson et al.; "A Recipe Based On-Line Food Store"; Proceedings of the 5$^{th}$ International Conference on Intelligent User Interfaces; bearing a date of 2000; pp. 1-3.
Svensson et al.; "Designing and Evaluating Kalas: A Social Navigation System for Food Recipes", ACM Transactions on Computer-Human Interaction (TOCHI); bearing a date of Sep. 2005; pp. 374-400; vol. 12, No. 3.
Uchida et al.; "A New Traceability System for SMEs with Open Source Software"; WSEAS Transactions on Business and Economics; bearing a date of Jan. 2009; pp. 1-10; Issue 1, vol. 6.
Wyler et al.; "CRS Report for Congress: International Illegal Trade in Wildlife: Threats and U.S. Policy"; Congressional Research Service; bearing a date of Mar. 3, 2008; pp. CRS-1-CRS-45.
Kunze et al.; "Towards Dynamically Configurable Context Recognition Systems"; AAAI Technical Report; Jul. 2012; pp. 60-64; Association for the Advancement of Artificial Intelligence.
Tsuchiya et al.; "Big Data Processing in Cloud Environments"; Fujitsu Scientific & Technical Journal; Apr. 2012; pp. 159-168; vol. 48—No. 2.

U.S. Appl. No. 13/785,690, Jung et al.
U.S. Appl. No. 13/785,283, Jung et al.
U.S. Appl. No. 13/771,664, Jung et al.
U.S. Appl. No. 13/771,506, Jung et al.
U.S. Appl. No. 13/755,308, Jung et al.
U.S. Appl. No. 13/755,095, Jung et al.
U.S. Appl. No. 13/724,062, Jung et al.
U.S. Appl. No. 13/721,558, Jung et al.
U.S. Appl. No. 13/721,357, Jung et al.
U.S. Appl. No. 13/720,572, Jung et al.
U.S. Appl. No. 13/715,309, Jung et al.
U.S. Appl. No. 13/709,831, Jung et al.
U.S. Appl. No. 13/687,382, Jung et al.
U.S. Appl. No. 13/682,939, Jung et al.
U.S. Appl. No. 13/669,018, Jung et al.
U.S. Appl. No. 13/668,977, Jung et al.
U.S. Appl. No. 13/663,095, Jung et al.
Azaquar; "Food preservation by high pressure"; found at http://www.azaquar.com/en/doc/food-preservation-by-high-pressare with a date of Oct. 5, 2011; pp. 1-4; azaquar.com.
Buchanan et al.; "Traceability Within the British Columbia Halibut Industry—A Review of Traceability Practices, Readiness, and Opportunities"; Archipelago Marine Research Ltd.; Jul. 2012; pp. 1-44.
Dillon et al. "A Guide to Traceability within the Fish Industry"; 2004; pp. 1-80; ISBN 1900134187.
Golan et al.; "Traceability in the U.S. Food Supply: Economic Theory and Industry Studies"; Agricultural Economic Report No. 830; Mar. 2004; pp. 1-48; USDA Economic Research Service.
Hsu et al.; "A RFID-Enabled Traceability System for the Supply Chain of Live Fish"; International Conference on Automation and Logistics; Sep. 2008; pp. 81-86; IEEE.
Randrup, Maria; "Case studies of quality, quality assurance, and traceable information in auction-based fish supply chains"; Mar. 2012; pp. 1-136; Technical University of Denmark, National Food Institute, Division of Industrial Food Research.

* cited by examiner

*Fig. 63* o11 electronically receiving monitoring information related to one or more farming related production factors involved with farming related production of one or more ingestible materials o1161 electronically receiving monitoring information related to one or more farming related production factors involved with the farming related production of one or more ingestible materials including at least in part one or more microorganism culturing activities involved with farming related ingestible material production o1162 electronically receiving monitoring information related to one or more farming related production factors involved with the farming related production of one or more ingestible materials including at least in part one or more vegetable gardening related activities involved with farming related ingestible material production o1163 electronically receiving monitoring information related to one or more farming related production factors involved with the farming related production of one or more ingestible materials including at least in part one or more butchering related activities involved with farming related ingestible material production

Fig. 70 o12 electronically associating at least a portion of said monitoring information one or more farming related production factors involved with farming related production of one or more ingestible materials with one or more identifiers accessible through one or more tracers, said one or more tracers logged as being at least momentarily in physical proximity with said one or more ingestible materials o1201 the electronically associating at least a portion of said monitoring information related to one or more farming related production factors involved with farming related production of one or more ingestible materials with one or more identifiers accessible through one or more tracers, said one or more tracers logged as being at least momentarily in physical proximity with said one or more ingestible materials via at least in part one or more electronically implemented indices o1202 the electronically associating at least a portion of said monitoring information related to one or more farming related production factors involved with farming related production of one or more ingestible materials with one or more identifiers accessible through one or more tracers, said one or more tracers logged as being at least momentarily in physical proximity with said one or more ingestible materials via at least in part one or more electronically implemented pointers o1203 the electronically associating at least a portion of said monitoring information related to one or more farming related production factors involved with farming related production of one or more ingestible materials with one or more identifiers accessible through one or more tracers, said one or more tracers logged as being at least momentarily in physical proximity with said one or more ingestible materials through at least in part one or more electronic relational databases

*Fig. 81* o12

Start electronically associating at least a portion of said monitoring information one or more farming related production factors involved with farming related production of one or more ingestible materials with one or more identifiers accessible through one or more tracers, said one or more tracers logged as being at least momentarily in physical proximity with said one or more ingestible materials o1234 electronically associating at least a portion of said monitoring information related to one or more farming related production factors involved with farming related production of one or more ingestible materials with one or more identifiers accessible through one or more tracers, said one or more tracers logged as being at least momentarily the in physical proximity with said one or more ingestible materials including at least in part affixed to one or more ingestible materials o1235 electronically associating at least a portion of said monitoring information related to one or more farming related production factors involved with farming related production of one or more ingestible materials with one or more identifiers accessible through one or more tracers, said one or more tracers logged as being at least momentarily the in physical proximity with said one or more ingestible materials including at least in part affixed to pre-processed forms of one or more ingestible materials o1236 electronically associating at least a portion of said monitoring information related to one or more farming related production factors involved with farming related production of one or more ingestible materials with one or more identifiers accessible through one or more tracers, said one or more tracers logged as being at least momentarily the in physical proximity with said one or more ingestible materials including at least in part affixed to another portion of a biological structure that is physically connected with the ingestible material End

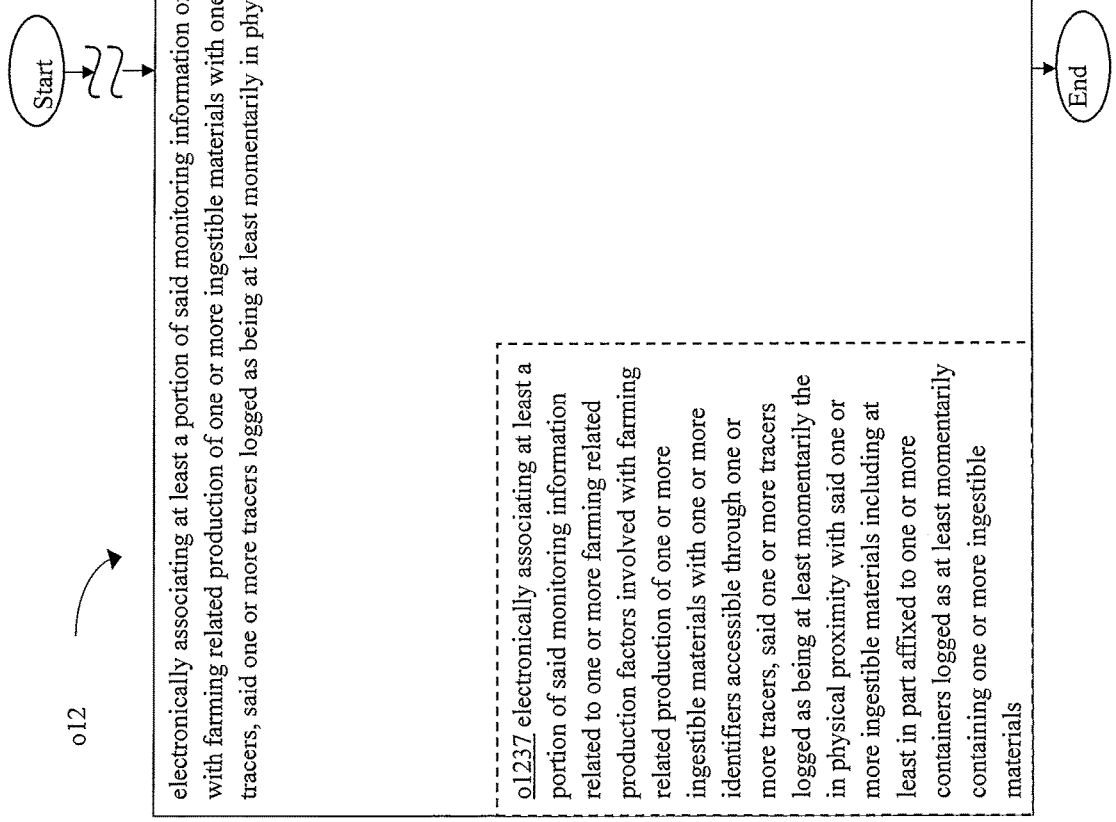

FOOD SUPPLY CHAIN AUTOMATION FARM TRACKING SYSTEM AND METHOD

PRIORITY APPLICATIONS

For purposes of the USPTO extra-statutory requirements, the present application constitutes a continuation of U.S. patent application Ser. No. 13/663,095, entitled FOOD SUPPLY CHAIN AUTOMATION FARM TRACKING SYSTEM AND METHOD, naming Edward K. Y. Jung, Royce A. Levien, Robert W. Lord, and Mark A. Malamud as inventors, filed 29 Oct. 2012, which is currently co-pending.

CROSS-REFERENCE TO RELATED APPLICATIONS

The present application is related to and/or claims the benefit of the earliest available effective filing date(s) from the following listed application(s) (the "Priority Applications"), if any, listed below (e.g., claims earliest available priority dates for other than provisional patent applications or claims benefits under 35 USC §119(e) for provisional patent applications, for any and all parent, grandparent, great-grandparent, etc. applications of the Priority Application(s)). In addition, the present application is related to the "Related Applications," if any, listed below.

RELATED APPLICATIONS

None

The United States Patent Office (USPTO) has published a notice to the effect that the USPTO's computer programs require that patent applicants reference both a serial number and indicate whether an application is a continuation, continuation-in-part, or divisional of a parent application. Stephen G. Kunin, Benefit of Prior-Filed Application, USPTO Official Gazette Mar. 18, 2003. The USPTO further has provided forms for the Application Data Sheet which allow automatic loading of bibliographic data but which require identification of each application as a continuation, continuation-in-part, or divisional of a parent application. The present Applicant Entity (hereinafter "Applicant") has provided above a specific reference to the application(s) from which priority is being claimed as recited by statute. Applicant understands that the statute is unambiguous in its specific reference language and does not require either a serial number or any characterization, such as "continuation" or "continuation-in-part," for claiming priority to U.S. patent applications. Notwithstanding the foregoing, Applicant understands that the USPTO's computer programs have certain data entry requirements, and hence Applicant has provided designation(s) of a relationship between the present application and its parent application(s) as set forth above and in any ADS filed in this application, but expressly points out that such designation(s) are not to be construed in any way as any type of commentary and/or admission as to whether or not the present application contains any new matter in addition to the matter of its parent application(s).

If the listings of applications provided above are inconsistent with the listings provided via an ADS, it is the intent of the Applicant to claim priority to each application that appears in the Priority Applications section of the ADS and to each application that appears in the Priority Applications section of this application.

All subject matter of the Priority Applications and the Related Applications and of any and all parent, grandparent, great-grandparent, etc. applications of the Priority Applications and the Related Applications, including any priority claims, is incorporated herein by reference to the extent such subject matter is not inconsistent herewith.

SUMMARY

In one aspect, a computationally-implemented method includes, but is not limited to electronically receiving monitoring information related to one or more farming related production factors involved with farming related production of one or more ingestible materials; and electronically associating at least a portion of said monitoring information one or more farming related production factors involved with farming related production of one or more ingestible materials with one or more identifiers accessible through one or more tracers, said one or more tracers logged as being at least momentarily in physical proximity with said one or more ingestible materials. In addition to the foregoing, other method aspects are described in the claims, drawings, and text forming a part of the disclosure set forth herein.

In one or more various aspects, related machines, compositions of matter, or manufactures of systems may include, but are not limited to, circuitry and/or programming for effecting the herein-referenced method aspects; the circuitry and/or programming can be virtually any combination of hardware, software, and/or firmware configured to effect the herein-referenced method aspects depending upon the design choices of the system designer (limited to patentable subject matter under 35 USC 101).

A computationally-implemented system includes, but is not limited to: means for electronically receiving monitoring information related to one or more farming related production factors involved with farming related production of one or more ingestible materials; and means for electronically associating at least a portion of said monitoring information one or more farming related production factors involved with farming related production of one or more ingestible materials with one or more identifiers accessible through one or more tracers, said one or more tracers logged as being at least momentarily in physical proximity with said one or more ingestible materials. In addition to the foregoing, other system aspects are described in the claims, drawings, and text forming a part of the disclosure set forth herein.

A computationally-implemented system includes, but is not limited to a receiving information electrical circuitry arrangement for electronically receiving monitoring information related to one or more farming related production factors involved with farming related production of one or more ingestible materials; and a associating information electrical circuitry arrangement for electronically associating at least a portion of said monitoring information one or more farming related production factors involved with farming related production of one or more ingestible materials with one or more identifiers accessible through one or more tracers, said one or more tracers logged as being at least momentarily in physical proximity with said one or more ingestible materials. In addition to the foregoing, other system aspects are described in the claims, drawings, and text forming a part of the disclosure set forth herein.

A system includes, but is not limited to a receiving information module configured to operate in accordance with electronically receiving monitoring information related to one or more farming related production factors involved with farming related production of one or more ingestible materials; and a associating information module configured to operate in accordance with electronically associating at least a portion of said monitoring information one or more farming related production factors involved with farming related production of one or more ingestible materials with one or more identifiers accessible through one or more tracers, said one or more tracers logged as being at least momentarily in physical proximity with said one or more ingestible materials. In addition to the foregoing, other system aspects are described in the claims, drawings, and text forming a part of the disclosure set forth herein.

An article of manufacture including one or more non-transitory signal-bearing storage medium bearing one or more instructions for electronically receiving monitoring information related to one or more farming related production factors involved with farming related production of one or more ingestible materials; and one or more instructions for electronically associating at least a portion of said monitoring information one or more farming related production factors involved with farming related production of one or more ingestible materials with one or more identifiers accessible through one or more tracers, said one or more tracers logged as being at least momentarily in physical proximity with said one or more ingestible materials. In addition to the foregoing, other computer program product aspects are described in the claims, drawings, and text forming a part of the disclosure set forth herein.

A system including one or more computing devices; and one or more instructions when executed on the one or more computing devices cause the one or more computing devices to perform electronically receiving monitoring information related to one or more farming related production factors involved with farming related production of one or more ingestible materials; and electronically associating at least a portion of said monitoring information one or more farming related production factors involved with farming related production of one or more ingestible materials with one or more identifiers accessible through one or more tracers, said one or more tracers logged as being at least momentarily in physical proximity with said one or more ingestible materials. In addition to the foregoing, other computer program product aspects are described in the claims, drawings, and text forming a part of the disclosure set forth herein.

In addition to the foregoing, various other method and/or system and/or program product aspects are set forth and described in the teachings such as text (e.g., claims and/or detailed description) and/or drawings of the present disclosure.

The foregoing is a summary and thus may contain simplifications, generalizations, inclusions, and/or omissions of detail; consequently, those skilled in the art will appreciate that the summary is illustrative only and is NOT intended to be in any way limiting. Other aspects, features, and advantages of the devices and/or processes and/or other subject matter described herein will become apparent in the teachings set forth herein.

BRIEF DESCRIPTION OF THE FIGURES

For a more complete understanding of embodiments, reference now is made to the following descriptions taken in connection with the accompanying drawings. The use of the same symbols in different drawings typically indicates similar or identical items, unless context dictates otherwise.

With reference now to the figures, shown are one or more examples of is an example of farming related ingestible materials production tracking system that may provide context, for instance, in introducing one or more processes and/or devices described herein

FIG. 63 is a high-level flowchart including exemplary implementations of operation o11 of FIG. 42.

FIG. 70 is a high-level flowchart including exemplary implementations of operation o12 of FIG. 42.

FIG. 81 is a high-level flowchart including exemplary implementations of operation o12 of FIG. 42.

FIG. 82 is a high-level flowchart including exemplary implementations of operation o12 of FIG. 42.

DETAILED DESCRIPTION

Figure 1:
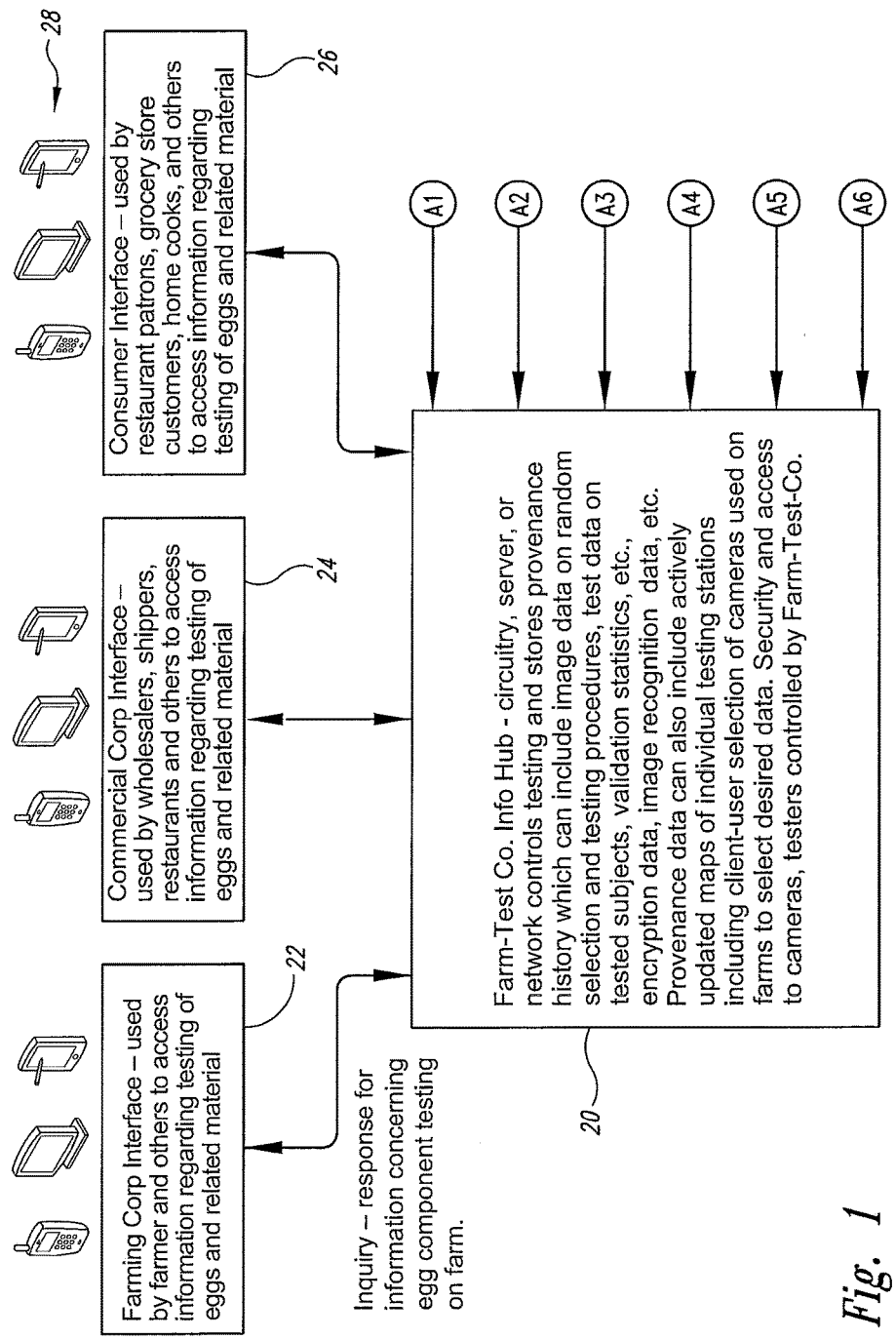
FIG. 1 is a schematic view depicting farm-test co. info hub aspects as related with a farming related ingestible materials production tracking system.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here.

The present application may use formal outline headings for clarity of presentation. However, it is to be understood that the outline headings are for presentation purposes, and that different types of subject matter may be discussed throughout the application (e.g., device(s)/structure(s) may be described under process(es)/operations heading(s) and/or process(es)/operations may be discussed under structure(s)/process(es) headings; and/or descriptions of single topics may span two or more topic headings). Hence, the use of the formal outline headings is not intended to be in any way limiting.

Generally, both commercial and consumer interests are becoming more concerned regarding origins of their food and other ingestible materials. Thus, tracking and testing systems to provide in depth information concerning provenance and other data associated with food and other ingestible materials including farming related production and other handling and processing can also be of interest.

With reference now to the Figures, FIGS. 1-11 depict a schematic diagram of an environment(s) and/or an implementation(s) of technologies described herein. FIGS. 1-11 depict that including physical flows generally including indications as such by use of dashed arrows, the physical flows including that involving handling, testing, worker behavior, animal behavior, and other involvement of items, which can include feed, chicken, egg, carton, containers, transit, grocery store, receiving of containers, unpacking of cartons, shelving of cartons, shopping for cartons, in-store transit of cartons, purchase of carton, transit of carton to home, receiving carton at home, storage of carton at home, removal of egg and preparation of such, etc. Other physical flows are depicted to include transit of container to restaurant, receiving, unpacking, storage, etc. of container at restaurant, unpacking of egg and preparation of in dish, serving and purchasing of dish containing egg, etc. Physical flows are depicted to include testing of grain, chicken, egg, or other items.

FIGS. 1-11 depict that including information flows generally including indications as such by use of solid arrows, the information flows including image data sent from various imaging devices to information hubs, the image data including imaging of various stages of the physical flows. Information flows depicted also include inquiry-responses, initiating of devices, financial data, testing, etc. The information hubs are depicted to include those directed to information flows involving information obtained at farm, transit, restaurant, grocery, home or other locations. The information hubs are depicted to include interchange of information between each other. The information hubs are depicted to communicate with various interfaces to allow for communication there between by farming, commercial, restaurant, consumer and other interests. Information in information hubs can allow for research and other activities including determinations of compliance, noncompliance or errors made during one or more physical flows. The examples depicted in FIGS. 1-11 are for illustrative purposes but are not intended to limit aspects to only these examples. Rather they serve to exemplify how data on food provenance and other ingestible material and other sorts of source data can be acquired through various tracking and testing for retrieval and inquiry through such as interfaces shown.

Figure 2:
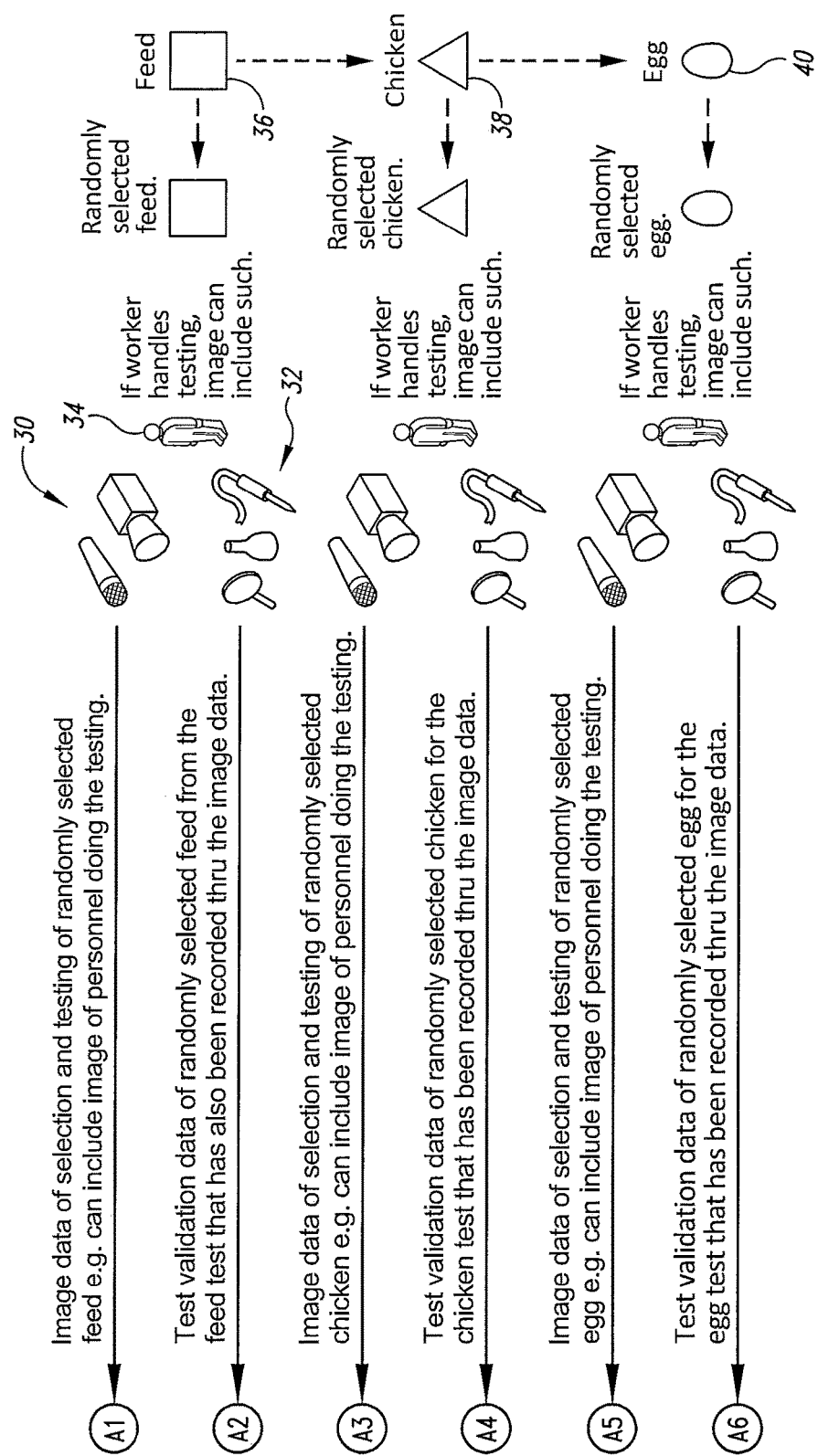
FIG. 2 is a schematic view depicting farm-tracking aspects as related with the farming related ingestible materials production tracking system.

In particular, as shown in FIG. 1, interfaces 22, 24, and 26 are used to interact with Farm-Test Co. Info Hub 20 containing various information related to test of production factors and other items concerning one or more farming related production factors or other items. As shown in FIG. 2, production factors or ingestible material such as feed 36, chicken 38, and egg 40 can be monitored and tested through various sensors 30, 32 further described herein. Behavior of workers 34 can also be monitored.

Figure 3:
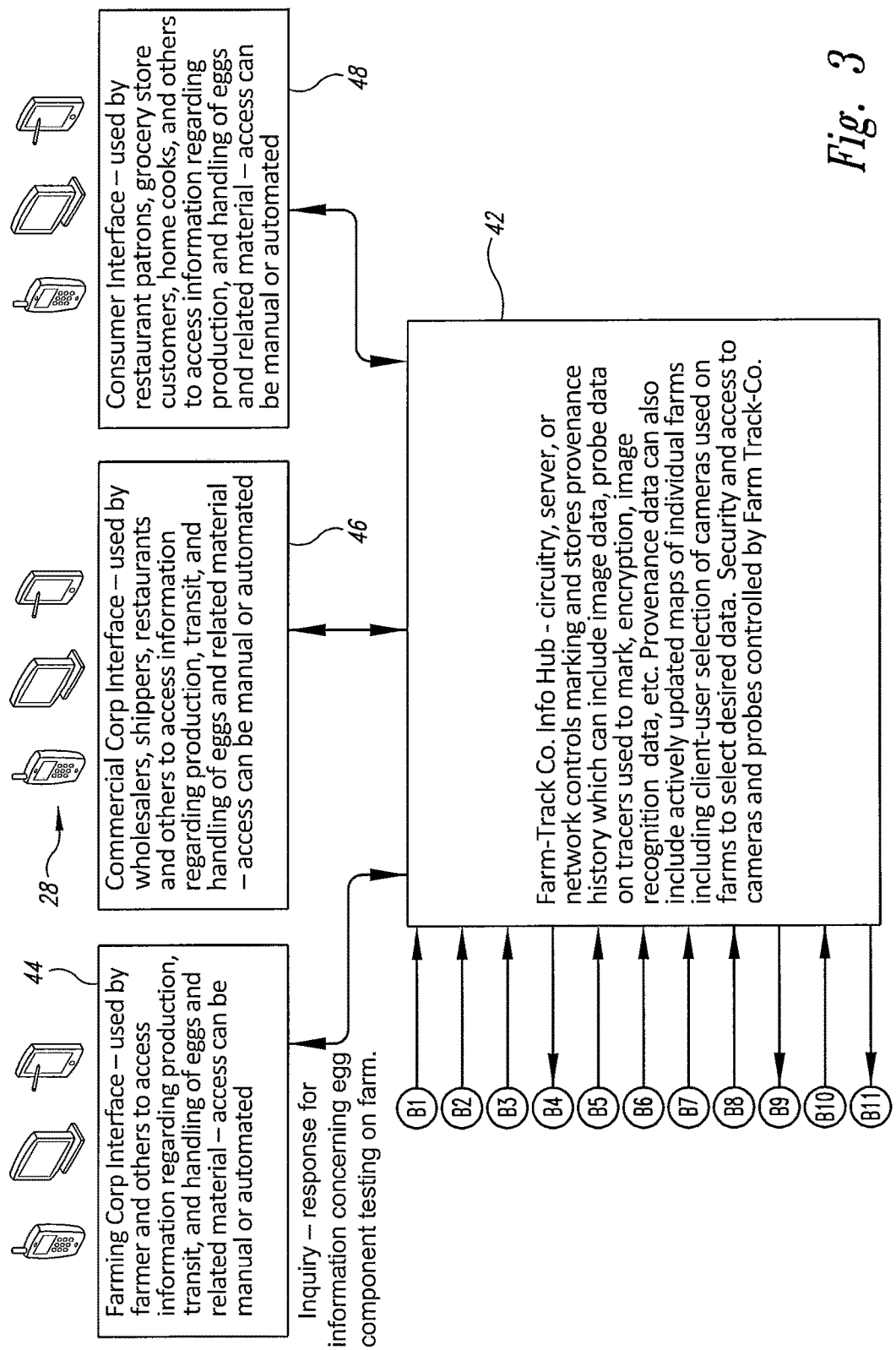
FIG. 3 is a schematic view depicting farm-track co. info hub aspects as related with the farming related ingestible materials production tracking system.
Figure 4:
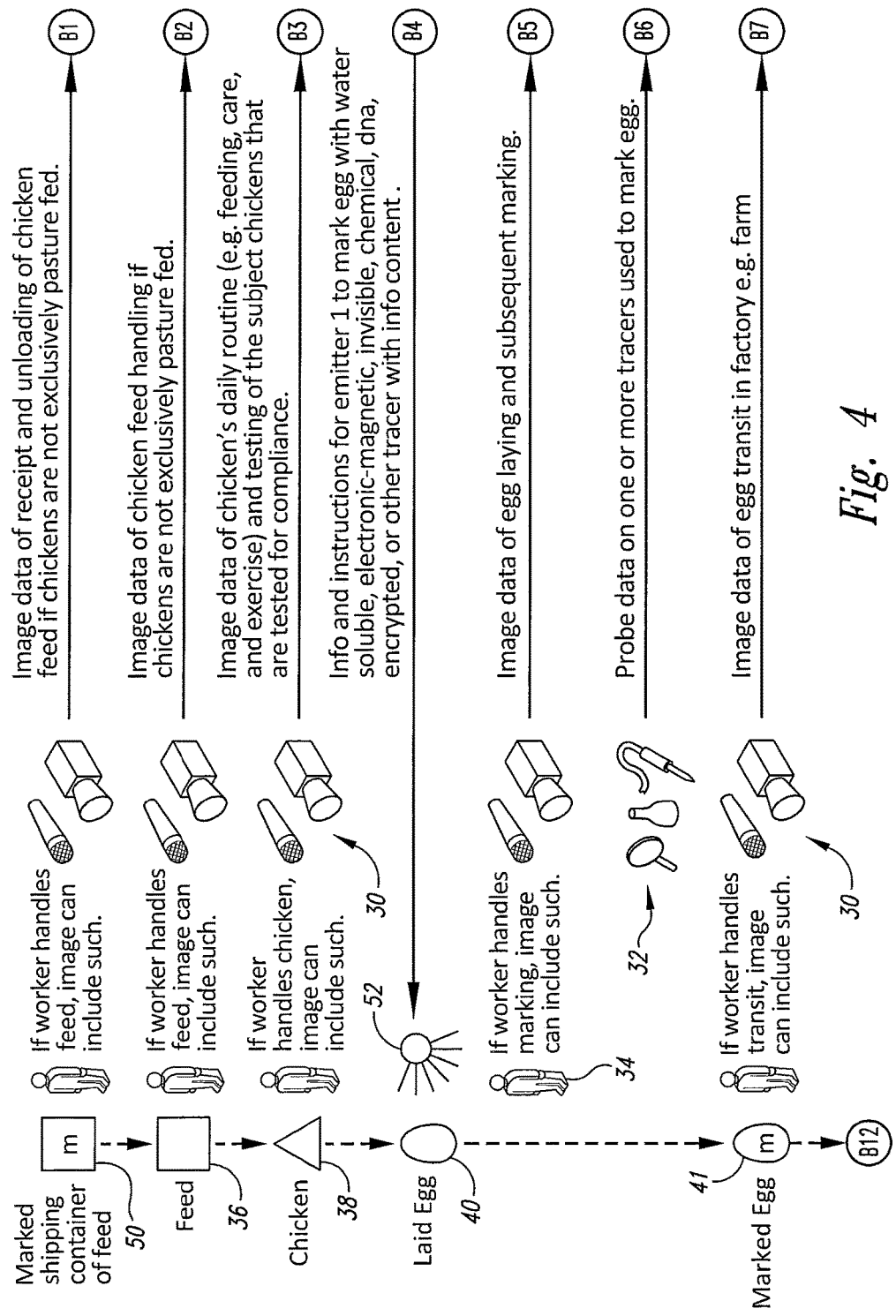
FIG. 4 is a schematic view depicting farm-tracking aspects as related with the farming related ingestible materials production tracking system.
Figure 5:
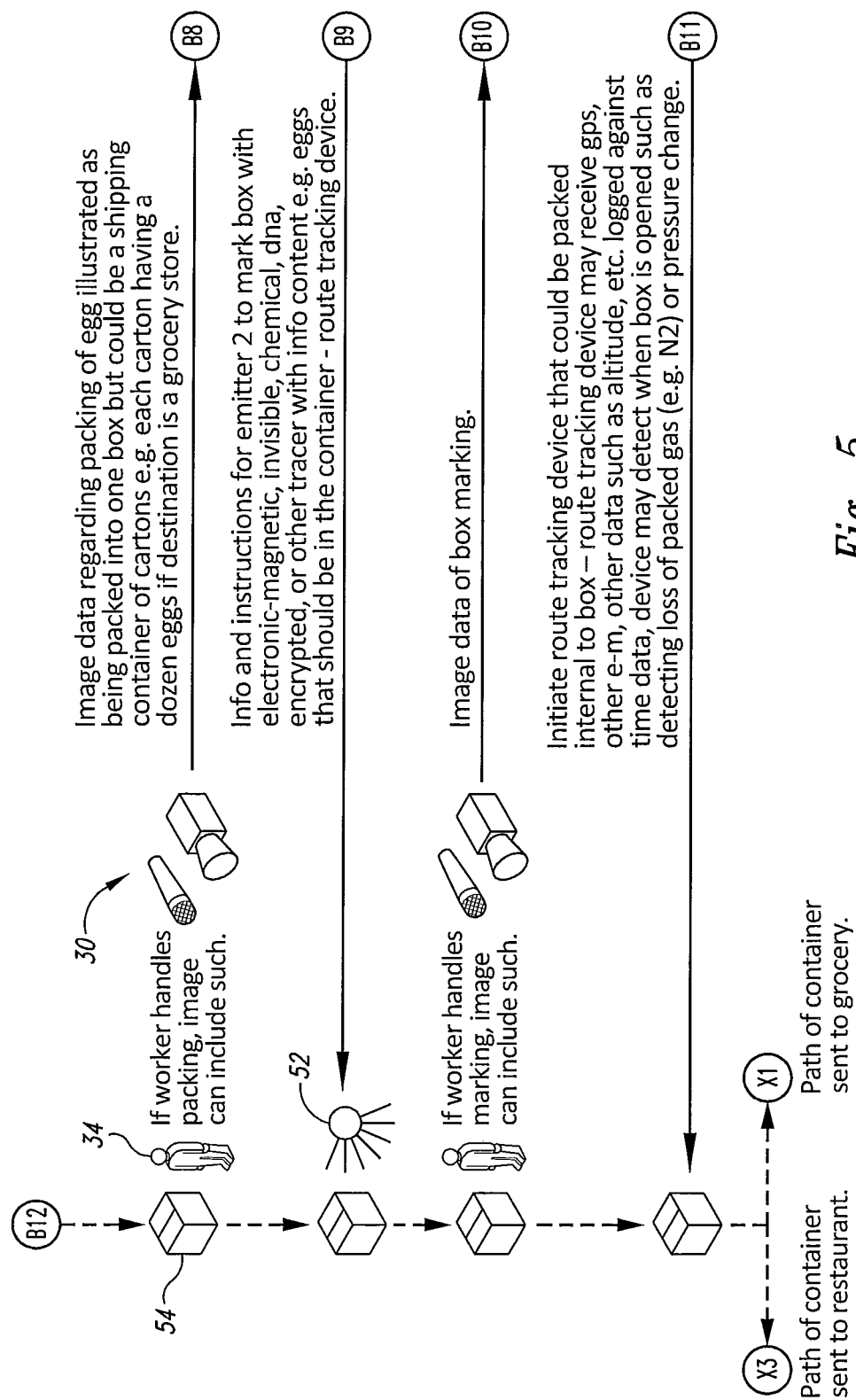
FIG. 5 is a schematic view depicting shipping aspects as related with the farming related ingestible materials production tracking system.

As shown in FIG. 3, interfaces 44, 46, and 48 are used to interact with Farm-Track Co. Info Hub 42 containing various information related to monitoring of production factors and other items concerning one or more farming related production factors or other items. As ingestible material is produced such as egg 40 later becoming marked egg 41 is packed, all such activity involved with such can also be monitored as shown in FIG. 4. The monitoring can be associated with tracers or other labels or marks and also identifiers or other identification information. These associations can be used to access monitoring or testing information through use of tracers and associated identifiers. The tracers can be located at least momentarily in proximity to ingestible material or other production factors to assist in accessing monitoring or testing information. Packing of ingestible material into shipping containers 54 such as shown in FIG. 5 can also be subject to monitoring and labeling of containers through emitters 52.

Figure 6:
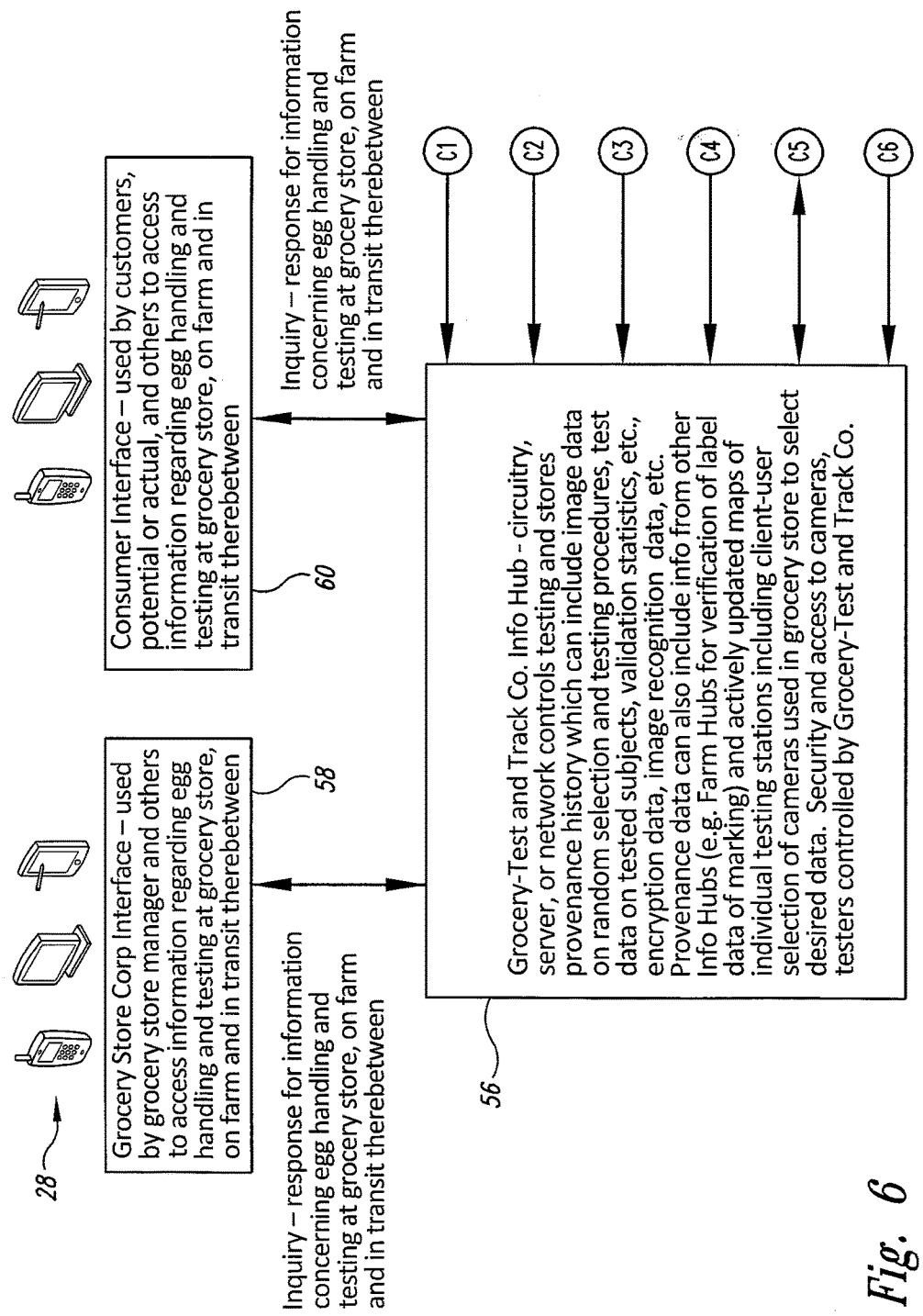
FIG. 6 is a schematic view depicting grocery test and track co. info hub aspects as related with the farming related ingestible materials production tracking system.
Figure 7:
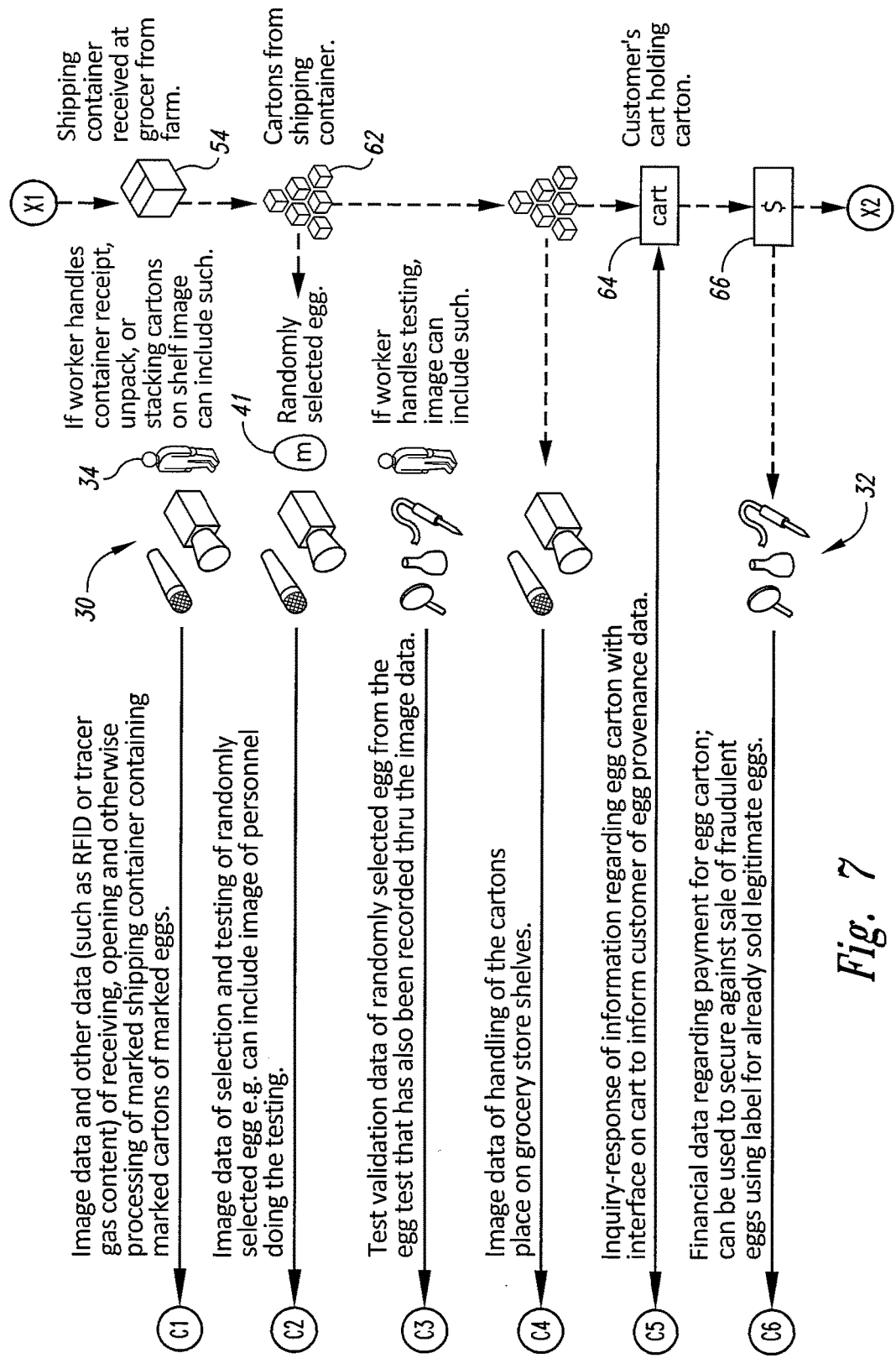
FIG. 7 is a schematic view depicting grocery tracking aspects as related with the farming related ingestible materials production tracking system.

Further monitoring and testing can be performed at commercial locations with information stored on other information hubs such as grocery-test and track co info hub 56 as shown in FIG. 6. Monitoring of grocery activities, such as unpacking cartons 62, use of customer shopping carts 64, and purchase activity 66 shown in FIG. 7, can also be performed.

Figure 8:
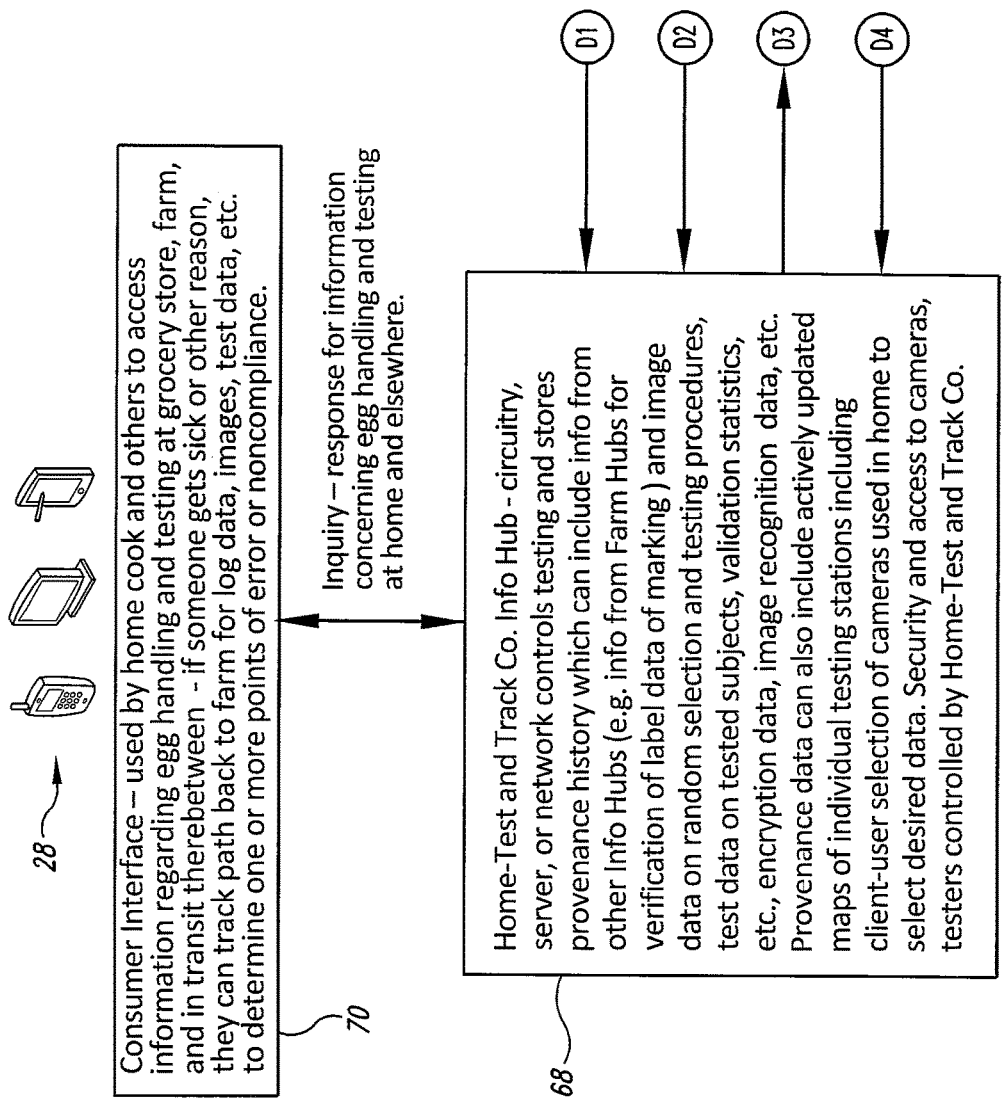
FIG. 8 is a schematic view depicting home-test and track co. info hub aspects as related with the farming related ingestible materials production tracking system.
Figure 9:
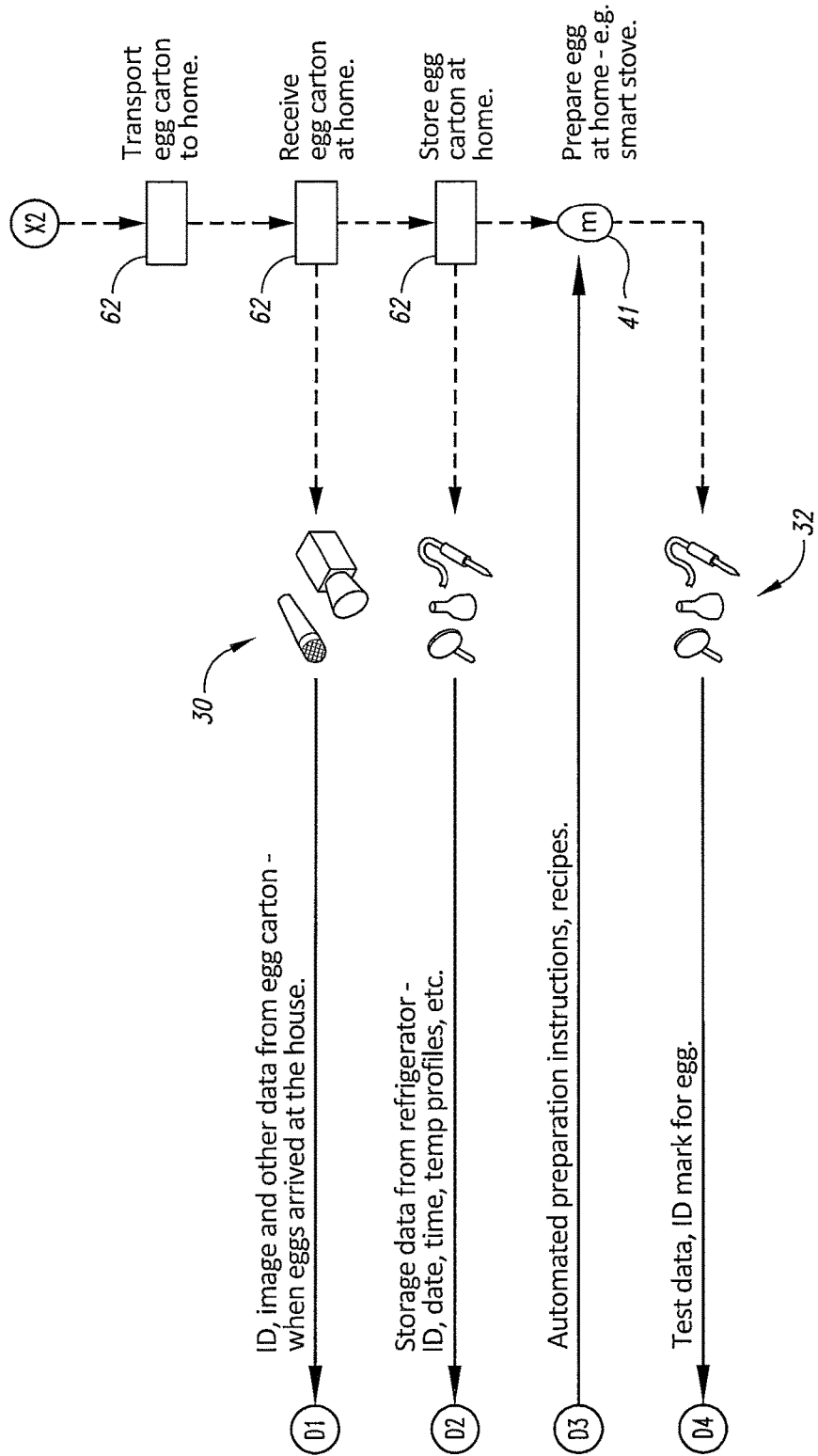
FIG. 9 is a schematic view depicting home tracking aspects as related with the farming related ingestible materials production tracking system.

Monitoring, testing and accessing of data can be accomplished at home as well as depicted in FIG. 8 through use of a home-test track co. info hub 68 and consumer interfaces 28. Further illustrative home activities that can be monitored are shown in FIG. 9 to include transporting, receiving, storing and preparing ingestible material.

Figure 10:
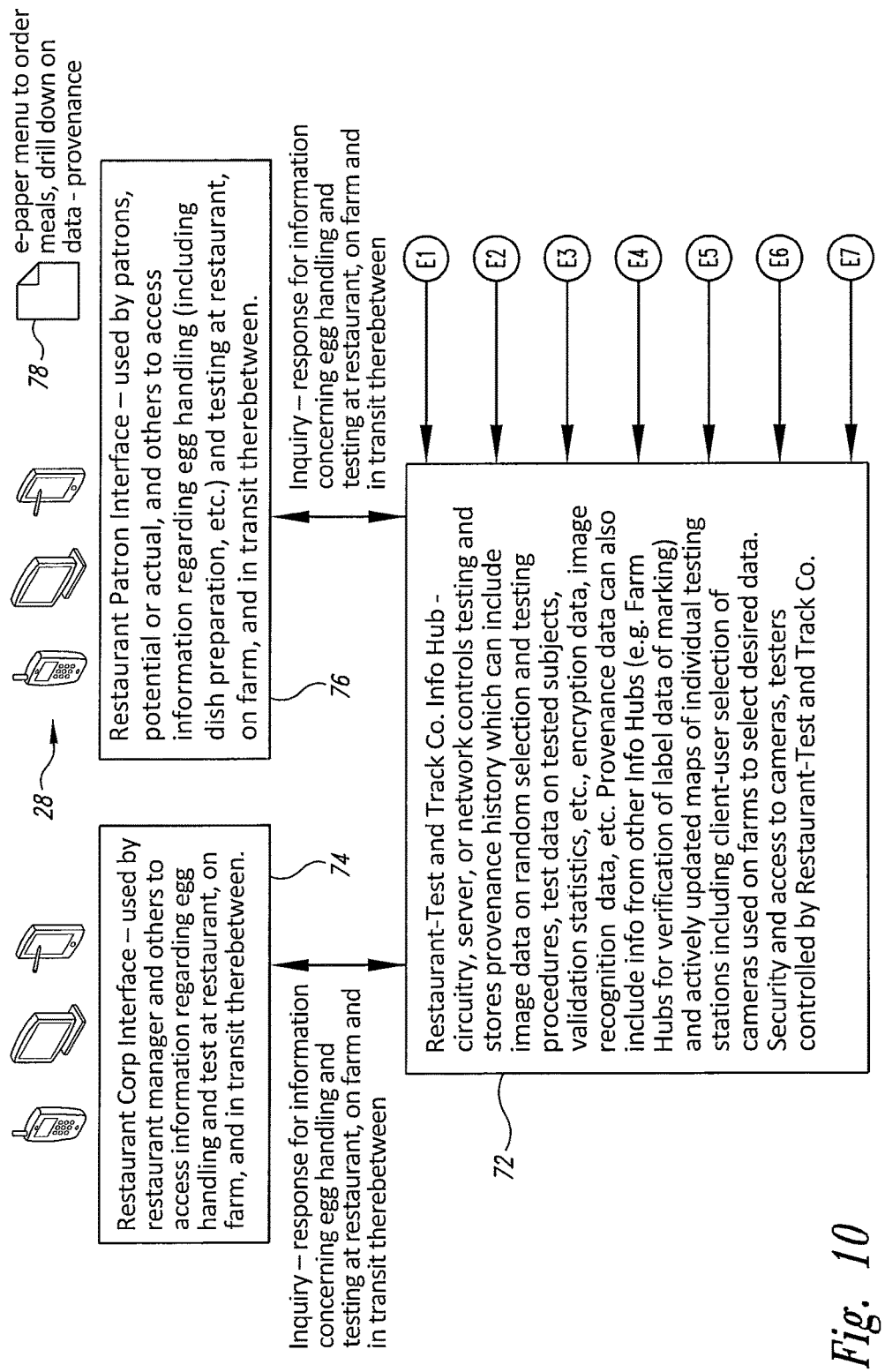
FIG. 10 is a schematic view depicting restaurant-test and track co. info hub aspects as related with the farming related ingestible materials production tracking system.

Other commercial venues for monitoring and testing can include restaurants as illustrated in FIG. 10 to include restaurant-test and track co. info hub 72 that can be used for storage and access of provenance data and also monitoring data of activities conducted at a restaurant. This data can be access by both restaurant personnel and restaurant patrons such as through interfaces 74, 76, and 78 to include menuing systems for the patrons.

Figure 11:
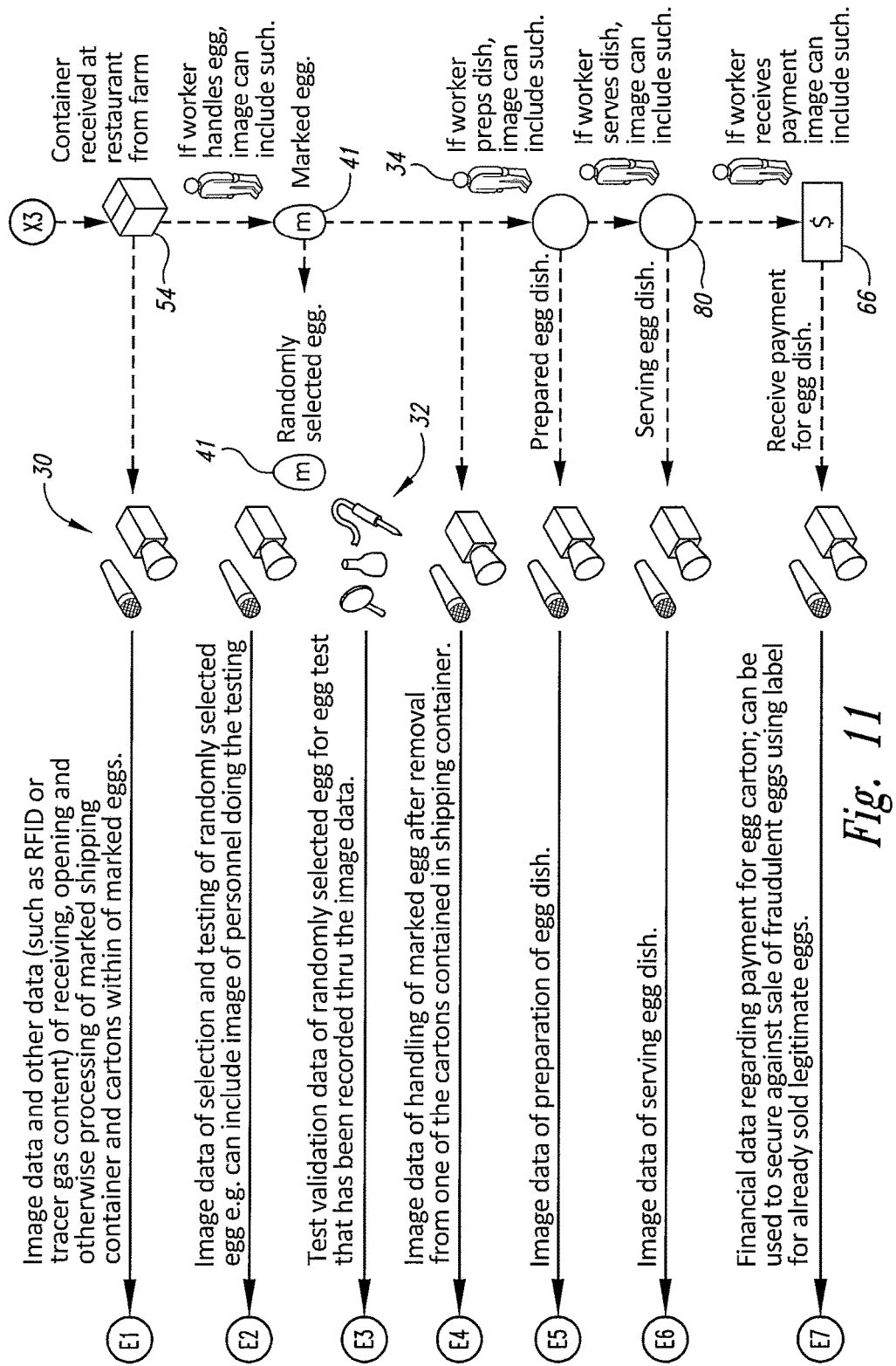
FIG. 11 is a schematic view depicting restaurant tracking aspects as related with the farming related ingestible materials production tracking system.

Activities conducted in a restaurant including those depicted in FIG. 11 such as receiving, handling, preparing, serving 80, and transacting payment can be included in monitoring and testing aspects to be stored on the restaurant-test and track co info hub 72 or elsewhere.

Various aspects embodied and illustrated through FIGS. 1-11 can be enumerated below and are provided to provide examples but are not intended to be limiting.

Figure 12:
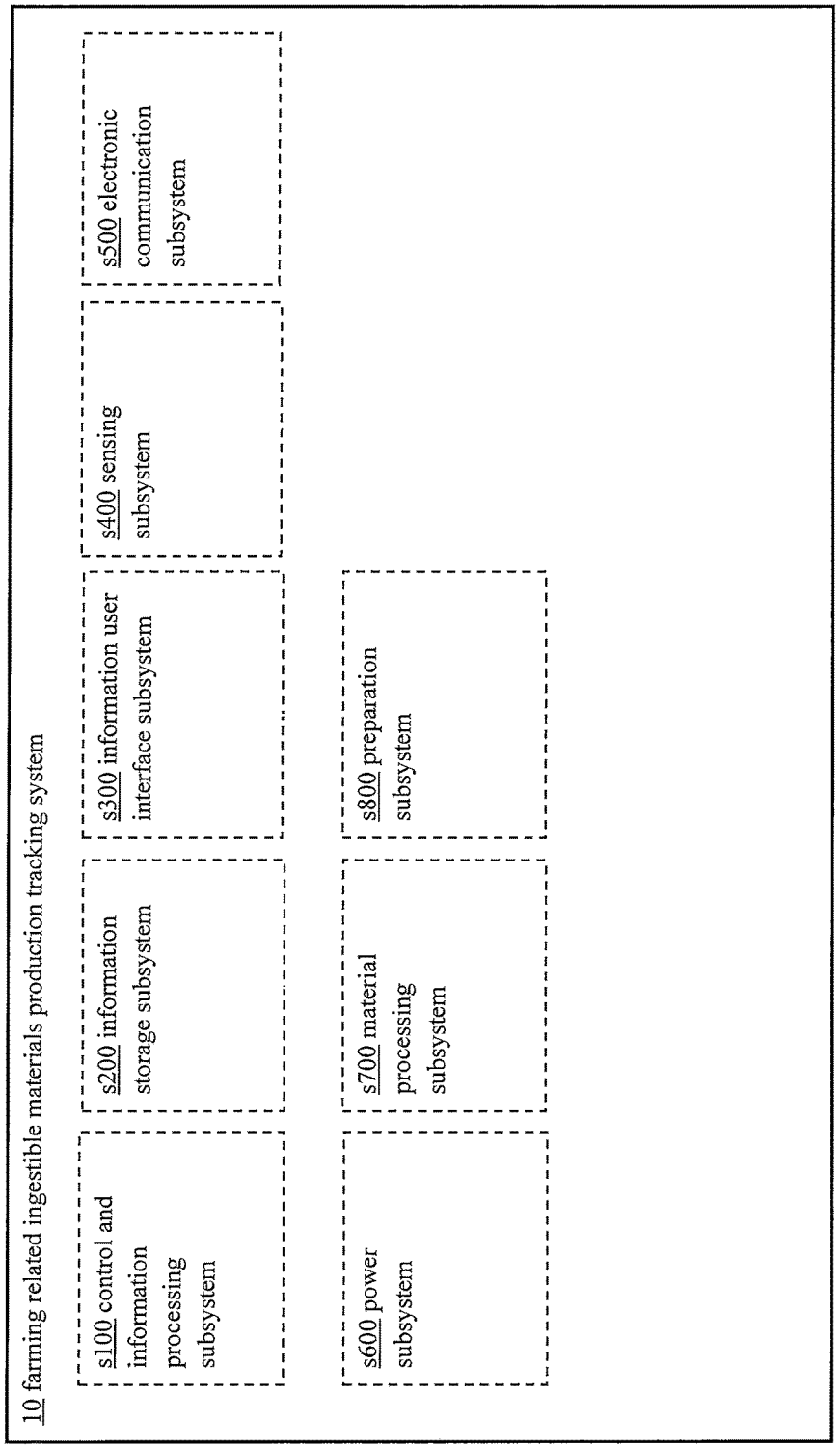
FIG. 12 is a block diagram depicting an exemplary implementation of the farming related ingestible materials production tracking system 10 of FIG. 1 including exemplary subsystems.

1. Feed (e.g. grain) Farm Track Information Hub aspects:
   a. receive fertilizer track and test hub information
   b. receive fertilizer container tracer information or fertilizer tracer information
   c. verify fertilizer container tracer information or fertilizer tracer information with fertilizer track hub information
   d. receive internal fertilizer container tracker information
   e. verify internal fertilizer container tracker information with fertilizer track hub information
   f. receive local fertilizer container handling audio-video and sensor information
   g. scan local fertilizer container handling audio-video and sensor information for error or noncompliance
   h. receive accounting information of production factor use for local fertilizer container handling
   i. correlate local fertilizer container handling audio-video and sensor information with accounting information of production factor use for local fertilizer container handling
   j. associate local fertilizer container handling audio-video and sensor information with fertilizer tracer information
   k. receive local fertilizer handling audio-video and sensor information
   l. scan local fertilizer handling audio-video and sensor information for error or noncompliance
   m. receive accounting information of production factor use for local fertilizer handling
   n. correlate local fertilizer behavior and handling audio-video and sensor information with accounting information of production factor use for local fertilizer handling
   o. associate local fertilizer handling audio-video and sensor information with animal tracer information
   p. receive local feed (grain) handling audio-video and sensor information
   q. associate local feed handling audio-video and sensor information with feed container tracer information or feed tracer information
   r. receive local grain field handling audio-video and sensor information
   s. scan local grain field handling audio-video and sensor information for error or noncompliance
   t. receive accounting information of production factor use for local grain field handling
   u. correlate local grain field handling audio-video and sensor information with accounting information of production factor use for local fertilizer handling
   v. associate local grain field handling audio-video and sensor information with animal tracer information 2. Animal (e.g. chicken) Farm Track and Test Information Hub aspects:
   a. receive feed track hub information
   b. receive feed container tracer information or feed tracer information
   c. verify feed container tracer information or feed tracer information with feed track hub information
   d. receive internal feed container tracker information
   e. verify internal feed container tracker information with feed track hub information
   f. receive local feed handling audio-video and sensor information
   g. associate local feed handling audio-video and sensor information with chicken tracer information
   h. scan local feed handling audio-video and sensor information for error or noncompliance
   i. receive accounting information of production factor use for local feed handling
   j. correlate local feed handling audio-video and sensor information with accounting information of production factor use for local feed handling
   k. send alert to initiate feed sample test event
   l. receive feed test sample tracer information
   m. verify feed test sample tracer information with egg track hub information
   n. receive feed test sample handling audio-video and sensor information
   o. associate feed test sample handing audio-video and sensor information with chicken tracer information
   p. scan feed test sample handling audio-video and sensor information for error or noncompliance
   q. receive accounting information of production factor use for feed test sample handling
   r. correlate feed test sample handling audio-video and sensor information with accounting information of production factor use for feed test sample handling
   s. receive test results for feed test sample
   t. associate test results for feed test sample with feed test sample tracer information
   u. update feed (grain) farm track information hub re butchered chicken portion test sample testing
   v. receive local chicken behavior and handling audio-video and sensor information
   w. associate local chicken behavior and handling audio-video and sensor information with chicken tracer information
   x. scan local chicken behavior and handling audio-video and sensor information for error or noncompliance
   y. receive accounting information of production factor use for local chicken behavior and handling
   z. correlate local chicken behavior and handling audio-video and sensor information with accounting information of production factor use for local chicken behavior and handling
   aa. send alert to initiate chicken sample test event
   bb. receive chicken test sample tracer information
   cc. verify chicken test sample tracer information with egg track hub information dd. receive chicken test sample handling audio-video and sensor information
ee. associate chicken test sample handing audio-video and sensor information with chicken tracer information
ff. scan chicken test sample handling audio-video and sensor information for error or noncompliance
gg. receive accounting information of production factor use for chicken test sample handling
hh. correlate chicken test sample handling audio-video and sensor information with accounting information of production factor use for chicken test sample handling
ii. receive test results for chicken test sample
jj. associate test results for chicken test sample with chicken test sample tracer information
kk. update feed (grain) farm track information hub re chicken test sample testing
ll. scan chicken behavior and handling audio-video and sensor information to determine egg was laid
mm. instruct emitter to mark laid egg with egg tracer(s) upon determining egg was laid
nn. receive local egg marking audio-video and sensor information
oo. scan local egg marking audio-video and sensor information for error or noncompliance
pp. receive accounting information of production factor use for local egg marking
qq. correlate local egg marking audio-video and sensor information with accounting information of production factor use for local egg marking
rr. associate audio-video and sensor information of egg marking with egg tracer information
ss. associate egg tracer information with tracer information of chicken that laid egg
tt. receive local egg handling audio-video and sensor information
uu. scan local egg handling audio-video and sensor information for error or noncompliance
vv. receive accounting information of production factor use for local egg handling
ww. correlate local egg handling audio-video and sensor information with accounting information of production factor use for local egg handling
xx. associate local egg handling audio-video and sensor information with egg tracer information
yy. send alert to initiate egg sample test event
zz. receive egg test sample tracer information
aaa. verify egg test sample tracer information with egg track hub information
bbb. receive egg test sample handling audio-video and sensor information
ccc. associate egg test sample handing audio-video and sensor information with chicken tracer information
ddd. scan egg test sample handling audio-video and sensor information for error or noncompliance
eee. receive accounting information of production factor use for egg test sample handling
fff. correlate egg test sample handling audio-video and sensor information with accounting information of production factor use for egg test sample handling
ggg. receive test results for egg test sample
hhh. associate test results for egg test sample with egg test sample tracer information
iii. update feed (grain) farm track information hub re egg test sample testing
jjj. receive local egg hatching into hatched chicken audio-video and sensor information
kkk. scan local egg hatching into hatched audio-video and sensor information for error or noncompliance
lll. receive accounting information of production factor use for local egg hatching into hatched chicken
mmm. correlate local egg hatching audio-video and sensor information with accounting information of production factor use for local egg hatching into hatched chicken
nnn. associate local egg hatching into hatched chicken audio-video and sensor information with egg tracer information
ooo. send alert to initiate hatched chicken sample test event
ppp. receive hatched chicken test sample tracer information
qqq. verify hatched chicken test sample tracer information with egg track hub information
rrr. receive hatched chicken test sample handling audio-video and sensor information
sss. associate hatched chicken test sample handing audio-video and sensor information with chicken tracer information
ttt. scan hatched chicken test sample handling audio-video and sensor information for error or noncompliance
uuu. receive accounting information of production factor use for hatched chicken test sample handling
vvv. correlate hatched chicken test sample handling audio-video and sensor information with accounting information of production factor use for hatched chicken test sample handling
www. receive test results for hatched chicken test sample
xxx. associate test results for hatched chicken test sample with hatched chicken test sample tracer information
yyy. update feed (grain) farm track information hub re hatched chicken test sample testing
zzz. instruct emitter to mark local hatched chicken with hatched chicken tracer(s)
aaaa. receive local hatched chicken marking audio-video and sensor information
bbbb. scan local hatched chicken marking audio-video and sensor information for error or noncompliance
cccc. receive accounting information of production factor use for local hatched chicken marking
dddd. correlate local hatched chicken marking audio-video and sensor information with accounting information of production factor use for local hatched chicken marking
eeee. associate local hatched chicken audio-video and sensor information with local hatched chicken tracer information
ffff. receive local hatched chicken behavior audio-video and sensor information
gggg. scan local hatched chicken behavior audio-video and sensor information for error or noncompliance
hhhh. receive accounting information of production factor use for local hatched chicken behavior
iiii. correlate local hatched chicken behavior audio-video and sensor information with accounting information of production factor use for local hatched chicken behavior
jjjj. associate local hatched chicken behavior audio-video and sensor information with local hatched chicken tracer information
kkkk. send alert to initiate hatched chicken sample test event
llll. receive hatched chicken test sample tracer information mmmm. verify hatched chicken test sample tracer information with egg track hub information
nnnn. receive hatched chicken test sample handling audio-video and sensor information
oooo. associate hatched chicken test sample handing audio-video and sensor information with chicken tracer information
pppp. scan hatched chicken test sample handling audio-video and sensor information for error or noncompliance
qqqq. receive accounting information of production factor use for hatched chicken test sample handling
rrrr. correlate hatched chicken test sample handling audio-video and sensor information with accounting information of production factor use for hatched chicken test sample handling
ssss. receive test results for hatched chicken test sample
tttt. associate test results for hatched chicken test sample with hatched chicken test sample tracer information
uuuu. update feed (grain) farm track information hub re hatched chicken test sample testing
vvvv. scan handling and behavior of local hatched chicken to determine when slaughter of local hatched chicken occurs
wwww. scan handling of slaughter of local hatched chicken for error or non-compliance
xxxx. receive accounting information of production factor use for slaughter of local hatched chicken
yyyy. correlate slaughter of local hatched chicken behavior audio-video and sensor information with accounting information of production factor use for slaughter of local hatched chicken
zzzz. associate slaughter of local hatched chicken audio-video and sensor information with local hatched chicken tracer information
aaaaa. scan handling and behavior of local hatched chicken to determine when butcher of local hatched chicken occurs
bbbbb. scan handling of butcher of local hatched chicken for error or non-compliance
ccccc. receive accounting information of production factor use for butcher of local hatched chicken
ddddd. correlate butcher of local hatched chicken audio-video and sensor information with accounting information of production factor use for butcher of local hatched chicken
eeeee. associate butcher of local hatched chicken audio-video and sensor information with local hatched chicken tracer
fffff. instruct emitter to mark each portion of butchered chicken with chicken portion tracer(s)
ggggg. receive butchered chicken portion marking audio-video and sensor information
hhhhh. scan butchered chicken portion marking audio-video and sensor information for error or noncompliance
iiiii. receive accounting information of production factor use for butchered chicken portion marking
jjjjj. correlate butchered chicken portion marking audio-video and sensor information with accounting information of production factor use for butchered chicken portion marking
kkkkk. associate butchered chicken portion marking audio-video and sensor information with butchered chicken portion tracer information
lllll. send alert to initiate butchered chicken portion sample test event
mmmmm. receive butchered chicken portion test sample tracer information
nnnnn. verify butchered chicken portion test sample tracer information with egg track hub information
ooooo. receive butchered chicken portion test sample handling audio-video and sensor information
ppppp. associate butchered chicken portion test sample handing audio-video and sensor information with chicken tracer information
qqqqq. scan butchered chicken portion test sample handling audio-video and sensor information for error or noncompliance
rrrrr. receive accounting information of production factor use for butchered chicken portion test sample handling
sssss. correlate butchered chicken portion test sample handling audio-video and sensor information with accounting information of production factor use for butchered chicken portion test sample handling
ttttt. receive test results for butchered chicken portion test sample
uuuuu. associate test results for butchered chicken portion test sample with butchered chicken portion test sample tracer information
vvvvv. update feed (grain) farm track information hub re butchered chicken portion test sample testing
wwwww. receive local packing butchered chicken portion into butchered chicken portion carton audio-video and sensor information
xxxxx. scan local packing butchered chicken portion into butchered chicken portion carton handling audio-video and sensor information for error or noncompliance
yyyyy. receive accounting information of production factor use for local packing butchered chicken portion into butchered chicken portion carton
zzzzz. correlate local packing butchered chicken portion into butchered chicken portion carton handling audio-video and sensor information with accounting information of production factor use for local packing butchered chicken portion into butchered chicken portion carton
aaaaaa. associate local packing butchered chicken portion into butchered chicken portion carton audio-video and sensor information with butchered chicken portion tracer information
bbbbbb. instruct emitter to mark butchered chicken portion carton with butchered chicken portion carton tracer(s)
cccccc. receive local butchered chicken portion carton marking audio-video and sensor information
dddddd. scan local butchered chicken portion carton marking audio-video and sensor information for error or noncompliance
eeeeee. receive accounting information of production factor use for local butchered chicken portion carton marking
ffffff. correlate local butchered chicken portion carton marking audio-video and sensor information with accounting information of production factor use for local butchered chicken portion carton marking
gggggg. associate butchered chicken portion carton marking audio-video and sensor information with butchered chicken portion carton tracer information
hhhhhh. receive local packing butchered chicken portion carton into carton container audio-video and sensor information iiiiii. scan local packing butchered chicken portion carton into carton container audio-video and sensor information for error or noncompliance jjjjjj. receive accounting information of production factor use for local packing butchered chicken portion carton into carton container kkkkkk. correlate local packing butchered chicken portion carton into carton container audio-video and sensor information with accounting information of production factor use for local packing butchered chicken portion carton into carton container llllll. associate local packing butchered chicken portion carton into carton container audio-video and sensor information with carton container tracer information mmmmmm. instruct emitter to mark carton container with carton container tracer(s)

nnnnnn. receive local carton container marking audio-video and sensor information oooooo. scan local carton container marking audio-video and sensor information for error or noncompliance pppppp. receive accounting information of production factor use for local carton container marking qqqqqq. correlate local carton container marking audio-video and sensor information with accounting information of production factor use for local carton container marking rrrrrr. associate local carton container marking audio-video and sensor information with carton container tracer information 3. Farm (e.g. egg) Track Information Hub 42 aspects:
a. receive feed track hub information
b. receive feed container tracer information or feed tracer information
c. verify feed container tracer information or feed tracer information with feed track hub information
d. receive internal feed container tracker information
e. verify internal feed container tracker information with feed track hub information
f. receive local feed handling audio-video and sensor information
g. associate local feed handling audio-video and sensor information with chicken tracer information
h. scan local feed handling audio-video and sensor information for error or noncompliance
i. receive accounting information of production factor use for local feed handling
j. correlate local feed handling audio-video and sensor information with accounting information of production factor use for local feed handling
k. receive chicken track hub information
l. receive chicken container tracer information or chicken tracer information
m. verify chicken container tracer information or chicken tracer information with chicken track hub information
n. receive internal chicken container tracker information
o. verify internal chicken container tracker information with chicken track hub information
p. receive local chicken behavior and handling audio-video and sensor information
q. associate local chicken behavior and handling audio-video and sensor information with chicken tracer information
r. scan local chicken behavior and handling audio-video and sensor information for error or noncompliance
s. receive accounting information of production factor use for local chicken behavior and handling
t. correlate local chicken behavior and handling audio-video and sensor information with accounting information of production factor use for local chicken behavior and handling
u. scan chicken behavior and handling audio-video and sensor information to determine egg was laid
v. instruct emitter to mark laid egg with egg tracer(s) upon determining egg was laid
w. receive local egg marking audio-video and sensor information
x. scan local egg marking audio-video and sensor information for error or noncompliance
y. receive accounting information of production factor use for local egg marking
z. correlate local egg marking audio-video and sensor information with accounting information of production factor use for local egg marking
aa. associate audio-video and sensor information of egg marking with egg tracer information
bb. associate egg tracer information with tracer information of chicken that laid egg
cc. receive local egg handling (includes marking) audio-video and sensor information
dd. scan local egg handling audio-video and sensor information for error or noncompliance
ee. receive accounting information of production factor use for local egg handling
ff. correlate local egg handling audio-video and sensor information with accounting information of production factor use for local egg handling
gg. associate local egg handling audio-video and sensor information with egg tracer information
hh. receive local packing egg into egg carton audio-video and sensor information
ii. scan local packing egg into egg carton handling audio-video and sensor information for error or noncompliance
jj. receive accounting information of production factor use for local packing egg into egg carton
kk. correlate local packing egg into egg carton handling audio-video and sensor information with accounting information of production factor use for local packing egg into egg carton
ll. associate local packing egg into egg carton audio-video and sensor information with egg tracer information
mm. instruct emitter to mark egg carton with egg carton tracer(s)
nn. receive local egg carton marking audio-video and sensor information
oo. scan local egg carton marking audio-video and sensor information for error or noncompliance
pp. receive accounting information of production factor use for local egg carton marking
qq. correlate local egg carton marking audio-video and sensor information with accounting information of production factor use for local egg carton marking
rr. associate egg carton marking audio-video and sensor information with egg carton tracer information
ss. receive local egg carton handling audio-video and sensor handling information
tt. scan local egg carton handling audio-video and sensor information for error or noncompliance
uu. receive accounting information of production factor use for local egg carton handling
vv. correlate local egg carton handling audio-video and sensor information with accounting information of production factor use for local egg carton handling ww. associate local egg carton handling audio-video and sensor information with egg carton tracer information
xx. associate carton tracer information with egg tracer information
yy. receive local packing egg carton into carton container audio-video and sensor information
zz. scan local packing egg carton into carton container audio-video and sensor information for error or noncompliance
aaa. receive accounting information of production factor use for local packing egg carton into carton container
bbb. correlate local packing egg carton into carton container audio-video and sensor information with accounting information of production factor use for local packing egg carton into carton container
ccc. associate local packing egg carton into carton container audio-video and sensor information with carton container tracer information
ddd. instruct emitter to mark carton container with carton container tracer(s)
eee. receive local carton container marking audio-video and sensor information
fff. scan local carton container marking audio-video and sensor information for error or noncompliance
ggg. receive accounting information of production factor use for local carton container marking
hhh. correlate local carton container marking audio-video and sensor information with accounting information of production factor use for local carton container marking
iii. associate local carton container marking audio-video and sensor information with carton container tracer information
jjj. receive local carton container handling audio-video and sensor information
kkk. scan local carton container handling audio-video and sensor information for error or noncompliance
lll. receive accounting information of production factor use for local carton container handling
mmm. correlate local carton container handling audio-video and sensor information with accounting information of production factor use for local carton container handling
nnn. associate carton container handling audio-video and sensor information with carton container tracer information
ooo. associate carton container tracer information with egg carton tracer information
ppp. initiate tracker placed internally in carton container during packing thereof
qqq. receive egg test hub information
4. Farm (e.g. egg) Test Information Hub 20 aspects:
a. receive egg track hub information
b. send alert to initiate local feed sample test event
c. receive local feed test sample tracer information
d. verify local feed test sample tracer information with egg track hub information
e. receive local feed test sample handling audio-video and sensor information
f. associate local feed test sample handing audio-video and sensor information with local feed test sample tracer information
g. scan local feed test sample handling audio-video and sensor information for error or noncompliance
h. receive accounting information of production factor use for local feed test sample handling
i. correlate local feed test sample handling audio-video and sensor information with accounting information of production factor use for local feed test sample handling
j. receive test results for local feed test sample
k. associate test results for local feed test sample with local feed test sample tracer information
l. update egg farm track information hub re local feed test sample testing
m. update chicken farm track information hub re local feed test sample testing
n. update feed (grain) farm track information hub re local feed test sample testing
o. send alert to initiate local chicken sample test event
p. receive local chicken test sample tracer information
q. verify local chicken test sample tracer information with egg track hub information
r. receive local chicken test sample handling audio-video and sensor information
s. associate local chicken test sample handing audio-video and sensor information with chicken tracer information
t. scan local chicken test sample handling audio-video and sensor information for error or noncompliance
u. receive accounting information of production factor use for local chicken test sample handling
v. correlate local chicken test sample handling audio-video and sensor information with accounting information of production factor use for local chicken test sample handling
w. receive test results for local chicken test sample
x. associate test results for local chicken test sample with local chicken test sample tracer information
y. update egg farm track information hub re local chicken test sample testing
z. update chicken farm track information hub re local chicken test sample testing
aa. update feed (grain) farm track information hub re local chicken test sample testing
bb. receive local egg test sample tracer information
cc. verify local egg test sample tracer information with egg track hub information
dd. receive local egg test sample handling audio-video and sensor information
ee. associate local egg test sample handing audio-video and sensor information with egg tracer information
ff. scan local egg test sample handling audio-video and sensor information for error or noncompliance
gg. receive accounting information of production factor use for local egg test sample handling
hh. correlate local egg test sample handling audio-video and sensor information with accounting information of production factor use for local egg test sample handling
ii. receive test results for local egg test sample
jj. associate test results for local egg test sample with local egg test sample tracer information
kk. update egg farm track information hub re local egg test sample testing
ll. update chicken farm track information hub re local egg test sample testing
mm. update feed (grain) farm track information hub re local egg test sample testing
5. Restaurant Test and Track Information Hub 68 aspects:
a. receive egg farm track hub information
b. receive egg farm test hub information
c. receive carton container tracer information
d. verify carton container tracer information with egg track hub information e. receive internal carton container tracker information
f. verify internal carton container tracker information with egg track hub information
g. receive local carton container handling audio-video and sensor information
h. scan local carton container handling audio-video and sensor information for error or noncompliance
i. receive accounting information of production factor use for local carton container handling
j. correlate local carton container handling audio-video and sensor information with accounting information of production factor use for local carton container handling
k. associate local handling of carton container audio-video and sensor information with carton container tracer information
l. receive local egg carton handling audio-video and sensor information
m. scan local egg carton handling audio-video and sensor information for error or noncompliance
n. receive accounting information of production factor use for local egg carton handling
o. correlate local egg carton handling audio-video and sensor information with accounting information of production factor use for local egg carton handling
p. associate local egg carton handling audio-video and sensor information with egg carton tracer information
q. receive local egg handling audio-video and sensor information
r. scan local egg handling audio-video and sensor information for error or noncompliance
s. receive accounting information of production factor use for local egg handling
t. correlate local egg handling audio-video and sensor information with accounting information of production factor use for local egg handling
u. associate local egg handling audio-video and sensor information with egg tracer information
v. send alert to initiate local egg sample test event
w. receive local egg test sample tracer information
x. verify local egg test sample tracer information with egg track hub information
y. receive local egg test sample handling audio-video and sensor information
z. associate local egg test sample handing audio-video and sensor information with egg tracer information
aa. scan local egg test sample handling audio-video and sensor information for error or noncompliance
bb. receive accounting information of production factor use for local egg test sample handling
cc. correlate local egg test sample handling audio-video and sensor information with accounting information of production factor use for local egg test sample handling
dd. receive test results for local egg test sample
ee. associate test results for local egg test sample with local egg test sample tracer information
ff. update egg farm track information hub re local egg test sample testing
gg. update chicken farm track information hub re local egg test sample testing
hh. update feed (grain) farm track information hub re local egg test sample testing
ii. receive local egg dish preparation audio-video and sensor information
jj. scan local egg dish preparation audio-video and sensor information for error or noncompliance
kk. receive accounting information of production factor use for local egg dish preparation
ll. correlate local egg dish preparation audio-video and sensor information with accounting information of production factor use for local egg dish preparation
mm. associate local egg dish preparation audio-video and sensor information with egg tracer information
nn. receive local egg dish serving audio-video and sensor information
oo. scan local egg dish serving audio-video and sensor information for error or noncompliance
pp. receive accounting information of production factor use for local egg dish serving
qq. correlate local egg dish serving audio-video and sensor information with accounting information of production factor use for local egg dish serving
rr. associate local egg dish serving audio-video and sensor information with egg tracer information
ss. receive local egg dish payment audio-video and sensor information
tt. scan local egg dish payment audio-video and sensor information for error or noncompliance
uu. receive accounting information of production factor use for local egg dish payment
vv. correlate local egg dish payment audio-video and sensor information with accounting information of production factor use for local egg dish payment
ww. associate local egg dish payment audio-video and sensor information with egg tracer information
6. Grocery Test and Track Information Hub 56 aspects:
a. receive egg farm track hub information
b. receive egg farm test hub information
c. receive carton container tracer information
d. verify carton container tracer information with egg track hub information
e. receive internal carton container tracker information
f. verify internal carton container tracker information with egg track hub information
g. receive local carton container handling audio-video and sensor information
h. scan local carton container handling audio-video and sensor information for error or noncompliance
i. receive accounting information of production factor use for local carton container handling
j. correlate local carton container handling audio-video and sensor information with accounting information of production factor use for local carton container handling
k. associate local handling of carton container audio-video and sensor information with carton container tracer information
l. receive local egg carton handling audio-video and sensor information
m. scan local egg carton handling audio-video and sensor information for error or noncompliance
n. receive accounting information of production factor use for local egg carton handling
o. correlate local egg carton handling audio-video and sensor information with accounting information of production factor use for local egg carton handling
p. associate local egg carton handling audio-video and sensor information with egg carton tracer information
q. send alert to initiate local egg sample test event
r. receive local egg test sample tracer information
s. verify local egg test sample tracer information with egg track hub information t. receive local egg test sample handling audio-video and sensor information
u. associate local egg test sample handing audio-video and sensor information with egg tracer information
v. scan local egg test sample handling audio-video and sensor information for error or noncompliance
w. receive accounting information of production factor use for local egg test sample handling
x. correlate local egg test sample handling audio-video and sensor information with accounting information of production factor use for local egg test sample handling
y. receive test results for local egg test sample
z. associate test results for local egg test sample with local egg test sample tracer information
aa. update egg farm track information hub re local egg test sample testing
bb. update chicken farm track information hub re local egg test sample testing
cc. update feed (grain) farm track information hub re local egg test sample testing
dd. receive local egg carton payment audio-video and sensor information
ee. scan local egg carton payment audio-video and sensor information for error or noncompliance
ff. receive accounting information of production factor use for local egg carton payment
gg. correlate local egg carton payment audio-video and sensor information with accounting information of production factor use for local egg carton payment
hh. associate local egg carton payment audio-video and sensor information with egg carton tracer information
7. Home Test and Track Information Hub 68 aspects:
a. receive grocery test and track hub information
b. receive egg carton tracer information
c. verify egg carton tracer information with egg track hub information
d. receive internal carton container tracker information
e. verify internal carton container tracker information with egg track hub information
f. receive local egg carton handling audio-video and sensor information
g. scan local egg carton handling audio-video and sensor information for error or noncompliance
h. receive accounting information of production factor use for local egg carton handling
i. correlate local egg carton handling audio-video and sensor information with accounting information of production factor use for local egg carton handling
j. associate local egg carton handling audio-video and sensor information with egg carton tracer information
k. receive local egg handling audio-video and sensor information
l. scan local egg handling audio-video and sensor information for error or noncompliance
m. receive accounting information of production factor use for local egg handling
n. correlate local egg handling audio-video and sensor information with accounting information of production factor use for local egg handling
o. associate local egg handling audio-video and sensor information with egg tracer information
p. send alert to initiate local egg sample test event
q. receive local egg test sample tracer information
r. verify local egg test sample tracer information with egg track hub information
s. receive local egg test sample handling audio-video and sensor information
t. associate local egg test sample handing audio-video and sensor information with egg tracer information
u. scan local egg test sample handling audio-video and sensor information for error or noncompliance
v. receive accounting information of production factor use for local egg test sample handling
w. correlate local egg test sample handling audio-video and sensor information with accounting information of production factor use for local egg test sample handling
x. receive test results for local egg test sample
y. associate test results for local egg test sample with local egg test sample tracer information
z. update grocery track information hub re local egg test sample testing
aa. update egg farm track information hub re local egg test sample testing
bb. update chicken farm track information hub re local egg test sample testing
cc. update feed (grain) farm track information hub re local egg test sample testing
dd. receive local egg dish preparation audio-video and sensor information
ee. scan local egg dish preparation audio-video and sensor information for error or noncompliance
ff. receive accounting information of production factor use for local egg dish preparation
gg. correlate local egg dish preparation audio-video and sensor information with accounting information of production factor use for local egg dish preparation
hh. associate local egg dish preparation audio-video and sensor information with egg tracer information
ii. receive local egg dish serving audio-video and sensor information
jj. scan local egg dish serving audio-video and sensor information for error or noncompliance
kk. receive accounting information of production factor use for local egg dish serving
ll. correlate local egg dish serving audio-video and sensor information with accounting information of production factor use for local egg dish serving
mm. associate local egg dish serving audio-video and sensor information with egg tracer information An exemplary version of the farming related ingestible materials production tracking system 10 is shown in FIG. 12 to optionally include various subsystems such as control and information processing subsystem s100, information storage subsystem s200, information user interface subsystem s300, sensing subsystem s400, electronic communication subsystem s500, power subsystem s600, material processing subsystem s700, and preparation subsystem s800.

Figure 13:
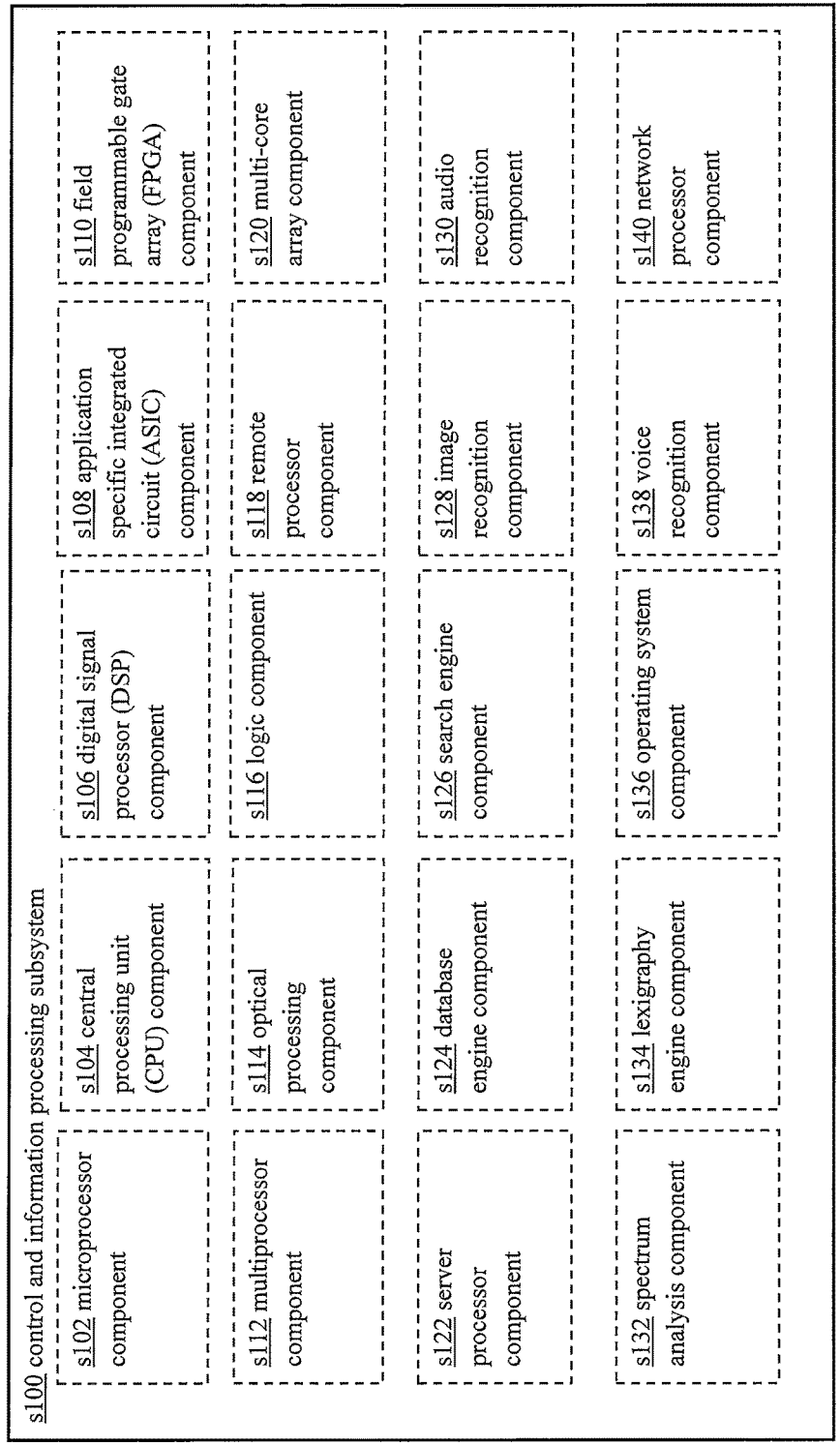
FIG. 13 is a block diagram depicting a control and information processing subsystem s100 of an exemplary implementation of the farming related ingestible materials production tracking system 10 of FIG. 1.

An exemplary implementation of the control and information processing subsystem s100 is shown in FIG. 13 to optionally include various components such as microprocessor component s102, central processing unit (CPU) component s104, digital signal processor (DSP) component s106, application specific integrated circuit (ASIC) component s108, field programmable gate array (FPGA) component s110, multiprocessor component s112, optical processing component s114, logic component s116, remote processor component s118, multi-core array component s120, server processor component s122, database engine component s124, search engine component s126, image recognition component s128, audio recognition component s130, spectrum analysis component s132, lexigraphy engine component s134, operating system component s136, voice recognition component s138, and network processor component s140.

Figure 14:
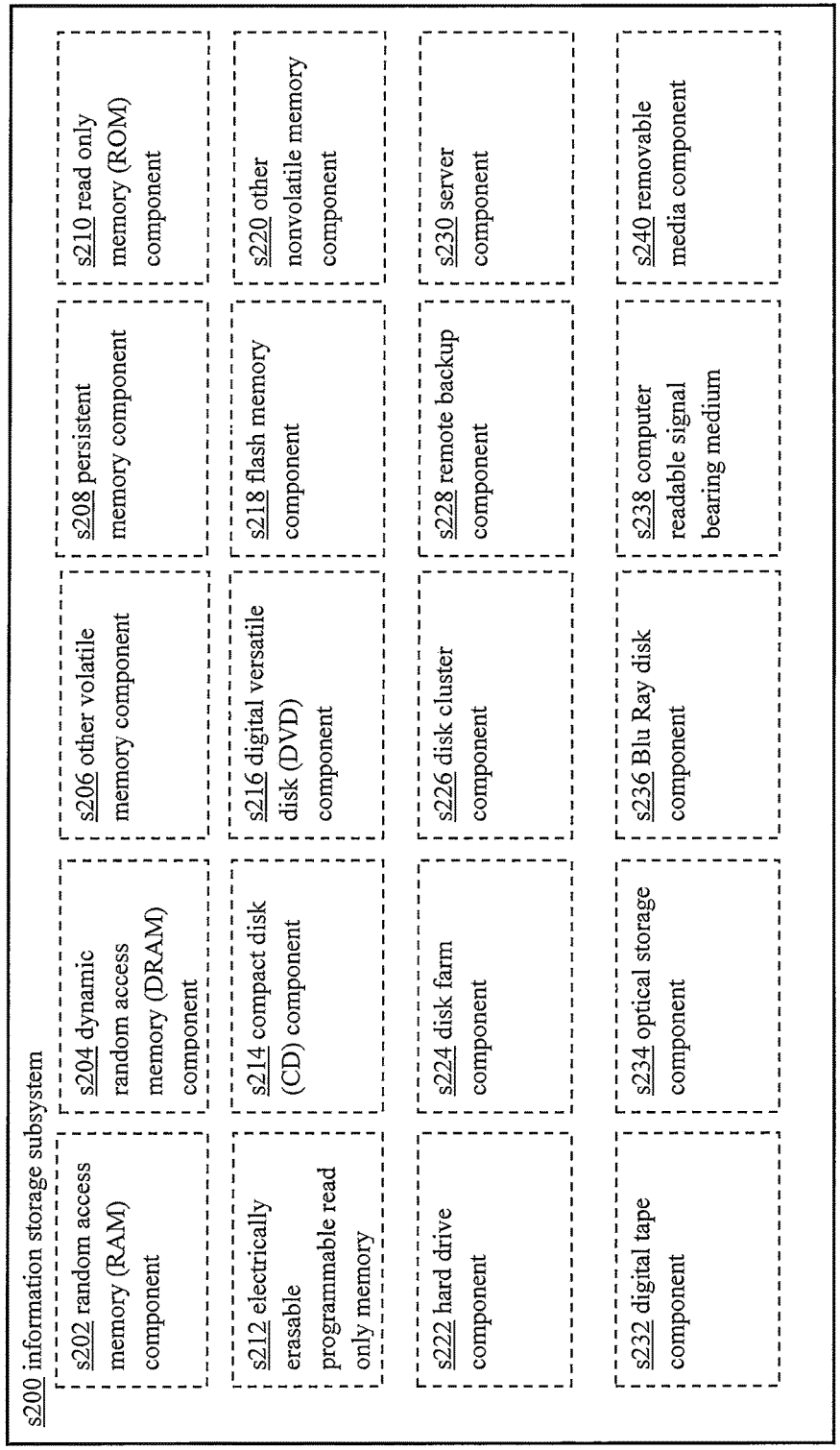
FIG. 14 is a block diagram depicting an information storage subsystem s200 of an exemplary implementation of the farming related ingestible materials production tracking system 10 of FIG. 1.

An exemplary implementation of the information storage subsystem s200 is shown in FIG. 14 to optionally include various components such as random access memory (RAM) component s202, dynamic random access memory (DRAM) component s204, other volatile memory component s206, persistent memory component s208, read only memory (ROM) component s210, electrically erasable programmable read only memory (EEPROM) component s212, compact disk (CD) component s214, digital versatile disk (DVD) component s216, flash memory component s218, other nonvolatile memory component s220, hard drive component s222, disk farm component s224, disk cluster component s226, remote backup component s228, server component s230, digital tape component s232, optical storage component s234, Blu Ray disk component s236, computer readable signal bearing medium s238, and removable media component s240.

Figure 15:
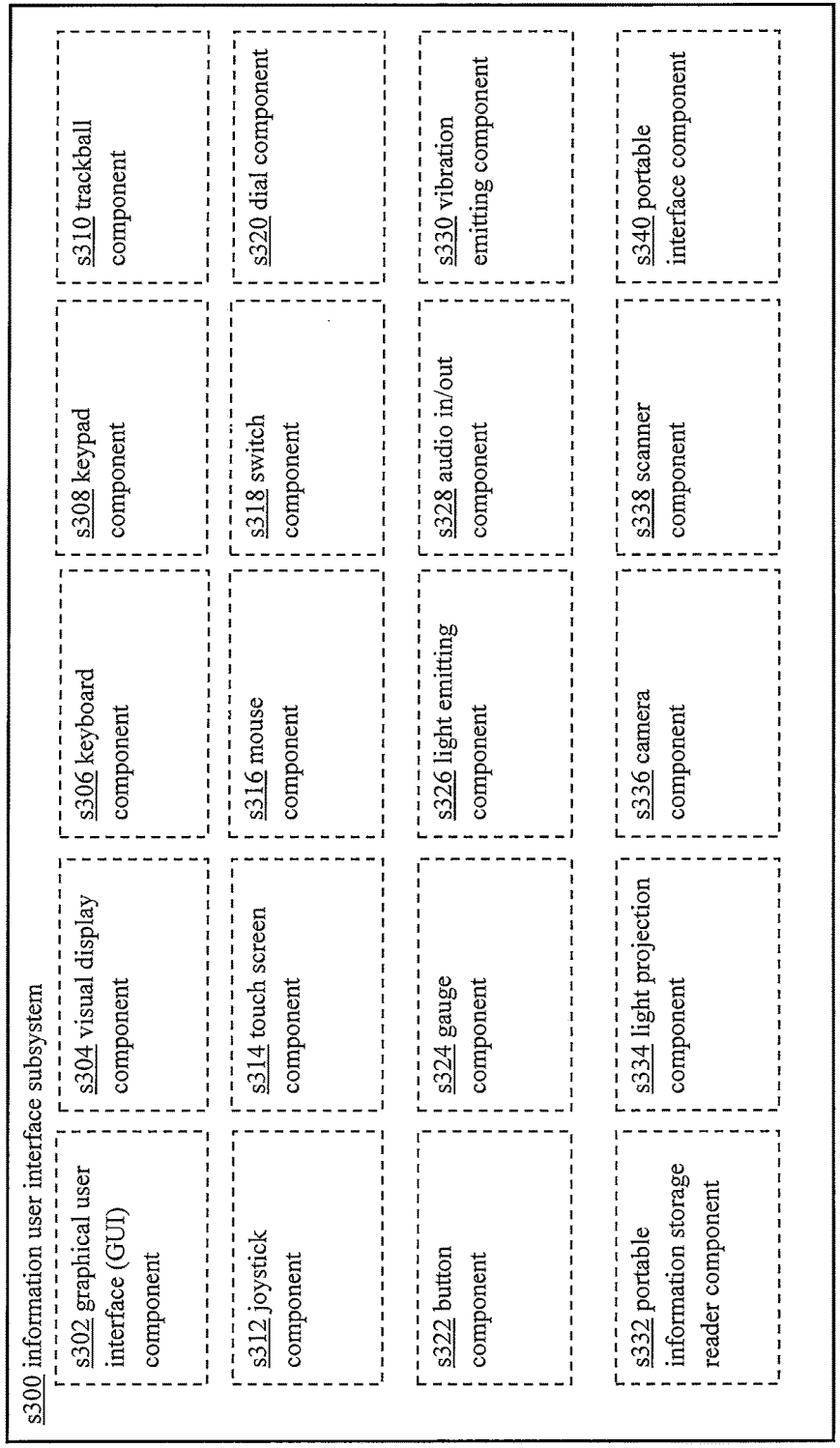
FIG. 15 is a block diagram depicting an information user interface subsystem s300 of an exemplary implementation of the farming related ingestible materials production tracking system 10 of FIG. 1.

An exemplary implementation of the information user interface subsystem s300 is shown in FIG. 15 to optionally include various components such as graphical user interface (GUI) component s302, visual display component s304, keyboard component s306, keypad component s308, trackball component s310, joystick component s312, touch screen component s314, mouse component s316, switch component s318, dial component s320, button component s322, gauge component s324, light emitting component s326, audio in/out component s328, vibration emitting component s330, portable information storage reader component s332, light projection component s334, camera component s336, scanner component s338, and portable interface component s340.

Figure 16:
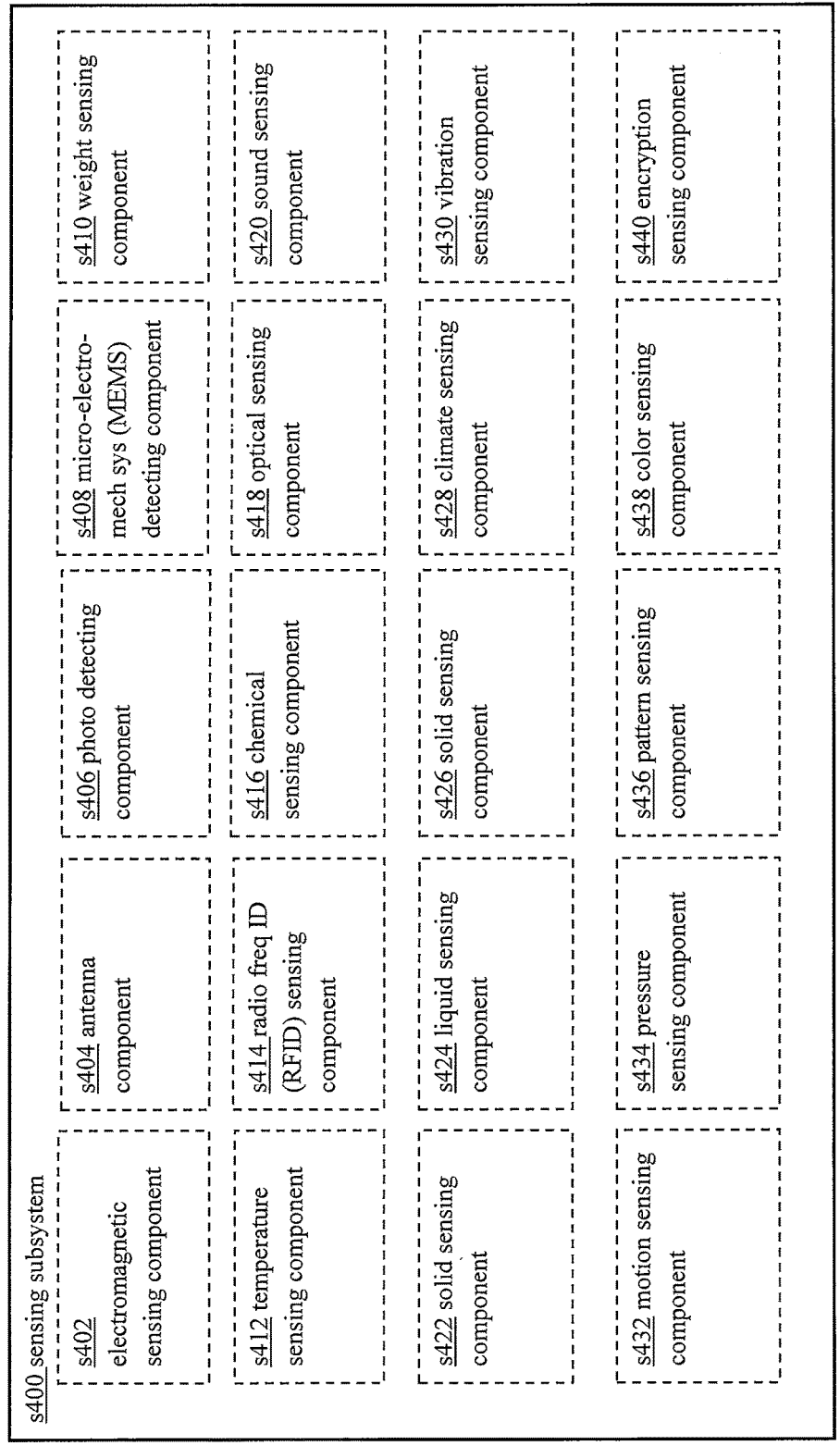
FIG. 16 is a block diagram depicting a sensing subsystem s400 of an exemplary implementation of the farming related ingestible materials production tracking system 10 of FIG. 1.

An exemplary implementation of the sensing subsystem s400 is shown in FIG. 16 to optionally include various components such as electromagnetic sensing component s402, antenna component s404, photo detecting component s406, micro-electro-mech sys (MEMS) detecting component s408, weight sensing component s410, temperature sensing component s412, radio freq ID (RFID) sensing component s414, chemical sensing component s416, optical sensing component s418, sound sensing component s420, solid sensing component s422, liquid sensing component s424, solid sensing component s426, climate sensing component s428, vibration sensing component s430, motion sensing component s432, pressure sensing component s434, pattern sensing component s436, color sensing component s438, and encryption sensing component s440.

Figure 17:
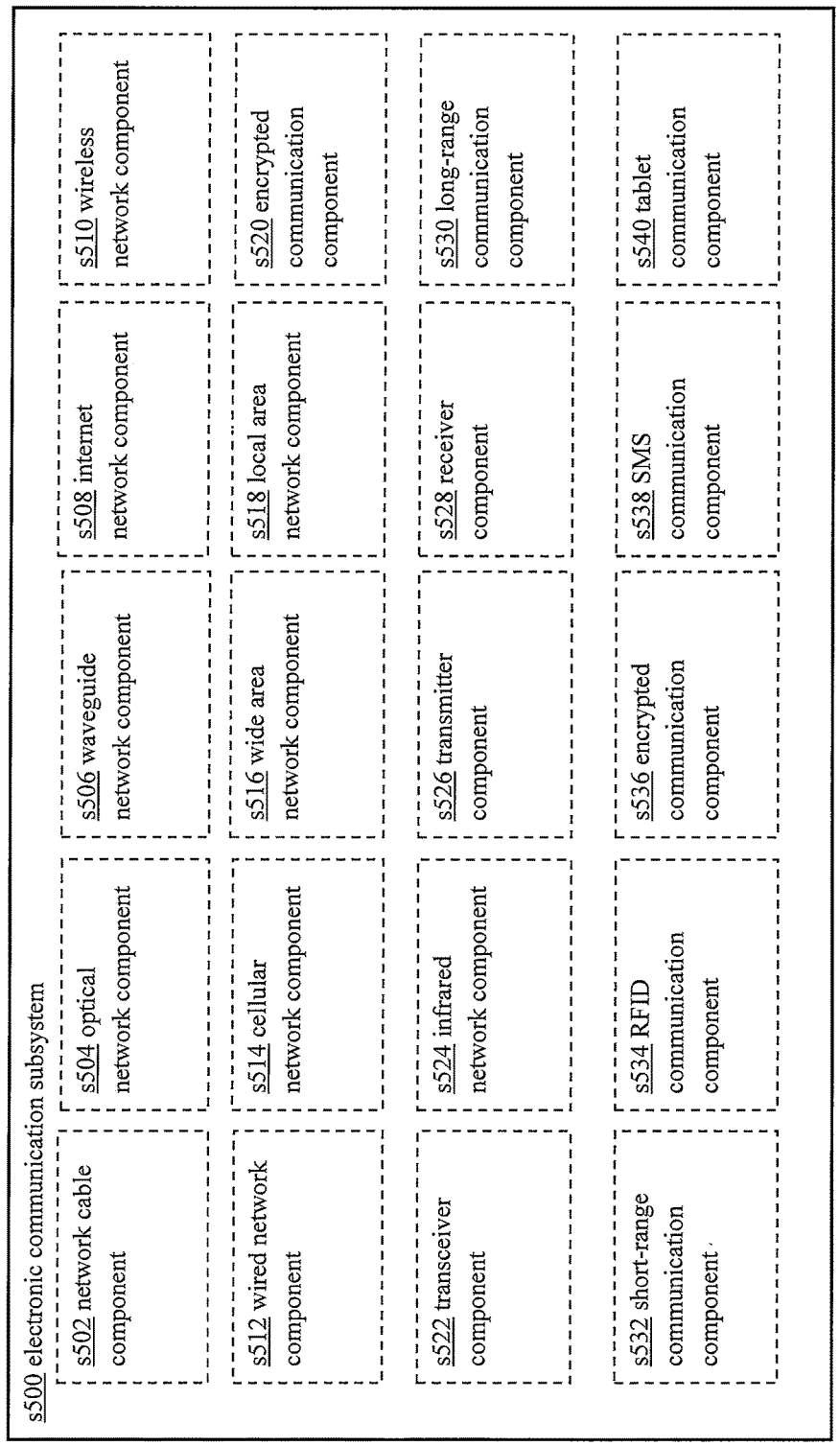
FIG. 17 is a block diagram depicting an electronic communication subsystem s500 of an exemplary implementation of the farming related ingestible materials production tracking system 10 of FIG. 1.

An exemplary implementation of the electronic communication subsystem s500 is shown in FIG. 17 to optionally include various components such as network cable component s502, optical network component s504, waveguide network component s506, internet network component s508, wireless network component s510, wired network component s512, cellular network component s514, wide area network component s516, local area network component s518, encrypted communication component s520, transceiver component s522, infrared network component s524, transmitter component s526, receiver component s528, receiver component s528, long-range communication component s530, short-range communication component s532, RFID communication component s534, encrypted communication component s536, SMS communication component s538, and tablet communication component s540.

Figure 18:
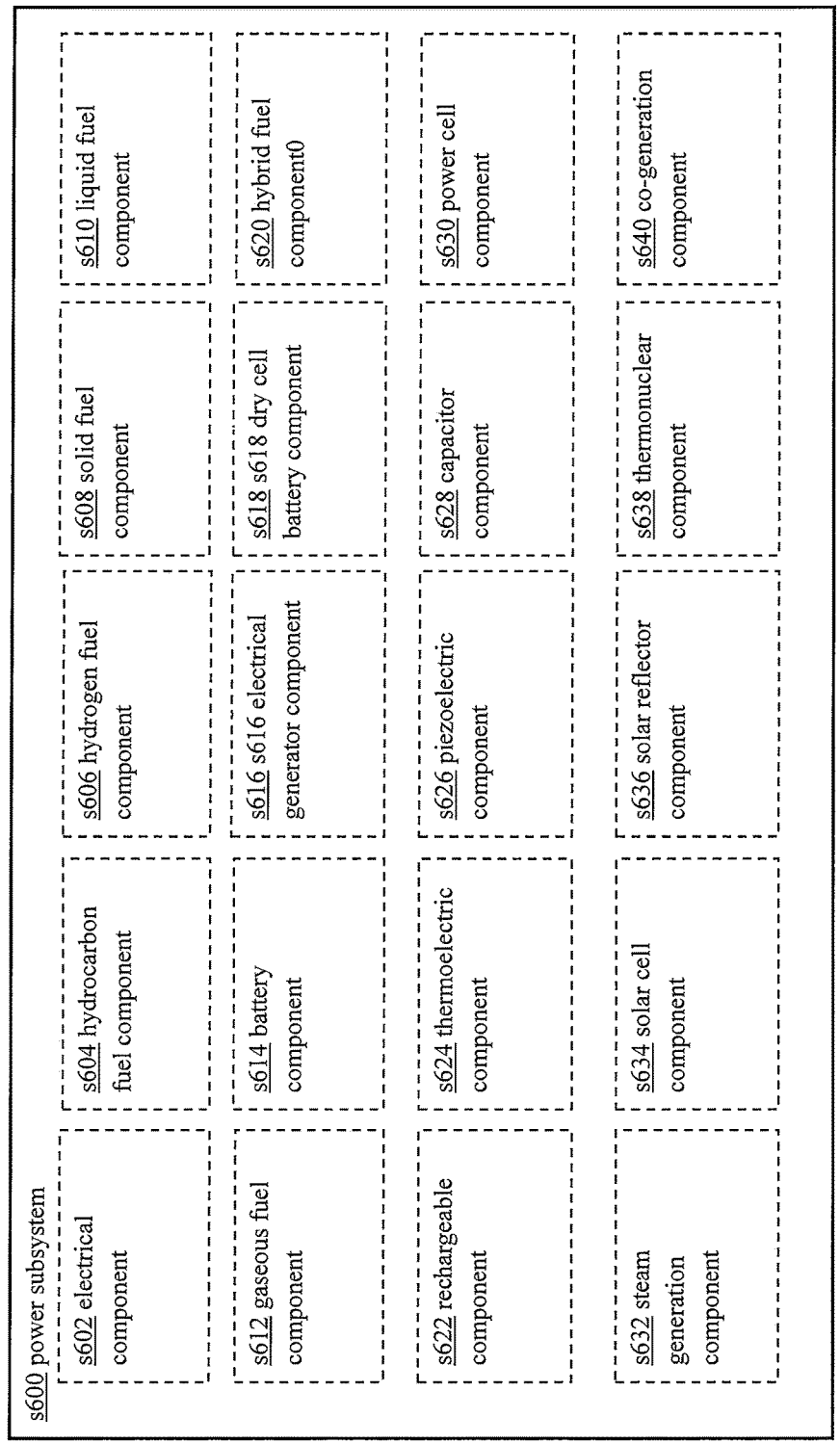
FIG. 18 is a block diagram depicting a power subsystem s600 of an exemplary implementation of the farming related ingestible materials production tracking system 10 of FIG. 1.

An exemplary implementation of the power subsystem s600 is shown in FIG. 18 to optionally include various components such as electrical component s602, hydrocarbon fuel component s604, hydrogen fuel component s606, solid fuel component s608, liquid fuel component s610, gaseous fuel component s612, battery component s614, battery component s622, battery component s624, battery component s626, battery component s628, power cell component s630, steam generation component s632, solar cell component s634, solar reflector component s636, thermonuclear component s638, and co-generation component s640.

Figure 19:
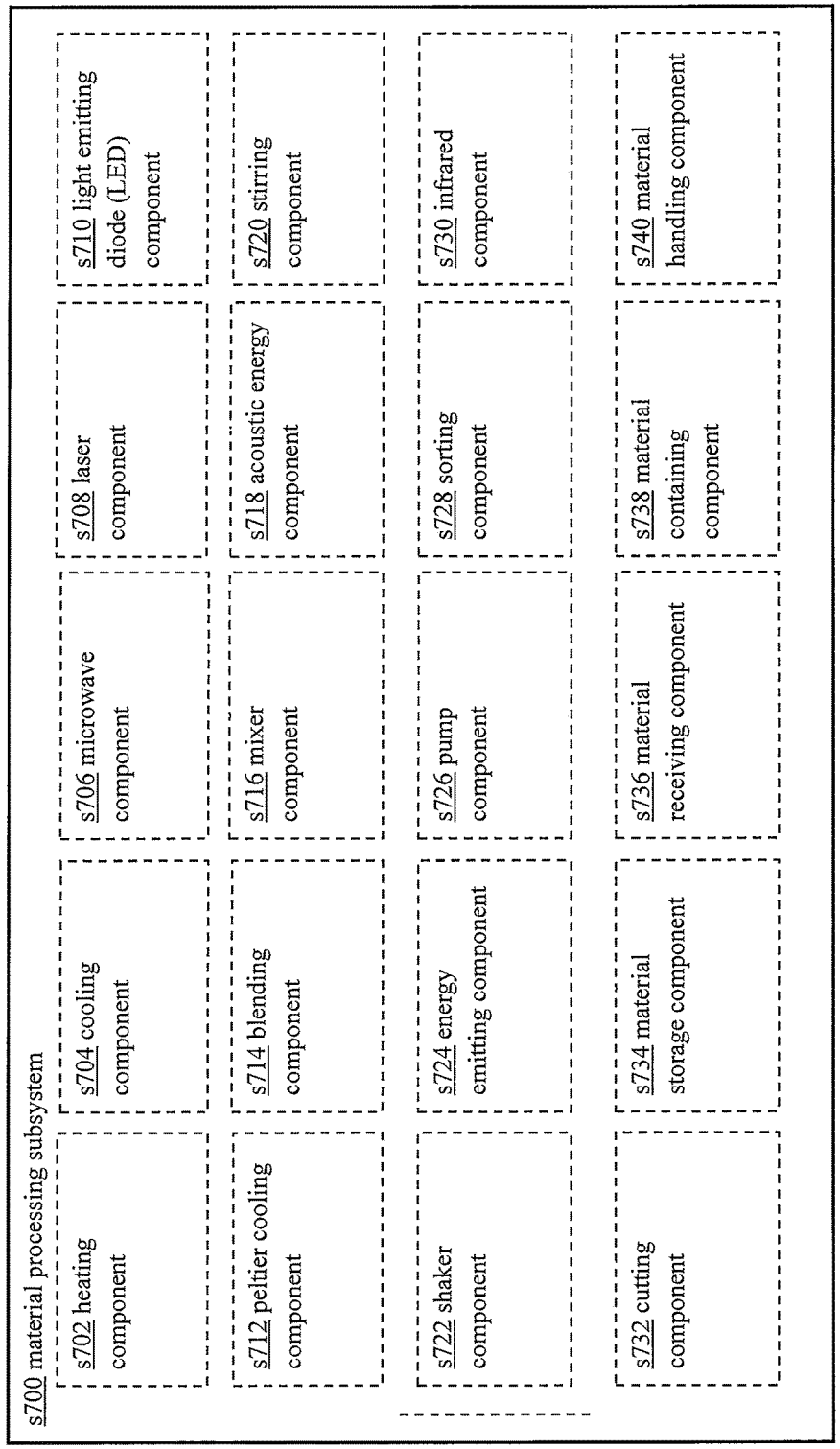
FIG. 19 is a block diagram depicting a material processing subsystem s700 of an exemplary implementation of the farming related ingestible materials production tracking system 10 of FIG. 1.

An exemplary implementation of the material processing subsystem s700 is shown in FIG. 19 to optionally include various components such as heating component s702, cooling component s704, microwave component s706, laser component s708, light emitting diode (LED) component s710, peltier cooling component s712, blending component s714, mixer component s716, acoustic energy component s718, stirring component s720, shaker component s722, energy emitting component s724, pump component s726, sorting component s728, infrared component s730, cutting component s732, material storage component s734, material receiving component s736, material containing component s738, and material handling component s740.

Figure 20:
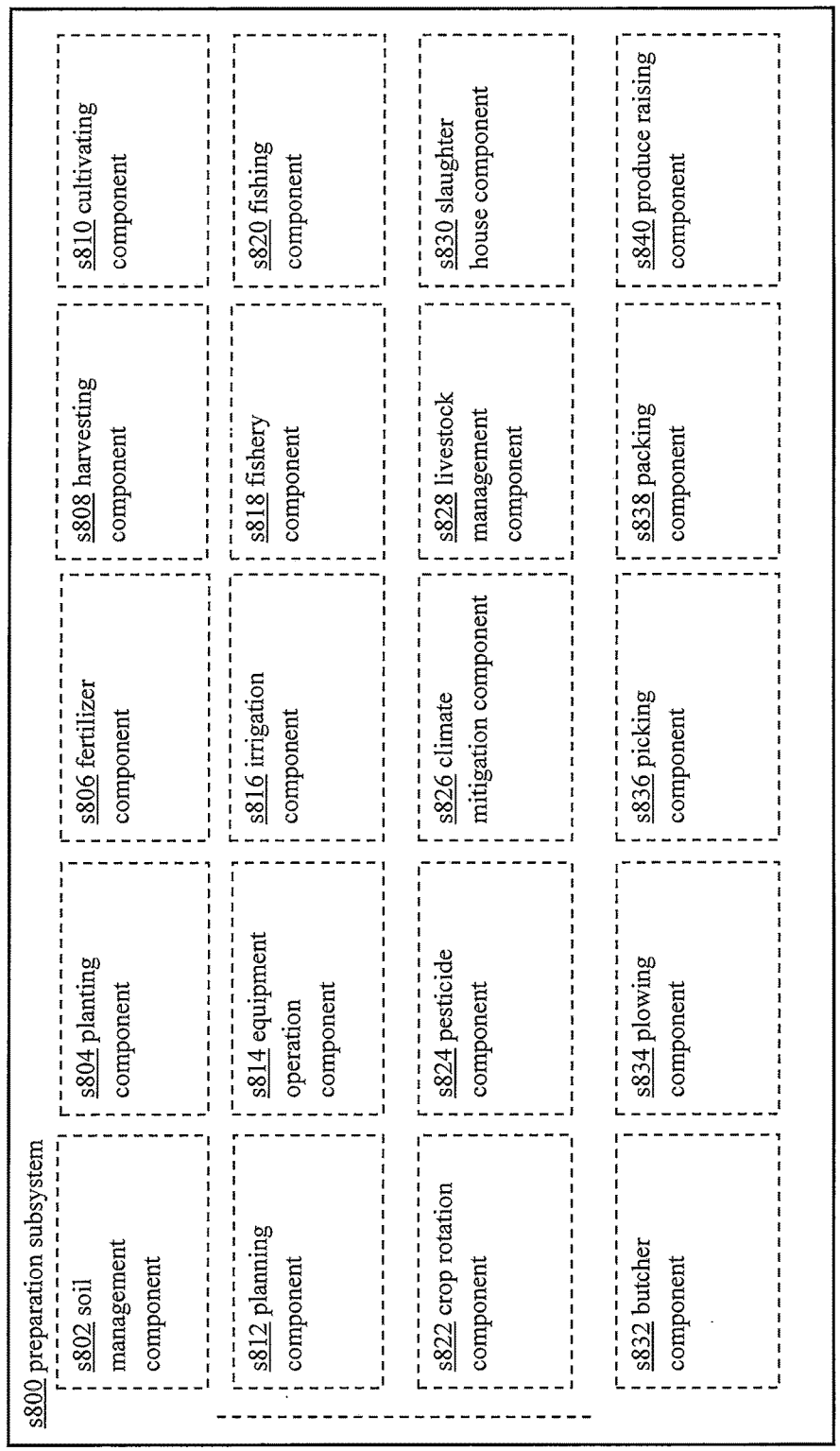
FIG. 20 is a block diagram depicting a preparation subsystem s800 of an exemplary implementation of the farming related ingestible materials production tracking system 10 of FIG. 1.

An exemplary implementation of the preparation subsystem s800 is shown in FIG. 20 to optionally include various components such as soil management component s802, planting component s804, fertilizer component s806, harvesting component s808, cultivating component s810, planning component s812, equipment operation component s814, irrigation component s816, fishery component s818, fishing component s820, crop rotation component s822, pesticide component s824, climate mitigation component s826, livestock management component s828, slaughter house component s830, butcher component s832, plowing component s834, picking component s836, packing component s838, and produce raising component s840.

Figure 21:
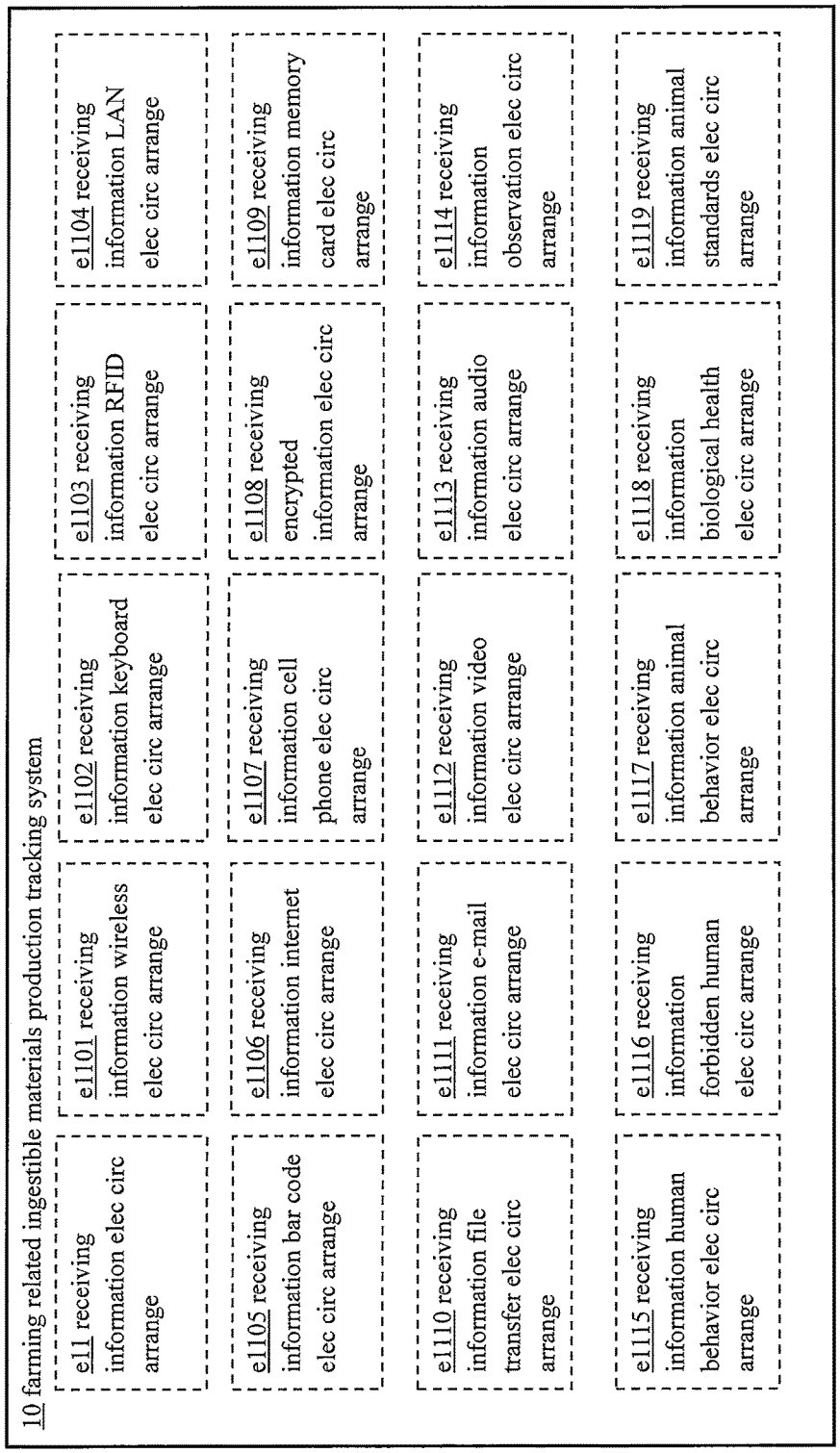
FIG. 21 is a block diagram depicting one or more exemplary electrical circuitry arrangements of the farming related ingestible materials production tracking system 10 of FIG. 1.

Implementations involve different combinations (otherwise known as "electrical circuitry arrangements") of components from the subsystems of the farming related ingestible materials production tracking system 10. Exemplary depictions of some of these electrical circuitry arrangements are shown in FIG. 21 to include receiving information electrical circuitry arrangement e11, receiving information wireless electrical circuitry arrangement e1101, receiving information keyboard electrical circuitry arrangement e1102, receiving information RFID electrical circuitry arrangement e1103, receiving information LAN electrical circuitry arrangement e1104, receiving information bar code electrical circuitry arrangement e1105, receiving information internet electrical circuitry arrangement e1106, receiving information cell phone electrical circuitry arrangement e1107, receiving encrypted information electrical circuitry arrangement e1108, receiving information memory card electrical circuitry arrangement e1109, receiving information file transfer electrical circuitry arrangement e1110, receiving information e-mail electrical circuitry arrangement e1111, receiving information video electrical circuitry arrangement e1112, receiving information audio electrical circuitry arrangement e1113, receiving information observation electrical circuitry arrangement e1114, receiving information human behavior electrical circuitry arrangement e1115, receiving information forbidden human electrical circuitry arrangement e1116, receiving information animal behavior electrical circuitry arrangement e1117, receiving information biological health electrical circuitry arrangement e1118, and receiving information animal standards electrical circuitry arrangement e1119.

Figure 22:
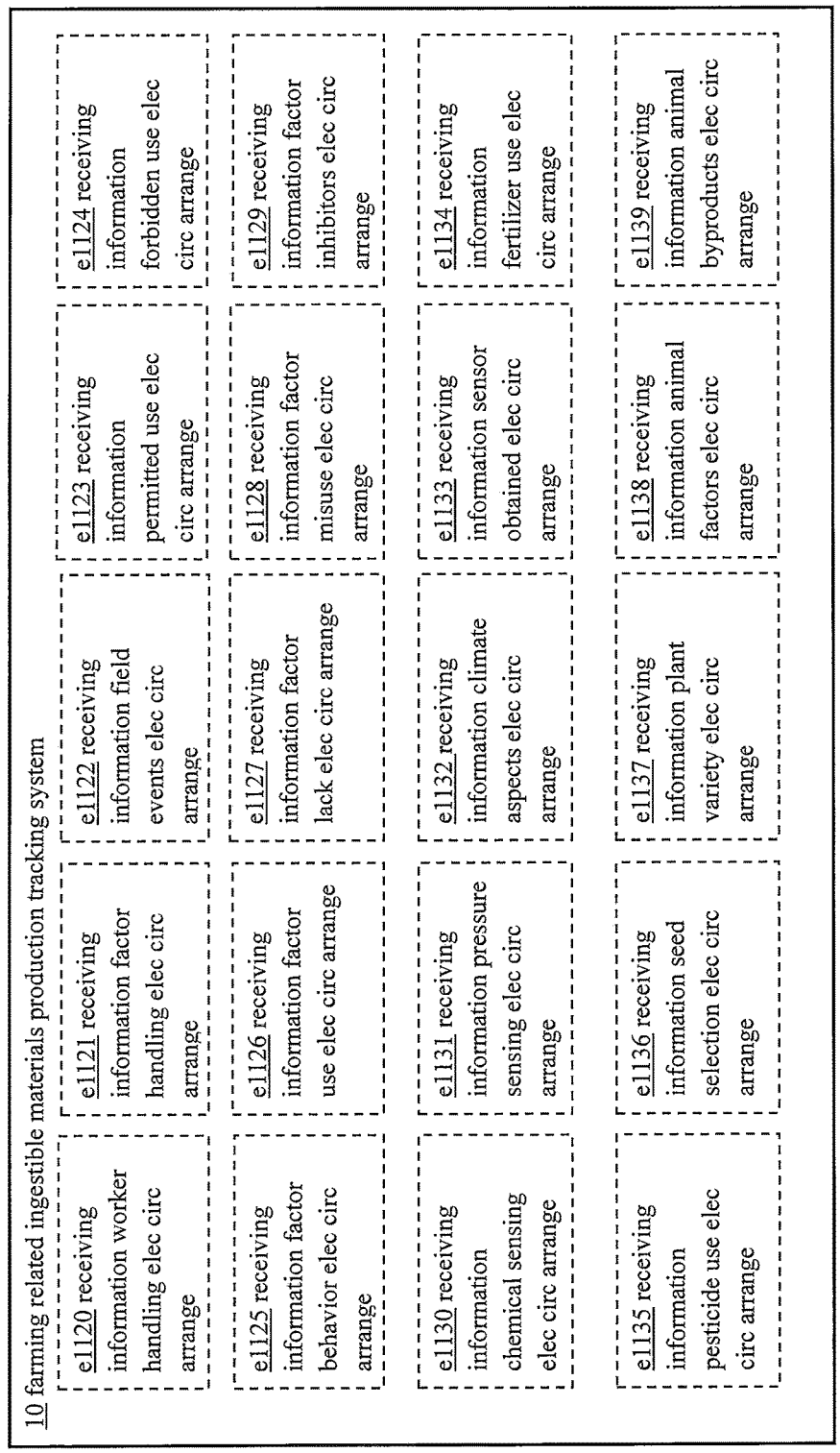
FIG. 22 is a block diagram depicting one or more exemplary electrical circuitry arrangements of the farming related ingestible materials production tracking system 10 of FIG. 1.

Some of these electrical circuitry arrangements are depicted in FIG. 22 to include receiving information worker handling electrical circuitry arrangement e1120, receiving information factor handling electrical circuitry arrangement e1121, receiving information field events electrical circuitry arrangement e1122, receiving information permitted use electrical circuitry arrangement e1123, receiving information forbidden use electrical circuitry arrangement e1124, receiving information factor behavior electrical circuitry arrangement e1125, receiving information factor use electrical circuitry arrangement e1126, receiving information factor lack electrical circuitry arrangement e1127, receiving information factor misuse electrical circuitry arrangement e1128, receiving information factor inhibitors electrical circuitry arrangement e1129, receiving information chemical sensing electrical circuitry arrangement e1130, receiving information pressure sensing electrical circuitry arrangement e113, receiving information climate aspects electrical circuitry arrangement e1132, receiving information sensor obtained electrical circuitry arrangement e1133, receiving information fertilizer use electrical circuitry arrangement e1134, receiving information pesticide use electrical circuitry arrangement e1135, receiving information seed selection electrical circuitry arrangement e1136, receiving information plant variety electrical circuitry arrangement e1137, receiving information animal factors electrical circuitry arrangement e1138, and receiving information animal byproducts electrical circuitry arrangement e1139.

Figure 23:
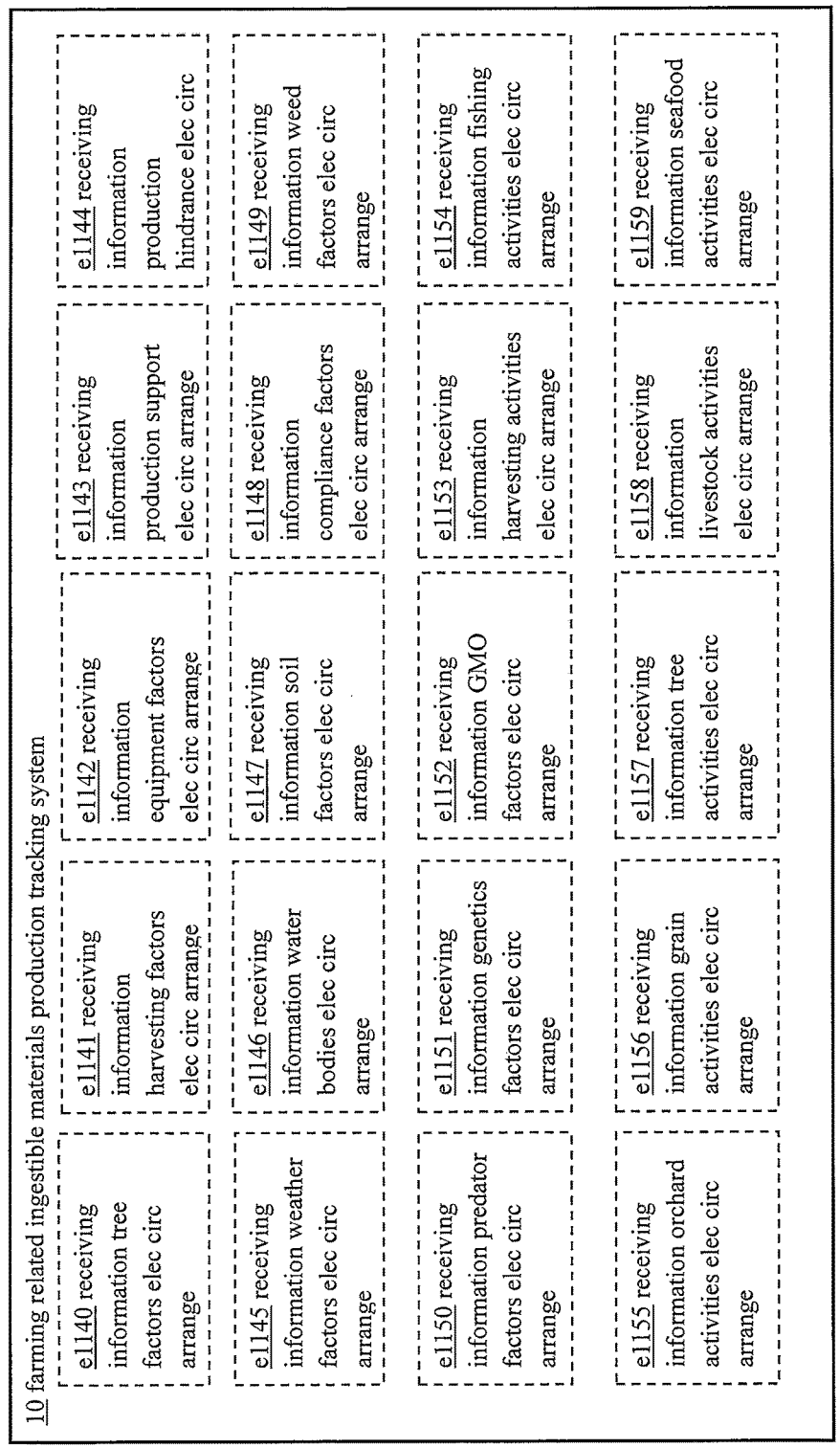
FIG. 23 is a block diagram depicting one or more exemplary electrical circuitry arrangements of the farming related ingestible materials production tracking system 10 of FIG. 1.

Some of these electrical circuitry arrangements are depicted in FIG. 23 to include receiving information tree factors electrical circuitry arrangement e1140, receiving information harvesting factors electrical circuitry arrangement e1141, receiving information equipment factors electrical circuitry arrangement e1142, receiving information production support electrical circuitry arrangement e1143, receiving information production hindrance electrical circuitry arrangement e1144, receiving information weather factors electrical circuitry arrangement e1145, receiving information water bodies electrical circuitry arrangement e1146, receiving information soil factors electrical circuitry arrangement e1147, receiving information compliance factors electrical circuitry arrangement e1148, receiving information weed factors electrical circuitry arrangement e1149, receiving information predator factors electrical circuitry arrangement e1150, receiving information genetics factors electrical circuitry arrangement e1151, receiving information GMO factors electrical circuitry arrangement e1152, receiving information harvesting activities electrical circuitry arrangement e1153, receiving information fishing activities electrical circuitry arrangement e1154, receiving information orchard activities electrical circuitry arrangement e1155, receiving information grain activities electrical circuitry arrangement e1156, receiving information tree activities electrical circuitry arrangement e1157, receiving information livestock activities electrical circuitry arrangement e1158, and receiving information seafood activities electrical circuitry arrangement e1159.

Figure 24:
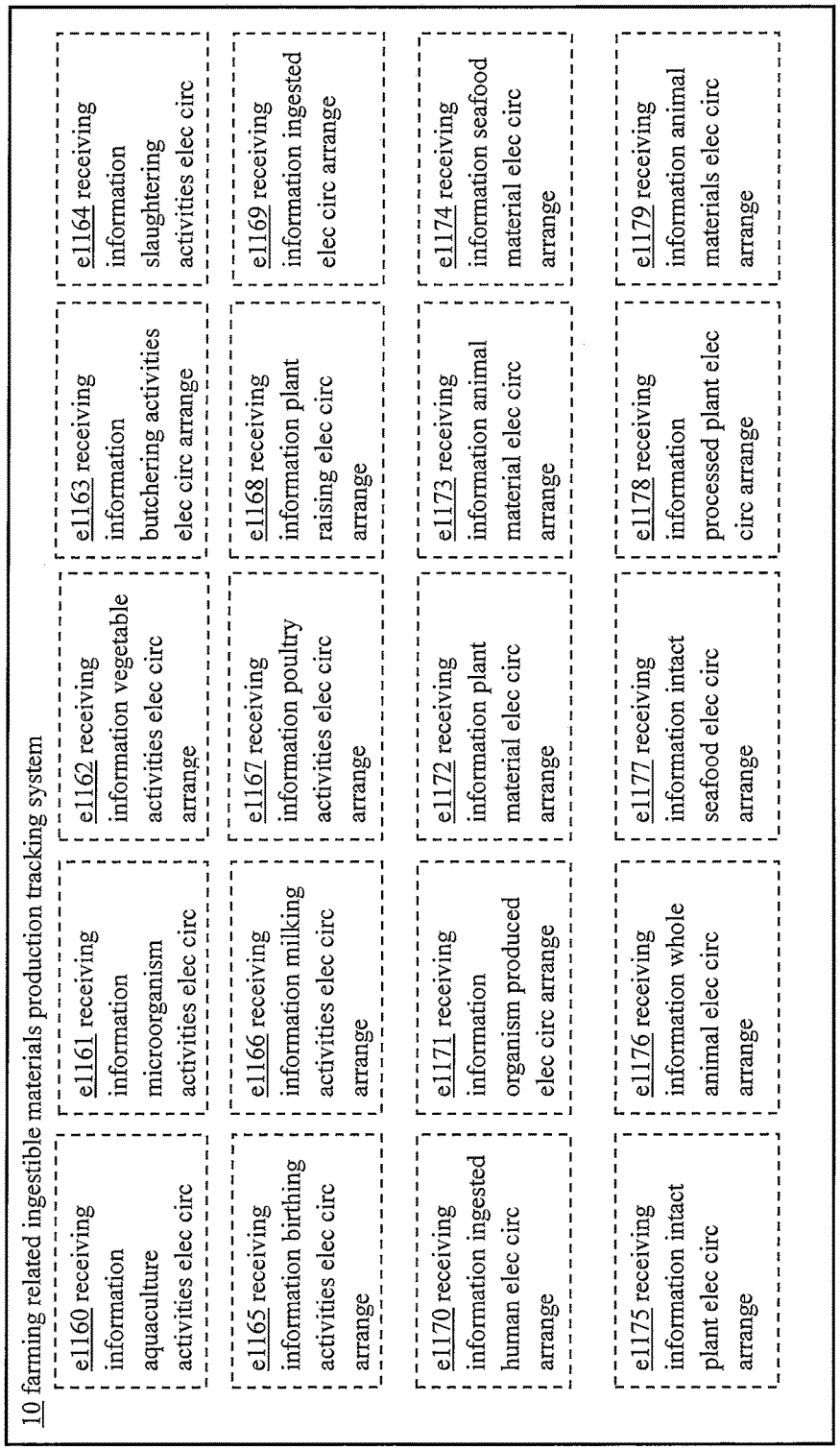
FIG. 24 is a block diagram depicting one or more exemplary electrical circuitry arrangements of the farming related ingestible materials production tracking system 10 of FIG. 1.

Some of these electrical circuitry arrangements are depicted in FIG. 24 to include receiving information aquaculture activities electrical circuitry arrangement e1160, receiving information microorganism activities electrical circuitry arrangement e1161, receiving information vegetable activities electrical circuitry arrangement e1162, receiving information butchering activities electrical circuitry arrangement e1163, receiving information slaughtering activities electrical circuitry arrangement e1164, receiving information birthing activities electrical circuitry arrangement e1165, and receiving information milking activities electrical circuitry arrangement e1166, receiving information poultry activities electrical circuitry arrangement e1167, receiving information plant raising electrical circuitry arrangement e1168, receiving information ingested electrical circuitry arrangement e1169, receiving information ingested human electrical circuitry arrangement e1170, receiving information organism produced electrical circuitry arrangement e1171, receiving information plant material electrical circuitry arrangement e1172, receiving information animal material electrical circuitry arrangement e1173, receiving information seafood material electrical circuitry arrangement e1174, receiving information intact plant electrical circuitry arrangement e1175, receiving information whole animal electrical circuitry arrangement e1176, receiving information intact seafood electrical circuitry arrangement e1177, receiving information processed plant electrical circuitry arrangement e1178, and receiving information animal materials electrical circuitry arrangement e1179.

Figure 25:
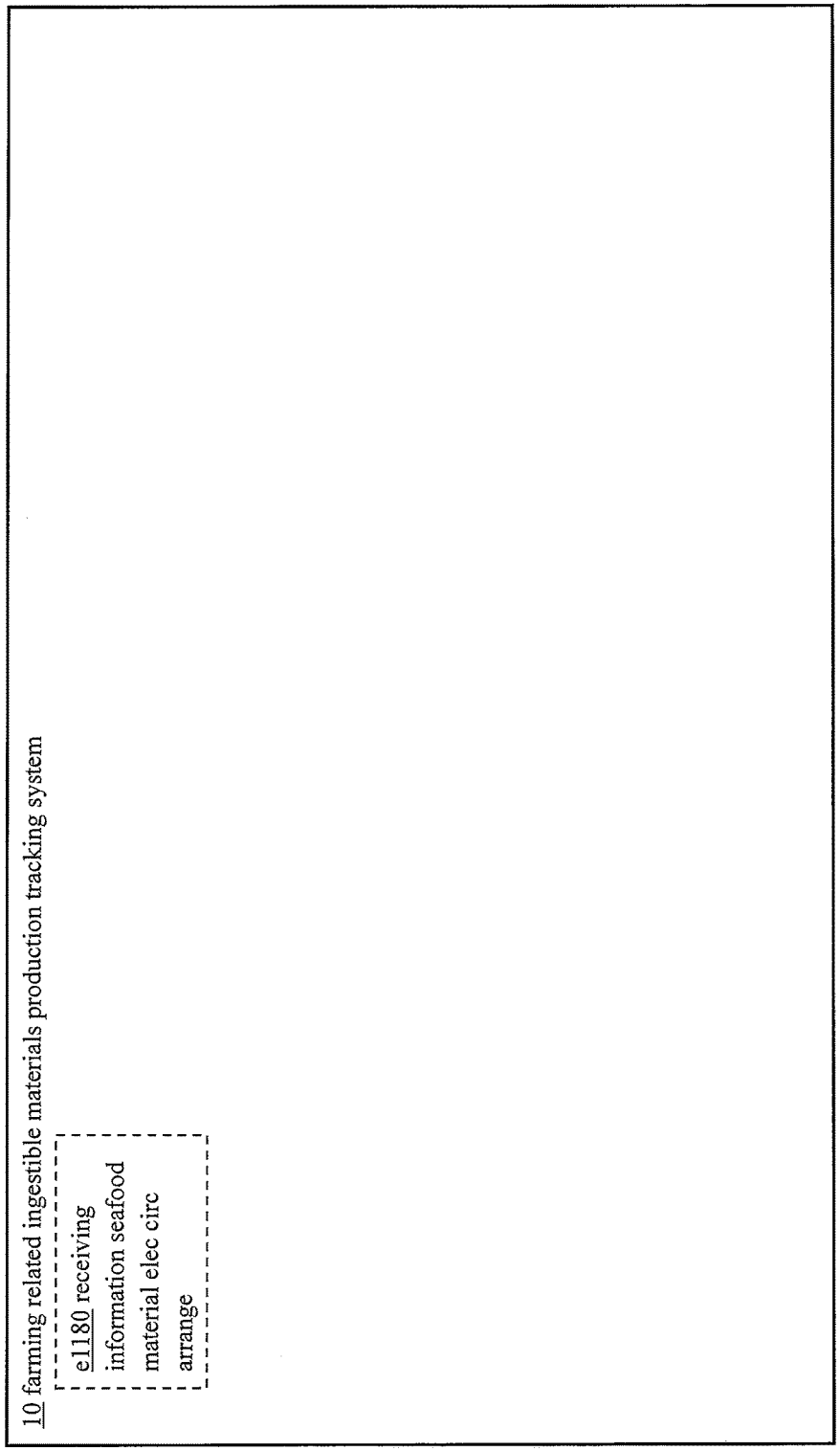
FIG. 25 is a block diagram depicting one or more exemplary electrical circuitry arrangements of the farming related ingestible materials production tracking system 10 of FIG. 1.

Some of these electrical circuitry arrangements are depicted in FIG. 25 to include receiving information seafood material electrical circuitry arrangement e1180.

Figure 26:
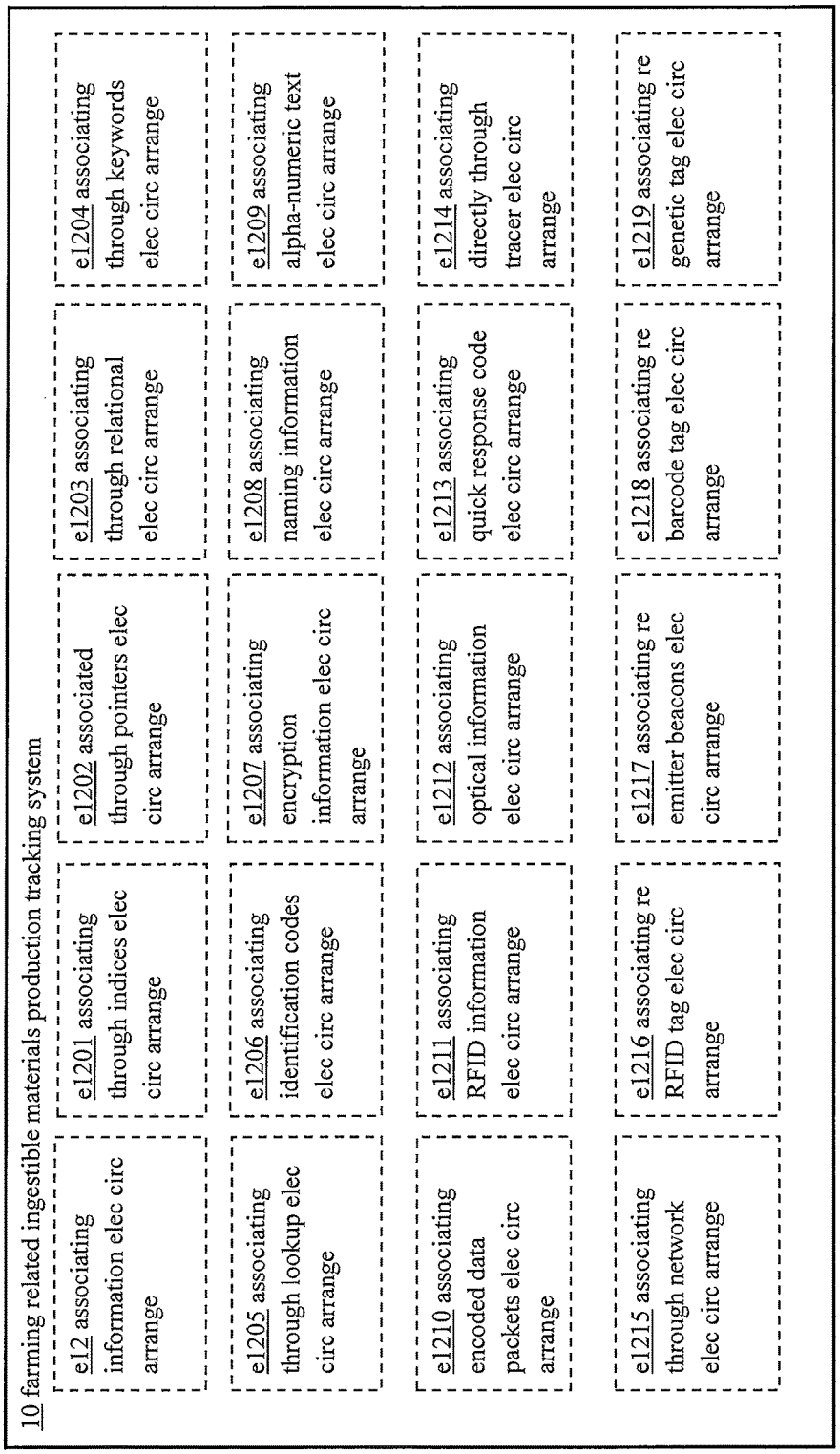
FIG. 26 is a block diagram depicting one or more exemplary electrical circuitry arrangements of the farming related ingestible materials production tracking system 10 of FIG. 1.

Some of these electrical circuitry arrangements are depicted in FIG. 26 to include associating information electrical circuitry arrangement e12, associating through indices electrical circuitry arrangement e1201, associated through pointers electrical circuitry arrangement e1202, associating through relational electrical circuitry arrangement e1203, associating through keywords electrical circuitry arrangement e1204, associating through lookup electrical circuitry arrangement e1205, associating identification codes electrical circuitry arrangement e1206, associating encryption information electrical circuitry arrangement e1207, associating naming information electrical circuitry arrangement e1208, associating alpha-numeric text electrical circuitry arrangement e1209, associating encoded data packets electrical circuitry arrangement e1210, associating RFID information electrical circuitry arrangement e1211, and associating optical information electrical circuitry arrangement e1212, associating quick response code electrical circuitry arrangement e1213, associating directly through tracer electrical circuitry arrangement e1214, associating through network electrical circuitry arrangement e1215, associating re RFID tag electrical circuitry arrangement e1216, associating re emitter beacons electrical circuitry arrangement e1217, associating re barcode tag electrical circuitry arrangement e1218, and associating re genetic tag electrical circuitry arrangement e1219.

Figure 27:
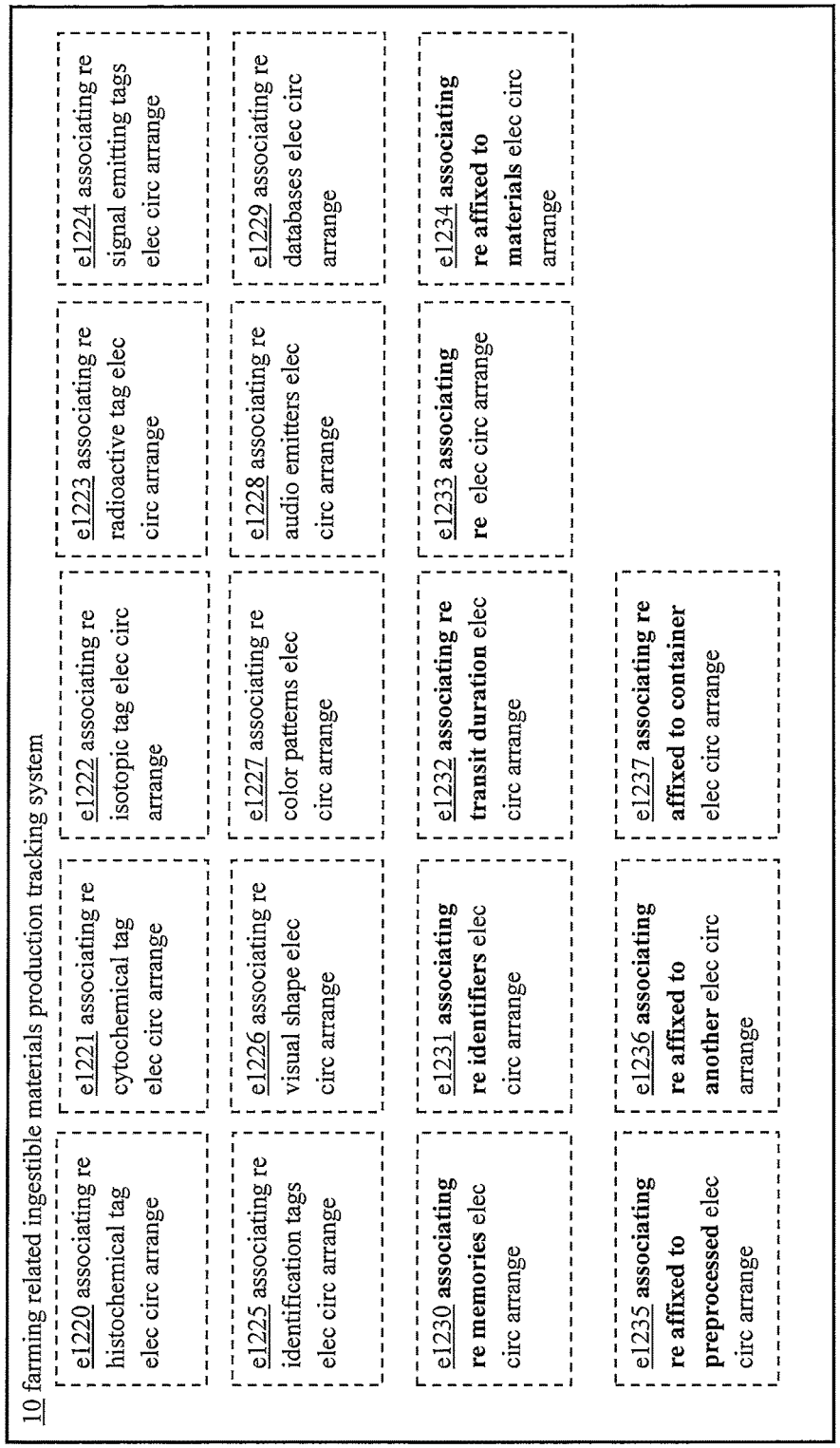
FIG. 27 is a block diagram depicting one or more exemplary electrical circuitry arrangements of the farming related ingestible materials production tracking system 10 of FIG. 1.

Some of these electrical circuitry arrangements are depicted in FIG. 27 to include associating re histochemical tag electrical circuitry arrangement e1220, associating re cytochemical tag electrical circuitry arrangement e1221, associating re isotopic tag electrical circuitry arrangement e1222, associating re radioactive tag electrical circuitry arrangement e1223, associating re signal emitting tags electrical circuitry arrangement e1224, associating re identification tags electrical circuitry arrangement e1225, associating re visual shape electrical circuitry arrangement e1226, associating re color patterns electrical circuitry arrangement e1227, associating re audio emitters electrical circuitry arrangement e1228, associating re databases electrical circuitry arrangement e1229, associating re affixed to materials electrical circuitry arrangement e1234, associating re identifiers electrical circuitry arrangement e1231, associating re transit duration electrical circuitry arrangement e1232, associating re electrical circuitry arrangement e1233, associating re affixed to materials electrical circuitry arrangement e1234, associating re affixed to preprocessed electrical circuitry arrangement e1235, associating re affixed to another electrical circuitry arrangement e1236, and associating re affixed to container electrical circuitry arrangement e1237.

In implementations one or more instructions are stored and/or otherwise borne in various subsystems, components, and/or accessories of the farming related ingestible materials production tracking system 10 such as being borne in a non-transitory signal bearing medium of information storage subsystem s200. One or more exemplary instructions depicted in FIG. 28 as being borne in an exemplary version of a non-transitory signal bearing medium of information storage subsystem s200 include one or more receiving information instructions i11, one or more receiving information wireless instructions i1101, one or more receiving information keyboard instructions i1102, one or more receiving information RFID instructions i1103, one or more receiving information LAN instructions i1104, one or more receiving information bar code instructions i1105, one or more receiving information internet instructions i1106, one or more receiving information cell phone instructions i1107, one or more receiving encrypted information instructions i1108, one or more receiving information memory card instructions i1109, one or more receiving information file transfer instructions i1110, one or more receiving information e-mail instructions ill 11, one or more receiving information video instructions i1112, one or more receiving information audio instructions i1113, one or more receiving information observation instructions i1114, one or more receiving information human behavior instructions i1115, one or more receiving information forbidden human instructions i1116, one or more receiving information animal behavior instructions i1117, one or more receiving information biological health instructions i1118, and one or more receiving information animal standards instructions i1119.

Figure 29:
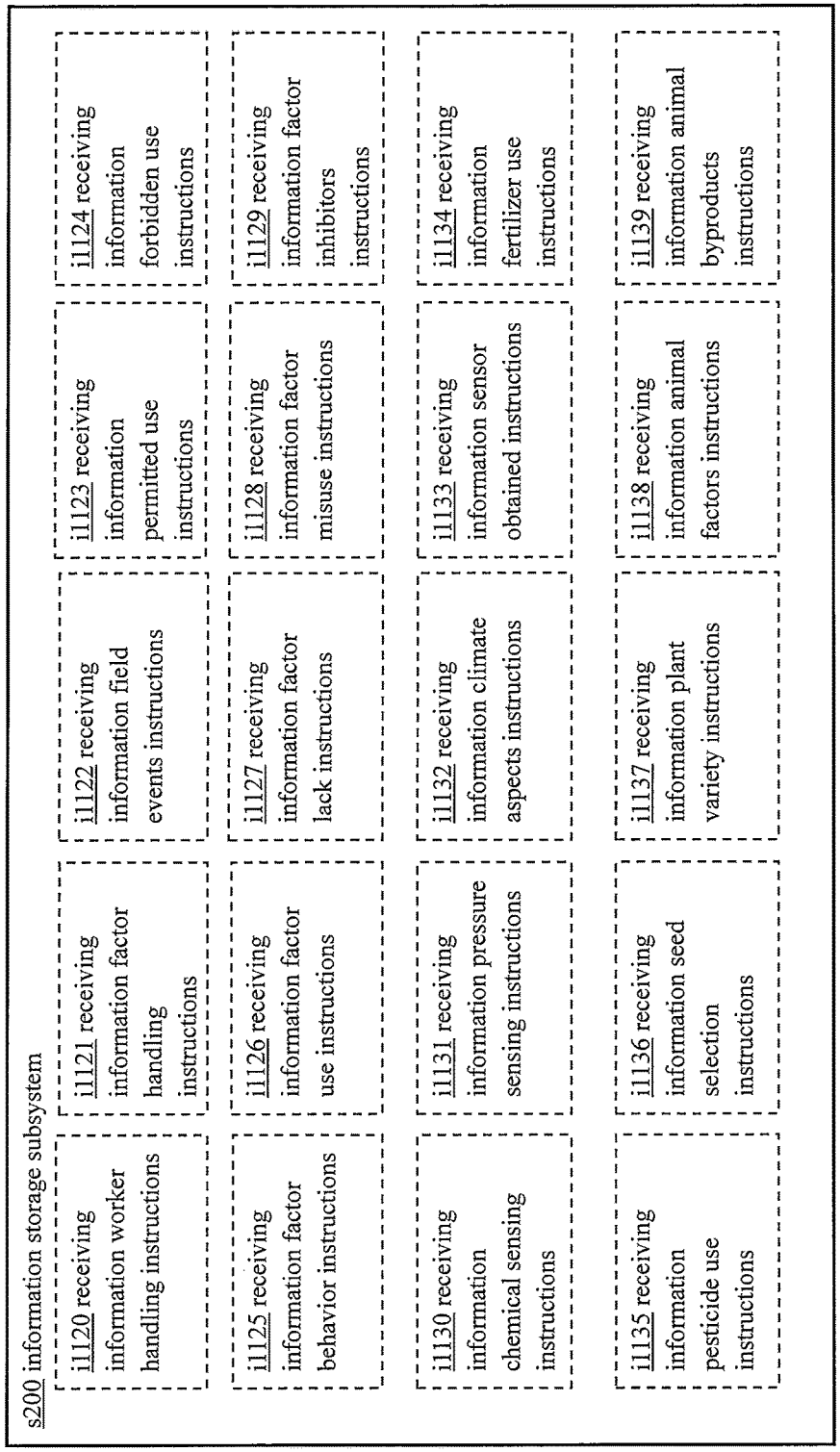
FIG. 29 is a block diagram depicting one or more exemplary instructions of the information storage subsystem s200 of the farming related ingestible materials production tracking system 10 of FIG. 1.

One or more exemplary instructions depicted in FIG. 29 as being borne in an exemplary version of a non-transitory signal bearing medium of information storage subsystem s200 include one or more receiving information worker handling instructions i1120, one or more receiving information factor handling instructions i1121, one or more receiving information field events instructions i1122, one or more receiving information permitted use instructions i1123, one or more receiving information forbidden use instructions i1124, one or more receiving information factor behavior instructions i1125, one or more receiving information factor use instructions i1126, one or more receiving information factor lack instructions i1127, one or more receiving information factor misuse instructions i1128, one or more receiving information factor inhibitors instructions i1129, one or more receiving information chemical sensing instructions i1130, one or more receiving information pressure sensing instructions i1131, one or more receiving information climate aspects instructions i1132, one or more receiving information sensor obtained instructions i1133, one or more receiving information fertilizer use instructions i1134, one or more receiving information pesticide use instructions i1135, one or more receiving information seed selection instructions i1136, one or more receiving information plant variety instructions i1137, one or more receiving information animal factors instructions i1138, and one or more receiving information animal byproducts instructions i1139.

Figure 30:
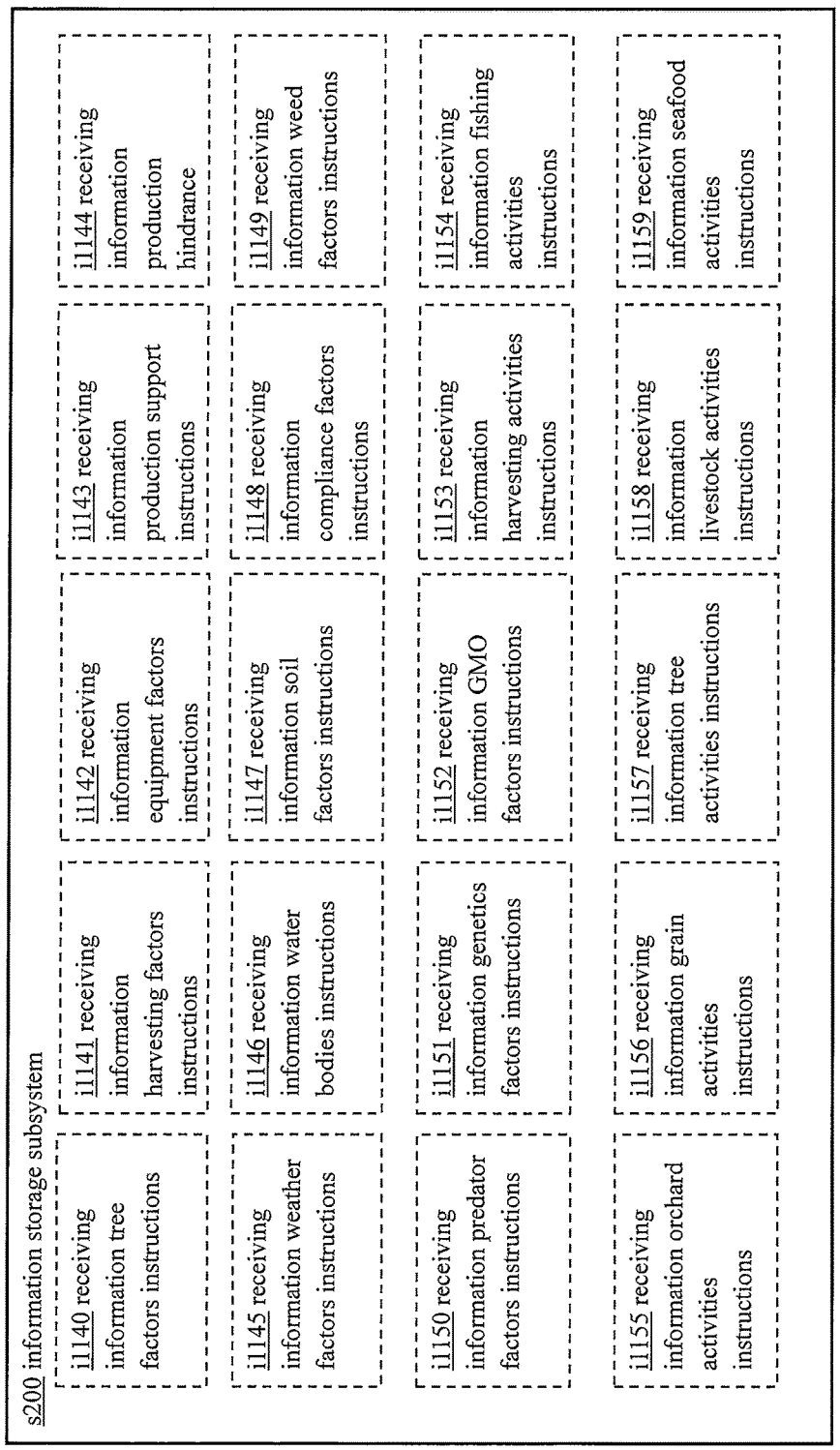
FIG. 30 is a block diagram depicting one or more exemplary instructions of the information storage subsystem s200 of the farming related ingestible materials production tracking system 10 of FIG. 1.

One or more exemplary instructions depicted in FIG. 30 as being borne in an exemplary version of a non-transitory signal bearing medium of information storage subsystem s200 include one or more receiving information tree factors instructions i1140, one or more receiving information harvesting factors instructions i1141, one or more receiving information equipment factors instructions i1142, one or more receiving information production support instructions i1143, one or more receiving information production hindrance instructions i1144, one or more receiving information weather factors instructions i1145, one or more receiving information water bodies instructions i1146, one or more receiving information soil factors instructions i1147, one or more receiving information compliance factors instructions i1148, one or more receiving information weed factors instructions i1149, one or more receiving information predator factors instructions i1150, one or more receiving information genetics factors instructions i1151, one or more receiving information GMO factors instructions i1152, one or more receiving information harvesting activities instructions i1153, one or more receiving information fishing activities instructions i1154, one or more receiving information orchard activities instructions i1155, one or more receiving information grain activities instructions i1156, one or more receiving information tree activities instructions i1157, one or more receiving information livestock activities instructions i1158, and one or more receiving information seafood activities instructions i1159.

Figure 31:
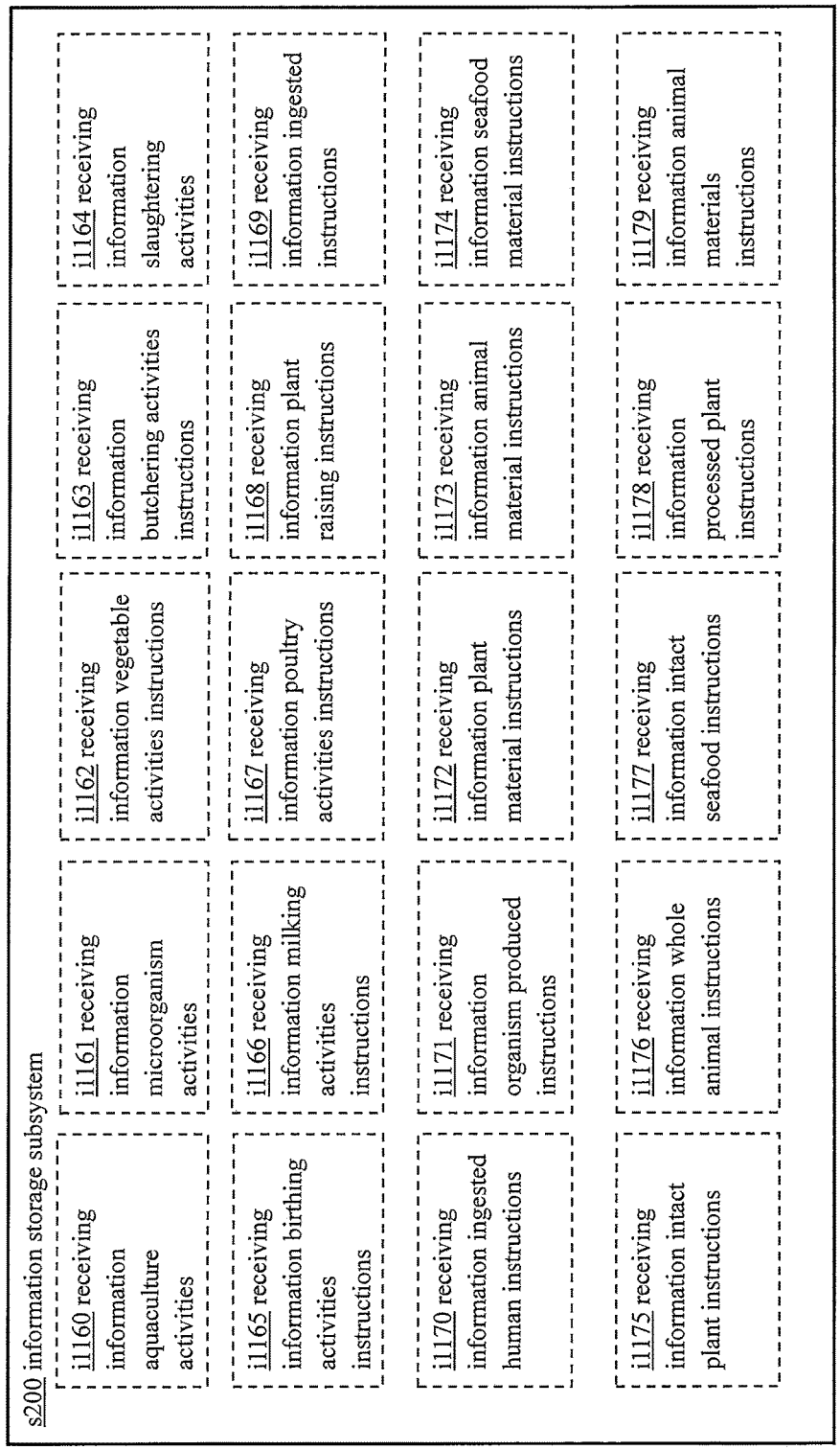
FIG. 31 is a block diagram depicting one or more exemplary instructions of the information storage subsystem s200 of the farming related ingestible materials production tracking system 10 of FIG. 1.

One or more exemplary instructions depicted in FIG. 31 as being borne in an exemplary version of a non-transitory signal bearing medium of information storage subsystem s200 include one or more receiving information aquaculture activities instructions i1160, one or more receiving information microorganism activities instructions i1161, one or more receiving information vegetable activities instructions i1162, one or more receiving information butchering activities instructions i1163, one or more receiving information slaughtering activities instructions i1164, one or more receiving information birthing activities instructions i1165, and one or more receiving information milking activities instructions i1166, one or more receiving information poultry activities instructions i1167, one or more receiving information plant raising instructions i1168, one or more receiving information ingested instructions i1169, one or more receiving information ingested human instructions i1170, one or more receiving information organism produced instructions i1171, one or more receiving information plant material instructions i1172, one or more receiving information animal material instructions i1173, one or more receiving information seafood material instructions i1174, one or more receiving information intact plant instructions i1175, one or more receiving information whole animal instructions i1176, one or more receiving information intact seafood instructions i1177, one or more receiving information processed plant instructions i1178, and one or more receiving information animal materials instructions i1179.

Figure 32:
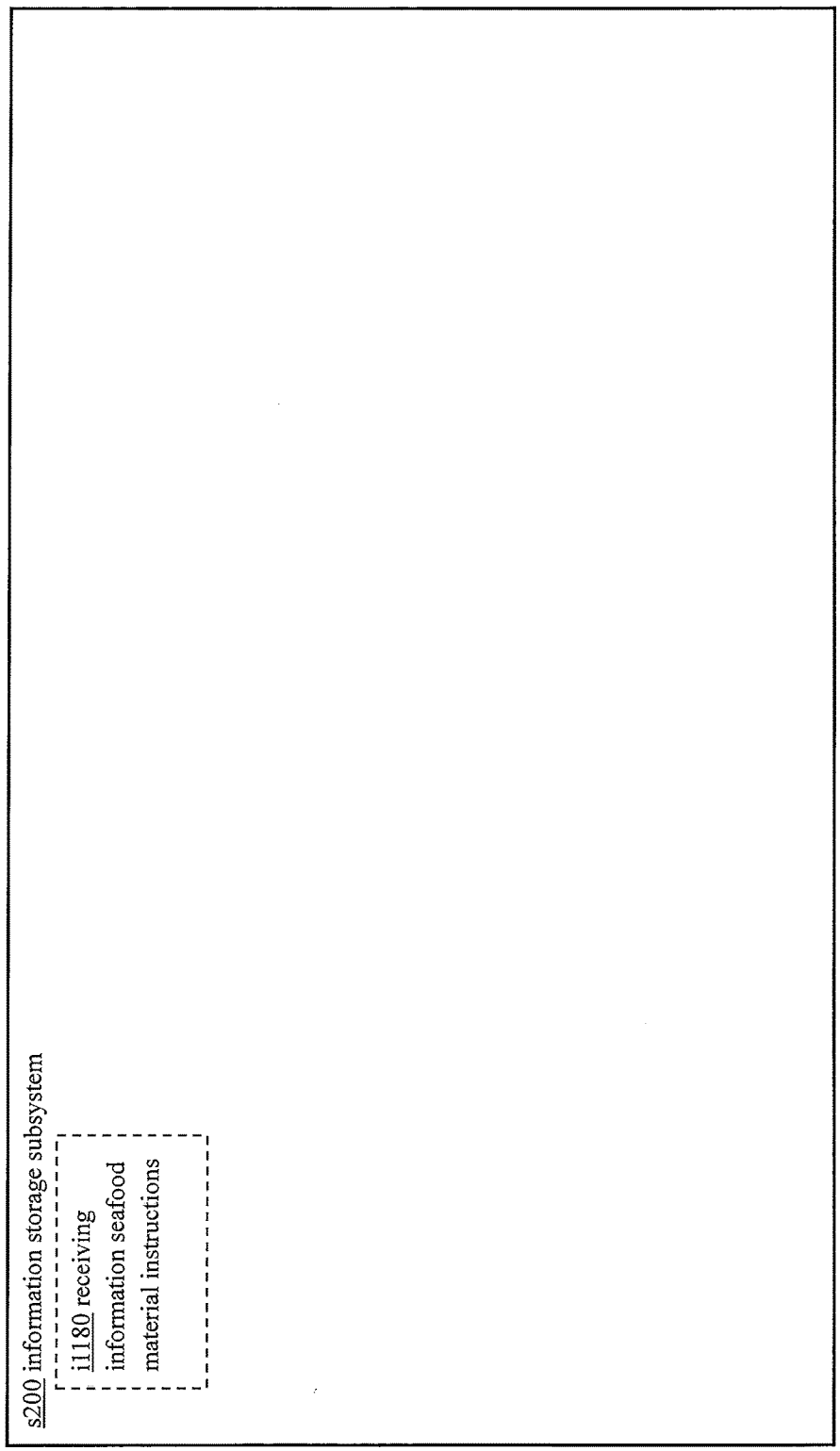
FIG. 32 is a block diagram depicting one or more exemplary instructions of the information storage subsystem s200 of the farming related ingestible materials production tracking system 10 of FIG. 1.

One or more exemplary instructions depicted in FIG. 32 as being borne in an exemplary version of a non-transitory signal bearing medium of information storage subsystem s200 include one or more receiving information seafood material instructions i1180.

Figure 33:
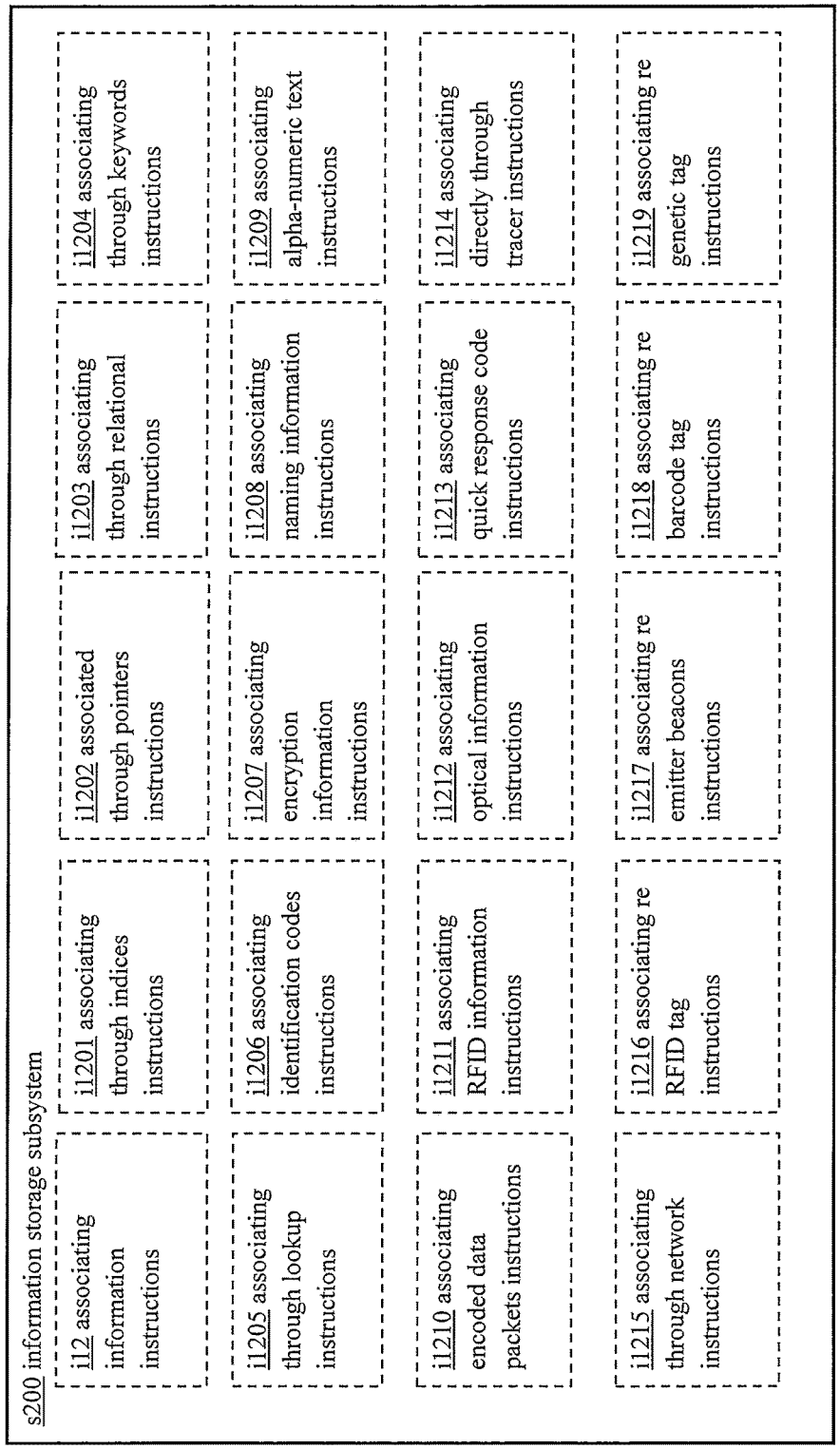
FIG. 33 is a block diagram depicting one or more exemplary instructions of the information storage subsystem s200 of the farming related ingestible materials production tracking system 10 of FIG. 1.

One or more exemplary instructions depicted in FIG. 33 as being borne in an exemplary version of a non-transitory signal bearing medium of information storage subsystem s200 include one or more associating information instructions i12, one or more associating through indices instructions i1201, one or more associated through pointers instructions i1202, one or more associating through relational instructions i1203, one or more associating through keywords instructions i1204, one or more associating through lookup instructions i1205, one or more associating identification codes instructions i1206, one or more associating encryption information instructions i1207, one or more associating naming information instructions i1208, one or more associating alpha-numeric text instructions i1209, one or more associating encoded data packets instructions i1210, one or more associating RFID information instructions i1211, one or more associating optical information instructions i1212, one or more associating quick response code instructions i1213, one or more associating directly through tracer instructions i1214, one or more associating through network instructions i1215, one or more associating re RFID tag instructions i1216, one or more associating re emitter beacons instructions i1217, one or more associating re barcode tag instructions i1218, and one or more associating re genetic tag instructions i1219.

Figure 34:
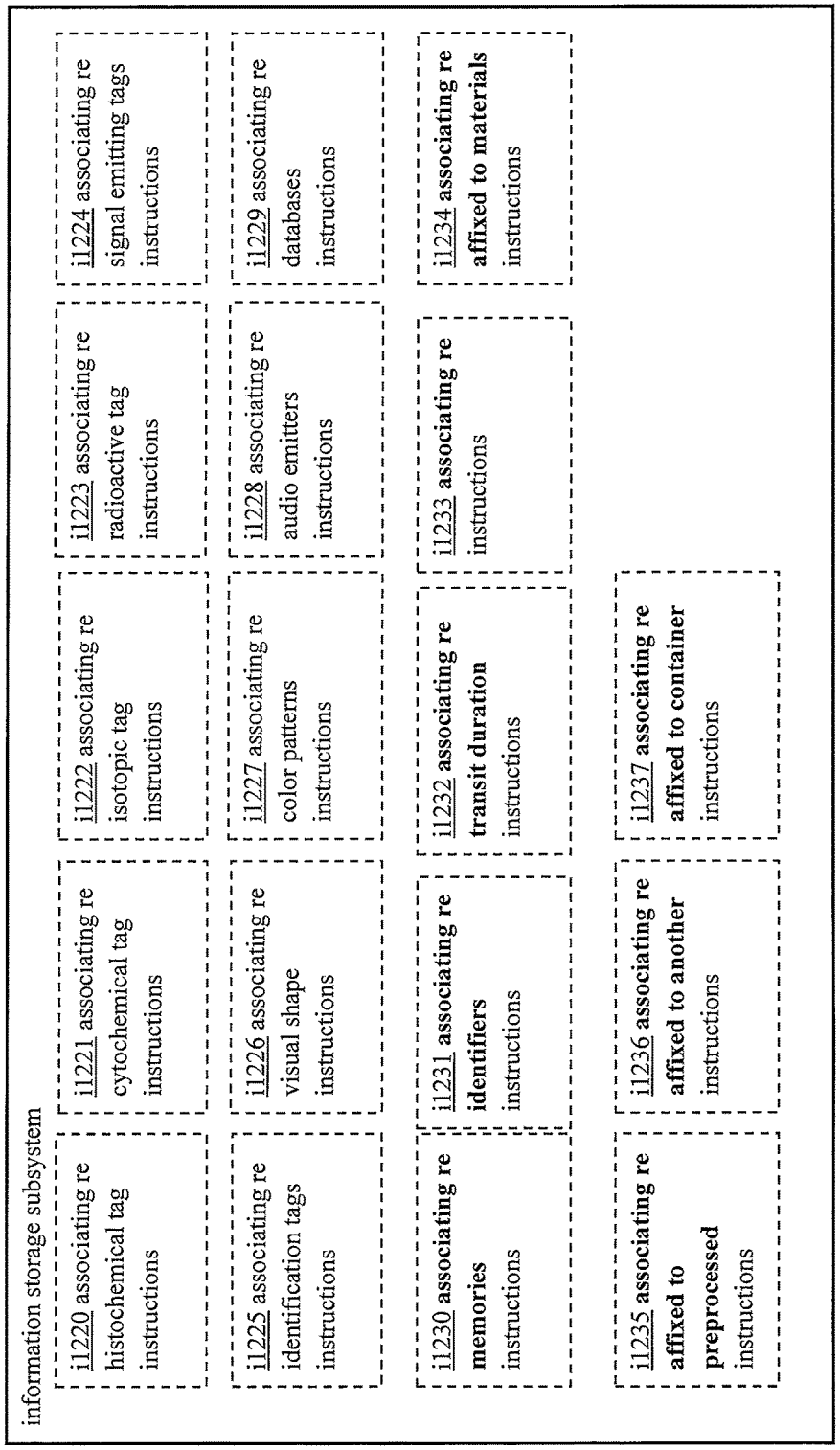
FIG. 34 is a block diagram depicting one or more exemplary instructions of the information storage subsystem s200 of the farming related ingestible materials production tracking system 10 of FIG. 1.

One or more exemplary instructions depicted in FIG. 34 as being borne in an exemplary version of a non-transitory signal bearing medium of information storage subsystem s200 include one or more associating re histochemical tag instructions i1220, one or more associating re cytochemical tag instructions i1221, one or more associating re isotopic tag instructions i1222, one or more associating re radioactive tag instructions i1223, one or more associating re signal emitting tags instructions i1224, one or more associating re identification tags instructions i1225, one or more associating re visual shape instructions i1226, one or more associating re color patterns instructions i1227, one or more associating re audio emitters instructions i1228, one or more associating re databases instructions i1229, one or more associating re affixed to materials instructions i1234, one or more associating re identifiers instructions i1231, one or more associating re transit duration instructions i1232, one or more associating re instructions i1233, one or more associating re affixed to materials instructions i1234, one or more associating re affixed to preprocessed instructions i1235, one or more associating re affixed to another instructions i1236, and one or more associating re affixed to container instructions i1237.

Figure 35:
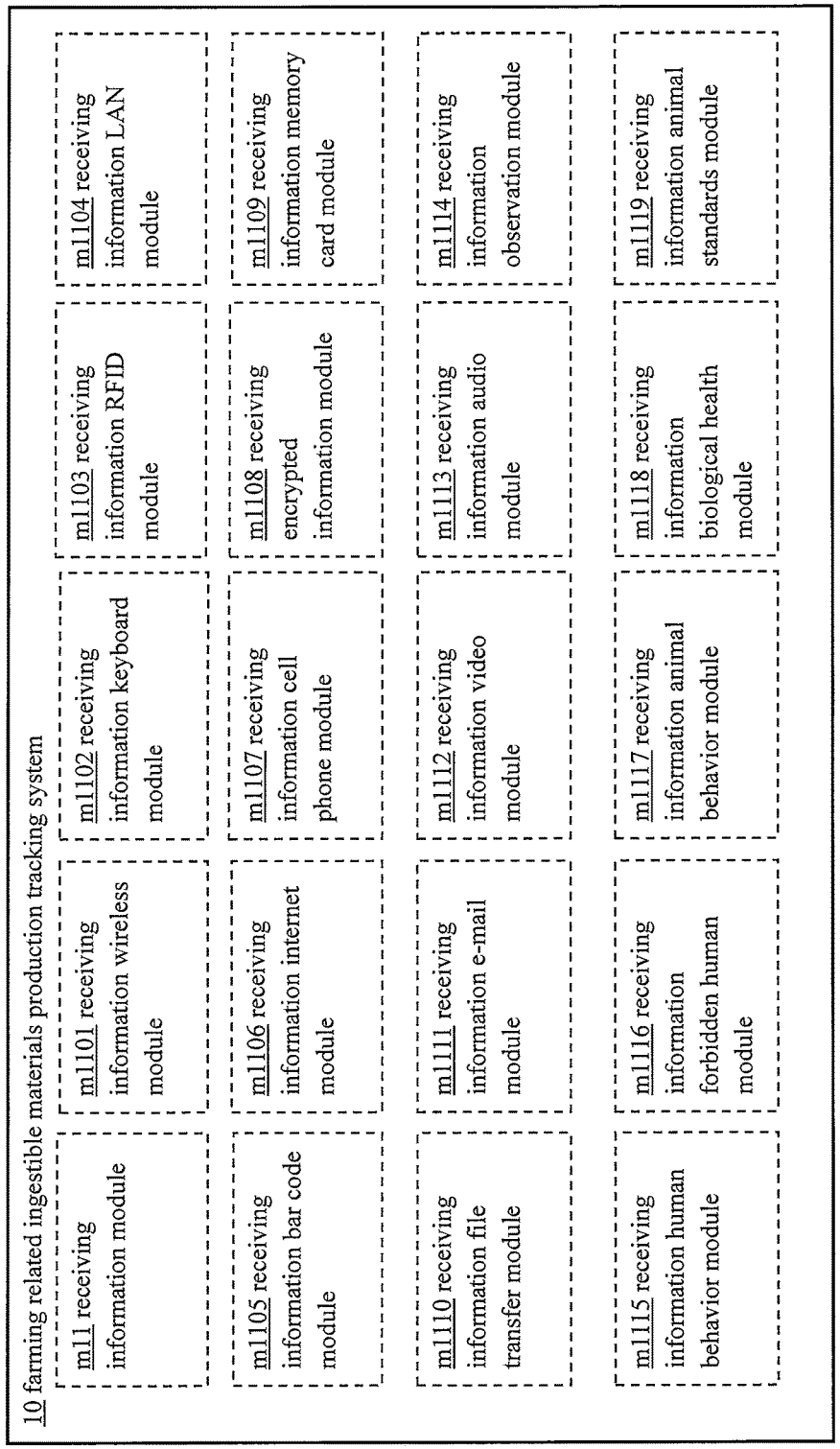
FIG. 35 is a block diagram depicting one or more exemplary modules of the farming related ingestible materials production tracking system 10 of FIG. 1.

Implementations of modules involve different combinations (limited to patentable subject matter under 35 U.S.C. 101) of one or more aspects from one or more of the electrical circuitry arrangements and/or one or more aspects from one or more of the instructions of the farming related ingestible materials production tracking system 10. Exemplary depictions of some of these modules are shown in FIG. 35 to include receiving information module m11, receiving information wireless module m1101, receiving information keyboard module m1102, receiving information RFID module m1103, receiving information LAN module m1104, receiving information bar code module m1105, receiving information internet module m1106, receiving information cell phone module m1107, receiving encrypted information module m1108, receiving information memory card module m1109, receiving information file transfer module m1110, receiving information e-mail module m1111, receiving information video module m1112, receiving information audio module m1113, receiving information observation module m1114, receiving information human behavior module m1115, receiving information forbidden human module m1116, receiving information animal behavior module m1117, receiving information biological health module m1118, and receiving information animal standards module m1119.

Figure 36:
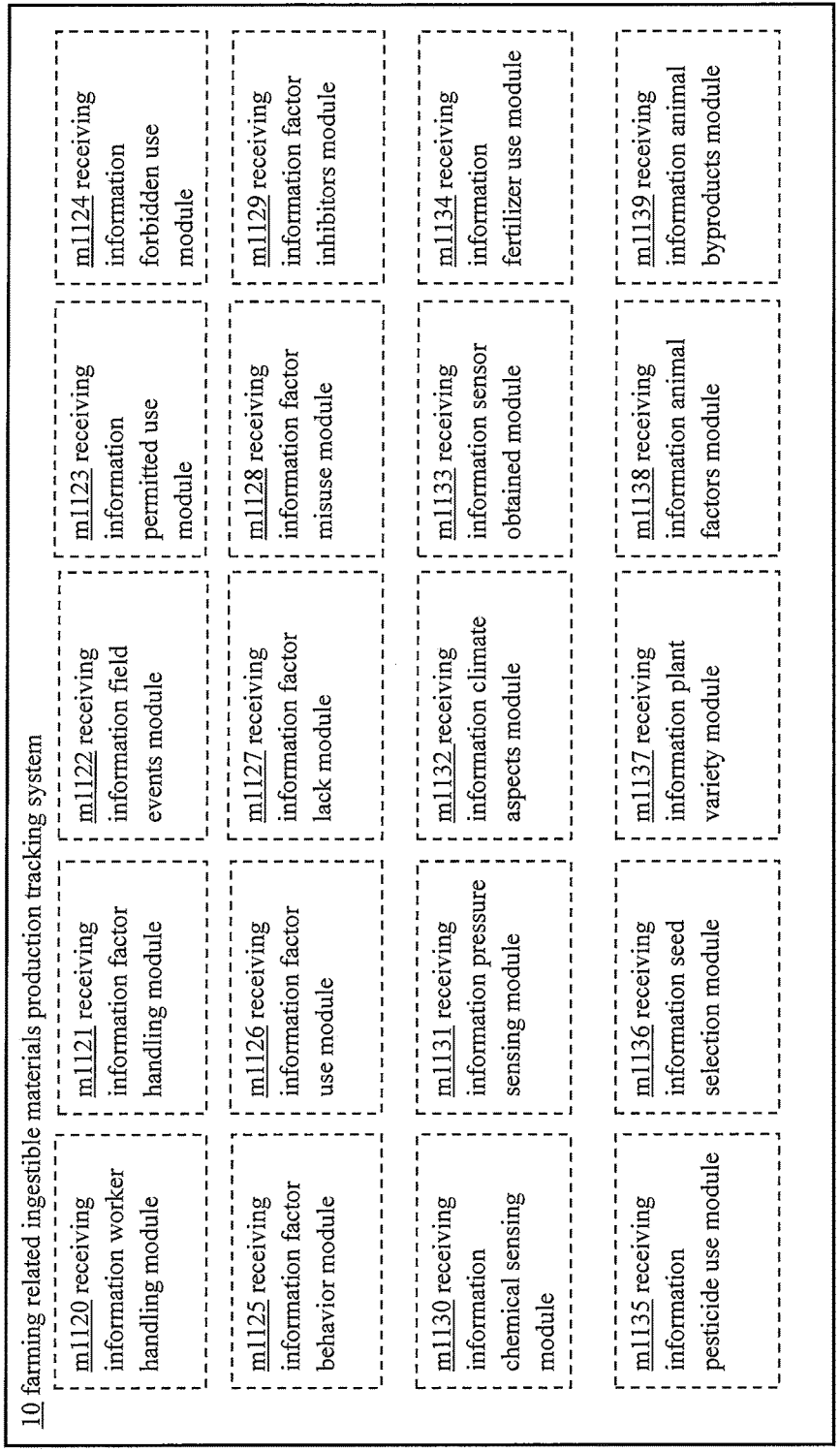
FIG. 36 is a block diagram depicting one or more exemplary modules of the farming related ingestible materials production tracking system 10 of FIG. 1.

Some of these modules are depicted in FIG. 36 to include receiving information worker handling module m1120, receiving information factor handling module m1121, receiving information field events module m1122, receiving information permitted use module m1123, receiving information forbidden use module m1124, receiving information factor behavior module m1125, receiving information factor use module m1126, receiving information factor lack module m1127, receiving information factor misuse module m1128, receiving information factor inhibitors module m1129, receiving information chemical sensing module m1130, receiving information pressure sensing module m113, receiving information climate aspects module m1132, receiving information sensor obtained module m1133, receiving information fertilizer use module m1134, receiving information pesticide use module m1135, receiving information seed selection module m1136, receiving information plant variety module m1137, receiving information animal factors module m1138, and receiving information animal byproducts module m1139.

Figure 37:
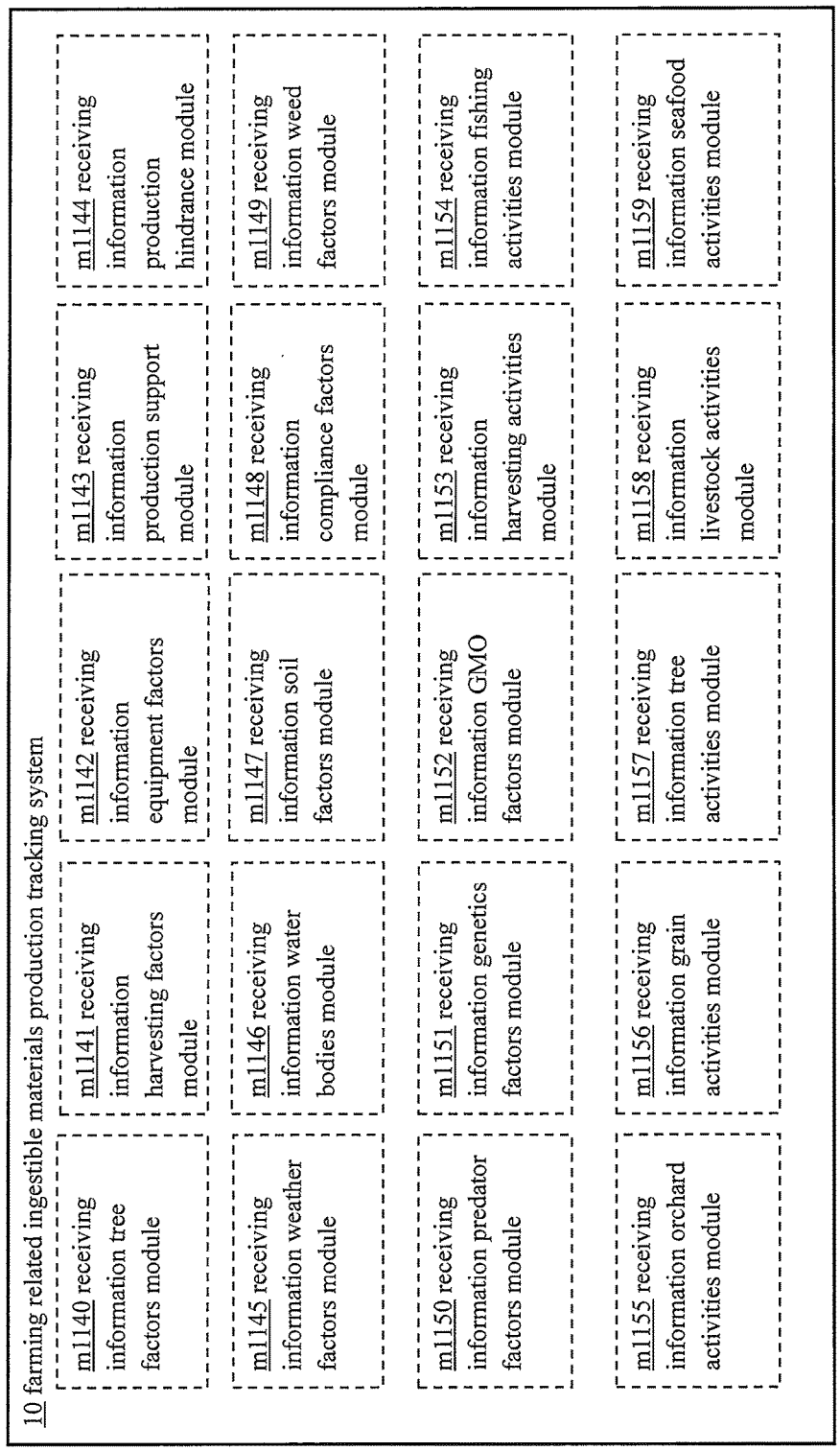
FIG. 37 is a block diagram depicting one or more exemplary modules of the farming related ingestible materials production tracking system 10 of FIG. 1.

Some of these modules are depicted in FIG. 37 to include receiving information tree factors module m1140, receiving information harvesting factors module m1141, receiving information equipment factors module m1142, receiving information production support module m1143, receiving information production hindrance module m1144, receiving information weather factors module m1145, receiving information water bodies module m1146, receiving information soil factors module m1147, receiving information compliance factors module m1148, receiving information weed factors module m1149, receiving information predator factors module m1150, receiving information genetics factors module m1151, receiving information GMO factors module m1152, receiving information harvesting activities module m1153, receiving information fishing activities module m1154, receiving information orchard activities module m1155, receiving information grain activities module m1156, receiving information tree activities module m1157, receiving information livestock activities module m1158, and receiving information seafood activities module m1159.

Figure 38:
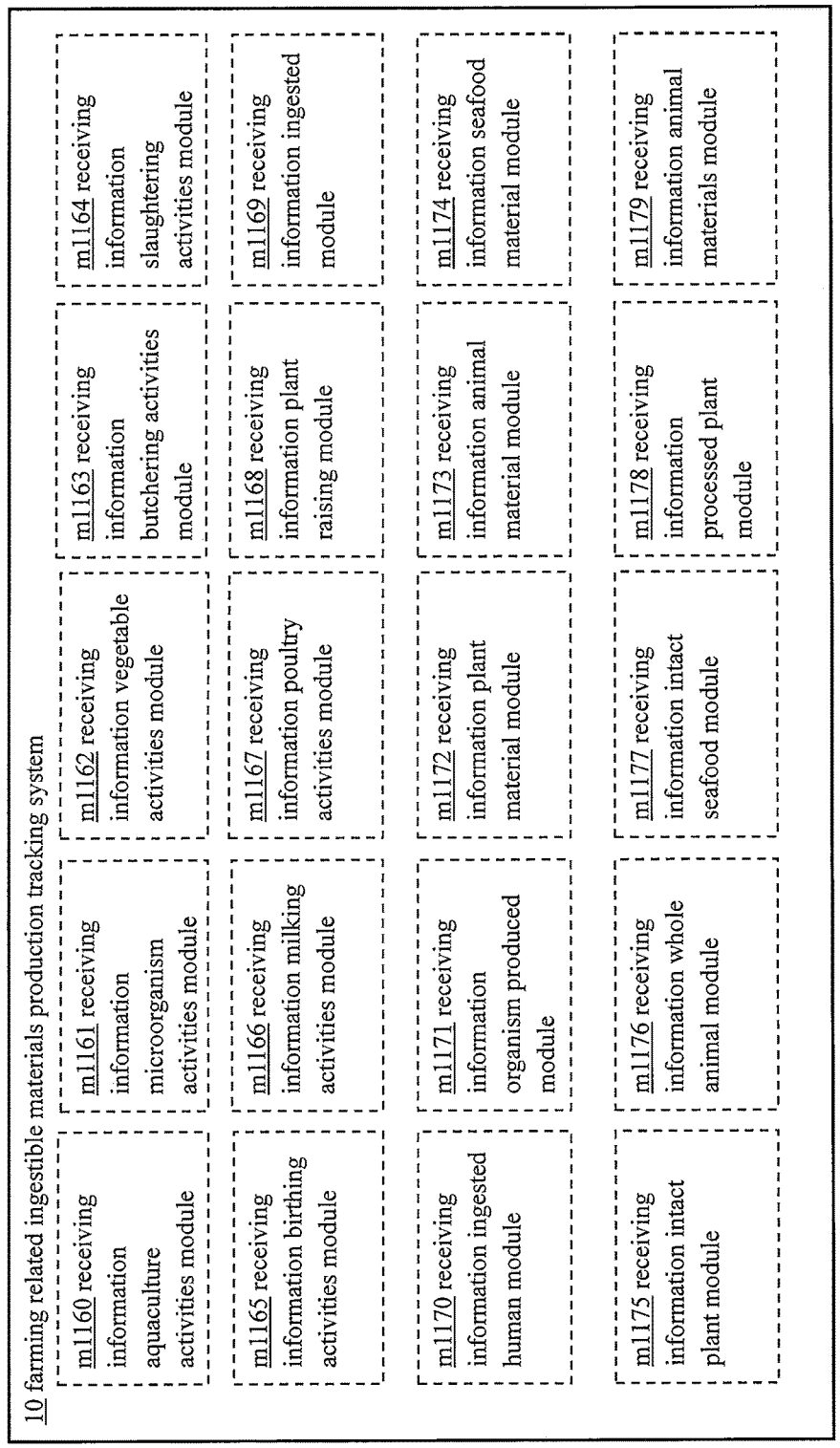
FIG. 38 is a block diagram depicting one or more exemplary modules of the farming related ingestible materials production tracking system 10 of FIG. 1.

Some of these modules are depicted in FIG. 38 to include receiving information aquaculture activities module m1160, receiving information microorganism activities module m1161, receiving information vegetable activities module m1162, receiving information butchering activities module m1163, receiving information slaughtering activities module m1164, receiving information birthing activities module m1165, and receiving information milking activities module m1166, receiving information poultry activities module m1167, receiving information plant raising module m1168, receiving information ingested module m1169, receiving information ingested human module m1170, receiving information organism produced module m1171, receiving information plant material module m1172, receiving information animal material module m1173, receiving information seafood material module m1174, receiving information intact plant module m1175, receiving information whole animal module m1176, receiving information intact seafood module m1177, receiving information processed plant module m1178, and receiving information animal materials module m1179.

Figure 39:
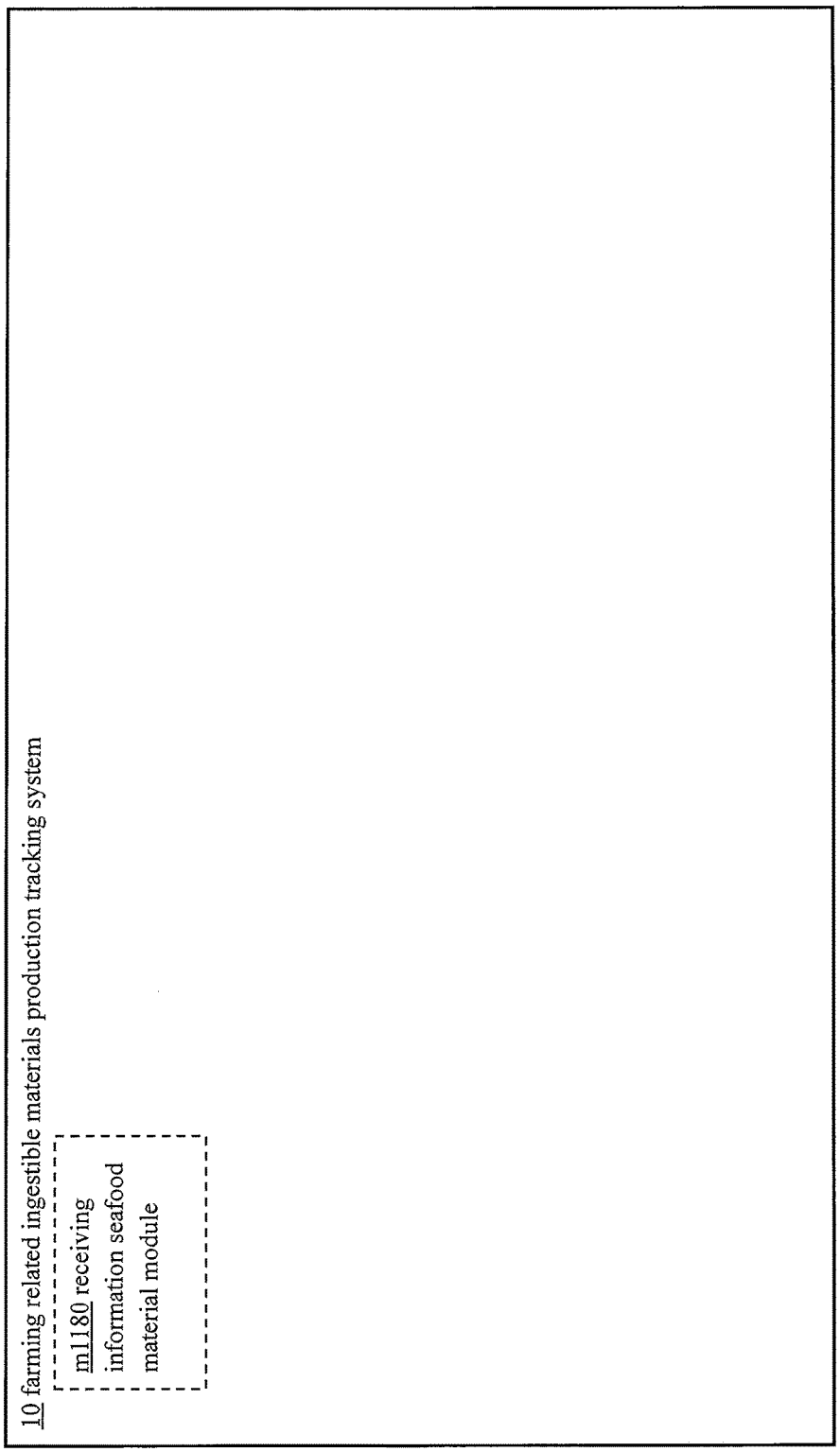
FIG. 39 is a block diagram depicting one or more exemplary modules of the farming related ingestible materials production tracking system 10 of FIG. 1.

Some of these modules are depicted in FIG. 39 to include receiving information seafood material.

Figure 40:
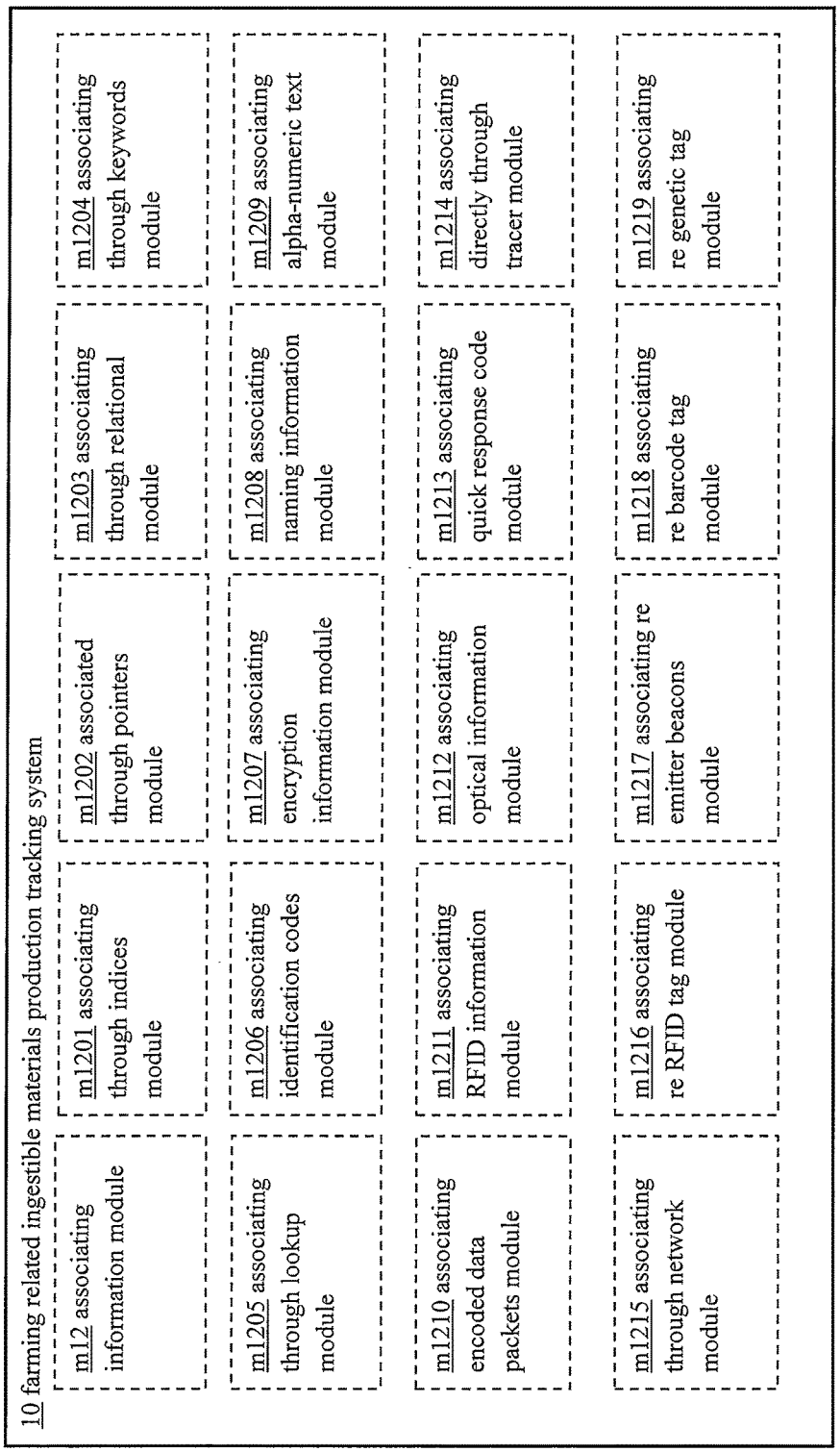
FIG. 40 is a block diagram depicting one or more exemplary modules of the farming related ingestible materials production tracking system 10 of FIG. 1.

Some of these modules are depicted in FIG. 40 to include associating information module m12, associating through indices module m1201, associated through pointers module m1202, associating through relational module m1203, associating through keywords module m1204, associating through lookup module m1205, associating identification codes module m1206, associating encryption information module m1207, associating naming information module m1208, associating alpha-numeric text module m1209, associating encoded data packets module m1210, associating RFID information module m1211, and associating optical information module m1212, associating quick response code module m1213, associating directly through tracer module m1214, associating through network module m1215, associating re RFID tag module m1216, associating re emitter beacons module m1217, associating re barcode tag module m1218, and associating re genetic tag module m1219.

Figure 41:
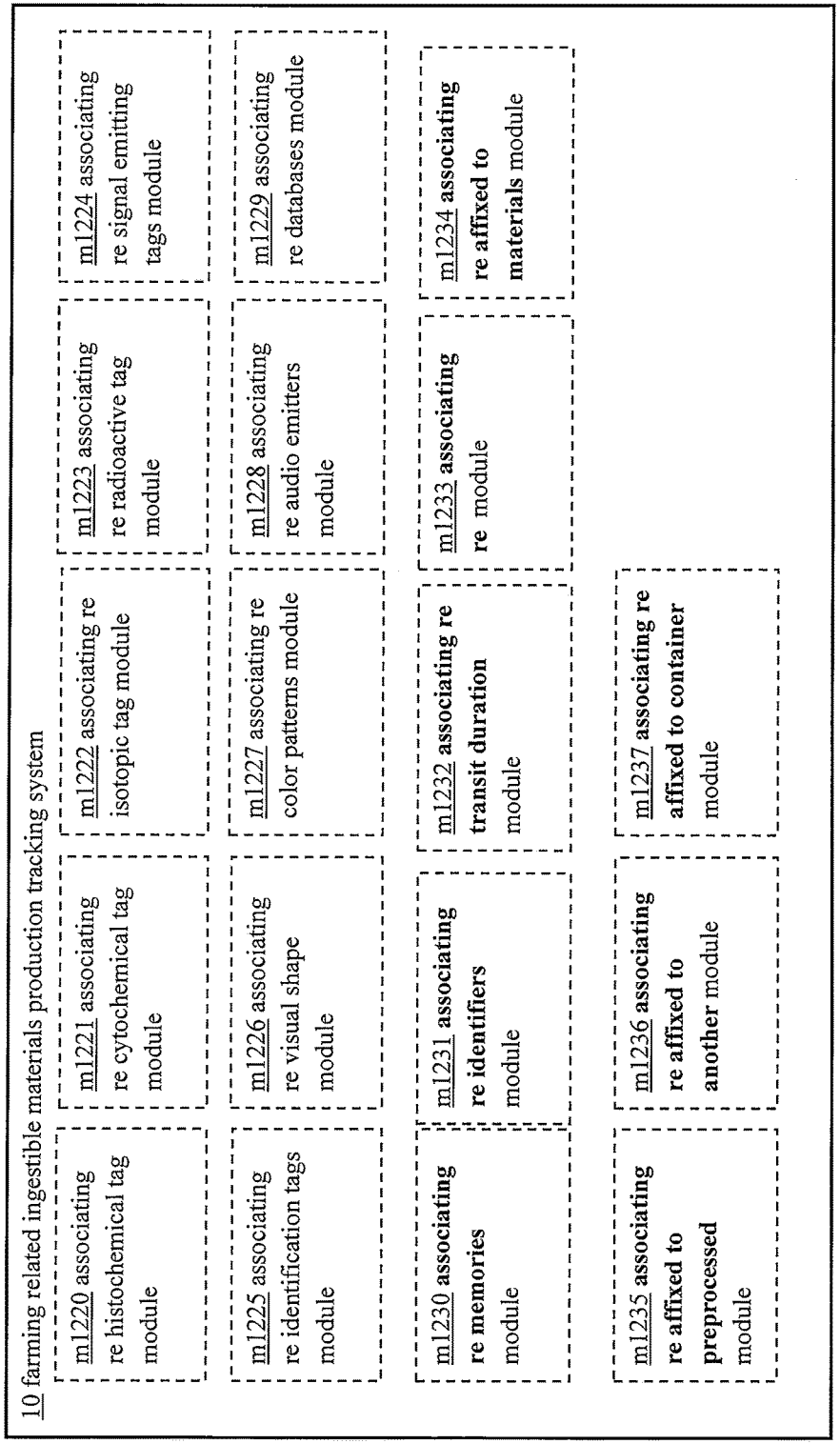
FIG. 41 is a block diagram depicting one or more exemplary modules of the farming related ingestible materials production tracking system 10 of FIG. 1.

Some of these modules are depicted in FIG. 41 to include associating re histochemical tag module m12, associating re cytochemical tag module m1221, associating re isotopic tag module m1222, associating re radioactive tag module m1223, associating re signal emitting tags module m1224, associating re identification tags module m1225, associating re visual shape module m1226, associating re color patterns module m1227, associating re audio emitters module m1228, associating re databases module m1229, associating re affixed to materials module m1234, associating re identifiers module m1231, associating re transit duration module m1232, associating re module m1233, associating re affixed to materials module m1234, associating re affixed to preprocessed module m1235, associating re affixed to another module m1236, and associating re affixed to container module m1237.

In some implementations, non-transitory signal-bearing medium of information storage subsystem s200 as articles of manufacture may store the one or more exemplary instructions. In some implementations, the non-transitory signal bearing medium may include a computer-readable medium. In some implementations, the non-transitory signal-bearing medium may include a recordable medium. In some implementations, the signal-bearing medium may include a communication medium.

The various subsystems and components of the farming related ingestible materials production tracking system s10 such as the control and information processing subsystem s100, the information storage subsystem s200, the information user interface subsystem s300, the sensing subsystem s400 and the electronic communication subsystem s500 and their sub-components and the other exemplary entities depicted may be embodied by hardware, software and/or firmware (limited to patentable subject matter under 35 USC 101). For example, in some implementations of the farming related ingestible materials production tracking system s10, aspects may be implemented with a processor (e.g., microprocessor, controller, and so forth) executing computer readable instructions (e.g., computer program product) stored in a storage medium (e.g., volatile or non-volatile memory) such as a signal-bearing medium. Alternatively, hardware such as application specific integrated circuit (ASIC) may be employed in order to implement such modules in some alternative implementations.

Figure 42:
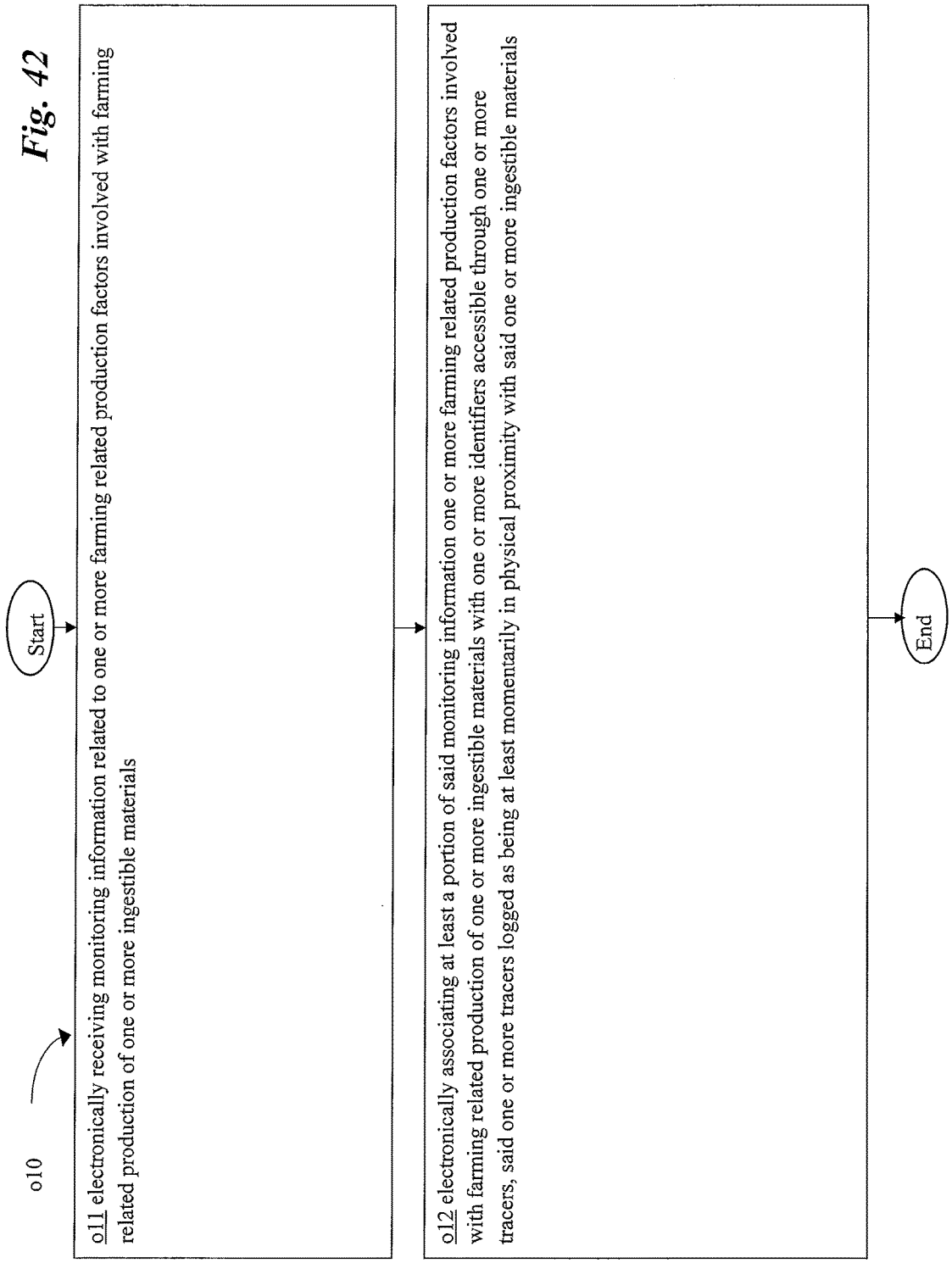
FIG. 42 is a high-level flowchart illustrating an operational flow o10 representing exemplary operations related to electronically receiving monitoring information related to one or more farming related production factors involved with farming related production of one or more ingestible materials, and electronically associating at least a portion of said monitoring information one or more farming related production factors involved with farming related production of one or more ingestible materials with one or more identifiers accessible through one or more tracers, said one or more tracers logged as being at least momentarily in physical proximity with said one or more ingestible materials at least associated with the depicted exemplary implementations of the system.

An operational flow o10 as shown in FIG. 42 represents example operations related to electronically receiving monitoring information related to one or more farming related production factors involved with farming related production of one or more ingestible materials and electronically associating at least a portion of said monitoring information one or more farming related production factors involved with farming related production of one or more ingestible materials with one or more identifiers accessible through one or more tracers, said one or more tracers logged as being at least momentarily in physical proximity with said one or more ingestible materials.

FIG. 42 and those figures that follow may have various examples of operational flows, and explanation may be provided with respect to the above-described examples of FIGS. 1-11 and/or with respect to other examples and contexts. Nonetheless, it should be understood that the operational flows may be executed in a number of other environments and contexts, and/or in modified versions of FIGS. 1-11. Furthermore, although the various operational flows are presented in the sequence(s) illustrated, it should be understood that the various operations may be performed in other orders than those which are illustrated, or may be performed concurrently.

In FIG. 42 and those figures that follow, various operations may be depicted in a box-within-a-box manner. Such depictions may indicate that an operation in an internal box may comprise an optional exemplary implementation of the operational step illustrated in one or more external boxes. However, it should be understood that internal box operations may be viewed as independent operations separate from any associated external boxes and may be performed in any sequence with respect to all other illustrated operations, or may be performed concurrently.

For ease of understanding, the flowcharts are organized such that the initial flowcharts present implementations via an example implementation and thereafter the following flowcharts present alternate implementations and/or expansions of the initial flowchart(s) as either sub-component operations or additional component operations building on one or more earlier-presented flowcharts. Those having skill in the art will appreciate that the style of presentation utilized herein (e.g., beginning with a presentation of a flowchart(s) presenting an example implementation and thereafter providing additions to and/or further details in subsequent flowcharts) generally allows for a rapid and easy understanding of the various process implementations. In addition, those skilled in the art will further appreciate that the style of presentation used herein also lends itself well to modular and/or object-oriented program design paradigms.

As shown in FIG. 42, the operational flow o10 proceeds to operation o11 for electronically receiving monitoring information related to one or more farming related production factors involved with farming related production of one or more ingestible materials. An exemplary version of a non-transitory signal bearing medium of information storage subsystem s200 is depicted as bearing one or more receiving information instructions ill that when executed will direct performance of the operation o11. In an implementation, the one or more receiving information instructions ill when executed direct electronically receiving (e.g. wifi, laptop entry, RFID scan, etc.) monitoring information (e.g. AVI file format, MP3 file format, audio listening, etc.) related to (e.g. efficiency, cost measures, pandemics, etc.) one or more farming related production factors (e.g. fuel delivery schedule, cost of fuel, record keeping methods, etc.) involved with (e.g. associated, affected, affecting, etc.) farming related production of (e.g. blueberry cultivation, raspberry harvesting, corn growing, etc.) one or more ingestible materials (e.g. feed grain, beet pulp, water, etc.). Furthermore, the receiving information electrical circuitry arrangement ("elec circ arrange") ell when activated will perform the operation o1101. Also, the receiving information wireless module m1101, when executed and/or activated, will direct performance of and/or performs the operation o11. In an implementation, the receiving information electrical circuitry arrangement ell, when activated performs electronically receiving (e.g. wifi, laptop entry, RFID scan, etc.) monitoring information (e.g. AVI file format, MP3 file format, audio listening, etc.) related to (e.g. efficiency, cost measures, pandemics, etc.) one or more farming related production factors (e.g. fuel delivery schedule, cost of fuel, record keeping methods, etc.) involved with (e.g. associated, affected, affecting, etc.) farming related production of (e.g. blueberry cultivation, raspberry harvesting, corn growing, etc.) one or more ingestible materials (e.g. feed grain, beet pulp, water, etc.). Also, the receiving information module m11, when executed and/or activated, will direct performance of and/or perform the operation o11. In an implementation, the electronically receiving monitoring information related to one or more farming related production factors involved with farming related production of one or more ingestible materials is carried out by electronically receiving (e.g. wifi, laptop entry, RFID scan, etc.) monitoring information (e.g. AVI file format, MP3 file format, audio listening, etc.) related to (e.g. efficiency, cost measures, pandemics, etc.) one or more farming related production factors (e.g. fuel delivery schedule, cost of fuel, record keeping methods, etc.) involved with (e.g. associated, affecting, affecting, etc.) farming related production of (e.g. blueberry cultivation, raspberry harvesting, corn growing, etc.) one or more ingestible materials (e.g. feed grain, beet pulp, water, etc.).

Figure 28:
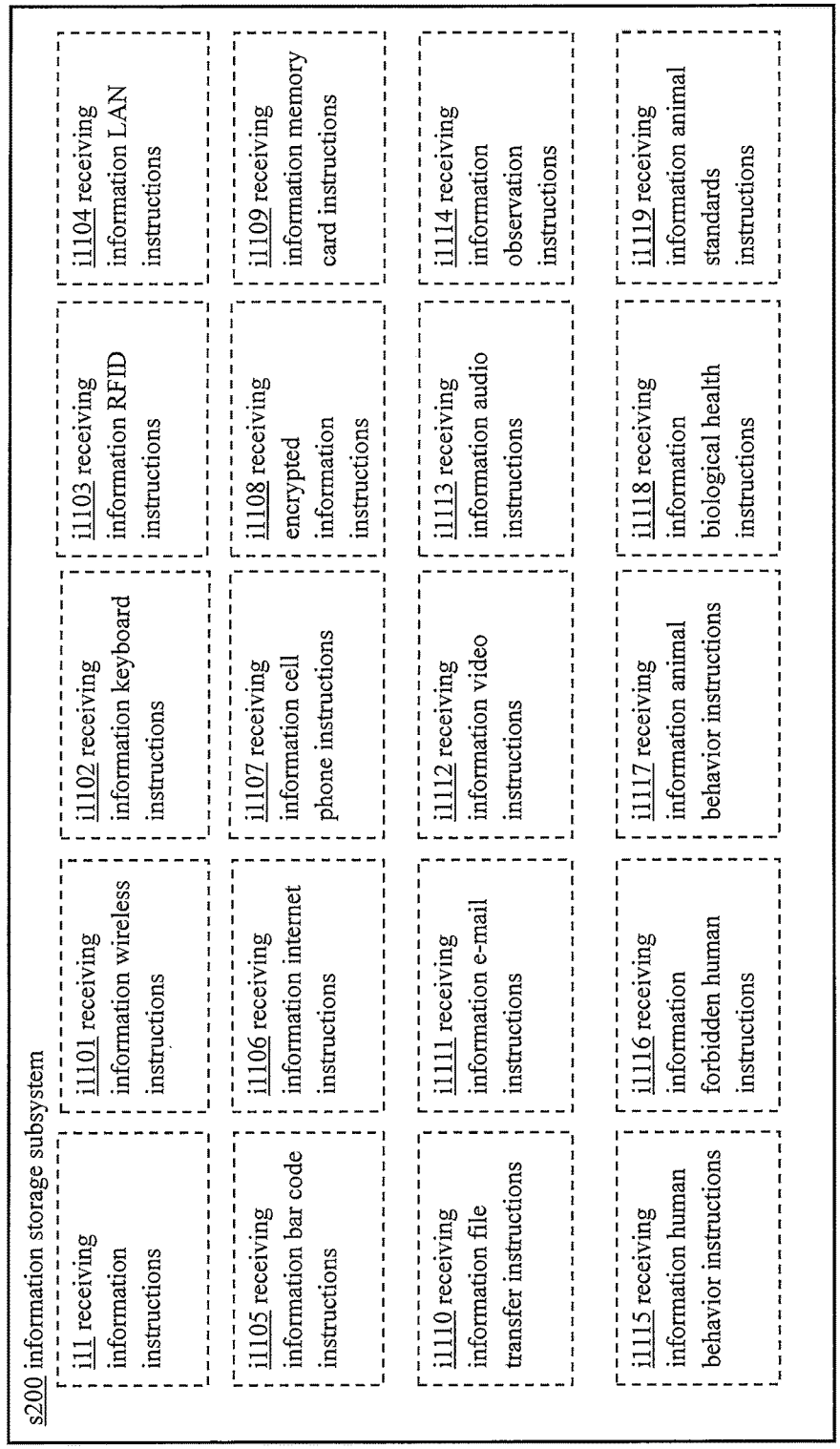
FIG. 28 is a block diagram depicting one or more exemplary instructions of the information storage subsystem s200 of the farming related ingestible materials production tracking system 10 of FIG. 1.
Figure 43:
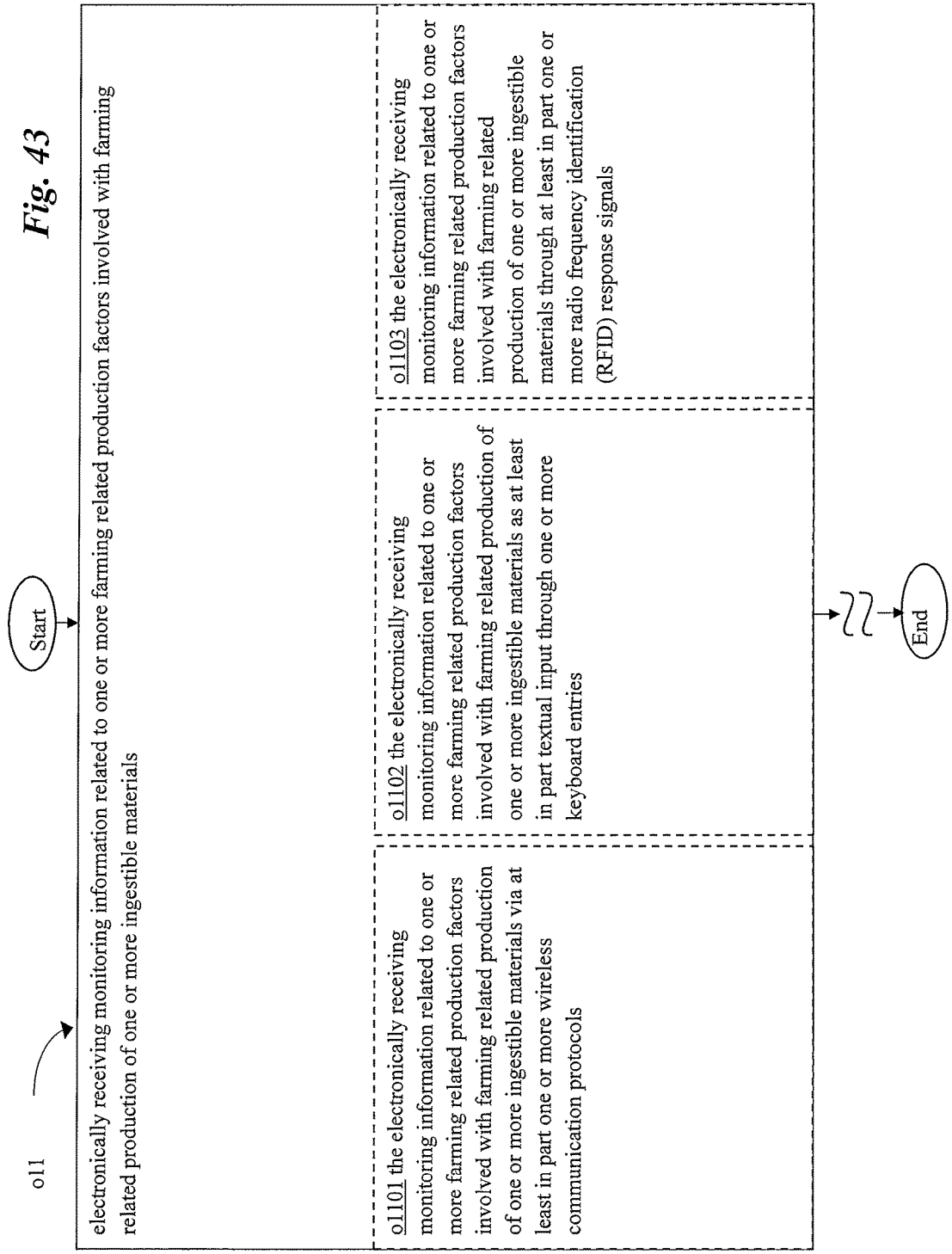
FIG. 43 is a high-level flowchart including exemplary implementations of operation o11 of FIG. 42.

In one or more implementations, as shown in FIG. 43, operation o11 includes an operation o1101 for the electronically receiving monitoring information related to one or more farming related production factors involved with farming related production of one or more ingestible materials via at least in part one or more wireless communication protocols. Origination of an illustratively derived receiving information wireless component group can be accomplished through skilled in the art design choice selection of one or more of the above depicted components from one or more of the above depicted subsystems shown in FIG. 12. Components from the receiving information wireless component group can be used in implementing execution of the one or more receiving information wireless instructions i1101 of FIG. 28, can be used in performance of the receiving information wireless electrical circuitry arrangement e1101 of FIG. 21, and/or can be used in otherwise fulfillment of the operation o1101. An exemplary non-transitory signal bearing medium version of the information storage subsystem s200 is depicted in FIG. 28 as bearing the one or more receiving information wireless instructions i1101 that when executed will direct performance of the operation o1101. Furthermore, the receiving information wireless electrical circuitry arrangement ("elec circ arrange") e1101, when activated, will perform the operation o1101. Also, the receiving information wireless module m1101, when executed and/or activated, will direct performance of and/or perform the operation o1101. For instance, in one or more exemplary implementations, the one or more receiving information wireless instructions i1101, when executed, direct performance of the operation o1101 in the illustrative depiction as follows, and/or the receiving information wireless electrical circuitry arrangement e1101, when activated, performs the operation o1101 in the illustrative depiction as follows, and/or the receiving information wireless module m1101, when executed and/or activated, directs performance of and/or performs the operation o1101 in the illustrative depiction as follows, and/or the operation o1101 is otherwise carried out in the illustrative depiction as follows: the electronically receiving (e.g. wifi, etc.) monitoring information (e.g. AVI file format, etc.) related to (e.g. efficiency, etc.) one or more farming related production factors (e.g. fuel delivery schedule, etc.) involved with (e.g. associated, etc.) farming related production of (e.g. blueberry cultivation, etc.) one or more ingestible materials (e.g. feed grain, etc.) via at least in part one or more wireless communication protocols (e.g. wifi, etc.).

In one or more implementations, as shown in FIG. 43, operation o11 includes an operation o1102 for the electronically receiving monitoring information related to one or more farming related production factors involved with farming related production of one or more ingestible materials as at least in part textual input through one or more keyboard entries. Origination of an illustratively derived receiving information keyboard component group can be accomplished through skilled in the art design choice selection of one or more of the above depicted components from one or more of the above depicted subsystems shown in FIG. 12. Components from the receiving information keyboard component group can be used in implementing execution of the one or more receiving information keyboard instructions i1102 of FIG. 28, can be used in performance of the receiving information keyboard electrical circuitry arrangement e1102 of FIG. 21, and/or can be used in otherwise fulfillment of the operation o1102. An exemplary non-transitory signal bearing medium version of the information storage subsystem s200 is depicted in FIG. 28 as bearing the one or more receiving information keyboard instructions i1102 that when executed will direct performance of the operation o1102. Furthermore, the receiving information keyboard electrical circuitry arrangement ("elec circ arrange") e1102, when activated, will perform the operation o1102. Also, the receiving information keyboard module m1102, when executed and/or activated, will direct performance of and/or perform the operation o1102. For instance, in one or more exemplary implementations, the one or more receiving information keyboard instructions i1102, when executed, direct performance of the operation o1102 in the illustrative depiction as follows, and/or the receiving information keyboard electrical circuitry arrangement e1102, when activated, performs the operation o1102 in the illustrative depiction as follows, and/or the receiving information keyboard module m1102, when executed and/or activated, directs performance of and/or performs the operation o1102 in the illustrative depiction as follows, and/or the operation o1102 is otherwise carried out in the illustrative depiction as follows: the electronically receiving (e.g. laptop entry, etc.) monitoring information (e.g. MP3 file format, etc.) related to (e.g. cost measures, etc.) one or more farming related production factors (e.g. cost of fuel, etc.) involved with (e.g. affected, etc.) farming related production of (e.g. raspberry harvesting, etc.) one or more ingestible materials (e.g. beet pulp, etc.) as at least in part textual input through one or more keyboard entries (e.g. laptop entry, etc.).

In one or more implementations, as shown in FIG. 43, operation o11 includes an operation o1103 for the electronically receiving monitoring information related to one or more farming related production factors involved with farming related production of one or more ingestible materials through at least in part one or more radio frequency identification (RFID) response signals. Origination of an illustratively derived receiving information RFID component group can be accomplished through skilled in the art design choice selection of one or more of the above depicted components from one or more of the above depicted subsystems shown in FIG. 12. Components from the receiving information RFID component group can be used in implementing execution of the one or more receiving information RFID instructions i1103 of FIG. 28, can be used in performance of the receiving information RFID electrical circuitry arrangement e1103 of FIG. 21, and/or can be used in otherwise fulfillment of the operation o1103. An exemplary non-transitory signal bearing medium version of the information storage subsystem s200 is depicted in FIG. 28 as bearing the one or more receiving information RFID instructions i1103 that when executed will direct performance of the operation o1103. Furthermore, the receiving information RFID electrical circuitry arrangement ("elec circ arrange") e1103, when activated, will perform the operation o1103. Also, the receiving information RFID module m1103, when executed and/or activated, will direct performance of and/or perform the operation o1103. For instance, in one or more exemplary implementations, the one or more receiving information RFID instructions i1103, when executed, direct performance of the operation o1103 in the illustrative depiction as follows, and/or the receiving information RFID electrical circuitry arrangement e1103, when activated, performs the operation o1103 in the illustrative depiction as follows, and/or the receiving information RFID module m1103, when executed and/or activated, directs performance of and/or performs the operation o1103 in the illustrative depiction as follows, and/or the operation o1103 is otherwise carried out in the illustrative depiction as follows: the electronically receiving (e.g. RFID scan, etc.) monitoring information (e.g. audio listening, etc.) related to (e.g. pandemics, etc.) one or more farming related production factors (e.g. record keeping methods, etc.) involved with (e.g. affecting, etc.) farming related production of (e.g. corn growing, etc.) one or more ingestible materials (e.g. water, etc.) through at least in part one or more radio frequency identification (RFID) response signals (e.g. RFID scan, etc.).

Figure 44:
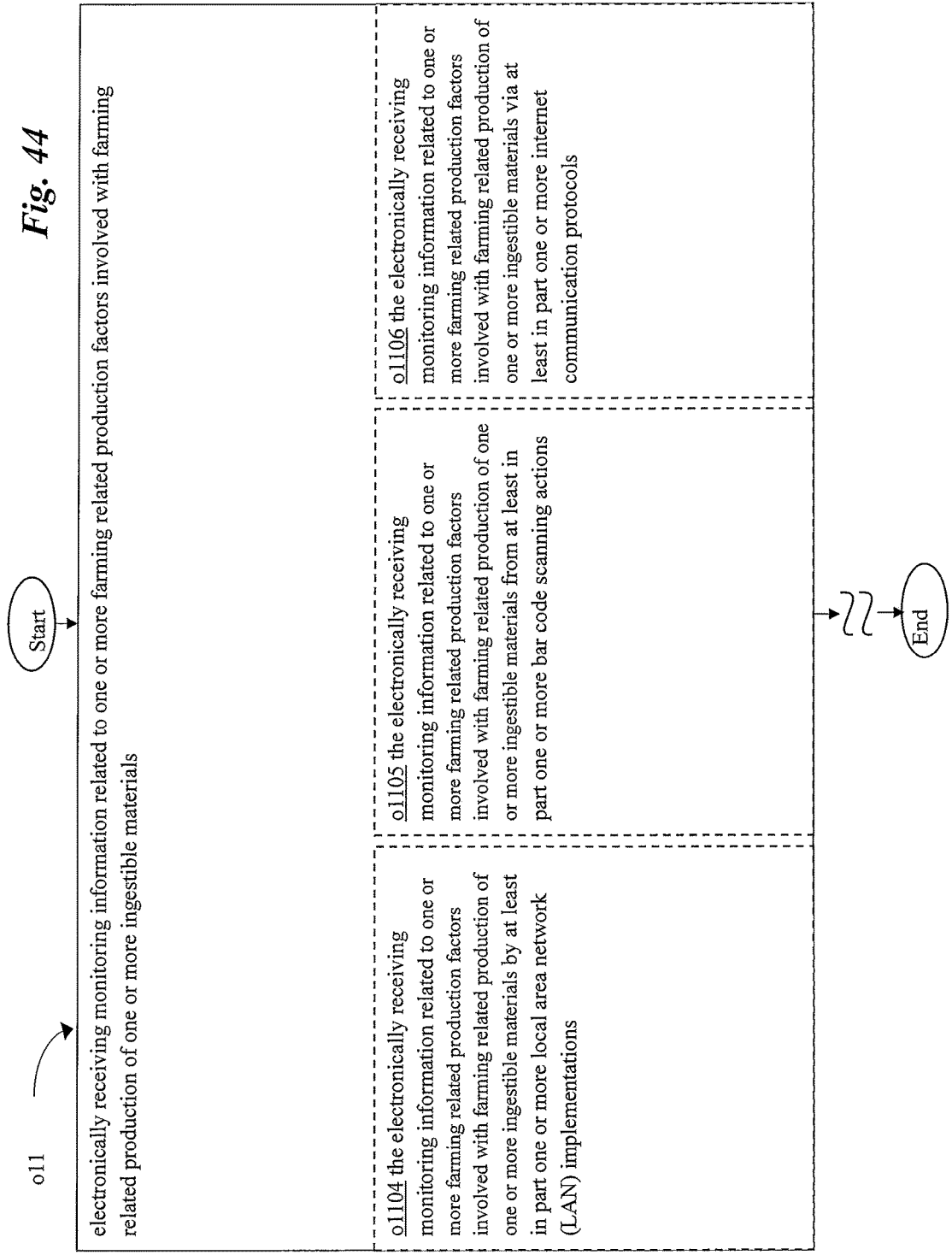
FIG. 44 is a high-level flowchart including exemplary implementations of operation o11 of FIG. 42.

In one or more implementations, as shown in FIG. 44, operation o11 includes an operation o1104 for the electronically receiving monitoring information related to one or more farming related production factors involved with farming related production of one or more ingestible materials by at least in part one or more local area network (LAN) implementations. Origination of an illustratively derived receiving information LAN component group can be accomplished through skilled in the art design choice selection of one or more of the above depicted components from one or more of the above depicted subsystems shown in FIG. 12. Components from the receiving information LAN component group can be used in implementing execution of the one or more receiving information LAN instructions i1104 of FIG. 28, can be used in performance of the receiving information LAN electrical circuitry arrangement e1104 of FIG. 21, and/or can be used in otherwise fulfillment of the operation o1104. An exemplary non-transitory signal bearing medium version of the information storage subsystem s200 is depicted in FIG. 28 as bearing the one or more receiving information LAN instructions i1104 that when executed will direct performance of the operation o1104. Furthermore, the receiving information LAN electrical circuitry arrangement ("elec circ arrange") e1104, when activated, will perform the operation o1104. Also, the receiving information LAN module m1104, when executed and/or activated, will direct performance of and/or perform the operation o1104. For instance, in one or more exemplary implementations, the one or more receiving information LAN instructions i1104, when executed, direct performance of the operation o1104 in the illustrative depiction as follows, and/or the receiving information LAN electrical circuitry arrangement e1104, when activated, performs the operation o1104 in the illustrative depiction as follows, and/or the receiving information LAN module m1104, when executed and/or activated, directs performance of and/or performs the operation o1104 in the illustrative depiction as follows, and/or the operation o1104 is otherwise carried out in the illustrative depiction as follows: the electronically receiving (e.g. ethernet, etc.) monitoring information (e.g. disobeying safety protocols, etc.) related to (e.g. advertising, etc.) one or more farming related production factors (e.g. certification deadlines, etc.) involved with (e.g. argue, etc.) farming related production of (e.g. soy bean harvesting, etc.) one or more ingestible materials (e.g. meal worms, etc.) by at least in part one or more local area network (LAN) implementations (e.g. ethernet, etc.).

In one or more implementations, as shown in FIG. 44, operation o11 includes an operation o1105 for the electronically receiving monitoring information related to one or more farming related production factors involved with farming related production of one or more ingestible materials from at least in part one or more bar code scanning actions. Origination of an illustratively derived receiving information bar code component group can be accomplished through skilled in the art design choice selection of one or more of the above depicted components from one or more of the above depicted subsystems shown in FIG. 12. Components from the receiving information bar code component group can be used in implementing execution of the one or more receiving information bar code instructions i1105 of FIG. 28, can be used in performance of the receiving information bar code electrical circuitry arrangement e1105 of FIG. 21, and/or can be used in otherwise fulfillment of the operation o1105. An exemplary non-transitory signal bearing medium version of the information storage subsystem s200 is depicted in FIG. 28 as bearing the one or more receiving information bar code instructions i1105 that when executed will direct performance of the operation o1105. Furthermore, the receiving information bar code electrical circuitry arrangement ("elec circ arrange") e1105, when activated, will perform the operation o1105. Also, the receiving information bar code module m1105, when executed and/or activated, will direct performance of and/or perform the operation o1105. For instance, in one or more exemplary implementations, the one or more receiving information bar code instructions i1105, when executed, direct performance of the operation o1105 in the illustrative depiction as follows, and/or the receiving information bar code electrical circuitry arrangement e1105, when activated, performs the operation o1105 in the illustrative depiction as follows, and/or the receiving information bar code module m1105, when executed and/or activated, directs performance of and/or performs the operation o1105 in the illustrative depiction as follows, and/or the operation o1105 is otherwise carried out in the illustrative depiction as follows: the electronically receiving (e.g. UPC scan, etc.) monitoring information (e.g. wind speed, etc.) related to (e.g. market conditions, etc.) one or more farming related production factors (e.g. types of fertilizers on order, etc.) involved with (e.g. connected, etc.) farming related production of (e.g. canola harvesting, etc.) one or more ingestible materials (e.g. crawling insects, etc.) from at least in part one or more bar code scanning actions (e.g. UPC scan, etc.).

In one or more implementations, as shown in FIG. 44, operation o11 includes an operation o1106 for the electronically receiving monitoring information related to one or more farming related production factors involved with farming related production of one or more ingestible materials via at least in part one or more internet communication protocols. Origination of an illustratively derived receiving information internet component group can be accomplished through skilled in the art design choice selection of one or more of the above depicted components from one or more of the above depicted subsystems shown in FIG. 12. Components from the receiving information internet component group can be used in implementing execution of the one or more receiving information internet instructions i1106 of FIG. 28, can be used in performance of the receiving information internet electrical circuitry arrangement e1106 of FIG. 21, and/or can be used in otherwise fulfillment of the operation o1106. An exemplary non-transitory signal bearing medium version of the information storage subsystem s200 is depicted in FIG. 28 as bearing the one or more receiving information internet instructions i1106 that when executed will direct performance of the operation o1106. Furthermore, the receiving information internet electrical circuitry arrangement ("elec circ arrange") e1106, when activated, will perform the operation o1106. Also, the receiving information internet module m1106, when executed and/or activated, will direct performance of and/or perform the operation o1106. For instance, in one or more exemplary implementations, the one or more receiving information internet instructions i1106, when executed, direct performance of the operation o1106 in the illustrative depiction as follows, and/or the receiving information internet electrical circuitry arrangement e1106, when activated, performs the operation o1106 in the illustrative depiction as follows, and/or the receiving information internet module m1106, when executed and/or activated, directs performance of and/or performs the operation o1106 in the illustrative depiction as follows, and/or the operation o1106 is otherwise carried out in the illustrative depiction as follows: the electronically receiving (e.g. HTML code, etc.) monitoring information (e.g. wind direction, etc.) related to (e.g. health issues, etc.) one or more farming related production factors (e.g. banned pesticides, etc.) involved with (e.g. commit to, etc.) farming related production of (e.g. cherry picking, etc.) one or more ingestible materials (e.g. parsnip, etc.) via at least in part one or more internet communication protocols (e.g. HTML code, etc.).

Figure 45:
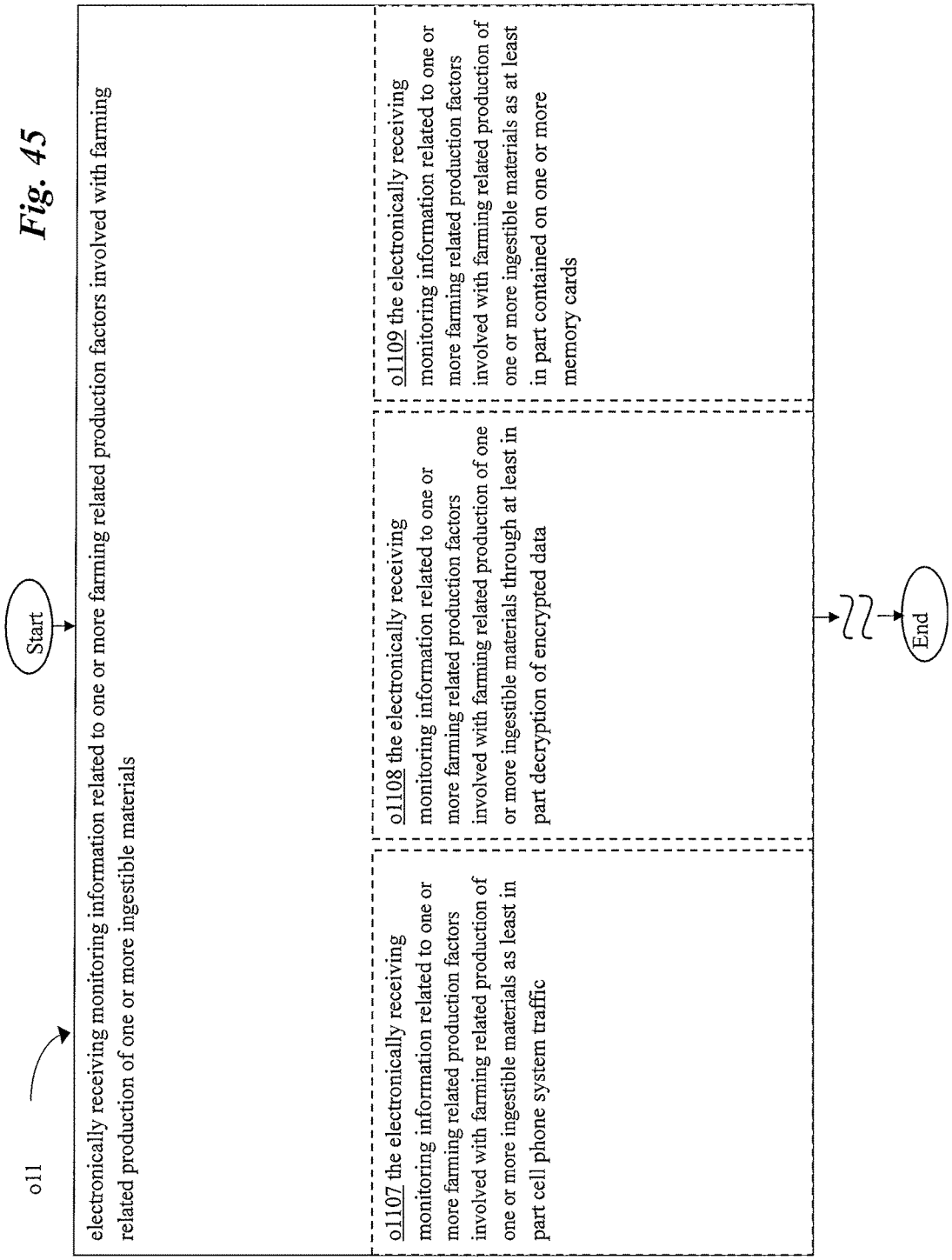
FIG. 45 is a high-level flowchart including exemplary implementations of operation o11 of FIG. 42.

In one or more implementations, as shown in FIG. 45, operation o11 includes an operation o1107 for the electronically receiving monitoring information related to one or more farming related production factors involved with farming related production of one or more ingestible materials as least in part cell phone system traffic. Origination of an illustratively derived receiving information cell phone component group can be accomplished through skilled in the art design choice selection of one or more of the above depicted components from one or more of the above depicted subsystems shown in FIG. 12. Components from the receiving information cell phone component group can be used in implementing execution of the one or more receiving information cell phone instructions i1107 of FIG. 28, can be used in performance of the receiving information cell phone electrical circuitry arrangement e1107 of FIG. 21, and/or can be used in otherwise fulfillment of the operation o1107. An exemplary non-transitory signal bearing medium version of the information storage subsystem s200 is depicted in FIG. 28 as bearing the one or more receiving information cell phone instructions i1107 that when executed will direct performance of the operation o1107. Furthermore, the receiving information cell phone electrical circuitry arrangement ("elec circ arrange") e1107, when activated, will perform the operation o1107. Also, the receiving information cell phone module m1107, when executed and/or activated, will direct performance of and/or perform the operation o1107. For instance, in one or more exemplary implementations, the one or more receiving information cell phone instructions i1107, when executed, direct performance of the operation o1107 in the illustrative depiction as follows, and/or the receiving information cell phone electrical circuitry arrangement e1107, when activated, performs the operation o1107 in the illustrative depiction as follows, and/or the receiving information cell phone module m1107, when executed and/or activated, directs performance of and/or performs the operation o1107 in the illustrative depiction as follows, and/or the operation o1107 is otherwise carried out in the illustrative depiction as follows: the electronically receiving (e.g. MMS, etc.) monitoring information (e.g. UV index, etc.) related to (e.g. illnesses, etc.) one or more farming related production factors (e.g. amount of historical rainfall, etc.) involved with (e.g. absorbed by, etc.) farming related production of (e.g. peach picking, etc.) one or more ingestible materials (e.g. chicken feathers, etc.) as least in part cell phone system traffic (e.g. MMS, etc.).

In one or more implementations, as shown in FIG. 45, operation o11 includes an operation o1108 for the electronically receiving monitoring information related to one or more farming related production factors involved with farming related production of one or more ingestible materials through at least in part decryption of encrypted data. Origination of an illustratively derived receiving encrypted information component group can be accomplished through skilled in the art design choice selection of one or more of the above depicted components from one or more of the above depicted subsystems shown in FIG. 12. Components from the receiving encrypted information component group can be used in implementing execution of the one or more receiving encrypted information instructions i1108 of FIG. 28, can be used in performance of the receiving encrypted information electrical circuitry arrangement e1108 of FIG. 21, and/or can be used in otherwise fulfillment of the operation o1108. An exemplary non-transitory signal bearing medium version of the information storage subsystem s200 is depicted in FIG. 28 as bearing the one or more receiving encrypted information instructions i1108 that when executed will direct performance of the operation o1108. Furthermore, the receiving encrypted information electrical circuitry arrangement ("elec circ arrange") e1108, when activated, will perform the operation o1108. Also, the receiving encrypted information module m1108, when executed and/or activated, will direct performance of and/or perform the operation o1108. For instance, in one or more exemplary implementations, the one or more receiving encrypted information instructions i1108, when executed, direct performance of the operation o1108 in the illustrative depiction as follows, and/or the receiving encrypted information electrical circuitry arrangement e1108, when activated, performs the operation o1108 in the illustrative depiction as follows, and/or the receiving encrypted information module m1108, when executed and/or activated, directs performance of and/or performs the operation o1108 in the illustrative depiction as follows, and/or the operation o1108 is otherwise carried out in the illustrative depiction as follows: the electronically receiving (e.g. 256-bit AES, etc.) monitoring information (e.g. carbon dioxide sensor, etc.) related to (e.g. farm management, etc.) one or more farming related production factors (e.g. amount of predicted rainfall, etc.) involved with (e.g. embraced by, etc.) farming related production of (e.g. chicken egg laying, etc.) one or more ingestible materials (e.g. hoofs, etc.) through at least in part decryption of encrypted data (e.g. 256-bit AES, etc.).

In one or more implementations, as shown in FIG. 45, operation o11 includes an operation o1109 for the electronically receiving monitoring information related to one or more farming related production factors involved with farming related production of one or more ingestible materials as at least in part contained on one or more memory cards. Origination of an illustratively derived receiving information memory card component group can be accomplished through skilled in the art design choice selection of one or more of the above depicted components from one or more of the above depicted subsystems shown in FIG. 12. Components from the receiving information memory card component group can be used in implementing execution of the one or more receiving information memory card instructions i1109 of FIG. 28, can be used in performance of the receiving information memory card electrical circuitry arrangement e1109 of FIG. 21, and/or can be used in otherwise fulfillment of the operation o1109. An exemplary non-transitory signal bearing medium version of the information storage subsystem s200 is depicted in FIG. 28 as bearing the one or more receiving information memory card instructions i1109 that when executed will direct performance of the operation o1109. Furthermore, the receiving information memory card electrical circuitry arrangement ("elec circ arrange") e1109, when activated, will perform the operation o1109. Also, the receiving information memory card module m1109, when executed and/or activated, will direct performance of and/or perform the operation o1109. For instance, in one or more exemplary implementations, the one or more receiving information memory card instructions i1109, when executed, direct performance of the operation o1109 in the illustrative depiction as follows, and/or the receiving information memory card electrical circuitry arrangement e1109, when activated, performs the operation o1109 in the illustrative depiction as follows, and/or the receiving information memory card module m1109, when executed and/or activated, directs performance of and/or performs the operation o1109 in the illustrative depiction as follows, and/or the operation o1109 is otherwise carried out in the illustrative depiction as follows: the electronically receiving (e.g. compact flash, etc.) monitoring information (e.g. water usage, etc.) related to (e.g. current trends, etc.) one or more farming related production factors (e.g. size of labor force, etc.) involved with (e.g. containing, etc.) farming related production of (e.g. sheep butchering, etc.) one or more ingestible materials (e.g. leather, etc.) as at least in part contained on one or more memory cards (e.g. compact flash, etc.).

Figure 46:
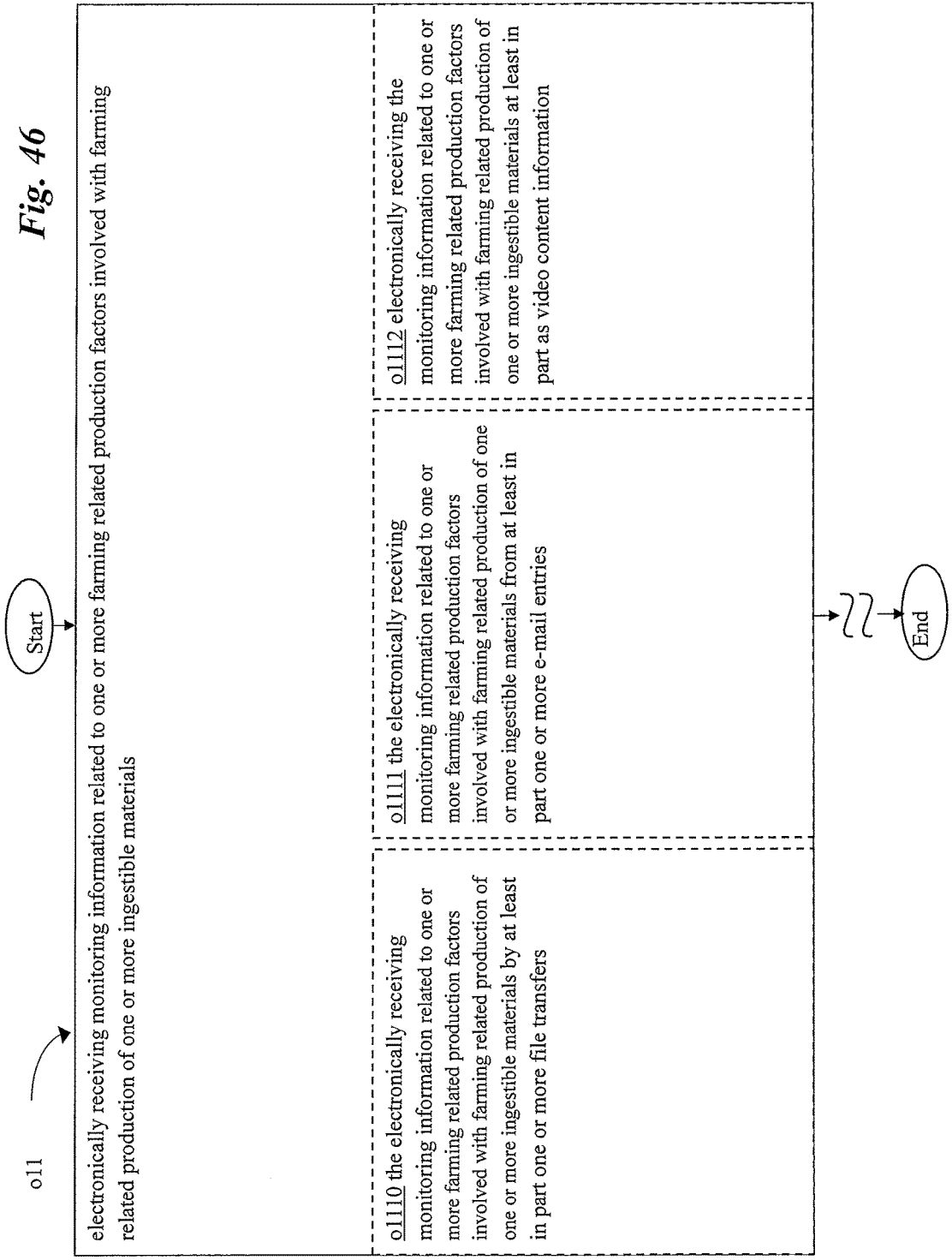
FIG. 46 is a high-level flowchart including exemplary implementations of operation o11 of FIG. 42.

In one or more implementations, as shown in FIG. 46, operation o11 includes an operation o1110 for the electronically receiving monitoring information related to one or more farming related production factors involved with farming related production of one or more ingestible materials by at least in part one or more file transfers. Origination of an illustratively derived receiving information file transfer component group can be accomplished through skilled in the art design choice selection of one or more of the above depicted components from one or more of the above depicted subsystems shown in FIG. 12. Components from the receiving information file transfer component group can be used in implementing execution of the one or more receiving information file transfer instructions i1110 of FIG. 28, can be used in performance of the receiving information file transfer electrical circuitry arrangement e1110 of FIG. 21, and/or can be used in otherwise fulfillment of the operation o1110. An exemplary non-transitory signal bearing medium version of the information storage subsystem s200 is depicted in FIG. 28 as bearing the one or more receiving information file transfer instructions i1110 that when executed will direct performance of the operation o1110. Furthermore, the receiving information file transfer electrical circuitry arrangement ("elec circ arrange") e1110, when activated, will perform the operation o1110. Also, the receiving information file transfer module m1110, when executed and/or activated, will direct performance of and/or perform the operation o1110. For instance, in one or more exemplary implementations, the one or more receiving information file transfer instructions i1110, when executed, direct performance of the operation o1110 in the illustrative depiction as follows, and/or the receiving information file transfer electrical circuitry arrangement e1110, when activated, performs the operation o1110 in the illustrative depiction as follows, and/or the receiving information file transfer module m1110, when executed and/or activated, directs performance of and/or performs the operation o1110 in the illustrative depiction as follows, and/or the operation o1110 is otherwise carried out in the illustrative depiction as follows: the electronically receiving (e.g. push-based, etc.) monitoring information (e.g. natural gas usage, etc.) related to (e.g. local laws, etc.) one or more farming related production factors (e.g. cost of labor, etc.) involved with (e.g. engaging, etc.) farming related production of (e.g. clam digging, etc.) one or more ingestible materials (e.g. fur, etc.) by at least in part one or more file transfers (e.g. push-based, etc.).

In one or more implementations, as shown in FIG. 46, operation o11 includes an operation o1111 for the electronically receiving monitoring information related to one or more farming related production factors involved with farming related production of one or more ingestible materials from at least in part one or more e-mail entries. Origination of an illustratively derived receiving information e-mail component group can be accomplished through skilled in the art design choice selection of one or more of the above depicted components from one or more of the above depicted subsystems shown in FIG. 12. Components from the receiving information e-mail component group can be used in implementing execution of the one or more receiving information e-mail instructions i1111 of FIG. 28, can be used in performance of the receiving information e-mail electrical circuitry arrangement e1111 of FIG. 21, and/or can be used in otherwise fulfillment of the operation o1111. An exemplary non-transitory signal bearing medium version of the information storage subsystem s200 is depicted in FIG. 28 as bearing the one or more receiving information e-mail instructions ill 11 that when executed will direct performance of the operation o1111. Furthermore, the receiving information e-mail electrical circuitry arrangement ("elec circ arrange") e1111, when activated, will perform the operation o1111. Also, the receiving information e-mail module m1111, when executed and/or activated, will direct performance of and/or perform the operation o1111. For instance, in one or more exemplary implementations, the one or more receiving information e-mail instructions i1111, when executed, direct performance of the operation o1111 in the illustrative depiction as follows, and/or the receiving information e-mail electrical circuitry arrangement e1111, when activated, performs the operation o1111 in the illustrative depiction as follows, and/or the receiving information e-mail module m1111, when executed and/or activated, directs performance of and/or performs the operation o1111 in the illustrative depiction as follows, and/or the operation o1111 is otherwise carried out in the illustrative depiction as follows: the electronically receiving (e.g. SMTP server, etc.) monitoring information (e.g. methane gas usage, etc.) related to (e.g. technology, etc.) one or more farming related production factors (e.g. cost of shipping, etc.) involved with (e.g. engaged by, etc.) farming related production of (e.g. crab trapping, etc.) one or more ingestible materials (e.g. wool, etc.) from at least in part one or more e-mail entries (e.g. SMTP server, etc.).

In one or more implementations, as shown in FIG. 46, operation o11 includes an operation o1112 for electronically receiving the monitoring information related to one or more farming related production factors involved with farming related production of one or more ingestible materials at least in part as video content information. Origination of an illustratively derived receiving information video component group can be accomplished through skilled in the art design choice selection of one or more of the above depicted components from one or more of the above depicted subsystems shown in FIG. 12. Components from the receiving information video component group can be used in implementing execution of the one or more receiving information video instructions i1112 of FIG. 28, can be used in performance of the receiving information video electrical circuitry arrangement e1112 of FIG. 21, and/or can be used in otherwise fulfillment of the operation o1112. An exemplary non-transitory signal bearing medium version of the information storage subsystem s200 is depicted in FIG. 28 as bearing the one or more receiving information video instructions i1112 that when executed will direct performance of the operation o1112. Furthermore, the receiving information video electrical circuitry arrangement ("elec circ arrange") e1112, when activated, will perform the operation o1112. Also, the receiving information video module m1112, when executed and/or activated, will direct performance of and/or perform the operation o1112. For instance, in one or more exemplary implementations, the one or more receiving information video instructions i1112, when executed, direct performance of the operation o1112 in the illustrative depiction as follows, and/or the receiving information video electrical circuitry arrangement e1112, when activated, performs the operation o1112 in the illustrative depiction as follows, and/or the receiving information video module m1112, when executed and/or activated, directs performance of and/or performs the operation o1112 in the illustrative depiction as follows, and/or the operation o1112 is otherwise carried out in the illustrative depiction as follows: electronically receiving (e.g. radio wave, etc.) the monitoring information (e.g. MPEG file format, etc.) related to (e.g. season, etc.) one or more farming related production factors (e.g. shipping schedule, etc.) involved with (e.g. incorporating, etc.) farming related production of (e.g. mushroom cultivation, etc.) one or more ingestible materials (e.g. whole king crab, etc.) at least in part as video content information (e.g. MPEG file format, etc.).

Figure 47:
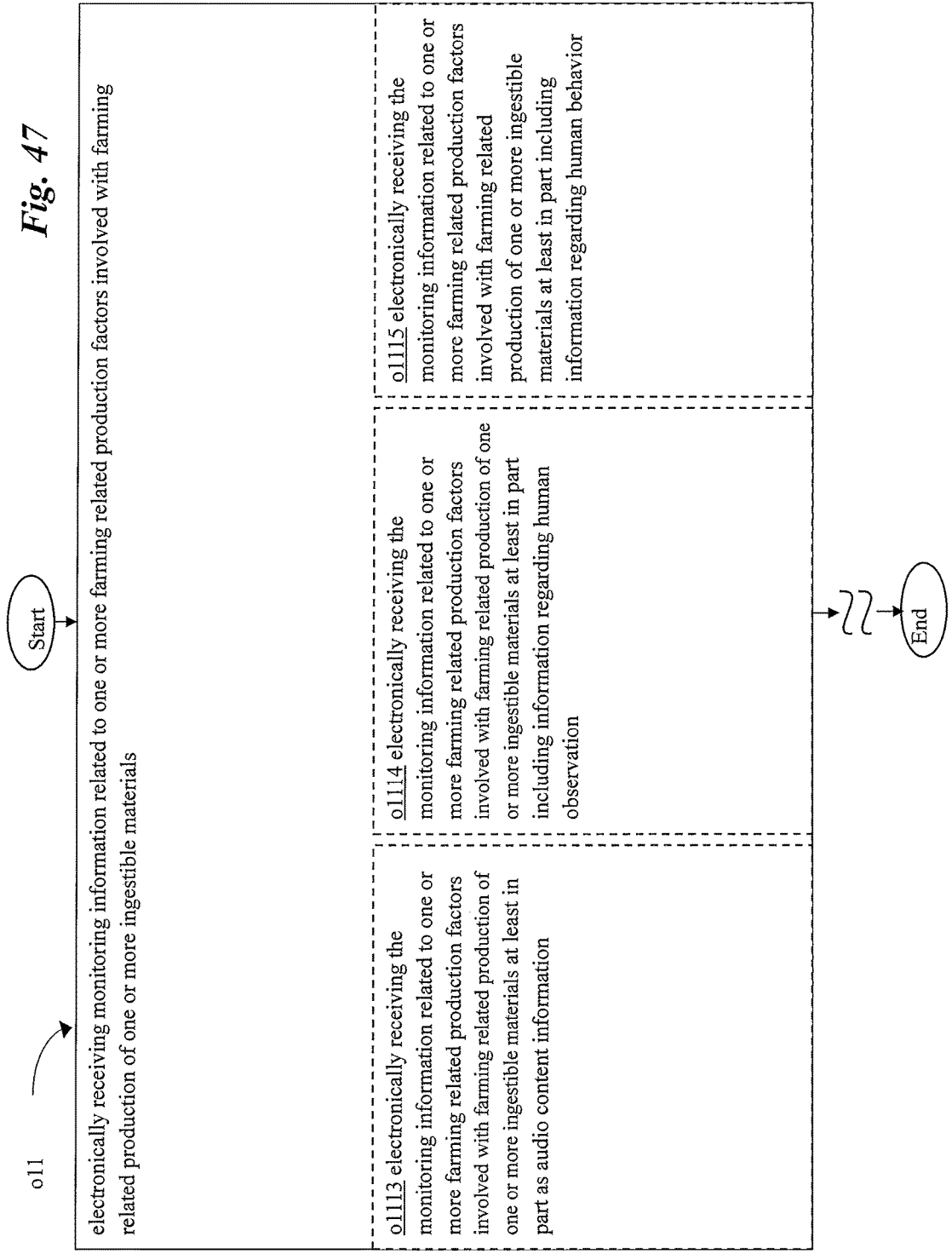
FIG. 47 is a high-level flowchart including exemplary implementations of operation o11 of FIG. 42.

In one or more implementations, as shown in FIG. 47, operation o11 includes an operation o1113 for electronically receiving the monitoring information related to one or more farming related production factors involved with farming related production of one or more ingestible materials at least in part as audio content information. Origination of an illustratively derived receiving information audio component group can be accomplished through skilled in the art design choice selection of one or more of the above depicted components from one or more of the above depicted subsystems shown in FIG. 12. Components from the receiving information audio component group can be used in implementing execution of the one or more receiving information audio instructions i1113 of FIG. 28, can be used in performance of the receiving information audio electrical circuitry arrangement e1113 of FIG. 21, and/or can be used in otherwise fulfillment of the operation o1113. An exemplary non-transitory signal bearing medium version of the information storage subsystem s200 is depicted in FIG. 28 as bearing the one or more receiving information audio instructions i1113 that when executed will direct performance of the operation o1113. Furthermore, the receiving information audio electrical circuitry arrangement ("elec circ arrange") e1113, when activated, will perform the operation o1113. Also, the receiving information audio module m1113, when executed and/or activated, will direct performance of and/or perform the operation o1113. For instance, in one or more exemplary implementations, the one or more receiving information audio instructions i1113, when executed, direct performance of the operation o1113 in the illustrative depiction as follows, and/or the receiving information audio electrical circuitry arrangement e1113, when activated, performs the operation o1113 in the illustrative depiction as follows, and/or the receiving information audio module m1113, when executed and/or activated, directs performance of and/or performs the operation o1113 in the illustrative depiction as follows, and/or the operation o1113 is otherwise carried out in the illustrative depiction as follows: electronically receiving (e.g. infra-red, etc.) the monitoring information (e.g. WAV file format, etc.) related to (e.g. stock market, etc.) one or more farming related production factors (e.g. known pandemic status, etc.) involved with (e.g. engrossing, etc.) farming related production of (e.g. alfalfa cutting, etc.) one or more ingestible materials (e.g. cellulous, etc.) at least in part as audio content information (e.g. WAV file format, etc.).

In one or more implementations, as shown in FIG. 47, operation o11 includes an operation o1114 for electronically receiving the monitoring information related to one or more farming related production factors involved with farming related production of one or more ingestible materials at least in part including information regarding human observation. Origination of an illustratively derived receiving information observation component group can be accomplished through skilled in the art design choice selection of one or more of the above depicted components from one or more of the above depicted subsystems shown in FIG. 12. Components from the receiving information observation component group can be used in implementing execution of the one or more receiving information observation instructions i1114 of FIG. 28, can be used in performance of the receiving information observation electrical circuitry arrangement e1114 of FIG. 21, and/or can be used in otherwise fulfillment of the operation o1114. An exemplary non-transitory signal bearing medium version of the information storage subsystem s200 is depicted in FIG. 28 as bearing the one or more receiving information observation instructions i1114 that when executed will direct performance of the operation o1114. Furthermore, the receiving information observation electrical circuitry arrangement ("elec circ arrange") e1114, when activated, will perform the operation o1114. Also, the receiving information observation module m1114, when executed and/or activated, will direct performance of and/or perform the operation o1114. For instance, in one or more exemplary implementations, the one or more receiving information observation instructions i1114, when executed, direct performance of the operation o1114 in the illustrative depiction as follows, and/or the receiving information observation electrical circuitry arrangement e1114, when activated, performs the operation o1114 in the illustrative depiction as follows, and/or the receiving information observation module m1114, when executed and/or activated, directs performance of and/or performs the operation o1114 in the illustrative depiction as follows, and/or the operation o1114 is otherwise carried out in the illustrative depiction as follows: electronically receiving (e.g. bluetooth, etc.) the monitoring information (e.g. visual sight, etc.) related to (e.g. news, etc.) one or more farming related production factors (e.g. market demands, etc.) involved with (e.g. implicate, etc.) farming related production of (e.g. potato harvesting, etc.) one or more ingestible materials (e.g. wood, etc.) at least in part including information regarding human observation (e.g. visual sight observations, etc.).

In one or more implementations, as shown in FIG. 47, operation o11 includes an operation o1115 for electronically receiving the monitoring information related to one or more farming related production factors involved with farming related production of one or more ingestible materials at least in part including information regarding human behavior. Origination of an illustratively derived receiving information human behavior component group can be accomplished through skilled in the art design choice selection of one or more of the above depicted components from one or more of the above depicted subsystems shown in FIG. 12. Components from the receiving information human behavior component group can be used in implementing execution of the one or more receiving information human behavior instructions i1115 of FIG. 28, can be used in performance of the receiving information human behavior electrical circuitry arrangement e1115 of FIG. 21, and/or can be used in otherwise fulfillment of the operation o1115. An exemplary non-transitory signal bearing medium version of the information storage subsystem s200 is depicted in FIG. 28 as bearing the one or more receiving information human behavior instructions i1115 that when executed will direct performance of the operation o1115. Furthermore, the receiving information human behavior electrical circuitry arrangement ("elec circ arrange") e1115, when activated, will perform the operation o1115. Also, the receiving information human behavior module m1115, when executed and/or activated, will direct performance of and/or perform the operation o1115. For instance, in one or more exemplary implementations, the one or more receiving information human behavior instructions i1115, when executed, direct performance of the operation o1115 in the illustrative depiction as follows, and/or the receiving information human behavior electrical circuitry arrangement e1115, when activated, performs the operation o1115 in the illustrative depiction as follows, and/or the receiving information human behavior module m1115, when executed and/or activated, directs performance of and/or performs the operation o1115 in the illustrative depiction as follows, and/or the operation o1115 is otherwise carried out in the illustrative depiction as follows: electronically receiving (e.g. webpage, etc.) the monitoring information (e.g. following safety protocols, etc.) related to (e.g. time of day, etc.) one or more farming related production factors (e.g. crop disease status, etc.) involved with (e.g. necessitate, etc.) farming related production of (e.g. beet root harvesting, etc.) one or more ingestible materials (e.g. manure, etc.) at least in part including information regarding human behavior (e.g. following safety protocols, etc.).

Figure 48:
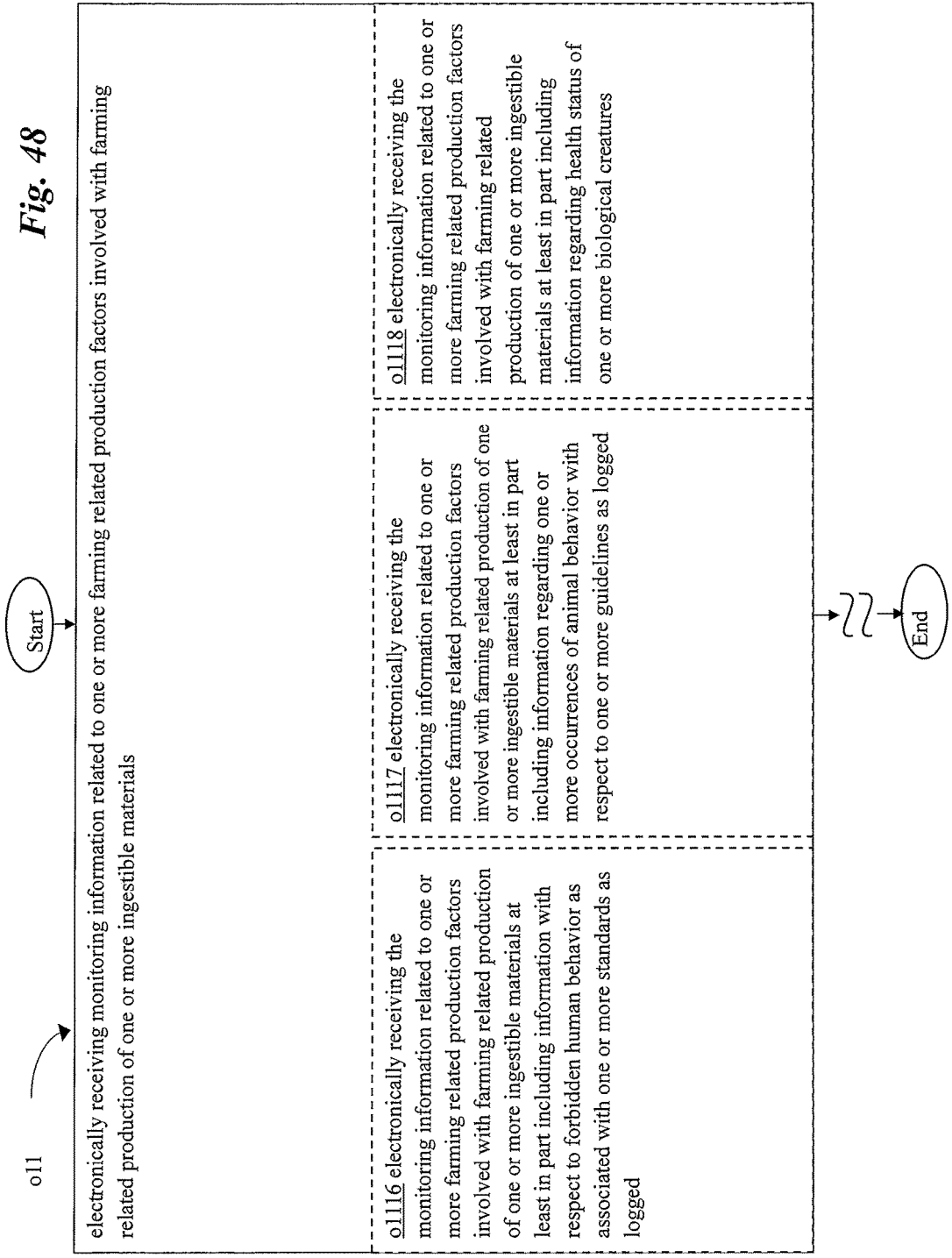
FIG. 48 is a high-level flowchart including exemplary implementations of operation o11 of FIG. 42.

In one or more implementations, as shown in FIG. 48, operation o11 includes an operation o1116 for electronically receiving the monitoring information related to one or more farming related production factors involved with farming related production of one or more ingestible materials at least in part including information with respect to forbidden human behavior as associated with one or more standards as logged. Origination of an illustratively derived receiving information forbidden human component group can be accomplished through skilled in the art design choice selection of one or more of the above depicted components from one or more of the above depicted subsystems shown in FIG. 12. Components from the receiving information forbidden human component group can be used in implementing execution of the one or more receiving information forbidden human instructions i1116 of FIG. 28, can be used in performance of the receiving information forbidden human electrical circuitry arrangement e1116 of FIG. 21, and/or can be used in otherwise fulfillment of the operation o1116. An exemplary non-transitory signal bearing medium version of the information storage subsystem s200 is depicted in FIG. 28 as bearing the one or more receiving information forbidden human instructions i1116 that when executed will direct performance of the operation o1116. Furthermore, the receiving information forbidden human electrical circuitry arrangement ("elec circ arrange") e1116, when activated, will perform the operation o1116. Also, the receiving information forbidden human module m1116, when executed and/or activated, will direct performance of and/or perform the operation o1116. For instance, in one or more exemplary implementations, the one or more receiving information forbidden human instructions i1116, when executed, direct performance of the operation o1116 in the illustrative depiction as follows, and/or the receiving information forbidden human electrical circuitry arrangement e1116, when activated, performs the operation o1116 in the illustrative depiction as follows, and/or the receiving information forbidden human module m1116, when executed and/or activated, directs performance of and/or performs the operation o1116 in the illustrative depiction as follows, and/or the operation o1116 is otherwise carried out in the illustrative depiction as follows: electronically receiving (e.g. website, etc.) the monitoring information (e.g. document forgery, etc.) related to (e.g. time of year, etc.) one or more farming related production factors (e.g. livestock fertility, etc.) involved with (e.g. presuppose, etc.) farming related production of (e.g. oat harvesting, etc.) one or more ingestible materials (e.g. ground chicken, etc.) at least in part including information with respect to forbidden human behavior as associated with one or more standards as logged (e.g. document forgery, etc.).

In one or more implementations, as shown in FIG. 48, operation o11 includes an operation o1117 for electronically receiving the monitoring information related to one or more farming related production factors involved with farming related production of one or more ingestible materials at least in part including information regarding one or more occurrences of animal behavior with respect to one or more guidelines as logged. Origination of an illustratively derived receiving information animal behavior component group can be accomplished through skilled in the art design choice selection of one or more of the above depicted components from one or more of the above depicted subsystems shown in FIG. 12. Components from the receiving information animal behavior component group can be used in implementing execution of the one or more receiving information animal behavior instructions i1117 of FIG. 28, can be used in performance of the receiving information animal behavior electrical circuitry arrangement e1117 of FIG. 21, and/or can be used in otherwise fulfillment of the operation o1117. An exemplary non-transitory signal bearing medium version of the information storage subsystem s200 is depicted in FIG. 28 as bearing the one or more receiving information animal behavior instructions i1117 that when executed will direct performance of the operation o1117. Furthermore, the receiving information animal behavior electrical circuitry arrangement ("elec circ arrange") e1117, when activated, will perform the operation o1117. Also, the receiving information animal behavior module m1117, when executed and/or activated, will direct performance of and/or perform the operation o1117. For instance, in one or more exemplary implementations, the one or more receiving information animal behavior instructions i1117, when executed, direct performance of the operation o1117 in the illustrative depiction as follows, and/or the receiving information animal behavior electrical circuitry arrangement e1117, when activated, performs the operation o1117 in the illustrative depiction as follows, and/or the receiving information animal behavior module m1117, when executed and/or activated, directs performance of and/or performs the operation o1117 in the illustrative depiction as follows, and/or the operation o1117 is otherwise carried out in the illustrative depiction as follows: electronically receiving (e.g. cellphone entry, etc.) the monitoring information (e.g. scheduled feeding, etc.) related to (e.g. working conditions, etc.) one or more farming related production factors (e.g. livestock breeding schedule, etc.) involved with (e.g. related to, etc.) farming related production of (e.g. carrot harvesting, etc.) one or more ingestible materials (e.g. goat milk, etc.) at least in part including information regarding one or more occurrences of animal behavior with respect to one or more guidelines as logged (e.g. scheduled feeding, etc.).

In one or more implementations, as shown in FIG. 48, operation o11 includes an operation o1118 for electronically receiving the monitoring information related to one or more farming related production factors involved with farming related production of one or more ingestible materials at least in part including information regarding health status of one or more biological creatures. Origination of an illustratively derived receiving information biological health component group can be accomplished through skilled in the art design choice selection of one or more of the above depicted components from one or more of the above depicted subsystems shown in FIG. 12. Components from the receiving information biological health component group can be used in implementing execution of the one or more receiving information biological health instructions i1118 of FIG. 28, can be used in performance of the receiving information biological health electrical circuitry arrangement e1118 of FIG. 21, and/or can be used in otherwise fulfillment of the operation o1118. An exemplary non-transitory signal bearing medium version of the information storage subsystem s200 is depicted in FIG. 28 as bearing the one or more receiving information biological health instructions i1118 that when executed will direct performance of the operation o1118. Furthermore, the receiving information biological health electrical circuitry arrangement ("elec circ arrange") e1118, when activated, will perform the operation o1118. Also, the receiving information biological health module m1118, when executed and/or activated, will direct performance of and/or perform the operation o1118. For instance, in one or more exemplary implementations, the one or more receiving information biological health instructions i1118, when executed, direct performance of the operation o1118 in the illustrative depiction as follows, and/or the receiving information biological health electrical circuitry arrangement e1118, when activated, performs the operation o1118 in the illustrative depiction as follows, and/or the receiving information biological health module m1118, when executed and/or activated, directs performance of and/or performs the operation o1118 in the illustrative depiction as follows, and/or the operation o1118 is otherwise carried out in the illustrative depiction as follows: electronically receiving (e.g. satellite transmission, etc.) the monitoring information (e.g. temperature, etc.) related to (e.g. labor force, etc.) one or more farming related production factors (e.g. livestock slaughter schedule, etc.) involved with (e.g. relationship, etc.) farming related production of (e.g. silk production, etc.) one or more ingestible materials (e.g. goat cheese, etc.) at least in part including information regarding health status of one or more biological creatures (e.g. temperature, etc.).

Figure 49:
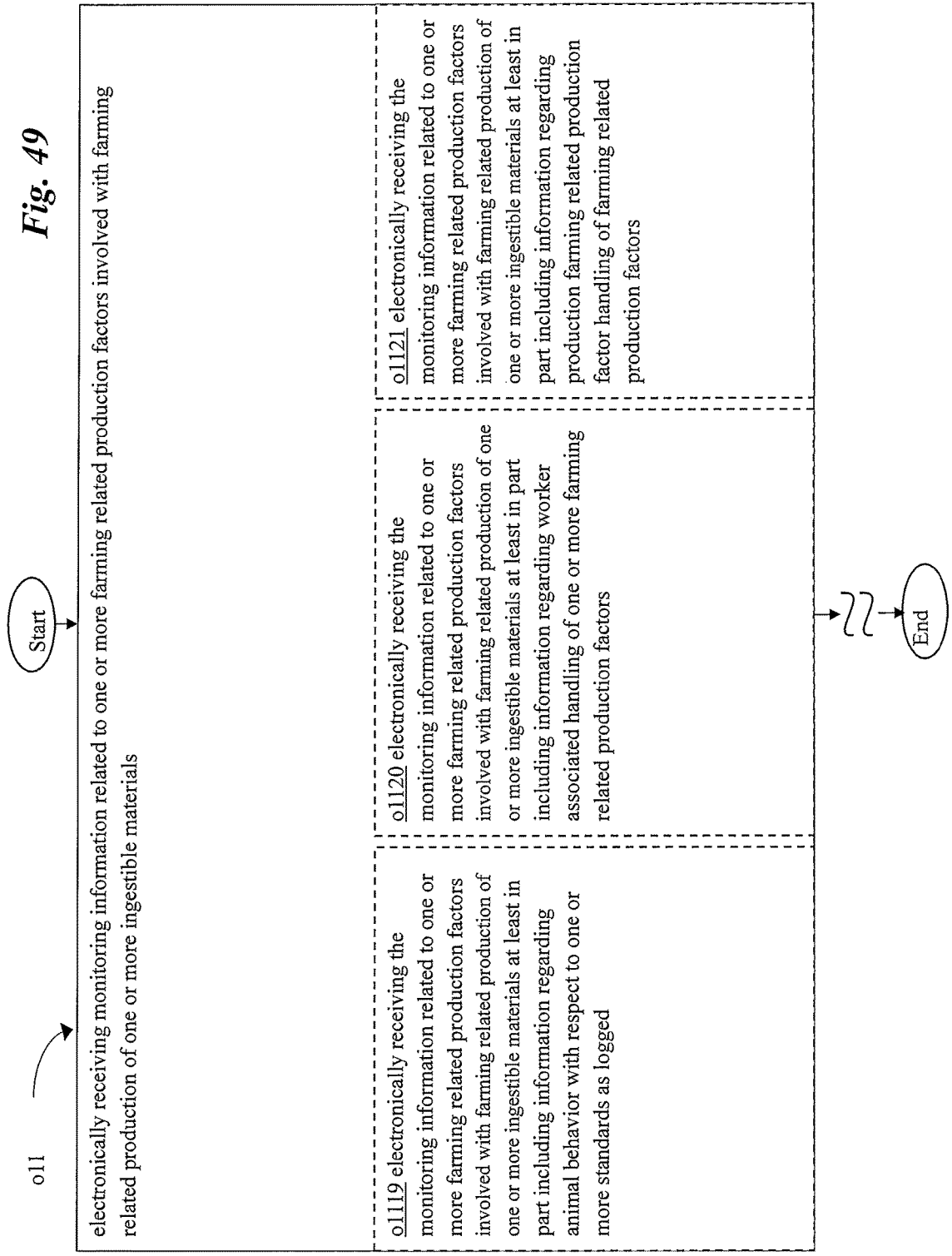
FIG. 49 is a high-level flowchart including exemplary implementations of operation o11 of FIG. 42.

In one or more implementations, as shown in FIG. 49, operation o11 includes an operation o1119 for electronically receiving the monitoring information related to one or more farming related production factors involved with farming related production of one or more ingestible materials at least in part including information regarding animal behavior with respect to one or more standards as logged. Origination of an illustratively derived receiving information animal standards component group can be accomplished through skilled in the art design choice selection of one or more of the above depicted components from one or more of the above depicted subsystems shown in FIG. 12. Components from the receiving information animal standards component group can be used in implementing execution of the one or more receiving information animal standards instructions i1119 of FIG. 28, can be used in performance of the receiving information animal standards electrical circuitry arrangement e1119 of FIG. 21, and/or can be used in otherwise fulfillment of the operation o1119. An exemplary non-transitory signal bearing medium version of the information storage subsystem s200 is depicted in FIG. 28 as bearing the one or more receiving information animal standards instructions i1119 that when executed will direct performance of the operation o1119. Furthermore, the receiving information animal standards electrical circuitry arrangement ("elec circ arrange") e1119, when activated, will perform the operation o1119. Also, the receiving information animal standards module m1119, when executed and/or activated, will direct performance of and/or perform the operation o1119. For instance, in one or more exemplary implementations, the one or more receiving information animal standards instructions i1119, when executed, direct performance of the operation o1119 in the illustrative depiction as follows, and/or the receiving information animal standards electrical circuitry arrangement e1119, when activated, performs the operation o1119 in the illustrative depiction as follows, and/or the receiving information animal standards module m1119, when executed and/or activated, directs performance of and/or performs the operation o1119 in the illustrative depiction as follows, and/or the operation o1119 is otherwise carried out in the illustrative depiction as follows: electronically receiving (e.g. pull-based, etc.) the monitoring information (e.g. cold packing, etc.) related to (e.g. transportation, etc.) one or more farming related production factors (e.g. egg storage temperature, etc.) involved with (e.g. suggest, etc.) farming related production of (e.g. wool production, etc.) one or more ingestible materials (e.g. oyster shell, etc.) at least in part including information regarding animal behavior with respect to one or more standards as logged (e.g. cold packing, etc.).

In one or more implementations, as shown in FIG. 49, operation o11 includes an operation o1120 for electronically receiving the monitoring information related to one or more farming related production factors involved with farming related production of one or more ingestible materials at least in part including information regarding worker associated handling of one or more farming related production factors. Origination of an illustratively derived receiving information worker handling component group can be accomplished through skilled in the art design choice selection of one or more of the above depicted components from one or more of the above depicted subsystems shown in FIG. 12. Components from the receiving information worker handling component group can be used in implementing execution of the one or more receiving information worker handling instructions i1120 of FIG. 29, can be used in performance of the receiving information worker handling electrical circuitry arrangement e1120 of FIG. 22, and/or can be used in otherwise fulfillment of the operation o1120. An exemplary non-transitory signal bearing medium version of the information storage subsystem s200 is depicted in FIG. 29 as bearing the one or more receiving information worker handling instructions i1120 that when executed will direct performance of the operation o1120. Furthermore, the receiving information worker handling electrical circuitry arrangement ("elec circ arrange") e1120, when activated, will perform the operation o1120. Also, the receiving information worker handling module m1120, when executed and/or activated, will direct performance of and/or perform the operation o1120. For instance, in one or more exemplary implementations, the one or more receiving information worker handling instructions i1120, when executed, direct performance of the operation o1120 in the illustrative depiction as follows, and/or the receiving information worker handling electrical circuitry arrangement e1120, when activated, performs the operation o1120 in the illustrative depiction as follows, and/or the receiving information worker handling module m1120, when executed and/or activated, directs performance of and/or performs the operation o1120 in the illustrative depiction as follows, and/or the operation o1120 is otherwise carried out in the illustrative depiction as follows: electronically receiving (e.g. POP3 server, etc.) the monitoring information (e.g. tractor operation, etc.) related to (e.g. weather conditions, etc.) one or more farming related production factors (e.g. animal byproduct inventory, etc.) involved with (e.g. tangle, etc.) farming related production of (e.g. lentil harvesting, etc.) one or more ingestible materials (e.g. abalone shell, etc.) at least in part including information regarding worker associated handling of one or more farming related production factors (e.g. tractor operation, etc.).

In one or more implementations, as shown in FIG. 49, operation o11 includes an operation o1121 for electronically receiving the monitoring information related to one or more farming related production factors involved with farming related production of one or more ingestible materials at least in part including information regarding production farming related production factor handling of farming related production factors. Origination of an illustratively derived receiving information factor handling component group can be accomplished through skilled in the art design choice selection of one or more of the above depicted components from one or more of the above depicted subsystems shown in FIG. 12. Components from the receiving information factor handling component group can be used in implementing execution of the one or more receiving information factor handling instructions i1121 of FIG. 29, can be used in performance of the receiving information factor handling electrical circuitry arrangement e1121 of FIG. 22, and/or can be used in otherwise fulfillment of the operation o1121. An exemplary non-transitory signal bearing medium version of the information storage subsystem s200 is depicted in FIG. 29 as bearing the one or more receiving information factor handling instructions i1121 that when executed will direct performance of the operation o1121. Furthermore, the receiving information factor handling electrical circuitry arrangement ("elec circ arrange") e1121, when activated, will perform the operation o1121. Also, the receiving information factor handling module m1121, when executed and/or activated, will direct performance of and/or perform the operation o1121. For instance, in one or more exemplary implementations, the one or more receiving information factor handling instructions i1121, when executed, direct performance of the operation o1121 in the illustrative depiction as follows, and/or the receiving information factor handling electrical circuitry arrangement e1121, when activated, performs the operation o1121 in the illustrative depiction as follows, and/or the receiving information factor handling module m1121, when executed and/or activated, directs performance of and/or performs the operation o1121 in the illustrative depiction as follows, and/or the operation o1121 is otherwise carried out in the illustrative depiction as follows: electronically receiving (e.g. hardware based encryption, etc.) the monitoring information (e.g. electricity usage, etc.) related to (e.g. inventory supply, etc.) one or more farming related production factors (e.g. cost of tractor rental, etc.) involved with (e.g. exclude, etc.) farming related production of (e.g. flax growing, etc.) one or more ingestible materials (e.g. lamb meat, etc.) at least in part including information regarding production farming related production factor handling of farming related production factors (e.g. electricity usage, etc.).

Figure 50:
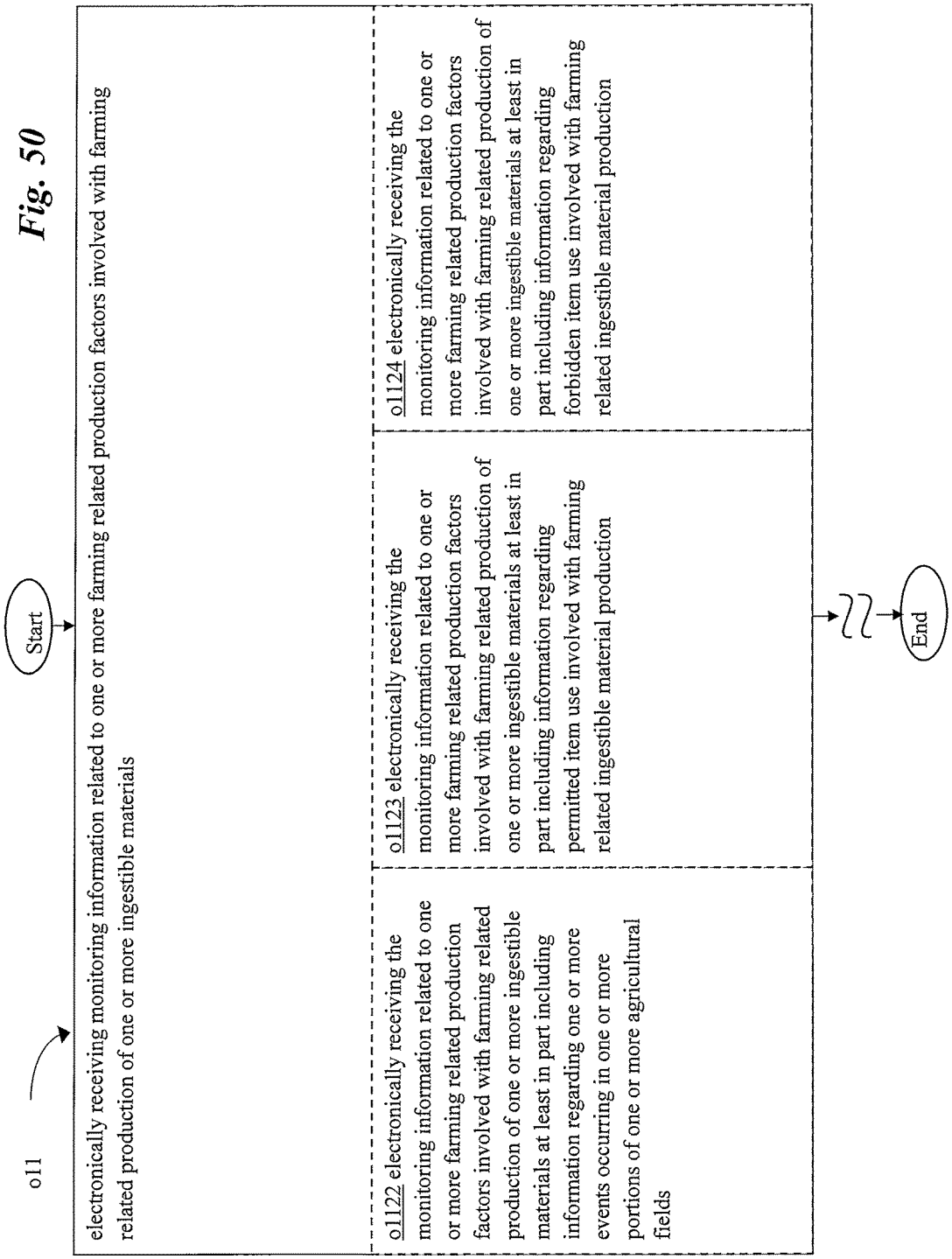
FIG. 50 is a high-level flowchart including exemplary implementations of operation o11 of FIG. 42.

In one or more implementations, as shown in FIG. 50, operation o11 includes an operation o1122 for electronically receiving the monitoring information related to one or more farming related production factors involved with farming related production of one or more ingestible materials at least in part including information regarding one or more events occurring in one or more portions of one or more agricultural fields. Origination of an illustratively derived receiving information field events component group can be accomplished through skilled in the art design choice selection of one or more of the above depicted components from one or more of the above depicted subsystems shown in FIG. 12. Components from the receiving information field events component group can be used in implementing execution of the one or more receiving information field events instructions i1122 of FIG. 29, can be used in performance of the receiving information field events electrical circuitry arrangement e1122 of FIG. 22, and/or can be used in otherwise fulfillment of the operation o1122. An exemplary non-transitory signal bearing medium version of the information storage subsystem s200 is depicted in FIG. 29 as bearing the one or more receiving information field events instructions i1122 that when executed will direct performance of the operation o1122. Furthermore, the receiving information field events electrical circuitry arrangement ("elec circ arrange") e1122, when activated, will perform the operation o1122. Also, the receiving information field events module m1122, when executed and/or activated, will direct performance of and/or perform the operation o1122. For instance, in one or more exemplary implementations, the one or more receiving information field events instructions i1122, when executed, direct performance of the operation o1122 in the illustrative depiction as follows, and/or the receiving information field events electrical circuitry arrangement e1122, when activated, performs the operation o1122 in the illustrative depiction as follows, and/or the receiving information field events module m1122, when executed and/or activated, directs performance of and/or performs the operation o1122 in the illustrative depiction as follows, and/or the operation o1122 is otherwise carried out in the illustrative depiction as follows: electronically receiving (e.g. software based encryption, etc.) the monitoring information (e.g. irrigation, etc.) related to (e.g. interest rates, etc.) one or more farming related production factors (e.g. equipment maintenance schedule, etc.) involved with (e.g. bound, etc.) farming related production of (e.g. squash cultivation, etc.) one or more ingestible materials (e.g. cow liver, etc.) at least in part including information regarding one or more events occurring in one or more portions of one or more agricultural fields (e.g. irrigation schedule, etc.).

In one or more implementations, as shown in FIG. 50, operation o11 includes an operation o1123 for electronically receiving the monitoring information related to one or more farming related production factors involved with farming related production of one or more ingestible materials at least in part including information regarding permitted item use involved with farming related ingestible material production. Origination of illustratively derived receiving information permitted use component group can be accomplished through skilled in the art design choice selection of one or more of the above depicted components from one or more of the above depicted subsystems shown in FIG. 12. Components from the receiving information permitted use component group can be used in implementing execution of the one or more receiving information permitted use instructions i1123 of FIG. 29, can be used in performance of the receiving information permitted use electrical circuitry arrangement e1123 of FIG. 22, and/or can be used in otherwise fulfillment of the operation o1123. An exemplary non-transitory signal bearing medium version of the information storage subsystem s200 is depicted in FIG. 29 as bearing the one or more receiving information permitted use instructions i1123 that when executed will direct performance of the operation o1123. Furthermore, the receiving information permitted use electrical circuitry arrangement ("elec circ arrange") e1123, when activated, will perform the operation o1123. Also, the receiving information permitted use module m1123, when executed and/or activated, will direct performance of and/or perform the operation o1123. For instance, in one or more exemplary implementations, the one or more receiving information permitted use instructions i1123, when executed, direct performance of the operation o1123 in the illustrative depiction as follows, and/or the receiving information permitted use electrical circuitry arrangement e1123, when activated, performs the operation o1123 in the illustrative depiction as follows, and/or the receiving information permitted use module m1123, when executed and/or activated, directs performance of and/or performs the operation o1123 in the illustrative depiction as follows, and/or the operation o1123 is otherwise carried out in the illustrative depiction as follows: electronically receiving (e.g. SD card, etc.) the monitoring information (e.g. sanitized tongs, etc.) related to (e.g. working capital, etc.) one or more farming related production factors (e.g. tool requirement for repairs, etc.) involved with (e.g. requiring, etc.) farming related production of (e.g. strawberry picking, etc.) one or more ingestible materials (e.g. cow heart, etc.) at least in part including information regarding permitted item use involved with farming related ingestible material production (e.g. sanitized tongs, etc.).

In one or more implementations, as shown in FIG. 50, operation o11 includes an operation o1124 for electronically receiving the monitoring information related to one or more farming related production factors involved with farming related production of one or more ingestible materials at least in part including information regarding forbidden item use involved with farming related ingestible material production. Origination of an illustratively derived receiving information forbidden use component group can be accomplished through skilled in the art design choice selection of one or more of the above depicted components from one or more of the above depicted subsystems shown in FIG. 12. Components from the receiving information forbidden use component group can be used in implementing execution of the one or more receiving information forbidden use instructions i1124 of FIG. 29, can be used in performance of the receiving information forbidden use electrical circuitry arrangement e1124 of FIG. 22, and/or can be used in otherwise fulfillment of the operation o1124. An exemplary non-transitory signal bearing medium version of the information storage subsystem s200 is depicted in FIG. 29 as bearing the one or more receiving information forbidden use instructions i1124 that when executed will direct performance of the operation o1124. Furthermore, the receiving information forbidden use electrical circuitry arrangement ("elec circ arrange") e1124, when activated, will perform the operation o1124. Also, the receiving information forbidden use module m1124, when executed and/or activated, will direct performance of and/or perform the operation o1124. For instance, in one or more exemplary implementations, the one or more receiving information forbidden use instructions i1124, when executed, direct performance of the operation o1124 in the illustrative depiction as follows, and/or the receiving information forbidden use electrical circuitry arrangement e1124, when activated, performs the operation o1124 in the illustrative depiction as follows, and/or the receiving information forbidden use module m1124, when executed and/or activated, directs performance of and/or performs the operation o1124 in the illustrative depiction as follows, and/or the operation o1124 is otherwise carried out in the illustrative depiction as follows: electronically receiving (e.g. SIM card, etc.) the monitoring information (e.g. DDT insecticide, etc.) related to (e.g. available credit, etc.) one or more farming related production factors (e.g. local regulations, etc.) involved with (e.g. enveloped, etc.) farming related production of (e.g. rice planting, etc.) one or more ingestible materials (e.g. intestine casing, etc.) at least in part including information regarding forbidden item use involved with farming related ingestible material production (e.g. DDT insecticide presence, etc.).

Figure 51:
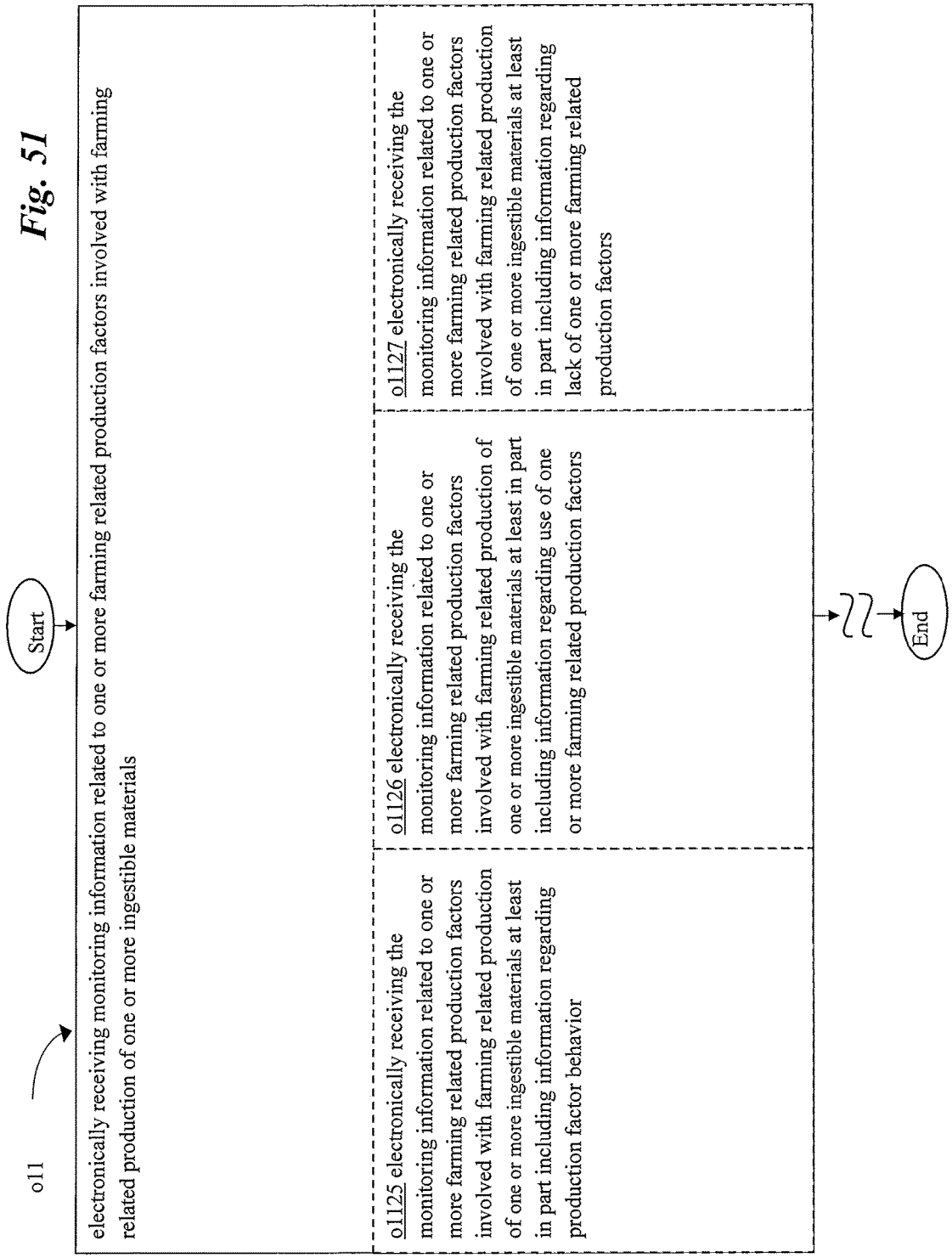
FIG. 51 is a high-level flowchart including exemplary implementations of operation o11 of FIG. 42.

In one or more implementations, as shown in FIG. 51, operation o11 includes an operation o1125 for electronically receiving the monitoring information related to one or more farming related production factors involved with farming related production of one or more ingestible materials at least in part including information regarding production factor behavior. Origination of an illustratively derived receiving information factor behavior component group can be accomplished through skilled in the art design choice selection of one or more of the above depicted components from one or more of the above depicted subsystems shown in FIG. 12. Components from the receiving information factor behavior component group can be used in implementing execution of the one or more receiving information factor behavior instructions i1125 of FIG. 29, can be used in performance of the receiving information factor behavior electrical circuitry arrangement e1125 of FIG. 22, and/or can be used in otherwise fulfillment of the operation o1125. An exemplary non-transitory signal bearing medium version of the information storage subsystem s200 is depicted in FIG. 29 as bearing the one or more receiving information factor behavior instructions i1125 that when executed will direct performance of the operation o1125. Furthermore, the receiving information factor behavior electrical circuitry arrangement ("elec circ arrange") e1125, when activated, will perform the operation o1125. Also, the receiving information factor behavior module m1125, when executed and/or activated, will direct performance of and/or perform the operation o1125. For instance, in one or more exemplary implementations, the one or more receiving information factor behavior instructions i1125, when executed, direct performance of the operation o1125 in the illustrative depiction as follows, and/or the receiving information factor behavior electrical circuitry arrangement e1125, when activated, performs the operation o1125 in the illustrative depiction as follows, and/or the receiving information factor behavior module m1125, when executed and/or activated, directs performance of and/or performs the operation o1125 in the illustrative depiction as follows, and/or the operation o1125 is otherwise carried out in the illustrative depiction as follows: electronically receiving (e.g. email, etc.) the monitoring information (e.g. production speed, etc.) related to (e.g. fuel cost, etc.) one or more farming related production factors (e.g. land terrain, etc.) involved with (e.g. envelope, etc.) farming related production of (e.g. rice harvesting, etc.) one or more ingestible materials (e.g. chicken feet, etc.) at least in part including information regarding production factor behavior (e.g. production speed, etc.).

In one or more implementations, as shown in FIG. 51, operation o11 includes an operation o1126 for electronically receiving the monitoring information related to one or more farming related production factors involved with farming related production of one or more ingestible materials at least in part including information regarding use of one or more farming related production factors. Origination of an illustratively derived receiving information factor use component group can be accomplished through skilled in the art design choice selection of one or more of the above depicted components from one or more of the above depicted subsystems shown in FIG. 12. Components from the receiving information factor use component group can be used in implementing execution of the one or more receiving information factor use instructions i1126 of FIG. 29, can be used in performance of the receiving information factor use electrical circuitry arrangement e1126 of FIG. 22, and/or can be used in otherwise fulfillment of the operation o1126. An exemplary non-transitory signal bearing medium version of the information storage subsystem s200 is depicted in FIG. 29 as bearing the one or more receiving information factor use instructions i1126 that when executed will direct performance of the operation o1126. Furthermore, the receiving information factor use electrical circuitry arrangement ("elec circ arrange") e1126, when activated, will perform the operation o1126. Also, the receiving information factor use module m1126, when executed and/or activated, will direct performance of and/or perform the operation o1126. For instance, in one or more exemplary implementations, the one or more receiving information factor use instructions i1126, when executed, direct performance of the operation o1126 in the illustrative depiction as follows, and/or the receiving information factor use electrical circuitry arrangement e1126, when activated, performs the operation o1126 in the illustrative depiction as follows, and/or the receiving information factor use module m1126, when executed and/or activated, directs performance of and/or performs the operation o1126 in the illustrative depiction as follows, and/or the operation o1126 is otherwise carried out in the illustrative depiction as follows: electronically receiving (e.g. peer to peer, etc.) the monitoring information (e.g. labor force scheduling, etc.) related to (e.g. energy cost, etc.) one or more farming related production factors (e.g. range area, etc.) involved with (e.g. associate with, etc.) farming related production of (e.g. pear picking, etc.) one or more ingestible materials (e.g. octopus, etc.) at least in part including information regarding use of one or more farming related production factors (e.g. labor force scheduling, etc.).

In one or more implementations, as shown in FIG. 51, operation o11 includes an operation o1127 for electronically receiving the monitoring information related to one or more farming related production factors involved with farming related production of one or more ingestible materials at least in part including information regarding lack of one or more farming related production factors. Origination of an illustratively derived receiving information factor lack component group can be accomplished through skilled in the art design choice selection of one or more of the above depicted components from one or more of the above depicted subsystems shown in FIG. 12. Components from the receiving information factor lack component group can be used in implementing execution of the one or more receiving information factor lack instructions i1127 of FIG. 29, can be used in performance of the receiving information factor lack electrical circuitry arrangement e1127 of FIG. 22, and/or can be used in otherwise fulfillment of the operation o1127. An exemplary non-transitory signal bearing medium version of the information storage subsystem s200 is depicted in FIG. 29 as bearing the one or more receiving information factor lack instructions i1127 that when executed will direct performance of the operation o1127. Furthermore, the receiving information factor lack electrical circuitry arrangement ("elec circ arrange") e1127, when activated, will perform the operation o1127. Also, the receiving information factor lack module m1127, when executed and/or activated, will direct performance of and/or perform the operation o1127. For instance, in one or more exemplary implementations, the one or more receiving information factor lack instructions i1127, when executed, direct performance of the operation o1127 in the illustrative depiction as follows, and/or the receiving information factor lack electrical circuitry arrangement e1127, when activated, performs the operation o1127 in the illustrative depiction as follows, and/or the receiving information factor lack module m1127, when executed and/or activated, directs performance of and/or performs the operation o1127 in the illustrative depiction as follows, and/or the operation o1127 is otherwise carried out in the illustrative depiction as follows: electronically receiving (e.g. 10-key, etc.) the monitoring information (e.g. future market demands, etc.) related to (e.g. water availability, etc.) one or more farming related production factors (e.g. range schedule, etc.) involved with (e.g. embroil, etc.) farming related production of (e.g. peanut harvesting, etc.) one or more ingestible materials (e.g. squid, etc.) at least in part including information regarding lack of one or more farming related production factors (e.g. future market demands, etc.).

Figure 52:
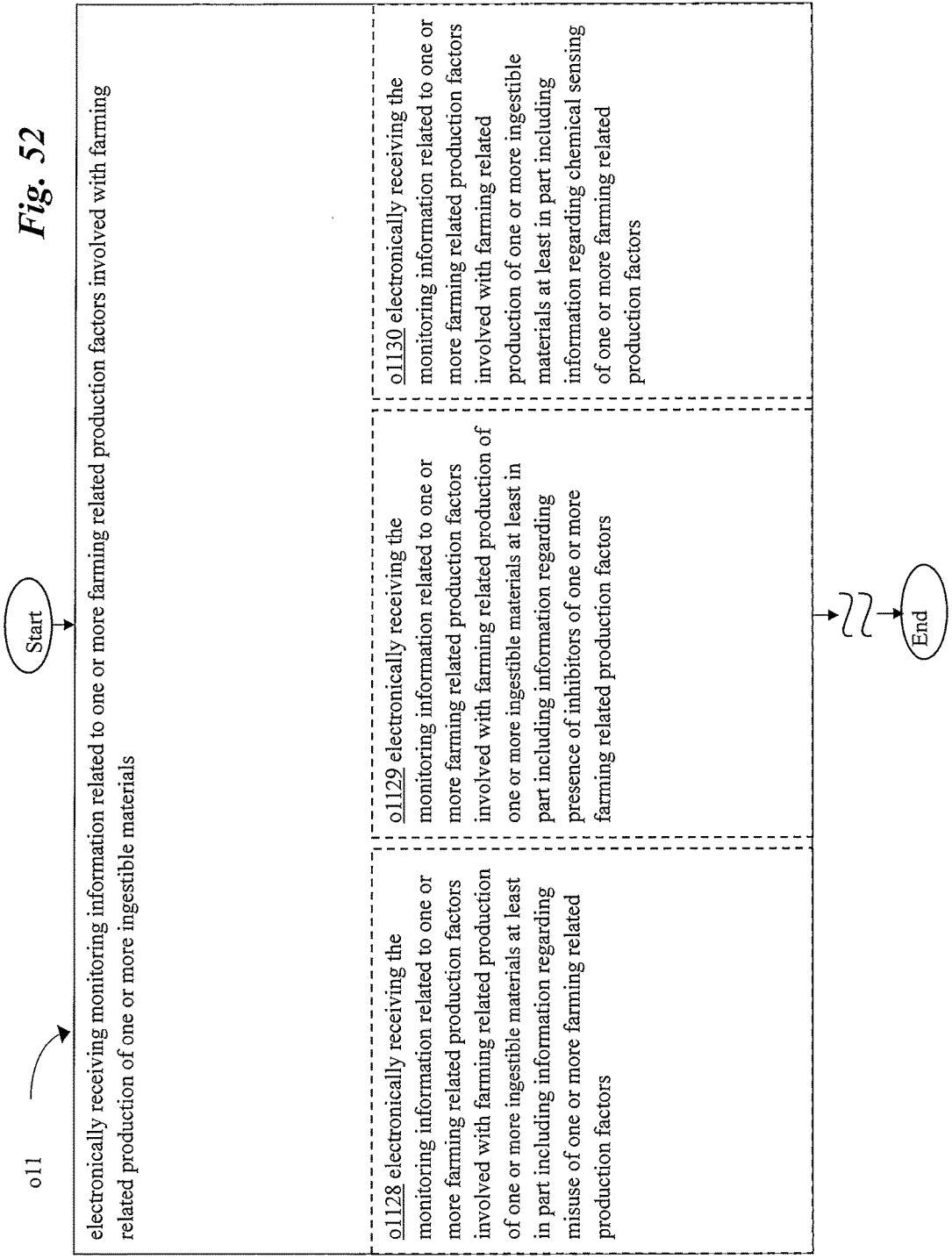
FIG. 52 is a high-level flowchart including exemplary implementations of operation o11 of FIG. 42.

In one or more implementations, as shown in FIG. 52, operation o11 includes an operation o1128 for electronically receiving the monitoring information related to one or more farming related production factors involved with farming related production of one or more ingestible materials at least in part including information regarding misuse of one or more farming related production factors. Origination of an illustratively derived receiving information factor misuse component group can be accomplished through skilled in the art design choice selection of one or more of the above depicted components from one or more of the above depicted subsystems shown in FIG. 12. Components from the receiving information factor misuse component group can be used in implementing execution of the one or more receiving information factor misuse instructions i1128 of FIG. 29, can be used in performance of the receiving information factor misuse electrical circuitry arrangement e1128 of FIG. 22, and/or can be used in otherwise fulfillment of the operation o1128. An exemplary non-transitory signal bearing medium version of the information storage subsystem s200 is depicted in FIG. 29 as bearing the one or more receiving information factor misuse instructions i1128 that when executed will direct performance of the operation o1128. Furthermore, the receiving information factor misuse electrical circuitry arrangement ("elec circ arrange") e1128, when activated, will perform the operation o1128. Also, the receiving information factor misuse module m1128, when executed and/or activated, will direct performance of and/or perform the operation o1128. For instance, in one or more exemplary implementations, the one or more receiving information factor misuse instructions i1128, when executed, direct performance of the operation o1128 in the illustrative depiction as follows, and/or the receiving information factor misuse electrical circuitry arrangement e1128, when activated, performs the operation o1128 in the illustrative depiction as follows, and/or the receiving information factor misuse module m1128, when executed and/or activated, directs performance of and/or performs the operation o1128 in the illustrative depiction as follows, and/or the operation o1128 is otherwise carried out in the illustrative depiction as follows: electronically receiving (e.g. USB port, etc.) the monitoring information (e.g. improper data calculation, etc.) related to (e.g. insect population, etc.) one or more farming related production factors (e.g. livestock inventory, etc.) involved with take in, etc.) farming related production of (e.g. parsnip growing, etc.) one or more ingestible materials (e.g. green algae, etc.) at least in part including information regarding misuse of one or more farming related production factors (e.g. improper data calculation, etc.).

In one or more implementations, as shown in FIG. 52, operation o11 includes an operation o1129 for electronically receiving the monitoring information related to one or more farming related production factors involved with farming related production of one or more ingestible materials at least in part including information regarding presence of inhibitors of one or more farming related production factors. Origination of an illustratively derived receiving information factor inhibitors component group can be accomplished through skilled in the art design choice selection of one or more of the above depicted components from one or more of the above depicted subsystems shown in FIG. 12. Components from the receiving information factor inhibitors component group can be used in implementing execution of the one or more receiving information factor inhibitors instructions i1129 of FIG. 29, can be used in performance of the receiving information factor inhibitors electrical circuitry arrangement e1129 of FIG. 22, and/or can be used in otherwise fulfillment of the operation o1129. An exemplary non-transitory signal bearing medium version of the information storage subsystem s200 is depicted in FIG. 29 as bearing the one or more receiving information factor inhibitors instructions i1129 that when executed will direct performance of the operation o1129. Furthermore, the receiving information factor inhibitors electrical circuitry arrangement ("elec circ arrange") e1129, when activated, will perform the operation o1129. Also, the receiving information factor inhibitors module m1129, when executed and/or activated, will direct performance of and/or perform the operation o1129. For instance, in one or more exemplary implementations, the one or more receiving information factor inhibitors instructions i1129, when executed, direct performance of the operation o1129 in the illustrative depiction as follows, and/or the receiving information factor inhibitors electrical circuitry arrangement e1129, when activated, performs the operation o1129 in the illustrative depiction as follows, and/or the receiving information factor inhibitors module m1129, when executed and/or activated, directs performance of and/or performs the operation o1129 in the illustrative depiction as follows, and/or the operation o1129 is otherwise carried out in the illustrative depiction as follows: electronically receiving (e.g. FTP, etc.) the monitoring information (e.g. infestation, etc.) related to (e.g. pollen count, etc.) one or more farming related production factors (e.g. labor laws, etc.) involved with comprised of, etc.) farming related production of (e.g. cow milking, etc.) one or more ingestible materials (e.g. corn on cob, etc.) at least in part including information regarding presence of inhibitors of one or more farming related production factors (e.g. infestation detected, etc.).

In one or more implementations, as shown in FIG. 52, operation o11 includes an operation o1130 for electronically receiving the monitoring information related to one or more farming related production factors involved with farming related production of one or more ingestible materials at least in part including information regarding chemical sensing of one or more farming related production factors. Origination of an illustratively derived receiving information chemical sensing component group can be accomplished through skilled in the art design choice selection of one or more of the above depicted components from one or more of the above depicted subsystems shown in FIG. 12. Components from the receiving information chemical sensing component group can be used in implementing execution of the one or more receiving information chemical sensing instructions i1130 of FIG. 29, can be used in performance of the receiving information chemical sensing electrical circuitry arrangement e1130 of FIG. 22, and/or can be used in otherwise fulfillment of the operation o1130. An exemplary non-transitory signal bearing medium version of the information storage subsystem s200 is depicted in FIG. 29 as bearing the one or more receiving information chemical sensing instructions i1130 that when executed will direct performance of the operation o1130. Furthermore, the receiving information chemical sensing electrical circuitry arrangement ("elec circ arrange") e1130, when activated, will perform the operation o1130. Also, the receiving information chemical sensing module m1130, when executed and/or activated, will direct performance of and/or perform the operation o1130. For instance, in one or more exemplary implementations, the one or more receiving information chemical sensing instructions i1130, when executed, direct performance of the operation o1130 in the illustrative depiction as follows, and/or the receiving information chemical sensing electrical circuitry arrangement e1130, when activated, performs the operation o1130 in the illustrative depiction as follows, and/or the receiving information chemical sensing module m1130, when executed and/or activated, directs performance of and/or performs the operation o1130 in the illustrative depiction as follows, and/or the operation o1130 is otherwise carried out in the illustrative depiction as follows: electronically receiving (e.g. HTTP, etc.) the monitoring information (e.g. sanitizer usage, etc.) related to (e.g. crop rotation, etc.) one or more farming related production factors (e.g. safety regulations, etc.) involved with (e.g. comprehend, etc.) farming related production of (e.g. cow birthing, etc.) one or more ingestible materials (e.g. bison meat, etc.) at least in part including information regarding chemical sensing of one or more farming related production factors (e.g. sanitizer usage, etc.).

Figure 53:
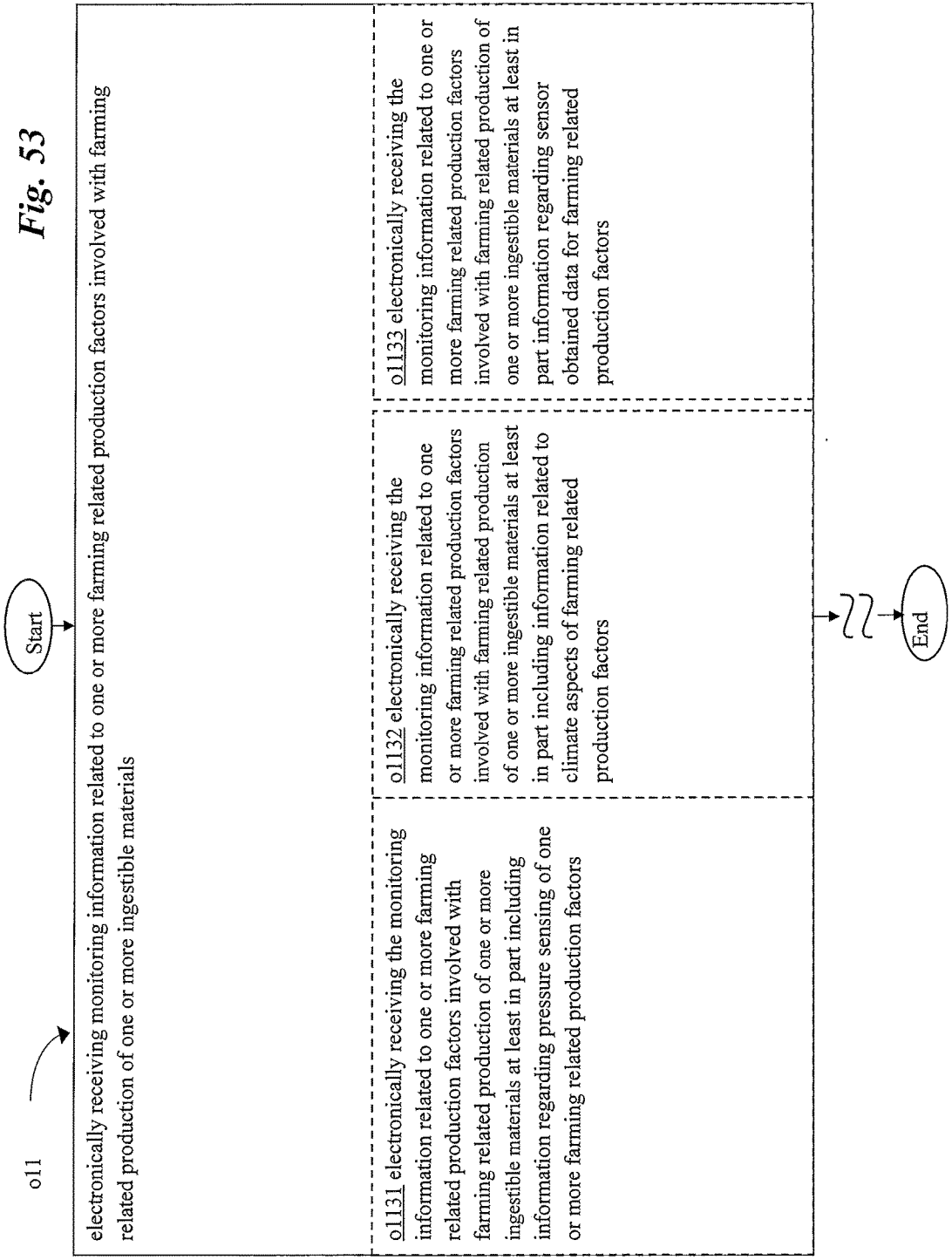
FIG. 53 is a high-level flowchart including exemplary implementations of operation o11 of FIG. 42.

In one or more implementations, as shown in FIG. 53, operation o11 includes an operation o1131 for electronically receiving the monitoring information related to one or more farming related production factors involved with farming related production of one or more ingestible materials at least in part including information regarding pressure sensing of one or more farming related production factors. Origination of an illustratively derived receiving information pressure sensing component group can be accomplished through skilled in the art design choice selection of one or more of the above depicted components from one or more of the above depicted subsystems shown in FIG. 12. Components from the receiving information pressure sensing component group can be used in implementing execution of the one or more receiving information pressure sensing instructions i1131 of FIG. 29, can be used in performance of the receiving information pressure sensing electrical circuitry arrangement e1131 of FIG. 22, and/or can be used in otherwise fulfillment of the operation o1131. An exemplary non-transitory signal bearing medium version of the information storage subsystem s200 is depicted in FIG. 29 as bearing the one or more receiving information pressure sensing instructions i1131 that when executed will direct performance of the operation o1131. Furthermore, the receiving information pressure sensing electrical circuitry arrangement ("elec circ arrange") e1131, when activated, will perform the operation o1131. Also, the receiving information pressure sensing module m1131, when executed and/or activated, will direct performance of and/or perform the operation o1131. For instance, in one or more exemplary implementations, the one or more receiving information pressure sensing instructions i1131, when executed, direct performance of the operation o1131 in the illustrative depiction as follows, and/or the receiving information pressure sensing electrical circuitry arrangement e1131, when activated, performs the operation o1131 in the illustrative depiction as follows, and/or the receiving information pressure sensing module m1131, when executed and/or activated, directs performance of and/or performs the operation o1131 in the illustrative depiction as follows, and/or the operation o1131 is otherwise carried out in the illustrative depiction as follows: electronically receiving (e.g. bittorent, etc.) the monitoring information (e.g. mbar, etc.) related to (e.g. scientific data, etc.) one or more farming related production factors (e.g. neighbor's crop harvest, etc.) involved with (e.g. associated, etc.) farming related production of (e.g. blueberry cultivation, etc.) one or more ingestible materials (e.g. domestic goose, etc.) at least in part including information regarding pressure sensing of one or more farming related production factors (e.g. mbar amount, etc.).

In one or more implementations, as shown in FIG. 53, operation o11 includes an operation o1132 for electronically receiving the monitoring information related to one or more farming related production factors involved with farming related production of one or more ingestible materials at least in part including information related to climate aspects of farming related production factors. Origination of an illustratively derived receiving information climate aspects component group can be accomplished through skilled in the art design choice selection of one or more of the above depicted components from one or more of the above depicted subsystems shown in FIG. 12. Components from the receiving information climate aspects component group can be used in implementing execution of the one or more receiving information climate aspects instructions i1132 of FIG. 29, can be used in performance of the receiving information climate aspects electrical circuitry arrangement e1132 of FIG. 22, and/or can be used in otherwise fulfillment of the operation o1132. An exemplary non-transitory signal bearing medium version of the information storage subsystem s200 is depicted in FIG. 29 as bearing the one or more receiving information climate aspects instructions i1132 that when executed will direct performance of the operation o1132. Furthermore, the receiving information climate aspects electrical circuitry arrangement ("elec circ arrange") e1132, when activated, will perform the operation o1132. Also, the receiving information climate aspects module m1132, when executed and/or activated, will direct performance of and/or perform the operation o1132. For instance, in one or more exemplary implementations, the one or more receiving information climate aspects instructions i1132, when executed, direct performance of the operation o1132 in the illustrative depiction as follows, and/or the receiving information climate aspects electrical circuitry arrangement e1132, when activated, performs the operation o1132 in the illustrative depiction as follows, and/or the receiving information climate aspects module m1132, when executed and/or activated, directs performance of and/or performs the operation o1132 in the illustrative depiction as follows, and/or the operation o1132 is otherwise carried out in the illustrative depiction as follows: electronically receiving (e.g. gnutella, etc.) the monitoring information (e.g. humidity, etc.) related to (e.g. soil conditions, etc.) one or more farming related production factors (e.g. crop rotation demands, etc.) involved with (e.g. affected, etc.) farming related production of (e.g. raspberry harvesting, etc.) one or more ingestible materials (e.g. edible frog, etc.) at least in part including information related to climate aspects of farming related production factors (e.g. humidity historical data, etc.).

In one or more implementations, as shown in FIG. 53, operation o11 includes an operation o1133 for electronically receiving the monitoring information related to one or more farming related production factors involved with farming related production of one or more ingestible materials at least in part information regarding sensor obtained data for farming related production factors. Origination of an illustratively derived receiving information sensor obtained component group can be accomplished through skilled in the art design choice selection of one or more of the above depicted components from one or more of the above depicted subsystems shown in FIG. 12. Components from the receiving information sensor obtained component group can be used in implementing execution of the one or more receiving information sensor obtained instructions i1133 of FIG. 29, can be used in performance of the receiving information sensor obtained electrical circuitry arrangement e1133 of FIG. 22, and/or can be used in otherwise fulfillment of the operation o1133. An exemplary non-transitory signal bearing medium version of the information storage subsystem s200 is depicted in FIG. 29 as bearing the one or more receiving information sensor obtained instructions i1133 that when executed will direct performance of the operation o1133. Furthermore, the receiving information sensor obtained electrical circuitry arrangement ("elec circ arrange") e1133, when activated, will perform the operation o1133. Also, the receiving information sensor obtained module m1133, when executed and/or activated, will direct performance of and/or perform the operation o1133. For instance, in one or more exemplary implementations, the one or more receiving information sensor obtained instructions i1133, when executed, direct performance of the operation o1133 in the illustrative depiction as follows, and/or the receiving information sensor obtained electrical circuitry arrangement e1133, when activated, performs the operation o1133 in the illustrative depiction as follows, and/or the receiving information sensor obtained module m1133, when executed and/or activated, directs performance of and/or performs the operation o1133 in the illustrative depiction as follows, and/or the operation o1133 is otherwise carried out in the illustrative depiction as follows: electronically receiving (e.g. TCP/IP, etc.) the monitoring information (e.g. oxygen sensor, etc.) related to (e.g. irrigation, etc.) one or more farming related production factors (e.g. government subsidy status, etc.) involved with affecting, etc.) farming related production of (e.g. corn growing, etc.) one or more ingestible materials (e.g. catfish, etc.) at least in part information regarding sensor obtained data for farming related production factors (e.g. oxygen levels, etc.).

Figure 54:
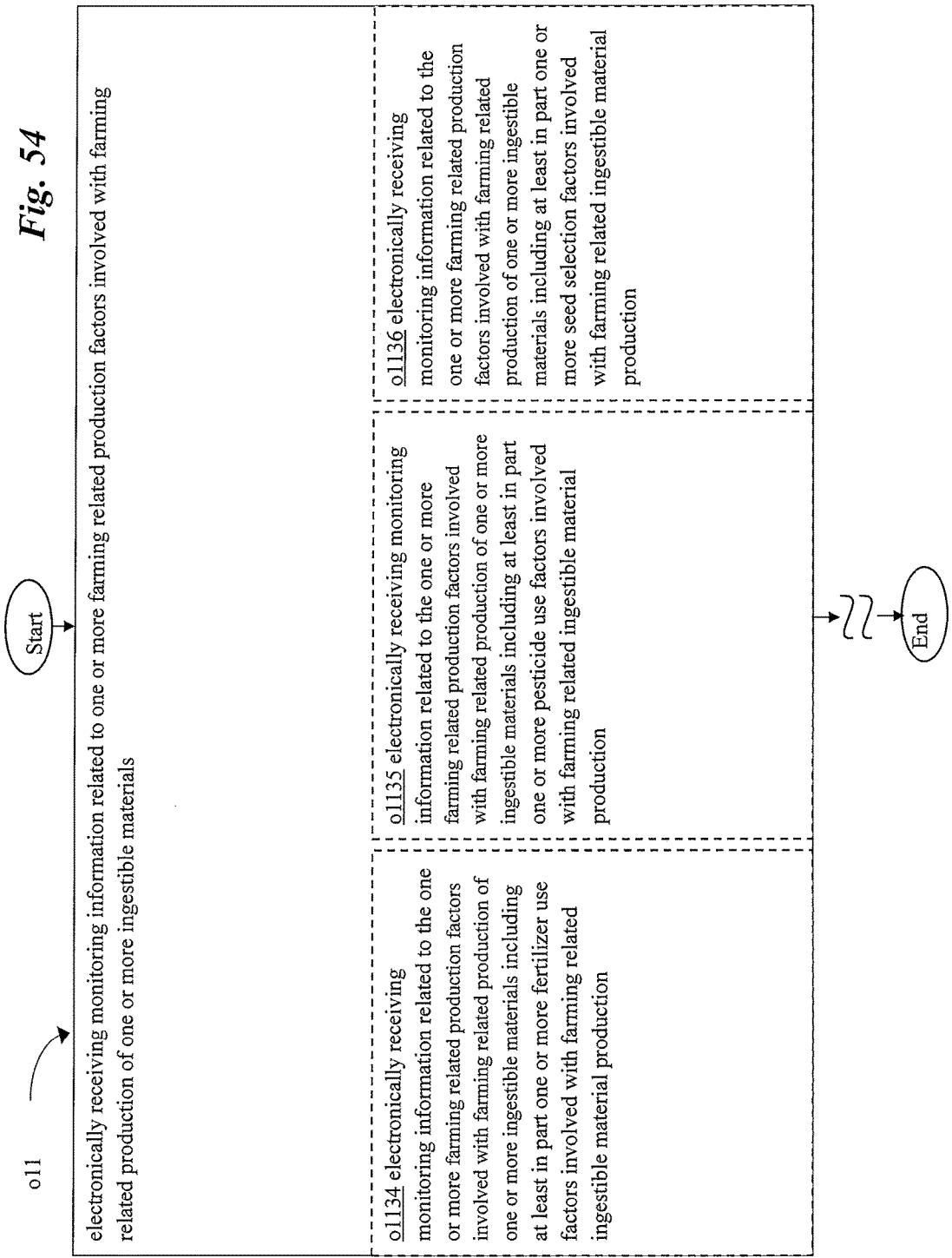
FIG. 54 is a high-level flowchart including exemplary implementations of operation o11 of FIG. 42.

In one or more implementations, as shown in FIG. 54, operation o11 includes an operation o1134 for electronically receiving monitoring information related to the one or more farming related production factors involved with farming related production of one or more ingestible materials including at least in part one or more fertilizer use factors involved with farming related ingestible material production. Origination of an illustratively derived receiving information fertilizer use component group can be accomplished through skilled in the art design choice selection of one or more of the above depicted components from one or more of the above depicted subsystems shown in FIG. 12. Components from the receiving information fertilizer use component group can be used in implementing execution of the one or more receiving information fertilizer use instructions i1134 of FIG. 29, can be used in performance of the receiving information fertilizer use electrical circuitry arrangement e1134 of FIG. 22, and/or can be used in otherwise fulfillment of the operation o1134. An exemplary non-transitory signal bearing medium version of the information storage subsystem s200 is depicted in FIG. 29 as bearing the one or more receiving information fertilizer use instructions i1134 that when executed will direct performance of the operation o1134. Furthermore, the receiving information fertilizer use electrical circuitry arrangement ("elec circ arrange") e1134, when activated, will perform the operation o1134. Also, the receiving information fertilizer use module m1134, when executed and/or activated, will direct performance of and/or perform the operation o1134. For instance, in one or more exemplary implementations, the one or more receiving information fertilizer use instructions i1134, when executed, direct performance of the operation o1134 in the illustrative depiction as follows, and/or the receiving information fertilizer use electrical circuitry arrangement e1134, when activated, performs the operation o1134 in the illustrative depiction as follows, and/or the receiving information fertilizer use module m1134, when executed and/or activated, directs performance of and/or performs the operation o1134 in the illustrative depiction as follows, and/or the operation o1134 is otherwise carried out in the illustrative depiction as follows: electronically receiving (e.g. RS-232, etc.) monitoring information (e.g. psi, etc.) related to (e.g. nutrients, etc.) the one or more farming related production factors (e.g. type of fertilizer used, etc.) involved with (e.g. argue, etc.) farming related production of (e.g. soy bean harvesting, etc.) one or more ingestible materials (e.g. silkworm, etc.) including at least in part one or more fertilizer use factors involved with farming related ingestible material production (e.g. type of fertilizer used, etc.).

In one or more implementations, as shown in FIG. 54, operation o11 includes an operation o1135 for electronically receiving monitoring information related to the one or more farming related production factors involved with farming related production of one or more ingestible materials including at least in part one or more pesticide use factors involved with farming related ingestible material production. Origination of an illustratively derived receiving information pesticide use component group can be accomplished through skilled in the art design choice selection of one or more of the above depicted components from one or more of the above depicted subsystems shown in FIG. 12. Components from the receiving information pesticide use component group can be used in implementing execution of the one or more receiving information pesticide use instructions i1135 of FIG. 29, can be used in performance of the receiving information pesticide use electrical circuitry arrangement e1135 of FIG. 22, and/or can be used in otherwise fulfillment of the operation o1135. An exemplary non-transitory signal bearing medium version of the information storage subsystem s200 is depicted in FIG. 29 as bearing the one or more receiving information pesticide use instructions i1135 that when executed will direct performance of the operation o1135. Furthermore, the receiving information pesticide use electrical circuitry arrangement ("elec circ arrange") e1135, when activated, will perform the operation o1135. Also, the receiving information pesticide use module m1135, when executed and/or activated, will direct performance of and/or perform the operation o1135. For instance, in one or more exemplary implementations, the one or more receiving information pesticide use instructions i1135, when executed, direct performance of the operation o1135 in the illustrative depiction as follows, and/or the receiving information pesticide use electrical circuitry arrangement e1135, when activated, performs the operation o1135 in the illustrative depiction as follows, and/or the receiving information pesticide use module m1135, when executed and/or activated, directs performance of and/or performs the operation o1135 in the illustrative depiction as follows, and/or the operation o1135 is otherwise carried out in the illustrative depiction as follows: electronically receiving (e.g. tablet entry, etc.) monitoring information (e.g. in Hg, etc.) related to (e.g. antibiotics, etc.) the one or more farming related production factors (e.g. schedule of pesticide application, etc.) involved with (e.g. connected, etc.) farming related production of (e.g. canola harvesting, etc.) one or more ingestible materials (e.g. silk, etc.) including at least in part one or more pesticide use factors involved with farming related ingestible material production (e.g. schedule of pesticide application, etc.).

In one or more implementations, as shown in FIG. 54, operation o11 includes an operation o1136 for electronically receiving monitoring information related to the one or more farming related production factors involved with farming related production of one or more ingestible materials including at least in part one or more seed selection factors involved with farming related ingestible material production. Origination of an illustratively derived receiving information seed selection component group can be accomplished through skilled in the art design choice selection of one or more of the above depicted components from one or more of the above depicted subsystems shown in FIG. 12. Components from the receiving information seed selection component group can be used in implementing execution of the one or more receiving information seed selection instructions i1136 of FIG. 29, can be used in performance of the receiving information seed selection electrical circuitry arrangement e1136 of FIG. 22, and/or can be used in otherwise fulfillment of the operation o1136. An exemplary non-transitory signal bearing medium version of the information storage subsystem s200 is depicted in FIG. 29 as bearing the one or more receiving information seed selection instructions i1136 that when executed will direct performance of the operation o1136. Furthermore, the receiving information seed selection electrical circuitry arrangement ("elec circ arrange") e1136, when activated, will perform the operation o1136. Also, the receiving information seed selection module m1136, when executed and/or activated, will direct performance of and/or perform the operation o1136. For instance, in one or more exemplary implementations, the one or more receiving information seed selection instructions i1136, when executed, direct performance of the operation o1136 in the illustrative depiction as follows, and/or the receiving information seed selection electrical circuitry arrangement e1136, when activated, performs the operation o1136 in the illustrative depiction as follows, and/or the receiving information seed selection module m1136, when executed and/or activated, directs performance of and/or performs the operation o1136 in the illustrative depiction as follows, and/or the operation o1136 is otherwise carried out in the illustrative depiction as follows: electronically receiving (e.g. PDA entry, etc.) monitoring information (e.g. equipment maintenance, etc.) related to (e.g. bioavailability, etc.) the one or more farming related production factors (e.g. genetic signature of heirloom tomato seeds used, etc.) involved with (e.g. commit to, etc.) farming related production of (e.g. cherry picking, etc.) one or more ingestible materials (e.g. shrimp, etc.) including at least in part one or more seed selection factors involved with farming related ingestible material production (e.g. genetic signature of heirloom tomato seeds used, etc.).

Figure 55:
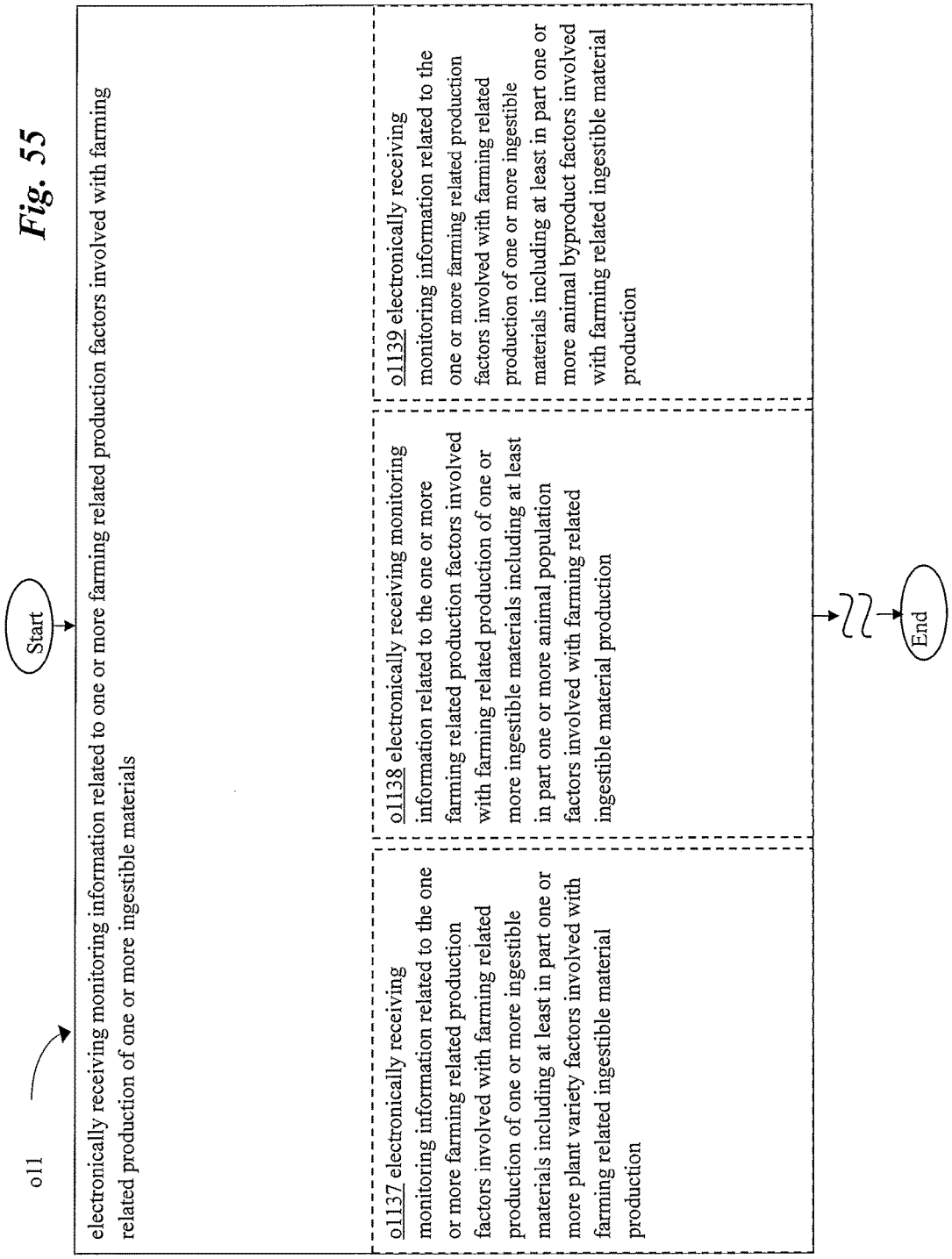
FIG. 55 is a high-level flowchart including exemplary implementations of operation o11 of FIG. 42.

In one or more implementations, as shown in FIG. 55, operation o11 includes an operation o1137 for electronically receiving monitoring information related to the one or more farming related production factors involved with farming related production of one or more ingestible materials including at least in part one or more plant variety factors involved with farming related ingestible material production. Origination of an illustratively derived receiving information plant variety component group can be accomplished through skilled in the art design choice selection of one or more of the above depicted components from one or more of the above depicted subsystems shown in FIG. 12. Components from the receiving information plant variety component group can be used in implementing execution of the one or more receiving information plant variety instructions i1137 of FIG. 29, can be used in performance of the receiving information plant variety electrical circuitry arrangement e1137 of FIG. 22, and/or can be used in otherwise fulfillment of the operation o1137. An exemplary non-transitory signal bearing medium version of the information storage subsystem s200 is depicted in FIG. 29 as bearing the one or more receiving information plant variety instructions i1137 that when executed will direct performance of the operation o1137. Furthermore, the receiving information plant variety electrical circuitry arrangement ("elec circ arrange") e1137, when activated, will perform the operation o1137. Also, the receiving information plant variety module m1137, when executed and/or activated, will direct performance of and/or perform the operation o1137. For instance, in one or more exemplary implementations, the one or more receiving information plant variety instructions i1137, when executed, direct performance of the operation o1137 in the illustrative depiction as follows, and/or the receiving information plant variety electrical circuitry arrangement e1137, when activated, performs the operation o1137 in the illustrative depiction as follows, and/or the receiving information plant variety module m1137, when executed and/or activated, directs performance of and/or performs the operation o1137 in the illustrative depiction as follows, and/or the operation o1137 is otherwise carried out in the illustrative depiction as follows: electronically receiving (e.g. desktop entry, etc.) monitoring information (e.g. nitrogen levels, etc.) related to (e.g. economic conditions, etc.) the one or more farming related production factors (e.g. invasive plant population, etc.) involved with (e.g. absorbed by, etc.) farming related production of (e.g. peach picking, etc.) one or more ingestible materials (e.g. snail, etc.) including at least in part one or more plant variety factors involved with farming related ingestible material production (e.g. invasive plant population, etc.).

In one or more implementations, as shown in FIG. 55, operation o11 includes an operation o1138 for electronically receiving monitoring information related to the one or more farming related production factors involved with farming related production of one or more ingestible materials including at least in part one or more animal population factors involved with farming related ingestible material production. Origination of an illustratively derived receiving information animal factors component group can be accomplished through skilled in the art design choice selection of one or more of the above depicted components from one or more of the above depicted subsystems shown in FIG. 12. Components from the receiving information animal factors component group can be used in implementing execution of the one or more receiving information animal factors instructions i1138 of FIG. 29, can be used in performance of the receiving information animal factors electrical circuitry arrangement e1138 of FIG. 22, and/or can be used in otherwise fulfillment of the operation o1138. An exemplary non-transitory signal bearing medium version of the information storage subsystem s200 is depicted in FIG. 29 as bearing the one or more receiving information animal factors instructions i1138 that when executed will direct performance of the operation o1138. Furthermore, the receiving information animal factors electrical circuitry arrangement ("elec circ arrange") e1138, when activated, will perform the operation o1138. Also, the receiving information animal factors module m1138, when executed and/or activated, will direct performance of and/or perform the operation o1138. For instance, in one or more exemplary implementations, the one or more receiving information animal factors instructions i1138, when executed, direct performance of the operation o1138 in the illustrative depiction as follows, and/or the receiving information animal factors electrical circuitry arrangement e1138, when activated, performs the operation o1138 in the illustrative depiction as follows, and/or the receiving information animal factors module m1138, when executed and/or activated, directs performance of and/or performs the operation o1138 in the illustrative depiction as follows, and/or the operation o1138 is otherwise carried out in the illustrative depiction as follows: electronically receiving (e.g. acoustic energy, etc.) monitoring information (e.g. calcium levels, etc.) related to (e.g. climate, etc.) the one or more farming related production factors (e.g. rodent population, etc.) involved with (e.g. embraced by, etc.) farming related production of (e.g. chicken egg laying, etc.) one or more ingestible materials (e.g. snail shell, etc.) including at least in part one or more animal population factors involved with farming related ingestible material production (e.g. rodent population, etc.).

In one or more implementations, as shown in FIG. 55, operation o11 includes an operation o1139 for electronically receiving monitoring information related to the one or more farming related production factors involved with farming related production of one or more ingestible materials including at least in part one or more animal byproduct factors involved with farming related ingestible material production. Origination of an illustratively derived receiving information animal byproducts component group can be accomplished through skilled in the art design choice selection of one or more of the above depicted components from one or more of the above depicted subsystems shown in FIG. 12. Components from the receiving information animal byproducts component group can be used in implementing execution of the one or more receiving information animal byproducts instructions i1139 of FIG. 29, can be used in performance of the receiving information animal byproducts electrical circuitry arrangement e1139 of FIG. 22, and/or can be used in otherwise fulfillment of the operation o1139. An exemplary non-transitory signal bearing medium version of the information storage subsystem s200 is depicted in FIG. 29 as bearing the one or more receiving information animal byproducts instructions i1139 that when executed will direct performance of the operation o1139. Furthermore, the receiving information animal byproducts electrical circuitry arrangement ("elec circ arrange") e1139, when activated, will perform the operation o1139. Also, the receiving information animal byproducts module m1139, when executed and/or activated, will direct performance of and/or perform the operation o1139. For instance, in one or more exemplary implementations, the one or more receiving information animal byproducts instructions i1139, when executed, direct performance of the operation o1139 in the illustrative depiction as follows, and/or the receiving information animal byproducts electrical circuitry arrangement e1139, when activated, performs the operation o1139 in the illustrative depiction as follows, and/or the receiving information animal byproducts module m1139, when executed and/or activated, directs performance of and/or performs the operation o1139 in the illustrative depiction as follows, and/or the operation o1139 is otherwise carried out in the illustrative depiction as follows: electronically receiving (e.g. VHF, etc.) monitoring information (e.g. phosphate levels, etc.) related to (e.g. sustainability, etc.) the one or more farming related production factors (e.g. manure composition, etc.) involved with (e.g. containing, etc.) farming related production of (e.g. sheep butchering, etc.) one or more ingestible materials (e.g. carp, etc.) including at least in part one or more animal byproduct factors involved with farming related ingestible material production (e.g. manure composition, etc.).

Figure 56:
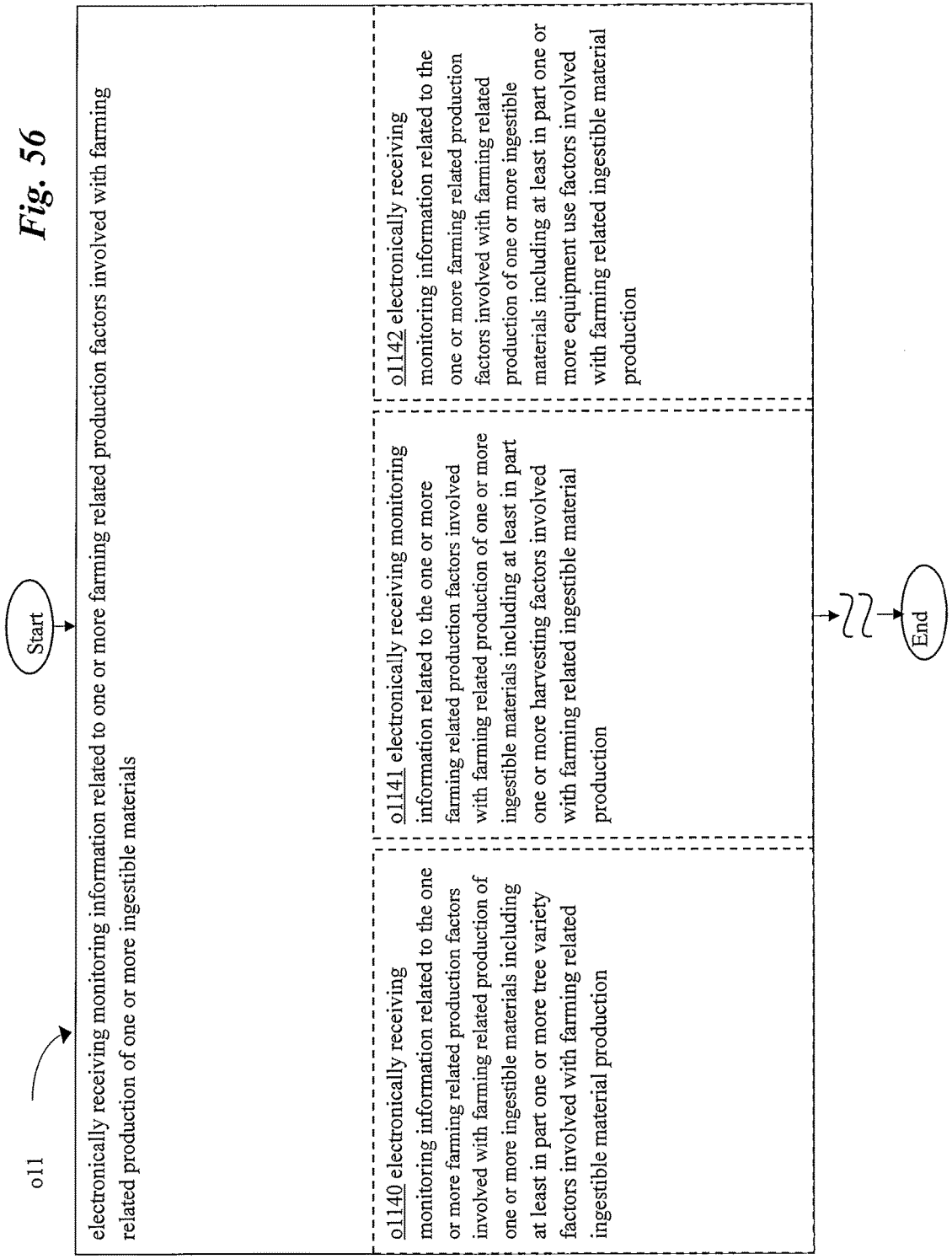
FIG. 56 is a high-level flowchart including exemplary implementations of operation o11 of FIG. 42.

In one or more implementations, as shown in FIG. 56, operation o11 includes an operation o1140 for electronically receiving monitoring information related to the one or more farming related production factors involved with farming related production of one or more ingestible materials including at least in part one or more tree variety factors involved with farming related ingestible material production. Origination of an illustratively derived receiving information tree factors component group can be accomplished through skilled in the art design choice selection of one or more of the above depicted components from one or more of the above depicted subsystems shown in FIG. 12. Components from the receiving information tree factors component group can be used in implementing execution of the one or more receiving information tree factors instructions i1140 of FIG. 30, can be used in performance of the receiving information tree factors electrical circuitry arrangement e1140 of FIG. 23, and/or can be used in otherwise fulfillment of the operation o1140. An exemplary non-transitory signal bearing medium version of the information storage subsystem s200 is depicted in FIG. 30 as bearing the one or more receiving information tree factors instructions i1140 that when executed will direct performance of the operation o1140. Furthermore, the receiving information tree factors electrical circuitry arrangement ("elec circ arrange") e1140, when activated, will perform the operation o1140. Also, the receiving information tree factors module m1140, when executed and/or activated, will direct performance of and/or perform the operation o1140. For instance, in one or more exemplary implementations, the one or more receiving information tree factors instructions i1140, when executed, direct performance of the operation o1140 in the illustrative depiction as follows, and/or the receiving information tree factors electrical circuitry arrangement e1140, when activated, performs the operation o1140 in the illustrative depiction as follows, and/or the receiving information tree factors module m1140, when executed and/or activated, directs performance of and/or performs the operation o1140 in the illustrative depiction as follows, and/or the operation o1140 is otherwise carried out in the illustrative depiction as follows: electronically receiving (e.g. UFH, etc.) monitoring information (e.g. shovel, etc.) related to (e.g. eutrophication, etc.) the one or more farming related production factors (e.g. shade tree population density, etc.) involved with (e.g. engaging, etc.) farming related production of (e.g. clam digging, etc.) one or more ingestible materials (e.g. sturgeon, etc.) including at least in part one or more tree variety factors involved with farming related ingestible material production (e.g. shade tree population density, etc.).

In one or more implementations, as shown in FIG. 56, operation o11 includes an operation o1141 for electronically receiving monitoring information related to the one or more farming related production factors involved with farming related production of one or more ingestible materials including at least in part one or more harvesting factors involved with farming related ingestible material production. Origination of an illustratively derived receiving information harvesting factors component group can be accomplished through skilled in the art design choice selection of one or more of the above depicted components from one or more of the above depicted subsystems shown in FIG. 12. Components from the receiving information harvesting factors component group can be used in implementing execution of the one or more receiving information harvesting factors instructions i1141 of FIG. 30, can be used in performance of the receiving information harvesting factors electrical circuitry arrangement e1141 of FIG. 23, and/or can be used in otherwise fulfillment of the operation o1141. An exemplary non-transitory signal bearing medium version of the information storage subsystem s200 is depicted in FIG. 30 as bearing the one or more receiving information harvesting factors instructions i1141 that when executed will direct performance of the operation o1141. Furthermore, the receiving information harvesting factors electrical circuitry arrangement ("elec circ arrange") e1141, when activated, will perform the operation o1141. Also, the receiving information harvesting factors module m1141, when executed and/or activated, will direct performance of and/or perform the operation o1141. For instance, in one or more exemplary implementations, the one or more receiving information harvesting factors instructions i1141, when executed, direct performance of the operation o1141 in the illustrative depiction as follows, and/or the receiving information harvesting factors electrical circuitry arrangement e1141, when activated, performs the operation o1141 in the illustrative depiction as follows, and/or the receiving information harvesting factors module m1141, when executed and/or activated, directs performance of and/or performs the operation o1141 in the illustrative depiction as follows, and/or the operation o1141 is otherwise carried out in the illustrative depiction as follows: electronically receiving (e.g. FRS, etc.) monitoring information (e.g. diesel fuel, etc.) related to (e.g. efficiency, etc.) the one or more farming related production factors (e.g. combine run time, etc.) involved with (e.g. engaged by, etc.) farming related production of (e.g. crab trapping, etc.) one or more ingestible materials (e.g. sturgeon eggs, etc.) including at least in part one or more harvesting factors involved with farming related ingestible material production (e.g. combine run time, etc.).

In one or more implementations, as shown in FIG. 56, operation o11 includes an operation o1142 for electronically receiving monitoring information related to the one or more farming related production factors involved with farming related production of one or more ingestible materials including at least in part one or more equipment use factors involved with farming related ingestible material production. Origination of an illustratively derived receiving information equipment factors component group can be accomplished through skilled in the art design choice selection of one or more of the above depicted components from one or more of the above depicted subsystems shown in FIG. 12. Components from the receiving information equipment factors component group can be used in implementing execution of the one or more receiving information equipment factors instructions i1142 of FIG. 30, can be used in performance of the receiving information equipment factors electrical circuitry arrangement e1142 of FIG. 23, and/or can be used in otherwise fulfillment of the operation o1142. An exemplary non-transitory signal bearing medium version of the information storage subsystem s200 is depicted in FIG. 30 as bearing the one or more receiving information equipment factors instructions i1142 that when executed will direct performance of the operation o1142. Furthermore, the receiving information equipment factors electrical circuitry arrangement ("elec circ arrange") e1142, when activated, will perform the operation o1142. Also, the receiving information equipment factors module m1142, when executed and/or activated, will direct performance of and/or perform the operation o1142. For instance, in one or more exemplary implementations, the one or more receiving information equipment factors instructions i1142, when executed, direct performance of the operation o1142 in the illustrative depiction as follows, and/or the receiving information equipment factors electrical circuitry arrangement e1142, when activated, performs the operation o1142 in the illustrative depiction as follows, and/or the receiving information equipment factors module m1142, when executed and/or activated, directs performance of and/or performs the operation o1142 in the illustrative depiction as follows, and/or the operation o1142 is otherwise carried out in the illustrative depiction as follows: electronically receiving (e.g. GMRS, etc.) monitoring information (e.g. combine, etc.) related to (e.g. cost measure, etc.) the one or more farming related production factors (e.g. welding machine usage, etc.) involved with (e.g. incorporating, etc.) farming related production of (e.g. mushroom cultivation, etc.) one or more ingestible materials (e.g. venison, etc.) including at least in part one or more equipment use factors involved with farming related ingestible material production (e.g. conveyor belt run time, etc.).

Figure 57:
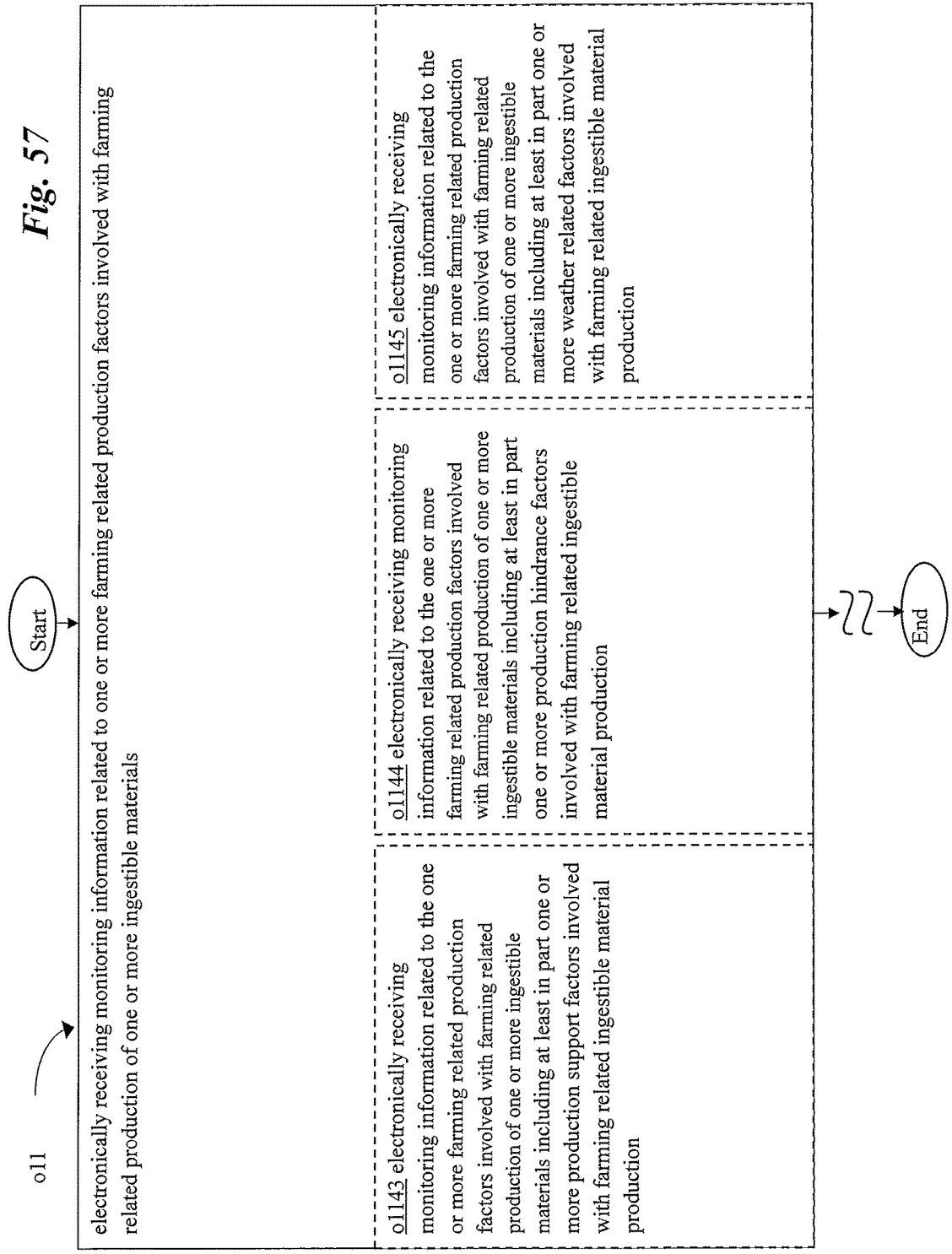
FIG. 57 is a high-level flowchart including exemplary implementations of operation o11 of FIG. 42.

In one or more implementations, as shown in FIG. 57, operation o11 includes an operation o1143 for electronically receiving monitoring information related to the one or more farming related production factors involved with farming related production of one or more ingestible materials including at least in part one or more production support factors involved with farming related ingestible material production. Origination of an illustratively derived receiving information production support component group can be accomplished through skilled in the art design choice selection of one or more of the above depicted components from one or more of the above depicted subsystems shown in FIG. 12. Components from the receiving information production support component group can be used in implementing execution of the one or more receiving information production support instructions i1143 of FIG. 30, can be used in performance of the receiving information production support electrical circuitry arrangement e1143 of FIG. 23, and/or can be used in otherwise fulfillment of the operation o1143. An exemplary non-transitory signal bearing medium version of the information storage subsystem s200 is depicted in FIG. 30 as bearing the one or more receiving information production support instructions i1143 that when executed will direct performance of the operation o1143. Furthermore, the receiving information production support electrical circuitry arrangement ("elec circ arrange") e1143, when activated, will perform the operation o1143. Also, the receiving information production support module m1143, when executed and/or activated, will direct performance of and/or perform the operation o1143. For instance, in one or more exemplary implementations, the one or more receiving information production support instructions i1143, when executed, direct performance of the operation o1143 in the illustrative depiction as follows, and/or the receiving information production support electrical circuitry arrangement e1143, when activated, performs the operation o1143 in the illustrative depiction as follows, and/or the receiving information production support module m1143, when executed and/or activated, directs performance of and/or performs the operation o1143 in the illustrative depiction as follows, and/or the operation o1143 is otherwise carried out in the illustrative depiction as follows: electronically receiving (e.g. IEEE 802.11, etc.) monitoring information (e.g. plow, etc.) related to (e.g. pandemics, etc.) the one or more farming related production factors (e.g. generator fuel type used, etc.) involved with (e.g. engrossing, etc.) farming related production of (e.g. alfalfa cutting, etc.) one or more ingestible materials (e.g. kangaroo meat, etc.) including at least in part one or more production support factors involved with farming related ingestible material production (e.g. generator fuel type used, etc.).

In one or more implementations, as shown in FIG. 57, operation o11 includes an operation o1144 for electronically receiving monitoring information related to the one or more farming related production factors involved with farming related production of one or more ingestible materials including at least in part one or more production hindrance factors involved with farming related ingestible material production. Origination of an illustratively derived receiving information production hindrance component group can be accomplished through skilled in the art design choice selection of one or more of the above depicted components from one or more of the above depicted subsystems shown in FIG. 12. Components from the receiving information production hindrance component group can be used in implementing execution of the one or more receiving information production hindrance instructions i1144 of FIG. 30, can be used in performance of the receiving information production hindrance electrical circuitry arrangement e1144 of FIG. 23, and/or can be used in otherwise fulfillment of the operation o1144. An exemplary non-transitory signal bearing medium version of the information storage subsystem s200 is depicted in FIG. 30 as bearing the one or more receiving information production hindrance instructions i1144 that when executed will direct performance of the operation o1144. Furthermore, the receiving information production hindrance electrical circuitry arrangement ("elec circ arrange") e1144, when activated, will perform the operation o1144. Also, the receiving information production hindrance module m1144, when executed and/or activated, will direct performance of and/or perform the operation o1144. For instance, in one or more exemplary implementations, the one or more receiving information production hindrance instructions i1144, when executed, direct performance of the operation o1144 in the illustrative depiction as follows, and/or the receiving information production hindrance electrical circuitry arrangement e1144, when activated, performs the operation o1144 in the illustrative depiction as follows, and/or the receiving information production hindrance module m1144, when executed and/or activated, directs performance of and/or performs the operation o1144 in the illustrative depiction as follows, and/or the operation o1144 is otherwise carried out in the illustrative depiction as follows: electronically receiving (e.g. CDMA, etc.) monitoring information (e.g. shipping containers, etc.) related to (e.g. advertising, etc.) the one or more farming related production factors (e.g. adequate record keeping of weather patterns, etc.) involved with (e.g. implicate, etc.) farming related production of (e.g. potato harvesting, etc.) one or more ingestible materials (e.g. maguey worm, etc.) including at least in part one or more production hindrance factors involved with farming related ingestible material production (e.g. inadequate record keeping of weather patterns, etc.).

In one or more implementations, as shown in FIG. 57, operation o11 includes an operation o1145 for electronically receiving monitoring information related to the one or more farming related production factors involved with farming related production of one or more ingestible materials including at least in part one or more weather related factors involved with farming related ingestible material production. Origination of an illustratively derived receiving information weather factors component group can be accomplished through skilled in the art design choice selection of one or more of the above depicted components from one or more of the above depicted subsystems shown in FIG. 12. Components from the receiving information weather factors component group can be used in implementing execution of the one or more receiving information weather factors instructions i1145 of FIG. 30, can be used in performance of the receiving information weather factors electrical circuitry arrangement e1145 of FIG. 23, and/or can be used in otherwise fulfillment of the operation o1145. An exemplary non-transitory signal bearing medium version of the information storage subsystem s200 is depicted in FIG. 30 as bearing the one or more receiving information weather factors instructions i1145 that when executed will direct performance of the operation o1145. Furthermore, the receiving information weather factors electrical circuitry arrangement ("elec circ arrange") e1145, when activated, will perform the operation o1145. Also, the receiving information weather factors module m1145, when executed and/or activated, will direct performance of and/or perform the operation o1145. For instance, in one or more exemplary implementations, the one or more receiving information weather factors instructions i1145, when executed, direct performance of the operation o1145 in the illustrative depiction as follows, and/or the receiving information weather factors electrical circuitry arrangement e1145, when activated, performs the operation o1145 in the illustrative depiction as follows, and/or the receiving information weather factors module m1145, when executed and/or activated, directs performance of and/or performs the operation o1145 in the illustrative depiction as follows, and/or the operation o1145 is otherwise carried out in the illustrative depiction as follows: electronically receiving (e.g. GPRS, etc.) monitoring information (e.g. plowing, etc.) related to (e.g. market conditions, etc.) the one or more farming related production factors (e.g. weather forecast, etc.) involved with (e.g. necessitate, etc.) farming related production of (e.g. beet root harvesting, etc.) one or more ingestible materials (e.g. mopane worm, etc.) including at least in part one or more weather related factors involved with farming related ingestible material production (e.g. weather forecast, etc.).

Figure 58:
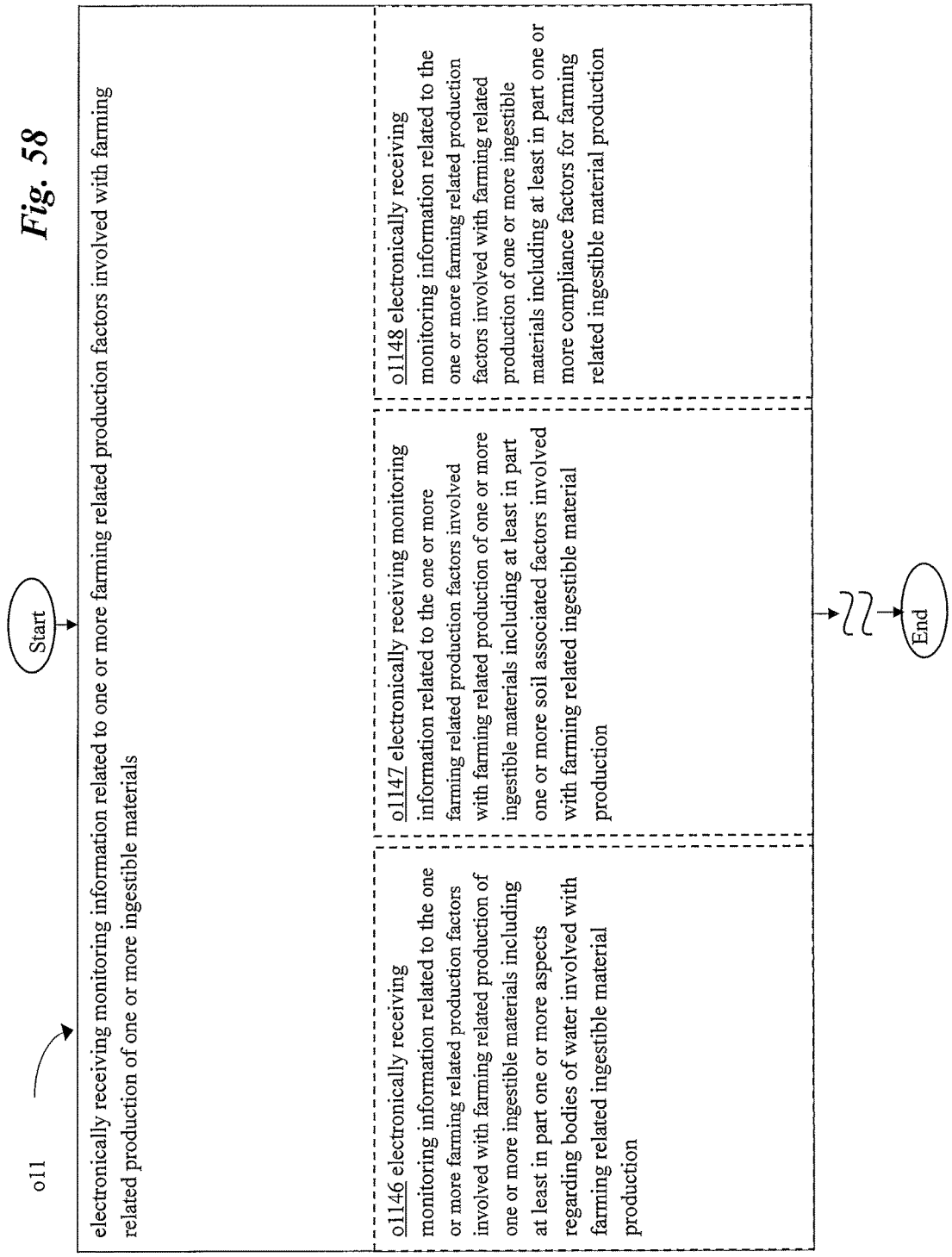
FIG. 58 is a high-level flowchart including exemplary implementations of operation o11 of FIG. 42.

In one or more implementations, as shown in FIG. 58, operation o11 includes an operation o1146 for electronically receiving monitoring information related to the one or more farming related production factors involved with farming related production of one or more ingestible materials including at least in part one or more aspects regarding bodies of water involved with farming related ingestible material production. Origination of an illustratively derived receiving information water bodies component group can be accomplished through skilled in the art design choice selection of one or more of the above depicted components from one or more of the above depicted subsystems shown in FIG. 12. Components from the receiving information water bodies component group can be used in implementing execution of the one or more receiving information water bodies instructions i1146 of FIG. 30, can be used in performance of the receiving information water bodies electrical circuitry arrangement e1146 of FIG. 23, and/or can be used in otherwise fulfillment of the operation o1146. An exemplary non-transitory signal bearing medium version of the information storage subsystem s200 is depicted in FIG. 30 as bearing the one or more receiving information water bodies instructions i1146 that when executed will direct performance of the operation o1146. Furthermore, the receiving information water bodies electrical circuitry arrangement ("elec circ arrange") e1146, when activated, will perform the operation o1146. Also, the receiving information water bodies module m1146, when executed and/or activated, will direct performance of and/or perform the operation o1146. For instance, in one or more exemplary implementations, the one or more receiving information water bodies instructions i1146, when executed, direct performance of the operation o1146 in the illustrative depiction as follows, and/or the receiving information water bodies electrical circuitry arrangement e1146, when activated, performs the operation o1146 in the illustrative depiction as follows, and/or the receiving information water bodies module m1146, when executed and/or activated, directs performance of and/or performs the operation o1146 in the illustrative depiction as follows, and/or the operation o1146 is otherwise carried out in the illustrative depiction as follows: electronically receiving (e.g. G, etc.) monitoring information (e.g. AVI file format, etc.) related to (e.g. health issues, etc.) the one or more farming related production factors (e.g. tide height, etc.) involved with (e.g. presuppose, etc.) farming related production of (e.g. oat harvesting, etc.) one or more ingestible materials (e.g. chapuline, etc.) including at least in part one or more aspects regarding bodies of water involved with farming related ingestible material production (e.g. tide height, etc.).

In one or more implementations, as shown in FIG. 58, operation o11 includes an operation o1147 for electronically receiving monitoring information related to the one or more farming related production factors involved with farming related production of one or more ingestible materials including at least in part one or more soil associated factors involved with farming related ingestible material production. Origination of an illustratively derived receiving information soil factors component group can be accomplished through skilled in the art design choice selection of one or more of the above depicted components from one or more of the above depicted subsystems shown in FIG. 12. Components from the receiving information soil factors component group can be used in implementing execution of the one or more receiving information soil factors instructions i1147 of FIG. 30, can be used in performance of the receiving information soil factors electrical circuitry arrangement e1147 of FIG. 23, and/or can be used in otherwise fulfillment of the operation o1147. An exemplary non-transitory signal bearing medium version of the information storage subsystem s200 is depicted in FIG. 30 as bearing the one or more receiving information soil factors instructions i1147 that when executed will direct performance of the operation o1147. Furthermore, the receiving information soil factors electrical circuitry arrangement ("elec circ arrange") e1147, when activated, will perform the operation o1147. Also, the receiving information soil factors module m1147, when executed and/or activated, will direct performance of and/or perform the operation o1147. For instance, in one or more exemplary implementations, the one or more receiving information soil factors instructions i1147, when executed, direct performance of the operation o1147 in the illustrative depiction as follows, and/or the receiving information soil factors electrical circuitry arrangement e1147, when activated, performs the operation o1147 in the illustrative depiction as follows, and/or the receiving information soil factors module m1147, when executed and/or activated, directs performance of and/or performs the operation o1147 in the illustrative depiction as follows, and/or the operation o1147 is otherwise carried out in the illustrative depiction as follows: electronically receiving (e.g. G4, etc.) monitoring information (e.g. MP3 file format, etc.) related to (e.g. illnesses, etc.) the one or more farming related production factors (e.g. soil composition, etc.) involved with (e.g. related to, etc.) farming related production of (e.g. carrot harvesting, etc.) one or more ingestible materials (e.g. ostrich meat, etc.) including at least in part one or more soil associated factors involved with farming related ingestible material production (e.g. soil composition, etc.).

In one or more implementations, as shown in FIG. 58, operation o11 includes an operation o1148 for electronically receiving monitoring information related to the one or more farming related production factors involved with farming related production of one or more ingestible materials including at least in part one or more compliance factors for farming related ingestible material production. Origination of an illustratively derived receiving information compliance factors component group can be accomplished through skilled in the art design choice selection of one or more of the above depicted components from one or more of the above depicted subsystems shown in FIG. 12. Components from the receiving information compliance factors component group can be used in implementing execution of the one or more receiving information compliance factors instructions i1148 of FIG. 30, can be used in performance of the receiving information compliance factors electrical circuitry arrangement e1148 of FIG. 23, and/or can be used in otherwise fulfillment of the operation o1148. An exemplary non-transitory signal bearing medium version of the information storage subsystem s200 is depicted in FIG. 30 as bearing the one or more receiving information compliance factors instructions i1148 that when executed will direct performance of the operation o1148. Furthermore, the receiving information compliance factors electrical circuitry arrangement ("elec circ arrange") e1148, when activated, will perform the operation o1148. Also, the receiving information compliance factors module m1148, when executed and/or activated, will direct performance of and/or perform the operation o1148. For instance, in one or more exemplary implementations, the one or more receiving information compliance factors instructions i1148, when executed, direct performance of the operation o1148 in the illustrative depiction as follows, and/or the receiving information compliance factors electrical circuitry arrangement e1148, when activated, performs the operation o1148 in the illustrative depiction as follows, and/or the receiving information compliance factors module m1148, when executed and/or activated, directs performance of and/or performs the operation o1148 in the illustrative depiction as follows, and/or the operation o1148 is otherwise carried out in the illustrative depiction as follows: electronically receiving (e.g. CD-ROM, etc.) monitoring information (e.g. audio listening, etc.) related to (e.g. farm management, etc.) the one or more farming related production factors (e.g. lack of record keeping, etc.) involved with (e.g. relationship, etc.) farming related production of (e.g. silk production, etc.) one or more ingestible materials (e.g. emu meat, etc.) including at least in part one or more compliance factors for farming related ingestible material production (e.g. proper record keeping methods, etc.).

Figure 59:
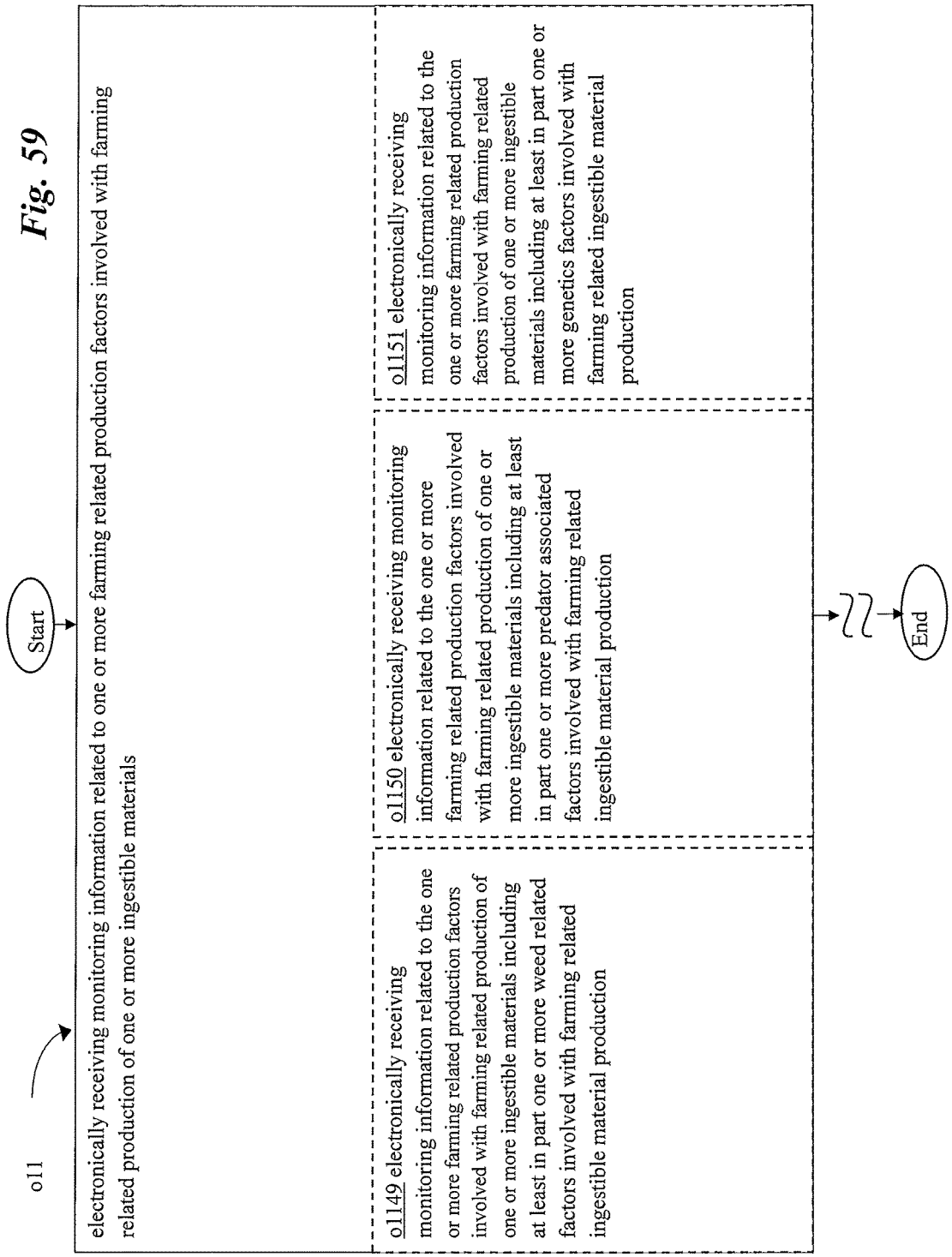
FIG. 59 is a high-level flowchart including exemplary implementations of operation o11 of FIG. 42.

In one or more implementations, as shown in FIG. 59, operation o11 includes an operation o1149 for electronically receiving monitoring information related to the one or more farming related production factors involved with farming related production of one or more ingestible materials including at least in part one or more weed related factors involved with farming related ingestible material production. Origination of an illustratively derived receiving information weed factors component group can be accomplished through skilled in the art design choice selection of one or more of the above depicted components from one or more of the above depicted subsystems shown in FIG. 12. Components from the receiving information weed factors component group can be used in implementing execution of the one or more receiving information weed factors instructions i1149 of FIG. 30, can be used in performance of the receiving information weed factors electrical circuitry arrangement e1149 of FIG. 23, and/or can be used in otherwise fulfillment of the operation o1149. An exemplary non-transitory signal bearing medium version of the information storage subsystem s200 is depicted in FIG. 30 as bearing the one or more receiving information weed factors instructions i1149 that when executed will direct performance of the operation o1149. Furthermore, the receiving information weed factors electrical circuitry arrangement ("elec circ arrange") e1149, when activated, will perform the operation o1149. Also, the receiving information weed factors module m1149, when executed and/or activated, will direct performance of and/or perform the operation o1149. For instance, in one or more exemplary implementations, the one or more receiving information weed factors instructions i1149, when executed, direct performance of the operation o1149 in the illustrative depiction as follows, and/or the receiving information weed factors electrical circuitry arrangement e1149, when activated, performs the operation o1149 in the illustrative depiction as follows, and/or the receiving information weed factors module m1149, when executed and/or activated, directs performance of and/or performs the operation o1149 in the illustrative depiction as follows, and/or the operation o1149 is otherwise carried out in the illustrative depiction as follows: electronically receiving (e.g. DVD, etc.) monitoring information (e.g. disobeying safety protocols, etc.) related to (e.g. current trends, etc.) the one or more farming related production factors (e.g. known weed species population, etc.) involved with (e.g. suggest, etc.) farming related production of (e.g. wool production, etc.) one or more ingestible materials (e.g. ostrich feathers, etc.) including at least in part one or more weed related factors involved with farming related ingestible material production (e.g. known weed species population, etc.).

In one or more implementations, as shown in FIG. 59, operation o11 includes an operation o1150 for electronically receiving monitoring information related to the one or more farming related production factors involved with farming related production of one or more ingestible materials including at least in part one or more predator associated factors involved with farming related ingestible material production. Origination of an illustratively derived receiving information predator factors component group can be accomplished through skilled in the art design choice selection of one or more of the above depicted components from one or more of the above depicted subsystems shown in FIG. 12. Components from the receiving information predator factors component group can be used in implementing execution of the one or more receiving information predator factors instructions i1150 of FIG. 30, can be used in performance of the receiving information predator factors electrical circuitry arrangement e1150 of FIG. 23, and/or can be used in otherwise fulfillment of the operation o1150. An exemplary non-transitory signal bearing medium version of the information storage subsystem s200 is depicted in FIG. 30 as bearing the one or more receiving information predator factors instructions i1150 that when executed will direct performance of the operation o1150. Furthermore, the receiving information predator factors electrical circuitry arrangement ("elec circ arrange") e1150, when activated, will perform the operation o1150. Also, the receiving information predator factors module m1150, when executed and/or activated, will direct performance of and/or perform the operation o1150. For instance, in one or more exemplary implementations, the one or more receiving information predator factors instructions i1150, when executed, direct performance of the operation o1150 in the illustrative depiction as follows, and/or the receiving information predator factors electrical circuitry arrangement e1150, when activated, performs the operation o1150 in the illustrative depiction as follows, and/or the receiving information predator factors module m1150, when executed and/or activated, directs performance of and/or performs the operation o1150 in the illustrative depiction as follows, and/or the operation o1150 is otherwise carried out in the illustrative depiction as follows: electronically receiving (e.g. hard drive, etc.) monitoring information (e.g. wind speed, etc.) related to (e.g. local laws, etc.) the one or more farming related production factors (e.g. estimated rat population, etc.) involved with (e.g. tangle, etc.) farming related production of (e.g. lentil harvesting, etc.) one or more ingestible materials (e.g. sheep cheese, etc.) including at least in part one or more predator associated factors involved with farming related ingestible material production (e.g. estimated fox population, etc.).

In one or more implementations, as shown in FIG. 59, operation o11 includes an operation o1151 for electronically receiving monitoring information related to the one or more farming related production factors involved with farming related production of one or more ingestible materials including at least in part one or more genetics factors involved with farming related ingestible material production. Origination of an illustratively derived receiving information genetics factors component group can be accomplished through skilled in the art design choice selection of one or more of the above depicted components from one or more of the above depicted subsystems shown in FIG. 12. Components from the receiving information genetics factors component group can be used in implementing execution of the one or more receiving information genetics factors instructions i1151 of FIG. 30, can be used in performance of the receiving information genetics factors electrical circuitry arrangement e1151 of FIG. 23, and/or can be used in otherwise fulfillment of the operation o1151. An exemplary non-transitory signal bearing medium version of the information storage subsystem s200 is depicted in FIG. 30 as bearing the one or more receiving information genetics factors instructions i1151 that when executed will direct performance of the operation o1151. Furthermore, the receiving information genetics factors electrical circuitry arrangement ("elec circ arrange") e1151, when activated, will perform the operation o1151. Also, the receiving information genetics factors module m1151, when executed and/or activated, will direct performance of and/or perform the operation o1151. For instance, in one or more exemplary implementations, the one or more receiving information genetics factors instructions i1151, when executed, direct performance of the operation o1151 in the illustrative depiction as follows, and/or the receiving information genetics factors electrical circuitry arrangement e1151, when activated, performs the operation o1151 in the illustrative depiction as follows, and/or the receiving information genetics factors module m1151, when executed and/or activated, directs performance of and/or performs the operation o1151 in the illustrative depiction as follows, and/or the operation o1151 is otherwise carried out in the illustrative depiction as follows: electronically receiving (e.g. wifi, etc.) monitoring information (e.g. wind direction, etc.) related to (e.g. technology, etc.) the one or more farming related production factors (e.g. genetic code of current crop, etc.) involved with (e.g. exclude, etc.) farming related production of (e.g. flax growing, etc.) one or more ingestible materials (e.g. feed grain, etc.) including at least in part one or more genetics factors involved with farming related ingestible material production (e.g. genetic code of current crop, etc.).

Figure 60:
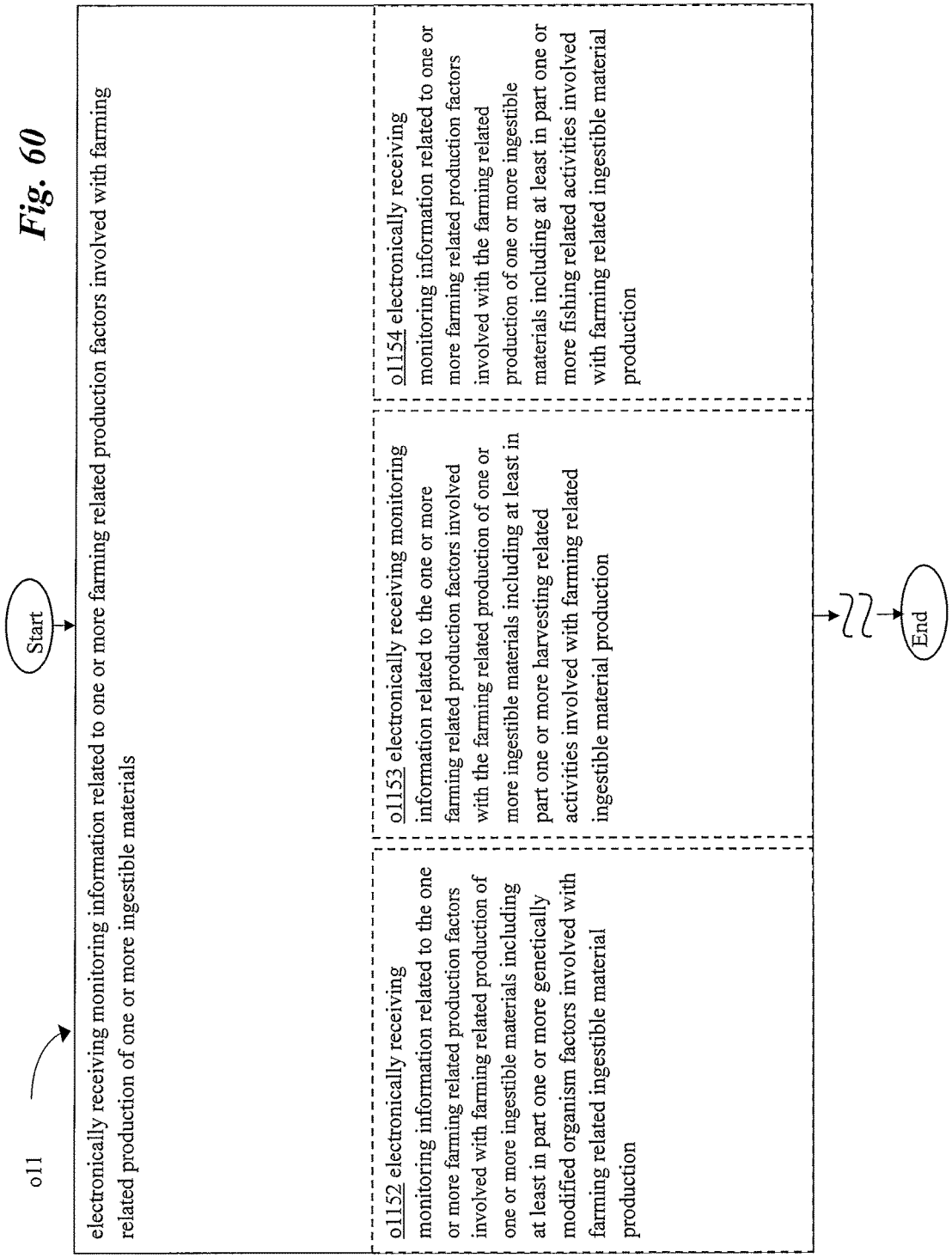
FIG. 60 is a high-level flowchart including exemplary implementations of operation o11 of FIG. 42.

In one or more implementations, as shown in FIG. 60, operation o11 includes an operation o1152 for electronically receiving monitoring information related to the one or more farming related production factors involved with farming related production of one or more ingestible materials including at least in part one or more genetically modified organism factors involved with farming related ingestible material production. Origination of an illustratively derived receiving information GMO factors component group can be accomplished through skilled in the art design choice selection of one or more of the above depicted components from one or more of the above depicted subsystems shown in FIG. 12. Components from the receiving information GMO factors component group can be used in implementing execution of the one or more receiving information GMO factors instructions i1152 of FIG. 30, can be used in performance of the receiving information GMO factors electrical circuitry arrangement e1152 of FIG. 23, and/or can be used in otherwise fulfillment of the operation o1152. An exemplary non-transitory signal bearing medium version of the information storage subsystem s200 is depicted in FIG. 30 as bearing the one or more receiving information GMO factors instructions i1152 that when executed will direct performance of the operation o1152. Furthermore, the receiving information GMO factors electrical circuitry arrangement ("elec circ arrange") e1152, when activated, will perform the operation o1152. Also, the receiving information GMO factors module m1152, when executed and/or activated, will direct performance of and/or perform the operation o1152. For instance, in one or more exemplary implementations, the one or more receiving information GMO factors instructions i1152, when executed, direct performance of the operation o1152 in the illustrative depiction as follows, and/or the receiving information GMO factors electrical circuitry arrangement e1152, when activated, performs the operation o1152 in the illustrative depiction as follows, and/or the receiving information GMO factors module m1152, when executed and/or activated, directs performance of and/or performs the operation o1152 in the illustrative depiction as follows, and/or the operation o1152 is otherwise carried out in the illustrative depiction as follows: electronically receiving (e.g. laptop entry, etc.) monitoring information (e.g. UV index, etc.) related to (e.g. season, etc.) the one or more farming related production factors (e.g. family tree of heirloom seeds used, etc.) involved with (e.g. bound, etc.) farming related production of (e.g. squash cultivation, etc.) one or more ingestible materials (e.g. beet pulp, etc.) including at least in part one or more genetically modified organism factors involved with farming related ingestible material production (e.g. genome sequence of seeds used, etc.).

In one or more implementations, as shown in FIG. 60, operation o11 includes an operation o1153 for electronically receiving monitoring information related to the one or more farming related production factors involved with the farming related production of one or more ingestible materials including at least in part one or more harvesting related activities involved with farming related ingestible material production. Origination of an illustratively derived receiving information harvesting activities component group can be accomplished through skilled in the art design choice selection of one or more of the above depicted components from one or more of the above depicted subsystems shown in FIG. 12. Components from the receiving information harvesting activities component group can be used in implementing execution of the one or more receiving information harvesting activities instructions i1153 of FIG. 30, can be used in performance of the receiving information harvesting activities electrical circuitry arrangement e1153 of FIG. 23, and/or can be used in otherwise fulfillment of the operation o1153. An exemplary non-transitory signal bearing medium version of the information storage subsystem s200 is depicted in FIG. 30 as bearing the one or more receiving information harvesting activities instructions i1153 that when executed will direct performance of the operation o1153. Furthermore, the receiving information harvesting activities electrical circuitry arrangement ("elec circ arrange") e1153, when activated, will perform the operation o1153. Also, the receiving information harvesting activities module m1153, when executed and/or activated, will direct performance of and/or perform the operation o1153. For instance, in one or more exemplary implementations, the one or more receiving information harvesting activities instructions i1153, when executed, direct performance of the operation o1153 in the illustrative depiction as follows, and/or the receiving information harvesting activities electrical circuitry arrangement e1153, when activated, performs the operation o1153 in the illustrative depiction as follows, and/or the receiving information harvesting activities module m1153, when executed and/or activated, directs performance of and/or performs the operation o1153 in the illustrative depiction as follows, and/or the operation o1153 is otherwise carried out in the illustrative depiction as follows: electronically receiving (e.g. RFID scan, etc.) monitoring information (e.g. carbon dioxide sensor, etc.) related to (e.g. stock market, etc.) the one or more farming related production factors (e.g. quality of feed water, etc.) involved with (e.g. requiring, etc.) the farming related production of (e.g. grain harvesting, etc.) one or more ingestible materials (e.g. water, etc.) including at least in part one or more harvesting related activities involved with farming related ingestible material production (e.g. grain harvesting, etc.).

In one or more implementations, as shown in FIG. 60, operation o11 includes an operation o1154 for electronically receiving monitoring information related to one or more farming related production factors involved with the farming related production of one or more ingestible materials including at least in part one or more fishing related activities involved with farming related ingestible material production. Origination of an illustratively derived receiving information fishing activities component group can be accomplished through skilled in the art design choice selection of one or more of the above depicted components from one or more of the above depicted subsystems shown in FIG. 12. Components from the receiving information fishing activities component group can be used in implementing execution of the one or more receiving information fishing activities instructions i1154 of FIG. 30, can be used in performance of the receiving information fishing activities electrical circuitry arrangement e1154 of FIG. 23, and/or can be used in otherwise fulfillment of the operation o1154. An exemplary non-transitory signal bearing medium version of the information storage subsystem s200 is depicted in FIG. 30 as bearing the one or more receiving information fishing activities instructions i1154 that when executed will direct performance of the operation o1154. Furthermore, the receiving information fishing activities electrical circuitry arrangement ("elec circ arrange") e1154, when activated, will perform the operation o1154. Also, the receiving information fishing activities module m1154, when executed and/or activated, will direct performance of and/or perform the operation o1154. For instance, in one or more exemplary implementations, the one or more receiving information fishing activities instructions i1154, when executed, direct performance of the operation o1154 in the illustrative depiction as follows, and/or the receiving information fishing activities electrical circuitry arrangement e1154, when activated, performs the operation o1154 in the illustrative depiction as follows, and/or the receiving information fishing activities module m1154, when executed and/or activated, directs performance of and/or performs the operation o1154 in the illustrative depiction as follows, and/or the operation o1154 is otherwise carried out in the illustrative depiction as follows: electronically receiving (e.g. ethernet, etc.) monitoring information (e.g. water usage, etc.) related to (e.g. news, etc.) one or more farming related production factors (e.g. total cost of harvest, etc.) involved with (e.g. enveloped, etc.) the farming related production of (e.g. salmon fishing, etc.) one or more ingestible materials (e.g. meal worms, etc.) including at least in part one or more fishing related activities involved with farming related ingestible material production (e.g. salmon fishing, etc.).

Figure 61:
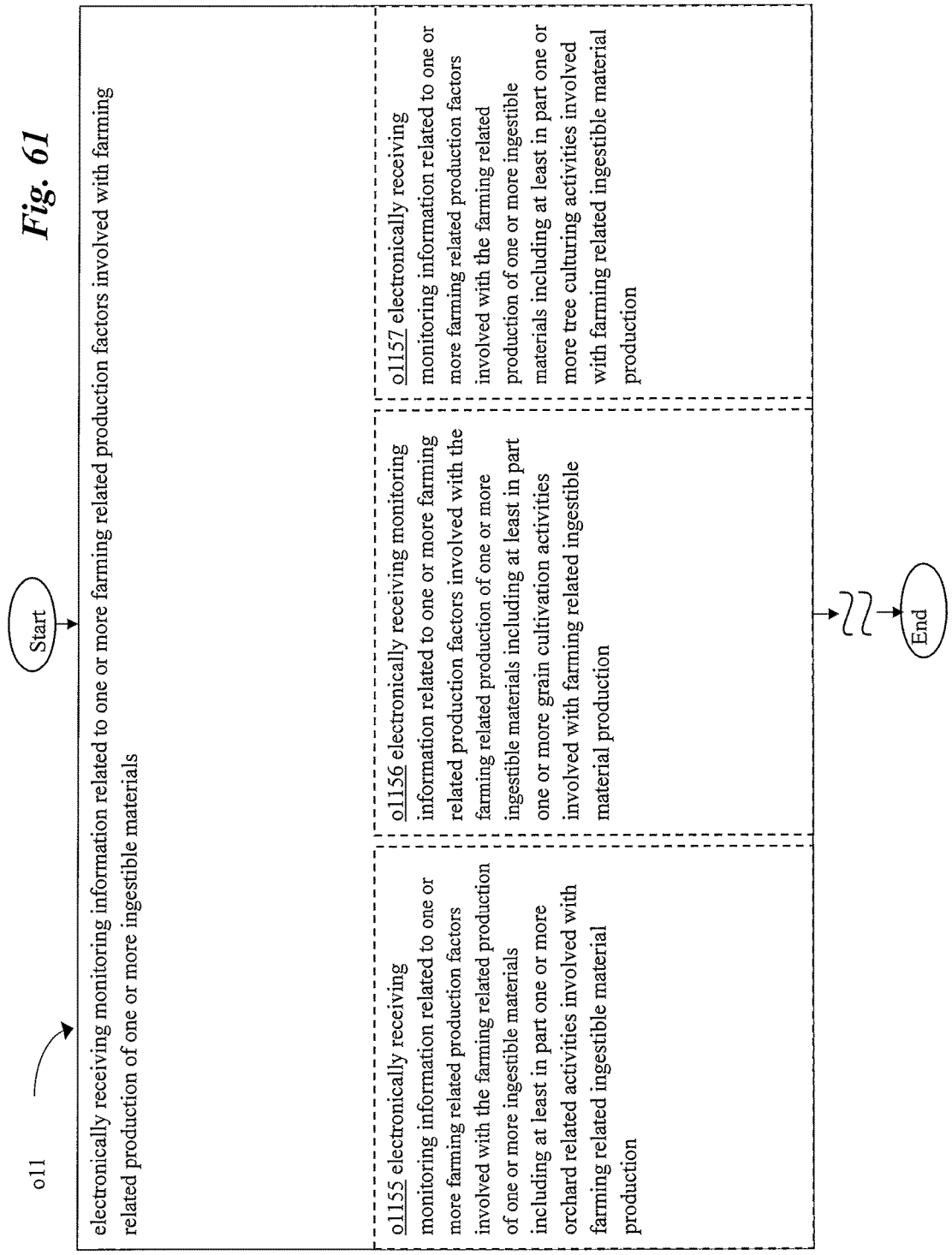
FIG. 61 is a high-level flowchart including exemplary implementations of operation o11 of FIG. 42.

In one or more implementations, as shown in FIG. 61, operation o11 includes an operation o1155 for electronically receiving monitoring information related to one or more farming related production factors involved with the farming related production of one or more ingestible materials including at least in part one or more orchard related activities involved with farming related ingestible material production. Origination of an illustratively derived receiving information orchard activities component group can be accomplished through skilled in the art design choice selection of one or more of the above depicted components from one or more of the above depicted subsystems shown in FIG. 12. Components from the receiving information orchard activities component group can be used in implementing execution of the one or more receiving information orchard activities instructions i1155 of FIG. 30, can be used in performance of the receiving information orchard activities electrical circuitry arrangement e1155 of FIG. 23, and/or can be used in otherwise fulfillment of the operation o1155. An exemplary non-transitory signal bearing medium version of the information storage subsystem s200 is depicted in FIG. 30 as bearing the one or more receiving information orchard activities instructions i1155 that when executed will direct performance of the operation o1155. Furthermore, the receiving information orchard activities electrical circuitry arrangement ("elec circ arrange") e1155, when activated, will perform the operation o1155. Also, the receiving information orchard activities module m1155, when executed and/or activated, will direct performance of and/or perform the operation o1155. For instance, in one or more exemplary implementations, the one or more receiving information orchard activities instructions i1155, when executed, direct performance of the operation o1155 in the illustrative depiction as follows, and/or the receiving information orchard activities electrical circuitry arrangement e1155, when activated, performs the operation o1155 in the illustrative depiction as follows, and/or the receiving information orchard activities module m1155, when executed and/or activated, directs performance of and/or performs the operation o1155 in the illustrative depiction as follows, and/or the operation o1155 is otherwise carried out in the illustrative depiction as follows: electronically receiving (e.g. UPC scan, etc.) monitoring information (e.g. natural gas usage, etc.) related to (e.g. time of day, etc.) one or more farming related production factors (e.g. shade tree type, etc.) involved with (e.g. envelope, etc.) the farming related production of (e.g. apple harvesting, etc.) one or more ingestible materials (e.g. parsnip, etc.) including at least in part one or more orchard related activities involved with farming related ingestible material production (e.g. apple harvesting, etc.).

In one or more implementations, as shown in FIG. 61, operation o11 includes an operation o1156 for electronically receiving monitoring information related to one or more farming related production factors involved with the farming related production of one or more ingestible materials including at least in part one or more grain cultivation activities involved with farming related ingestible material production. Origination of an illustratively derived receiving information grain activities component group can be accomplished through skilled in the art design choice selection of one or more of the above depicted components from one or more of the above depicted subsystems shown in FIG. 12. Components from the receiving information grain activities component group can be used in implementing execution of the one or more receiving information grain activities instructions i1156 of FIG. 30, can be used in performance of the receiving information grain activities electrical circuitry arrangement e1156 of FIG. 23, and/or can be used in otherwise fulfillment of the operation o1156. An exemplary non-transitory signal bearing medium version of the information storage subsystem s200 is depicted in FIG. 30 as bearing the one or more receiving information grain activities instructions i1156 that when executed will direct performance of the operation o1156. Furthermore, the receiving information grain activities electrical circuitry arrangement ("elec circ arrange") e1156, when activated, will perform the operation o1156. Also, the receiving information grain activities module m1156, when executed and/or activated, will direct performance of and/or perform the operation o1156. For instance, in one or more exemplary implementations, the one or more receiving information grain activities instructions i1156, when executed, direct performance of the operation o1156 in the illustrative depiction as follows, and/or the receiving information grain activities electrical circuitry arrangement e1156, when activated, performs the operation o1156 in the illustrative depiction as follows, and/or the receiving information grain activities module m1156, when executed and/or activated, directs performance of and/or performs the operation o1156 in the illustrative depiction as follows, and/or the operation o1156 is otherwise carried out in the illustrative depiction as follows: electronically receiving (e.g. HTML code, etc.) monitoring information (e.g. methane gas usage, etc.) related to (e.g. time of year, etc.) one or more farming related production factors (e.g. acreage available, etc.) involved with (e.g. associate with, etc.) the farming related production of (e.g. wheat threshing, etc.) one or more ingestible materials (e.g. chicken feathers, etc.) including at least in part one or more grain cultivation activities involved with farming related ingestible material production (e.g. wheat threshing, etc.).

In one or more implementations, as shown in FIG. 61, operation o11 includes an operation o1157 for electronically receiving monitoring information related to one or more farming related production factors involved with the farming related production of one or more ingestible materials including at least in part one or more tree culturing activities involved with farming related ingestible material production. Origination of an illustratively derived receiving information tree activities component group can be accomplished through skilled in the art design choice selection of one or more of the above depicted components from one or more of the above depicted subsystems shown in FIG. 12. Components from the receiving information tree activities component group can be used in implementing execution of the one or more receiving information tree activities instructions i1157 of FIG. 30, can be used in performance of the receiving information tree activities electrical circuitry arrangement e1157 of FIG. 23, and/or can be used in otherwise fulfillment of the operation o1157. An exemplary non-transitory signal bearing medium version of the information storage subsystem s200 is depicted in FIG. 30 as bearing the one or more receiving information tree activities instructions i1157 that when executed will direct performance of the operation o1157. Furthermore, the receiving information tree activities electrical circuitry arrangement ("elec circ arrange") e1157, when activated, will perform the operation o1157. Also, the receiving information tree activities module m1157, when executed and/or activated, will direct performance of and/or perform the operation o1157. For instance, in one or more exemplary implementations, the one or more receiving information tree activities instructions i1157, when executed, direct performance of the operation o1157 in the illustrative depiction as follows, and/or the receiving information tree activities electrical circuitry arrangement e1157, when activated, performs the operation o1157 in the illustrative depiction as follows, and/or the receiving information tree activities module m1157, when executed and/or activated, directs performance of and/or performs the operation o1157 in the illustrative depiction as follows, and/or the operation o1157 is otherwise carried out in the illustrative depiction as follows: electronically receiving (e.g. MMS, etc.) monitoring information (e.g. MPEG file format, etc.) related to (e.g. working conditions, etc.) one or more farming related production factors (e.g. corral dimensions, etc.) involved with (e.g. embroil, etc.) the farming related production of (e.g. almond harvesting, etc.) one or more ingestible materials (e.g. hoofs, etc.) including at least in part one or more tree culturing activities involved with farming related ingestible material production (e.g. almond harvesting, etc.).

Figure 62:
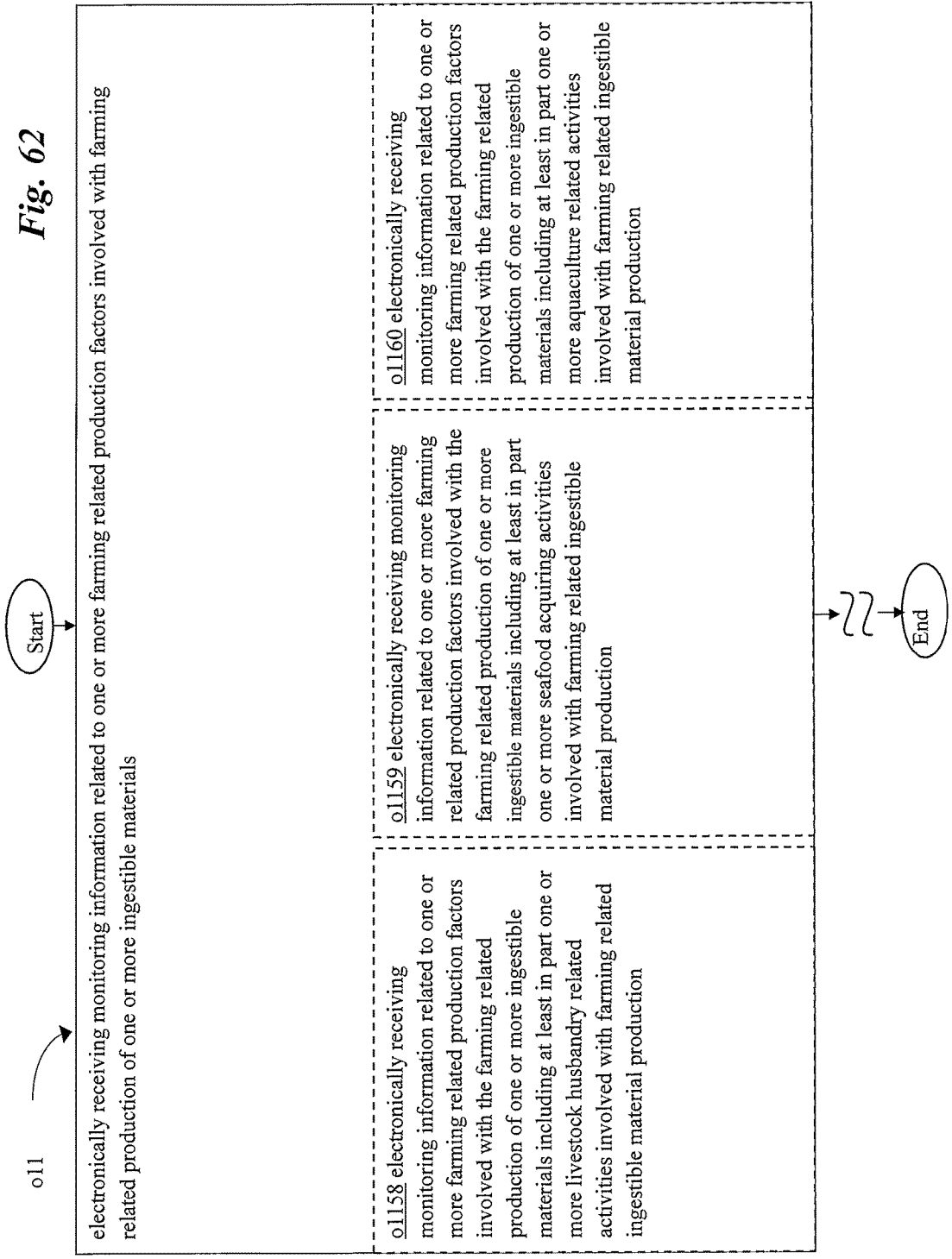
FIG. 62 is a high-level flowchart including exemplary implementations of operation o11 of FIG. 42.

In one or more implementations, as shown in FIG. 62, operation o11 includes an operation o1158 for electronically receiving monitoring information related to one or more farming related production factors involved with the farming related production of one or more ingestible materials including at least in part one or more livestock husbandry related activities involved with farming related ingestible material production. Origination of an illustratively derived receiving information livestock activities component group can be accomplished through skilled in the art design choice selection of one or more of the above depicted components from one or more of the above depicted subsystems shown in FIG. 12. Components from the receiving information livestock activities component group can be used in implementing execution of the one or more receiving information livestock activities instructions i1158 of FIG. 30, can be used in performance of the receiving information livestock activities electrical circuitry arrangement e1158 of FIG. 23, and/or can be used in otherwise fulfillment of the operation o1158. An exemplary non-transitory signal bearing medium version of the information storage subsystem s200 is depicted in FIG. 30 as bearing the one or more receiving information livestock activities instructions i1158 that when executed will direct performance of the operation o1158. Furthermore, the receiving information livestock activities electrical circuitry arrangement ("elec circ arrange") e1158, when activated, will perform the operation o1158. Also, the receiving information livestock activities module m1158, when executed and/or activated, will direct performance of and/or perform the operation o1158. For instance, in one or more exemplary implementations, the one or more receiving information livestock activities instructions i1158, when executed, direct performance of the operation o1158 in the illustrative depiction as follows, and/or the receiving information livestock activities electrical circuitry arrangement e1158, when activated, performs the operation o1158 in the illustrative depiction as follows, and/or the receiving information livestock activities module m1158, when executed and/or activated, directs performance of and/or performs the operation o1158 in the illustrative depiction as follows, and/or the operation o1158 is otherwise carried out in the illustrative depiction as follows: electronically receiving (e.g. 256-bit AES, etc.) monitoring information (e.g. WAV file format, etc.) related to (e.g. labor force, etc.) one or more farming related production factors (e.g. lease duration of equipment, etc.) involved with (e.g. take in, etc.) the farming related production of (e.g. cow butchering, etc.) one or more ingestible materials (e.g. leather, etc.) including at least in part one or more livestock husbandry related activities involved with farming related ingestible material production (e.g. cow butchering, etc.).

In one or more implementations, as shown in FIG. 62, operation o11 includes an operation o1159 for electronically receiving monitoring information related to one or more farming related production factors involved with the farming related production of one or more ingestible materials including at least in part one or more seafood acquiring activities involved with farming related ingestible material production. Origination of an illustratively derived receiving information seafood activities component group can be accomplished through skilled in the art design choice selection of one or more of the above depicted components from one or more of the above depicted subsystems shown in FIG. 12. Components from the receiving information seafood activities component group can be used in implementing execution of the one or more receiving information seafood activities instructions i1159 of FIG. 30, can be used in performance of the receiving information seafood activities electrical circuitry arrangement e1159 of FIG. 23, and/or can be used in otherwise fulfillment of the operation o1159. An exemplary non-transitory signal bearing medium version of the information storage subsystem s200 is depicted in FIG. 30 as bearing the one or more receiving information seafood activities instructions i1159 that when executed will direct performance of the operation o1159. Furthermore, the receiving information seafood activities electrical circuitry arrangement ("elec circ arrange") e1159, when activated, will perform the operation o1159. Also, the receiving information seafood activities module m1159, when executed and/or activated, will direct performance of and/or perform the operation o1159. For instance, in one or more exemplary implementations, the one or more receiving information seafood activities instructions i1159, when executed, direct performance of the operation o1159 in the illustrative depiction as follows, and/or the receiving information seafood activities electrical circuitry arrangement e1159, when activated, performs the operation o1159 in the illustrative depiction as follows, and/or the receiving information seafood activities module m1159, when executed and/or activated, directs performance of and/or performs the operation o1159 in the illustrative depiction as follows, and/or the operation o1159 is otherwise carried out in the illustrative depiction as follows: electronically receiving (e.g. compact flash, etc.) monitoring information (e.g. visual sight, etc.) related to (e.g. transportation, etc.) one or more farming related production factors (e.g. efficiency of tilling, etc.) involved with (e.g. comprised of, etc.) the farming related production of (e.g. tuna canning, etc.) one or more ingestible materials (e.g. fur, etc.) including at least in part one or more seafood acquiring activities involved with farming related ingestible material production (e.g. tuna fishing, etc.).

In one or more implementations, as shown in FIG. 62, operation o11 includes an operation o1160 for electronically receiving monitoring information related to one or more farming related production factors involved with the farming related production of one or more ingestible materials including at least in part one or more aquaculture related activities involved with farming related ingestible material production. Origination of an illustratively derived receiving information aquaculture activities component group can be accomplished through skilled in the art design choice selection of one or more of the above depicted components from one or more of the above depicted subsystems shown in FIG. 12. Components from the receiving information aquaculture activities component group can be used in implementing execution of the one or more receiving information aquaculture activities instructions i1160 of FIG. 31, can be used in performance of the receiving information aquaculture activities electrical circuitry arrangement e1160 of FIG. 24, and/or can be used in otherwise fulfillment of the operation o1160. An exemplary non-transitory signal bearing medium version of the information storage subsystem s200 is depicted in FIG. 31 as bearing the one or more receiving information aquaculture activities instructions i1160 that when executed will direct performance of the operation o1160. Furthermore, the receiving information aquaculture activities electrical circuitry arrangement ("elec circ arrange") e1160, when activated, will perform the operation o1160. Also, the receiving information aquaculture activities module m1160, when executed and/or activated, will direct performance of and/or perform the operation o1160. For instance, in one or more exemplary implementations, the one or more receiving information aquaculture activities instructions i1160, when executed, direct performance of the operation o1160 in the illustrative depiction as follows, and/or the receiving information aquaculture activities electrical circuitry arrangement e1160, when activated, performs the operation o1160 in the illustrative depiction as follows, and/or the receiving information aquaculture activities module m1160, when executed and/or activated, directs performance of and/or performs the operation o1160 in the illustrative depiction as follows, and/or the operation o1160 is otherwise carried out in the illustrative depiction as follows: electronically receiving (e.g. push-based, etc.) monitoring information (e.g. following safety protocols, etc.) related to (e.g. weather, etc.) one or more farming related production factors (e.g. land terrain, etc.) involved with (e.g. comprehend, etc.) the farming related production of (e.g. oyster harvesting, etc.) one or more ingestible materials (e.g. wool, etc.) including at least in part one or more aquaculture related activities involved with farming related ingestible material production (e.g. oyster harvesting, etc.).

In one or more implementations, as shown in FIG. 63, operation o11 includes an operation o1161 for electronically receiving monitoring information related to one or more farming related production factors involved with the farming related production of one or more ingestible materials including at least in part one or more microorganism culturing activities involved with farming related ingestible material production. Origination of an illustratively derived receiving information microorganism activities component group can be accomplished through skilled in the art design choice selection of one or more of the above depicted components from one or more of the above depicted subsystems shown in FIG. 12. Components from the receiving information microorganism activities component group can be used in implementing execution of the one or more receiving information microorganism activities instructions i1161 of FIG. 31, can be used in performance of the receiving information microorganism activities electrical circuitry arrangement e1161 of FIG. 24, and/or can be used in otherwise fulfillment of the operation o1161. An exemplary non-transitory signal bearing medium version of the information storage subsystem s200 is depicted in FIG. 31 as bearing the one or more receiving information microorganism activities instructions i1161 that when executed will direct performance of the operation o1161. Furthermore, the receiving information microorganism activities electrical circuitry arrangement ("elec circ arrange") e1161, when activated, will perform the operation o1161. Also, the receiving information microorganism activities module m1161, when executed and/or activated, will direct performance of and/or perform the operation o1161. For instance, in one or more exemplary implementations, the one or more receiving information microorganism activities instructions i1161, when executed, direct performance of the operation o1161 in the illustrative depiction as follows, and/or the receiving information microorganism activities electrical circuitry arrangement e1161, when activated, performs the operation o1161 in the illustrative depiction as follows, and/or the receiving information microorganism activities module m1161, when executed and/or activated, directs performance of and/or performs the operation o1161 in the illustrative depiction as follows, and/or the operation o1161 is otherwise carried out in the illustrative depiction as follows: electronically receiving (e.g. SMTP server, etc.) monitoring information (e.g. document forgery, etc.) related to (e.g. inventory supply, etc.) one or more farming related production factors (e.g. range area, etc.) involved with (e.g. calculate, etc.) the farming related production of (e.g. chanterelle foraging, etc.) one or more ingestible materials (e.g. whole king crab, etc.) including at least in part one or more microorganism culturing activities involved with farming related ingestible material production (e.g. chanterelle foraging, etc.).

In one or more implementations, as shown in FIG. 63, operation o11 includes an operation o1162 for electronically receiving monitoring information related to one or more farming related production factors involved with the farming related production of one or more ingestible materials including at least in part one or more vegetable gardening related activities involved with farming related ingestible material production. Origination of an illustratively derived receiving information vegetable activities component group can be accomplished through skilled in the art design choice selection of one or more of the above depicted components from one or more of the above depicted subsystems shown in FIG. 12. Components from the receiving information vegetable activities component group can be used in implementing execution of the one or more receiving information vegetable activities instructions i1162 of FIG. 31, can be used in performance of the receiving information vegetable activities electrical circuitry arrangement e1162 of FIG. 24, and/or can be used in otherwise fulfillment of the operation o1162. An exemplary non-transitory signal bearing medium version of the information storage subsystem s200 is depicted in FIG. 31 as bearing the one or more receiving information vegetable activities instructions i1162 that when executed will direct performance of the operation o1162. Furthermore, the receiving information vegetable activities electrical circuitry arrangement ("elec circ arrange") e1162, when activated, will perform the operation o1162. Also, the receiving information vegetable activities module m1162, when executed and/or activated, will direct performance of and/or perform the operation o1162. For instance, in one or more exemplary implementations, the one or more receiving information vegetable activities instructions i1162, when executed, direct performance of the operation o1162 in the illustrative depiction as follows, and/or the receiving information vegetable activities electrical circuitry arrangement e1162, when activated, performs the operation o1162 in the illustrative depiction as follows, and/or the receiving information vegetable activities module m1162, when executed and/or activated, directs performance of and/or performs the operation o1162 in the illustrative depiction as follows, and/or the operation o1162 is otherwise carried out in the illustrative depiction as follows: electronically receiving (e.g. radio wave, etc.) monitoring information (e.g. scheduled feeding, etc.) related to (e.g. interest rates, etc.) one or more farming related production factors (e.g. range schedule, etc.) involved with (e.g. affected, etc.) the farming related production of (e.g. broccoli harvesting, etc.) one or more ingestible materials (e.g. cellulous, etc.) including at least in part one or more vegetable gardening related activities involved with farming related ingestible material production (e.g. broccoli harvesting, etc.).

In one or more implementations, as shown in FIG. 63, operation o11 includes an operation o1163 for electronically receiving monitoring information related to one or more farming related production factors involved with the farming related production of one or more ingestible materials including at least in part one or more butchering related activities involved with farming related ingestible material production. Origination of an illustratively derived receiving information butchering activities component group can be accomplished through skilled in the art design choice selection of one or more of the above depicted components from one or more of the above depicted subsystems shown in FIG. 12. Components from the receiving information butchering activities component group can be used in implementing execution of the one or more receiving information butchering activities instructions i1163 of FIG. 31, can be used in performance of the receiving information butchering activities electrical circuitry arrangement e1163 of FIG. 24, and/or can be used in otherwise fulfillment of the operation o1163. An exemplary non-transitory signal bearing medium version of the information storage subsystem s200 is depicted in FIG. 31 as bearing the one or more receiving information butchering activities instructions i1163 that when executed will direct performance of the operation o1163. Furthermore, the receiving information butchering activities electrical circuitry arrangement ("elec circ arrange") e1163, when activated, will perform the operation o1163. Also, the receiving information butchering activities module m1163, when executed and/or activated, will direct performance of and/or perform the operation o1163. For instance, in one or more exemplary implementations, the one or more receiving information butchering activities instructions i1163, when executed, direct performance of the operation o1163 in the illustrative depiction as follows, and/or the receiving information butchering activities electrical circuitry arrangement e1163, when activated, performs the operation o1163 in the illustrative depiction as follows, and/or the receiving information butchering activities module m1163, when executed and/or activated, directs performance of and/or performs the operation o1163 in the illustrative depiction as follows, and/or the operation o1163 is otherwise carried out in the illustrative depiction as follows: electronically receiving (e.g. infra-red, etc.) monitoring information (e.g. temperature, etc.) related to (e.g. working capital, etc.) one or more farming related production factors (e.g. livestock inventory, etc.) involved with (e.g. affecting, etc.) the farming related production of (e.g. swine butchering, etc.) one or more ingestible materials (e.g. wood, etc.) including at least in part one or more butchering related activities involved with farming related ingestible material production (e.g. swine butchering, etc.).

Figure 64:
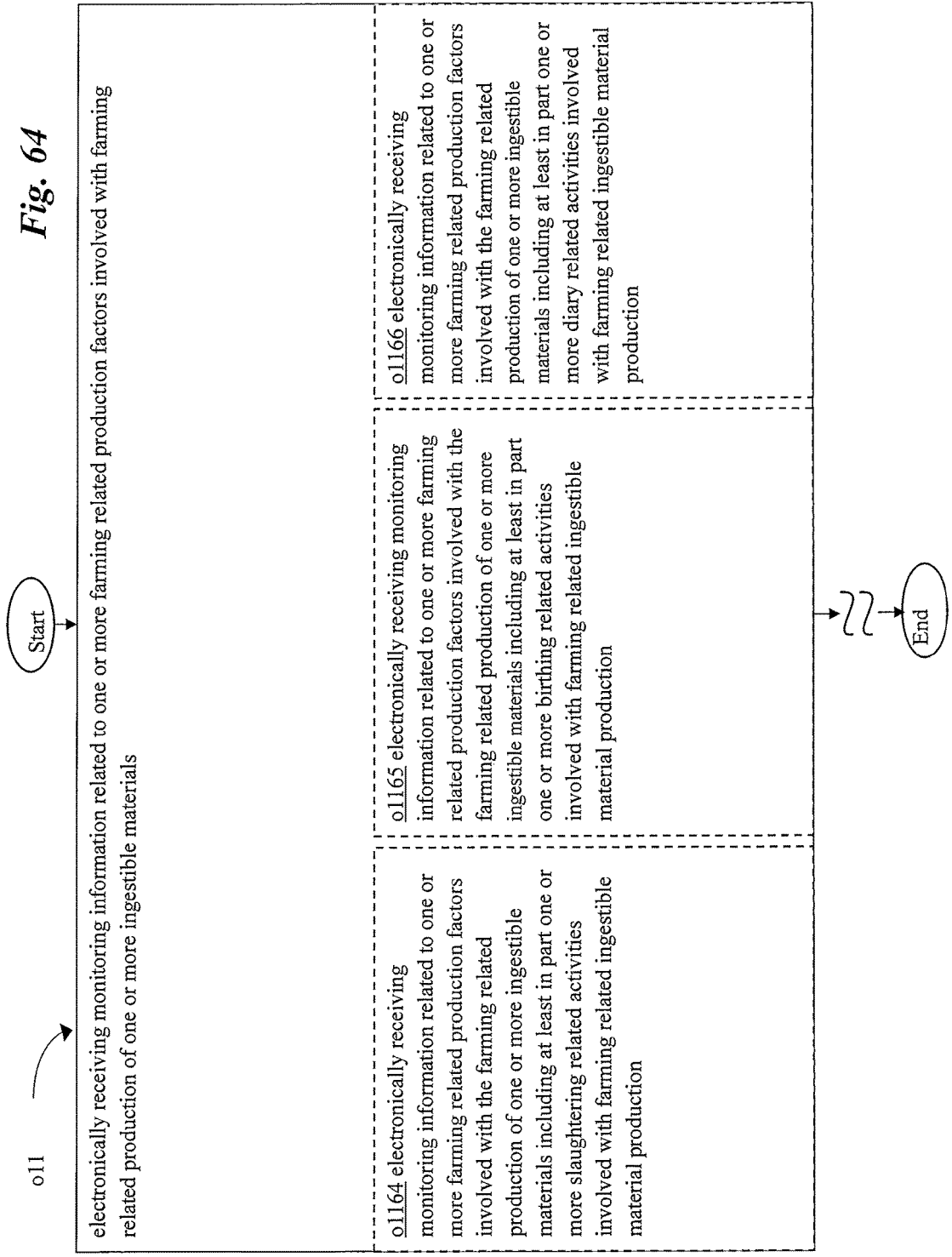
FIG. 64 is a high-level flowchart including exemplary implementations of operation o11 of FIG. 42.

In one or more implementations, as shown in FIG. 64, operation o11 includes an operation o1164 for electronically receiving monitoring information related to one or more farming related production factors involved with the farming related production of one or more ingestible materials including at least in part one or more slaughtering related activities involved with farming related ingestible material production. Origination of an illustratively derived receiving information slaughtering activities component group can be accomplished through skilled in the art design choice selection of one or more of the above depicted components from one or more of the above depicted subsystems shown in FIG. 12. Components from the receiving information slaughtering activities component group can be used in implementing execution of the one or more receiving information slaughtering activities instructions i1164 of FIG. 31, can be used in performance of the receiving information slaughtering activities electrical circuitry arrangement e1164 of FIG. 24, and/or can be used in otherwise fulfillment of the operation o1164. An exemplary non-transitory signal bearing medium version of the information storage subsystem s200 is depicted in FIG. 31 as bearing the one or more receiving information slaughtering activities instructions i1164 that when executed will direct performance of the operation o1164. Furthermore, the receiving information slaughtering activities electrical circuitry arrangement ("elec circ arrange") e1164, when activated, will perform the operation o1164. Also, the receiving information slaughtering activities module m1164, when executed and/or activated, will direct performance of and/or perform the operation o1164. For instance, in one or more exemplary implementations, the one or more receiving information slaughtering activities instructions i1164, when executed, direct performance of the operation o1164 in the illustrative depiction as follows, and/or the receiving information slaughtering activities electrical circuitry arrangement e1164, when activated, performs the operation o1164 in the illustrative depiction as follows, and/or the receiving information slaughtering activities module m1164, when executed and/or activated, directs performance of and/or performs the operation o1164 in the illustrative depiction as follows, and/or the operation o1164 is otherwise carried out in the illustrative depiction as follows: electronically receiving (e.g. bluetooth, etc.) monitoring information (e.g. cold packing, etc.) related to (e.g. available credit, etc.) one or more farming related production factors (e.g. labor laws, etc.) involved with (e.g. argue, etc.) the farming related production of (e.g. turkey slaughtering, etc.) one or more ingestible materials (e.g. manure, etc.) including at least in part one or more slaughtering related activities involved with farming related ingestible material production (e.g. turkey slaughtering, etc.).

In one or more implementations, as shown in FIG. 64, operation o11 includes an operation o1165 for electronically receiving monitoring information related to one or more farming related production factors involved with the farming related production of one or more ingestible materials including at least in part one or more birthing related activities involved with farming related ingestible material production. Origination of an illustratively derived receiving information birthing activities component group can be accomplished through skilled in the art design choice selection of one or more of the above depicted components from one or more of the above depicted subsystems shown in FIG. 12. Components from the receiving information birthing activities component group can be used in implementing execution of the one or more receiving information birthing activities instructions i1165 of FIG. 31, can be used in performance of the receiving information birthing activities electrical circuitry arrangement e1165 of FIG. 24, and/or can be used in otherwise fulfillment of the operation o1165. An exemplary non-transitory signal bearing medium version of the information storage subsystem s200 is depicted in FIG. 31 as bearing the one or more receiving information birthing activities instructions i1165 that when executed will direct performance of the operation o1165. Furthermore, the receiving information birthing activities electrical circuitry arrangement ("elec circ arrange") e1165, when activated, will perform the operation o1165. Also, the receiving information birthing activities module m1165, when executed and/or activated, will direct performance of and/or perform the operation o1165. For instance, in one or more exemplary implementations, the one or more receiving information birthing activities instructions i1165, when executed, direct performance of the operation o1165 in the illustrative depiction as follows, and/or the receiving information birthing activities electrical circuitry arrangement e1165, when activated, performs the operation o1165 in the illustrative depiction as follows, and/or the receiving information birthing activities module m1165, when executed and/or activated, directs performance of and/or performs the operation o1165 in the illustrative depiction as follows, and/or the operation o1165 is otherwise carried out in the illustrative depiction as follows: electronically receiving (e.g. webpage, etc.) monitoring information (e.g. tractor operation, etc.) related to (e.g. fuel cost, etc.) one or more farming related production factors (e.g. safety regulations, etc.) involved with (e.g. connected, etc.) the farming related production of (e.g. buffalo birthing, etc.) one or more ingestible materials (e.g. ground chicken, etc.) including at least in part one or more birthing related activities involved with farming related ingestible material production (e.g. buffalo birthing, etc.).

In one or more implementations, as shown in FIG. 64, operation o11 includes an operation o1166 for electronically receiving monitoring information related to one or more farming related production factors involved with the farming related production of one or more ingestible materials including at least in part one or more diary related activities involved with farming related ingestible material production. Origination of an illustratively derived receiving information milking activities component group can be accomplished through skilled in the art design choice selection of one or more of the above depicted components from one or more of the above depicted subsystems shown in FIG. 12. Components from the receiving information milking activities component group can be used in implementing execution of the one or more receiving information milking activities instructions i1166 of FIG. 31, can be used in performance of the receiving information milking activities electrical circuitry arrangement e1166 of FIG. 24, and/or can be used in otherwise fulfillment of the operation o1166. An exemplary non-transitory signal bearing medium version of the information storage subsystem s200 is depicted in FIG. 31 as bearing the one or more receiving information milking activities instructions i1166 that when executed will direct performance of the operation o1166. Furthermore, the receiving information milking activities electrical circuitry arrangement ("elec circ arrange") e1166, when activated, will perform the operation o1166. Also, the receiving information milking activities module m1166, when executed and/or activated, will direct performance of and/or perform the operation o1166. For instance, in one or more exemplary implementations, the one or more receiving information milking activities instructions i1166, when executed, direct performance of the operation o1166 in the illustrative depiction as follows, and/or the receiving information milking activities electrical circuitry arrangement e1166, when activated, performs the operation o1166 in the illustrative depiction as follows, and/or the receiving information milking activities module m1166, when executed and/or activated, directs performance of and/or performs the operation o1166 in the illustrative depiction as follows, and/or the operation o1166 is otherwise carried out in the illustrative depiction as follows: electronically receiving (e.g. website, etc.) monitoring information (e.g. electricity usage, etc.) related to (e.g. energy cost, etc.) one or more farming related production factors (e.g. livestock fertility, etc.) involved with (e.g. commit to, etc.) the farming related production of (e.g. goat milking, etc.) one or more ingestible materials (e.g. goat milk, etc.) including at least in part one or more diary related activities involved with farming related ingestible material production (e.g. goat milking, etc.).

Figure 65:
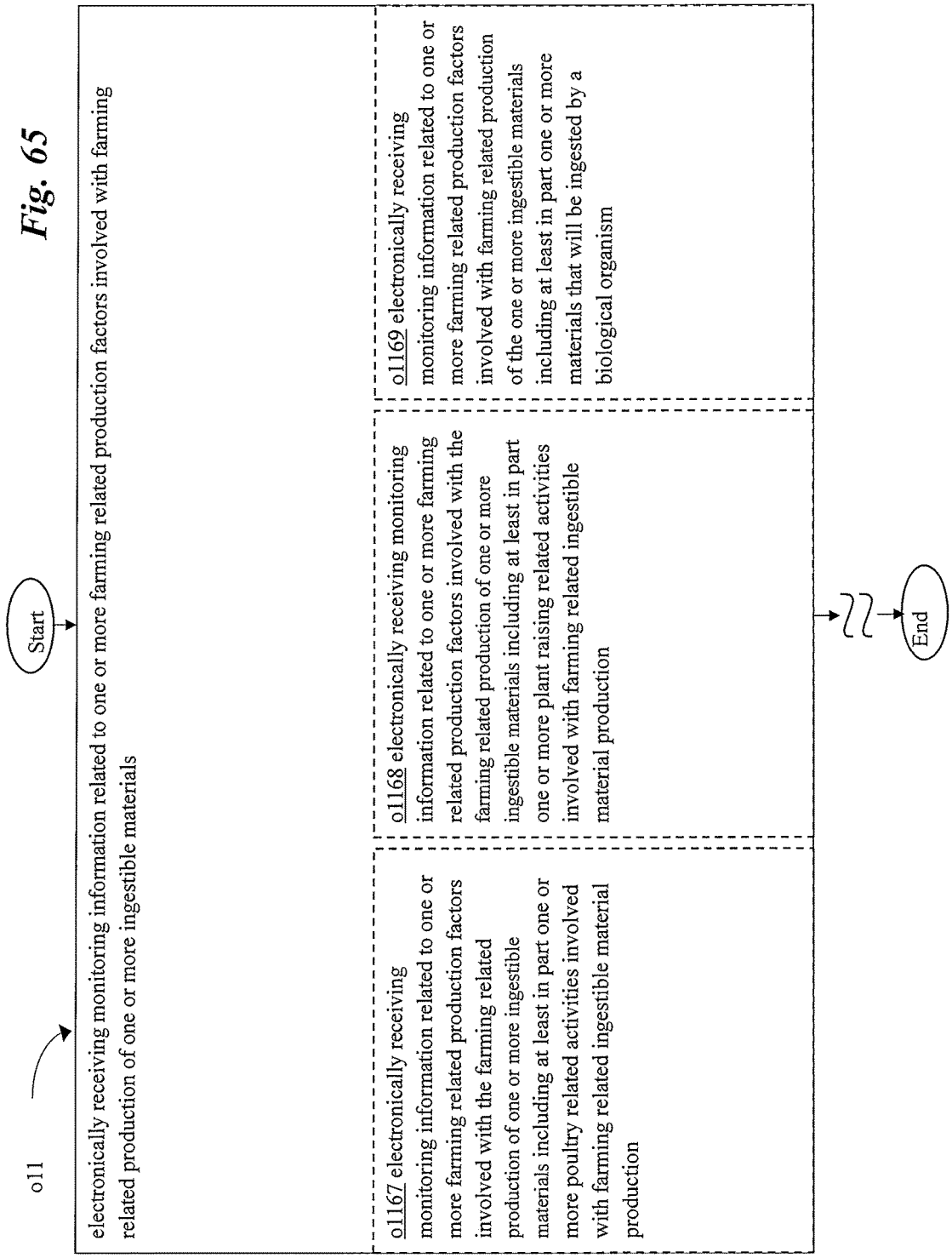
FIG. 65 is a high-level flowchart including exemplary implementations of operation o11 of FIG. 42.

In one or more implementations, as shown in FIG. 65, operation o11 includes an operation o1167 for electronically receiving monitoring information related to one or more farming related production factors involved with the farming related production of one or more ingestible materials including at least in part one or more poultry related activities involved with farming related ingestible material production. Origination of an illustratively derived receiving information poultry activities component group can be accomplished through skilled in the art design choice selection of one or more of the above depicted components from one or more of the above depicted subsystems shown in FIG. 12. Components from the receiving information poultry activities component group can be used in implementing execution of the one or more receiving information poultry activities instructions i1167 of FIG. 31, can be used in performance of the receiving information poultry activities electrical circuitry arrangement e1167 of FIG. 24, and/or can be used in otherwise fulfillment of the operation o1167. An exemplary non-transitory signal bearing medium version of the information storage subsystem s200 is depicted in FIG. 31 as bearing the one or more receiving information poultry activities instructions i1167 that when executed will direct performance of the operation o1167. Furthermore, the receiving information poultry activities electrical circuitry arrangement ("elec circ arrange") e1167, when activated, will perform the operation o1167. Also, the receiving information poultry activities module m1167, when executed and/or activated, will direct performance of and/or perform the operation o1167. For instance, in one or more exemplary implementations, the one or more receiving information poultry activities instructions i1167, when executed, direct performance of the operation o1167 in the illustrative depiction as follows, and/or the receiving information poultry activities electrical circuitry arrangement e1167, when activated, performs the operation o1167 in the illustrative depiction as follows, and/or the receiving information poultry activities module m1167, when executed and/or activated, directs performance of and/or performs the operation o1167 in the illustrative depiction as follows, and/or the operation o1167 is otherwise carried out in the illustrative depiction as follows: electronically receiving (e.g. cellphone entry, etc.) monitoring information (e.g. irrigation, etc.) related to (e.g. water availability, etc.) one or more farming related production factors (e.g. bee pollination schedule, etc.) involved with (e.g. absorbed by, etc.) the farming related production of (e.g. duck egg laying, etc.) one or more ingestible materials (e.g. goat cheese, etc.) including at least in part one or more poultry related activities involved with farming related ingestible material production (e.g. duck egg laying, etc.).

In one or more implementations, as shown in FIG. 65, operation o11 includes an operation o1168 for electronically receiving monitoring information related to one or more farming related production factors involved with the farming related production of one or more ingestible materials including at least in part one or more plant raising related activities involved with farming related ingestible material production. Origination of an illustratively derived receiving information plant raising component group can be accomplished through skilled in the art design choice selection of one or more of the above depicted components from one or more of the above depicted subsystems shown in FIG. 12. Components from the receiving information plant raising component group can be used in implementing execution of the one or more receiving information plant raising instructions i1168 of FIG. 31, can be used in performance of the receiving information plant raising electrical circuitry arrangement e1168 of FIG. 24, and/or can be used in otherwise fulfillment of the operation o1168. An exemplary non-transitory signal bearing medium version of the information storage subsystem s200 is depicted in FIG. 31 as bearing the one or more receiving information plant raising instructions i1168 that when executed will direct performance of the operation o1168. Furthermore, the receiving information plant raising electrical circuitry arrangement ("elec circ arrange") e1168, when activated, will perform the operation o1168. Also, the receiving information plant raising module m1168, when executed and/or activated, will direct performance of and/or perform the operation o1168. For instance, in one or more exemplary implementations, the one or more receiving information plant raising instructions i1168, when executed, direct performance of the operation o1168 in the illustrative depiction as follows, and/or the receiving information plant raising electrical circuitry arrangement e1168, when activated, performs the operation o1168 in the illustrative depiction as follows, and/or the receiving information plant raising module m1168, when executed and/or activated, directs performance of and/or performs the operation o1168 in the illustrative depiction as follows, and/or the operation o1168 is otherwise carried out in the illustrative depiction as follows: electronically receiving (e.g. satellite transmission, etc.) monitoring information (e.g. sanitized tongs, etc.) related to (e.g. insect population, etc.) one or more farming related production factors (e.g. cost of pollination, etc.) involved with (e.g. embraced, etc.) the farming related production of (e.g. bell pepper growing, etc.) one or more ingestible materials (e.g. oyster shell, etc.) including at least in part one or more plant raising related activities involved with farming related ingestible material production (e.g. bell pepper growing, etc.).

In one or more implementations, as shown in FIG. 65, operation o11 includes an operation o1169 for electronically receiving monitoring information related to one or more farming related production factors involved with farming related production of the one or more ingestible materials including at least in part one or more materials that will be ingested by a biological organism. Origination of an illustratively derived receiving information ingested component group can be accomplished through skilled in the art design choice selection of one or more of the above depicted components from one or more of the above depicted subsystems shown in FIG. 12. Components from the receiving information ingested component group can be used in implementing execution of the one or more receiving information ingested instructions i1169 of FIG. 31, can be used in performance of the receiving information ingested electrical circuitry arrangement e1169 of FIG. 24, and/or can be used in otherwise fulfillment of the operation o1169. An exemplary non-transitory signal bearing medium version of the information storage subsystem s200 is depicted in FIG. 31 as bearing the one or more receiving information ingested instructions i1169 that when executed will direct performance of the operation o1169. Furthermore, the receiving information ingested electrical circuitry arrangement ("elec circ arrange") e1169, when activated, will perform the operation o1169. Also, the receiving information ingested module m1169, when executed and/or activated, will direct performance of and/or perform the operation o1169. For instance, in one or more exemplary implementations, the one or more receiving information ingested instructions i1169, when executed, direct performance of the operation o1169 in the illustrative depiction as follows, and/or the receiving information ingested electrical circuitry arrangement e1169, when activated, performs the operation o1169 in the illustrative depiction as follows, and/or the receiving information ingested module m1169, when executed and/or activated, directs performance of and/or performs the operation o1169 in the illustrative depiction as follows, and/or the operation o1169 is otherwise carried out in the illustrative depiction as follows: electronically receiving (e.g. pull-based, etc.) monitoring information (e.g. DDT insecticide, etc.) related to (e.g. pollen count, etc.) one or more farming related production factors (e.g. duration of pollination, etc.) involved with (e.g. contain, etc.) farming related production of (e.g. wool production, etc.) the one or more ingestible materials (e.g. barley, etc.) including at least in part one or more materials that will be ingested by a biological organism (e.g. barley, etc.).

Figure 66:
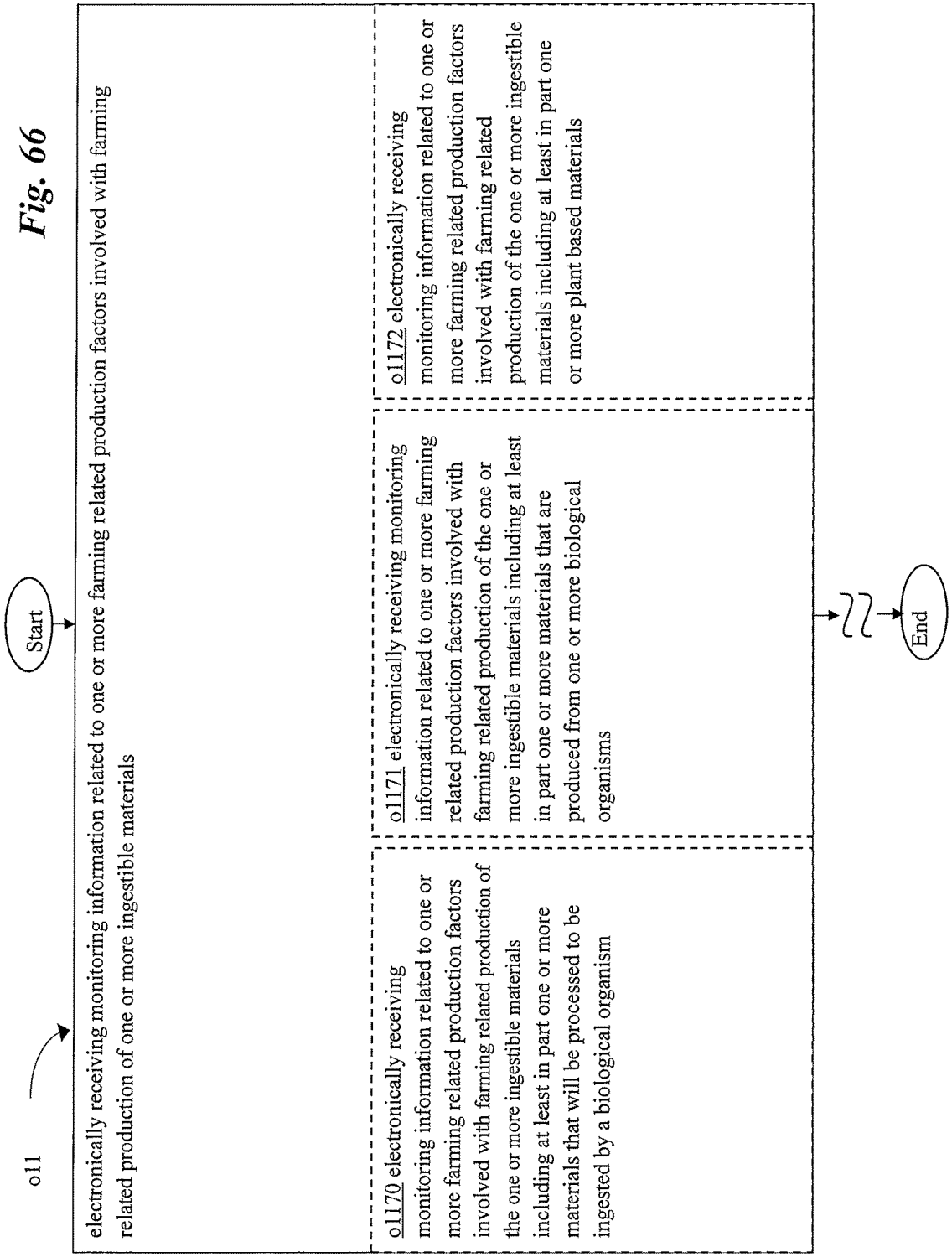
FIG. 66 is a high-level flowchart including exemplary implementations of operation o11 of FIG. 42.

In one or more implementations, as shown in FIG. 66, operation o11 includes an operation o1170 for electronically receiving monitoring information related to one or more farming related production factors involved with farming related production of the one or more ingestible materials including at least in part one or more materials that will be processed to be ingested by a biological organism. Origination of an illustratively derived receiving information ingested human component group can be accomplished through skilled in the art design choice selection of one or more of the above depicted components from one or more of the above depicted subsystems shown in FIG. 12. Components from the receiving information ingested human component group can be used in implementing execution of the one or more receiving information ingested human instructions i1170 of FIG. 31, can be used in performance of the receiving information ingested human electrical circuitry arrangement e1170 of FIG. 24, and/or can be used in otherwise fulfillment of the operation o1170. An exemplary non-transitory signal bearing medium version of the information storage subsystem s200 is depicted in FIG. 31 as bearing the one or more receiving information ingested human instructions i1170 that when executed will direct performance of the operation o1170. Furthermore, the receiving information ingested human electrical circuitry arrangement ("elec circ arrange") e1170, when activated, will perform the operation o1170. Also, the receiving information ingested human module m1170, when executed and/or activated, will direct performance of and/or perform the operation o1170. For instance, in one or more exemplary implementations, the one or more receiving information ingested human instructions i1170, when executed, direct performance of the operation o1170 in the illustrative depiction as follows, and/or the receiving information ingested human electrical circuitry arrangement e1170, when activated, performs the operation o1170 in the illustrative depiction as follows, and/or the receiving information ingested human module m1170, when executed and/or activated, directs performance of and/or performs the operation o1170 in the illustrative depiction as follows, and/or the operation o1170 is otherwise carried out in the illustrative depiction as follows: electronically receiving (e.g. POP3 server, etc.) monitoring information (e.g. production speed, etc.) related to (e.g. crop rotation, etc.) one or more farming related production factors (e.g. type of pollination required, etc.) involved with (e.g. engage, etc.) farming related production of (e.g. lentil harvesting, etc.) the one or more ingestible materials (e.g. wheat, etc.) including at least in part one or more materials that will be processed to be ingested by a biological organism (e.g. wheat, etc.).

In one or more implementations, as shown in FIG. 66, operation o11 includes an operation o1171 for electronically receiving monitoring information related to one or more farming related production factors involved with farming related production of the one or more ingestible materials including at least in part one or more materials that are produced from one or more biological organisms. Origination of an illustratively derived receiving information organism produced component group can be accomplished through skilled in the art design choice selection of one or more of the above depicted components from one or more of the above depicted subsystems shown in FIG. 12. Components from the receiving information organism produced component group can be used in implementing execution of the one or more receiving information organism produced instructions i1171 of FIG. 31, can be used in performance of the receiving information organism produced electrical circuitry arrangement e1171 of FIG. 24, and/or can be used in otherwise fulfillment of the operation o1171. An exemplary non-transitory signal bearing medium version of the information storage subsystem s200 is depicted in FIG. 31 as bearing the one or more receiving information organism produced instructions i1171 that when executed will direct performance of the operation o1171. Furthermore, the receiving information organism produced electrical circuitry arrangement ("elec circ arrange") e1171, when activated, will perform the operation o1171. Also, the receiving information organism produced module m1171, when executed and/or activated, will direct performance of and/or perform the operation o1171. For instance, in one or more exemplary implementations, the one or more receiving information organism produced instructions i1171, when executed, direct performance of the operation o1171 in the illustrative depiction as follows, and/or the receiving information organism produced electrical circuitry arrangement e1171, when activated, performs the operation o1171 in the illustrative depiction as follows, and/or the receiving information organism produced module m1171, when executed and/or activated, directs performance of and/or performs the operation o1171 in the illustrative depiction as follows, and/or the operation o1171 is otherwise carried out in the illustrative depiction as follows: electronically receiving (e.g. hardware based encryption, etc.) monitoring information (e.g. labor force scheduling, etc.) related to (e.g. scientific data, etc.) one or more farming related production factors (e.g. nutrient additive to diet, etc.) involved with (e.g. engaged by, etc.) farming related production of (e.g. flax growing, etc.) the one or more ingestible materials (e.g. bone, etc.) including at least in part one or more materials that are produced from one or more biological organisms (e.g. bone, etc.).

In one or more implementations, as shown in FIG. 66, operation o11 includes an operation o1172 for electronically receiving monitoring information related to one or more farming related production factors involved with farming related production of the one or more ingestible materials including at least in part one or more plant based materials. Origination of an illustratively derived receiving information plant material component group can be accomplished through skilled in the art design choice selection of one or more of the above depicted components from one or more of the above depicted subsystems shown in FIG. 12. Components from the receiving information plant material component group can be used in implementing execution of the one or more receiving information plant material instructions i1172 of FIG. 31, can be used in performance of the receiving information plant material electrical circuitry arrangement e1172 of FIG. 24, and/or can be used in otherwise fulfillment of the operation o1172. An exemplary non-transitory signal bearing medium version of the information storage subsystem s200 is depicted in FIG. 31 as bearing the one or more receiving information plant material instructions i1172 that when executed will direct performance of the operation o1172. Furthermore, the receiving information plant material electrical circuitry arrangement ("elec circ arrange") e1172, when activated, will perform the operation o1172. Also, the receiving information plant material module m1172, when executed and/or activated, will direct performance of and/or perform the operation o1172. For instance, in one or more exemplary implementations, the one or more receiving information plant material instructions i1172, when executed, direct performance of the operation o1172 in the illustrative depiction as follows, and/or the receiving information plant material electrical circuitry arrangement e1172, when activated, performs the operation o1172 in the illustrative depiction as follows, and/or the receiving information plant material module m1172, when executed and/or activated, directs performance of and/or performs the operation o1172 in the illustrative depiction as follows, and/or the operation o1172 is otherwise carried out in the illustrative depiction as follows: electronically receiving (e.g. software based encryption, etc.) monitoring information (e.g. future market demands, etc.) related to (e.g. soil conditions, etc.) one or more farming related production factors (e.g. feeding schedule, etc.) involved with (e.g. incorporate, etc.) farming related production of (e.g. squash cultivation, etc.) the one or more ingestible materials (e.g. potato, etc.) including at least in part one or more plant based materials (e.g. potato, etc.).

Figure 67:
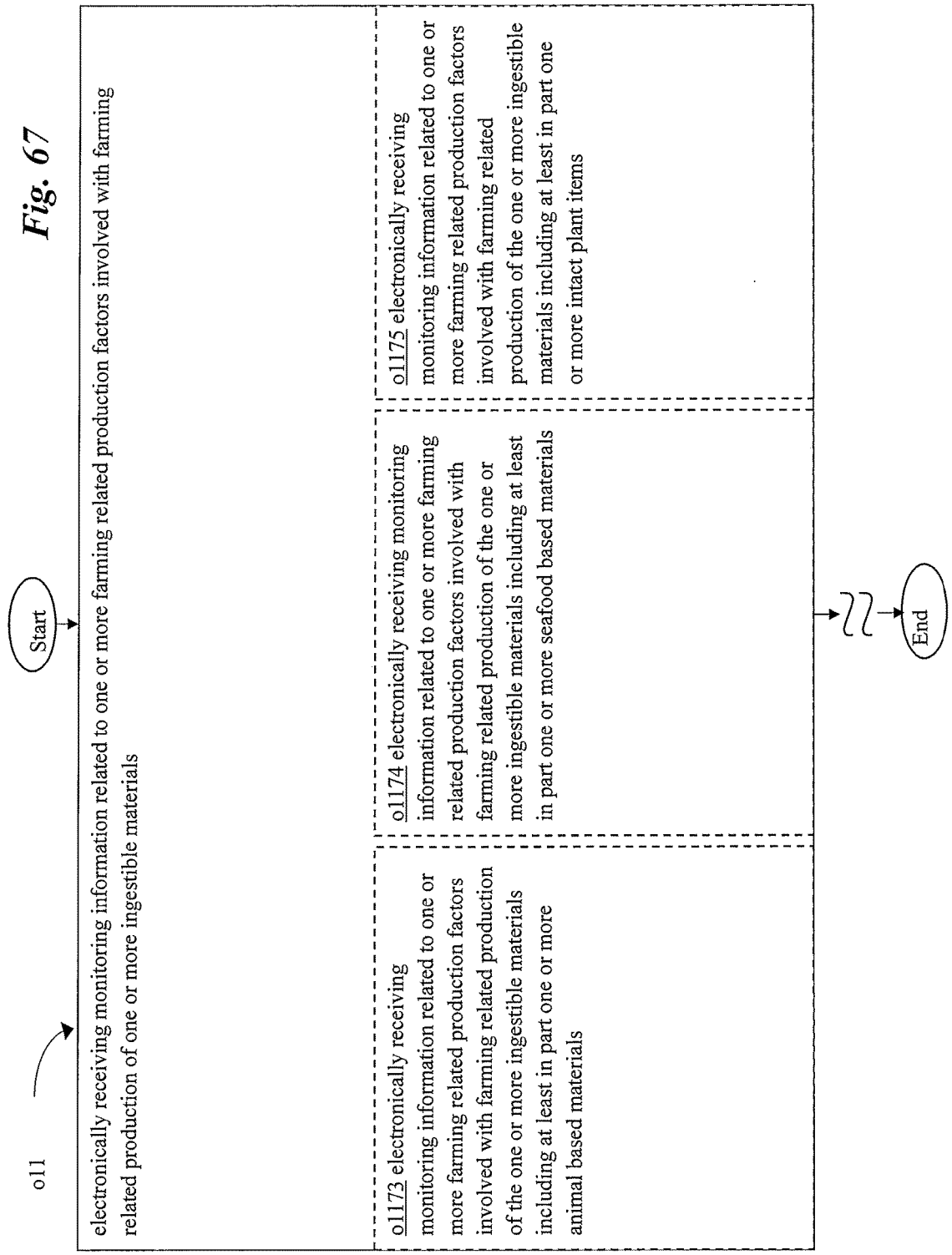
FIG. 67 is a high-level flowchart including exemplary implementations of operation o11 of FIG. 42.

In one or more implementations, as shown in FIG. 67, operation o11 includes an operation o1173 for electronically receiving monitoring information related to one or more farming related production factors involved with farming related production of the one or more ingestible materials including at least in part one or more animal based materials. Origination of an illustratively derived receiving information animal material component group can be accomplished through skilled in the art design choice selection of one or more of the above depicted components from one or more of the above depicted subsystems shown in FIG. 12. Components from the receiving information animal material component group can be used in implementing execution of the one or more receiving information animal material instructions i1173 of FIG. 31, can be used in performance of the receiving information animal material electrical circuitry arrangement e1173 of FIG. 24, and/or can be used in otherwise fulfillment of the operation o1173. An exemplary non-transitory signal bearing medium version of the information storage subsystem s200 is depicted in FIG. 31 as bearing the one or more receiving information animal material instructions i1173 that when executed will direct performance of the operation o1173. Furthermore, the receiving information animal material electrical circuitry arrangement ("elec circ arrange") e1173, when activated, will perform the operation o1173. Also, the receiving information animal material module m1173, when executed and/or activated, will direct performance of and/or perform the operation o1173. For instance, in one or more exemplary implementations, the one or more receiving information animal material instructions i1173, when executed, direct performance of the operation o1173 in the illustrative depiction as follows, and/or the receiving information animal material electrical circuitry arrangement e1173, when activated, performs the operation o1173 in the illustrative depiction as follows, and/or the receiving information animal material module m1173, when executed and/or activated, directs performance of and/or performs the operation o1173 in the illustrative depiction as follows, and/or the operation o1173 is otherwise carried out in the illustrative depiction as follows: electronically receiving (e.g. SD card, etc.) monitoring information (e.g. improper data calculation, etc.) related to (e.g. irrigation, etc.) one or more farming related production factors (e.g. lighting schedule, etc.) involved with (e.g. engross, etc.) farming related production of (e.g. grain harvesting, etc.) the one or more ingestible materials (e.g. pork meat, etc.) including at least in part one or more animal based materials (e.g. pork meat, etc.).

In one or more implementations, as shown in FIG. 67, operation o11 includes an operation o1174 for electronically receiving monitoring information related to one or more farming related production factors involved with farming related production of the one or more ingestible materials including at least in part one or more seafood based materials. Origination of an illustratively derived receiving information seafood material component group can be accomplished through skilled in the art design choice selection of one or more of the above depicted components from one or more of the above depicted subsystems shown in FIG. 12. Components from the receiving information seafood material component group can be used in implementing execution of the one or more receiving information seafood material instructions i1174 of FIG. 31, can be used in performance of the receiving information seafood material electrical circuitry arrangement e1174 of FIG. 24, and/or can be used in otherwise fulfillment of the operation o1174. An exemplary non-transitory signal bearing medium version of the information storage subsystem s200 is depicted in FIG. 31 as bearing the one or more receiving information seafood material instructions i1174 that when executed will direct performance of the operation o1174. Furthermore, the receiving information seafood material electrical circuitry arrangement ("elec circ arrange") e1174, when activated, will perform the operation o1174. Also, the receiving information seafood material module m1174, when executed and/or activated, will direct performance of and/or perform the operation o1174. For instance, in one or more exemplary implementations, the one or more receiving information seafood material instructions i1174, when executed, direct performance of the operation o1174 in the illustrative depiction as follows, and/or the receiving information seafood material electrical circuitry arrangement e1174, when activated, performs the operation o1174 in the illustrative depiction as follows, and/or the receiving information seafood material module m1174, when executed and/or activated, directs performance of and/or performs the operation o1174 in the illustrative depiction as follows, and/or the operation o1174 is otherwise carried out in the illustrative depiction as follows: electronically receiving (e.g. SIM card, etc.) monitoring information (e.g. infestation, etc.) related to (e.g. nutrients, etc.) one or more farming related production factors (e.g. invasive plant type, etc.) involved with (e.g. implicated, etc.) farming related production of (e.g. salmon fishing, etc.) the one or more ingestible materials (e.g. cod fish, etc.) including at least in part one or more seafood based materials (e.g. cod fish, etc.).

In one or more implementations, as shown in FIG. 67, operation o11 includes an operation o1175 for electronically receiving monitoring information related to one or more farming related production factors involved with farming related production of the one or more ingestible materials including at least in part one or more intact plant items. Origination of an illustratively derived receiving information intact plant component group can be accomplished through skilled in the art design choice selection of one or more of the above depicted components from one or more of the above depicted subsystems shown in FIG. 12. Components from the receiving information intact plant component group can be used in implementing execution of the one or more receiving information intact plant instructions i1175 of FIG. 31, can be used in performance of the receiving information intact plant electrical circuitry arrangement e1175 of FIG. 24, and/or can be used in otherwise fulfillment of the operation o1175. An exemplary non-transitory signal bearing medium version of the information storage subsystem s200 is depicted in FIG. 31 as bearing the one or more receiving information intact plant instructions i1175 that when executed will direct performance of the operation o1175. Furthermore, the receiving information intact plant electrical circuitry arrangement ("elec circ arrange") e1175, when activated, will perform the operation o1175. Also, the receiving information intact plant module m1175, when executed and/or activated, will direct performance of and/or perform the operation o1175. For instance, in one or more exemplary implementations, the one or more receiving information intact plant instructions i1175, when executed, direct performance of the operation o1175 in the illustrative depiction as follows, and/or the receiving information intact plant electrical circuitry arrangement e1175, when activated, performs the operation o1175 in the illustrative depiction as follows, and/or the receiving information intact plant module m1175, when executed and/or activated, directs performance of and/or performs the operation o1175 in the illustrative depiction as follows, and/or the operation o1175 is otherwise carried out in the illustrative depiction as follows: electronically receiving (e.g. email, etc.) monitoring information (e.g. sanitizer usage, etc.) related to (e.g. antibiotics, etc.) one or more farming related production factors (e.g. herbicide type, etc.) involved with (e.g. necessitate, etc.) farming related production of (e.g. apple harvesting, etc.) the one or more ingestible materials (e.g. carrot, etc.) including at least in part one or more intact plant items (e.g. whole carrot, etc.).

Figure 68:
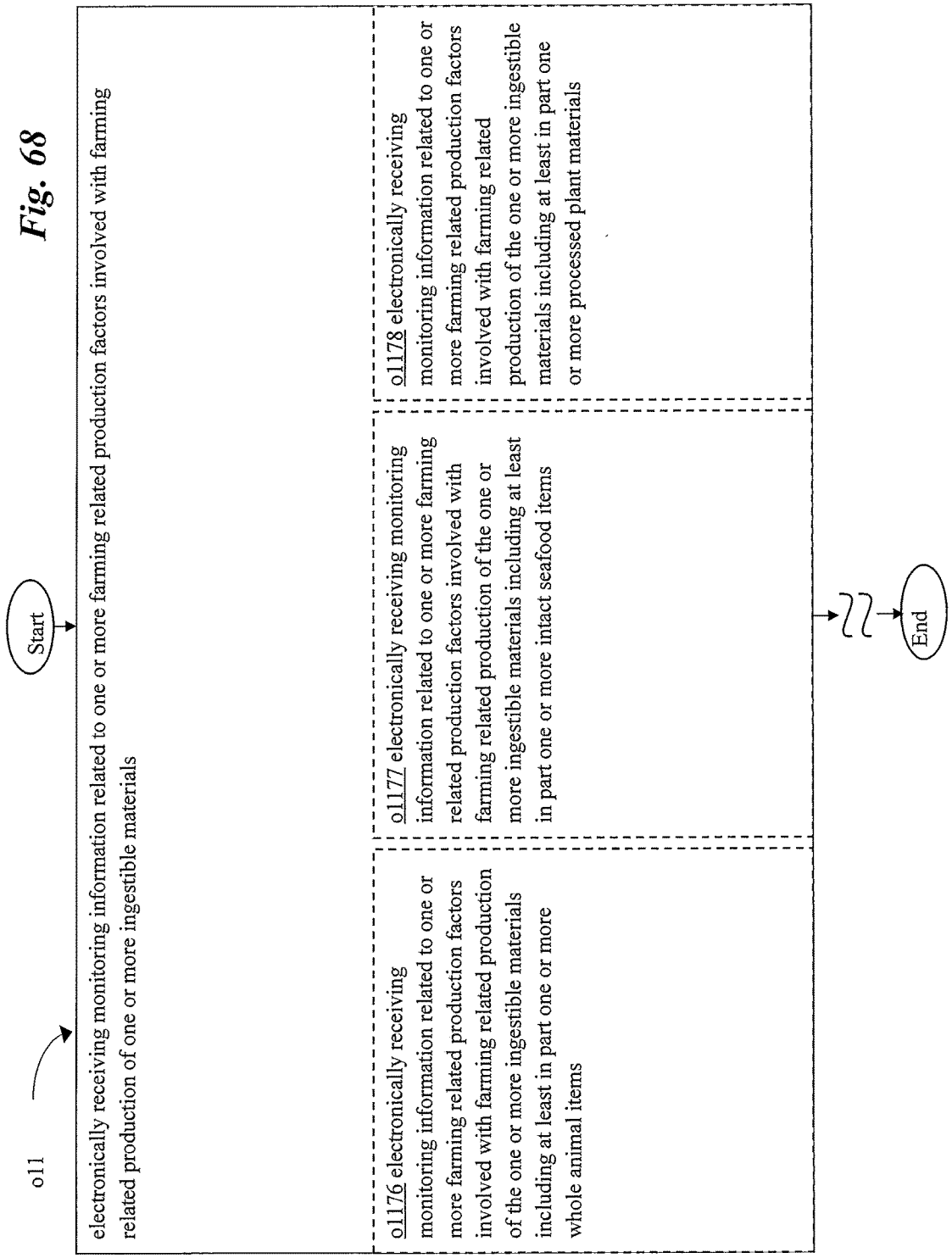
FIG. 68 is a high-level flowchart including exemplary implementations of operation o11 of FIG. 42.

In one or more implementations, as shown in FIG. 68, operation o11 includes an operation o1176 for electronically receiving monitoring information related to one or more farming related production factors involved with farming related production of the one or more ingestible materials including at least in part one or more whole animal items. Origination of an illustratively derived receiving information whole animal component group can be accomplished through skilled in the art design choice selection of one or more of the above depicted components from one or more of the above depicted subsystems shown in FIG. 12. Components from the receiving information whole animal component group can be used in implementing execution of the one or more receiving information whole animal instructions i1176 of FIG. 31, can be used in performance of the receiving information whole animal electrical circuitry arrangement e1176 of FIG. 24, and/or can be used in otherwise fulfillment of the operation o1176. An exemplary non-transitory signal bearing medium version of the information storage subsystem s200 is depicted in FIG. 31 as bearing the one or more receiving information whole animal instructions i1176 that when executed will direct performance of the operation o1176. Furthermore, the receiving information whole animal electrical circuitry arrangement ("elec circ arrange") e1176, when activated, will perform the operation o1176. Also, the receiving information whole animal module m1176, when executed and/or activated, will direct performance of and/or perform the operation o1176. For instance, in one or more exemplary implementations, the one or more receiving information whole animal instructions i1176, when executed, direct performance of the operation o1176 in the illustrative depiction as follows, and/or the receiving information whole animal electrical circuitry arrangement e1176, when activated, performs the operation o1176 in the illustrative depiction as follows, and/or the receiving information whole animal module m1176, when executed and/or activated, directs performance of and/or performs the operation o1176 in the illustrative depiction as follows, and/or the operation o1176 is otherwise carried out in the illustrative depiction as follows: electronically receiving (e.g. peer to peer, etc.) monitoring information (e.g. mbar, etc.) related to (e.g. bioavailability, etc.) one or more farming related production factors (e.g. tide schedule, etc.) involved with (e.g. presuppose, etc.) farming related production of (e.g. wheat threshing, etc.) the one or more ingestible materials (e.g. whole chicken, etc.) including at least in part one or more whole animal items (e.g. whole chicken, etc.).

In one or more implementations, as shown in FIG. 68, operation o11 includes an operation o1177 for electronically receiving monitoring information related to one or more farming related production factors involved with farming related production of the one or more ingestible materials including at least in part one or more intact seafood items. Origination of an illustratively derived receiving information intact seafood component group can be accomplished through skilled in the art design choice selection of one or more of the above depicted components from one or more of the above depicted subsystems shown in FIG. 12. Components from the receiving information intact seafood component group can be used in implementing execution of the one or more receiving information intact seafood instructions i1177 of FIG. 31, can be used in performance of the receiving information intact seafood electrical circuitry arrangement e1177 of FIG. 24, and/or can be used in otherwise fulfillment of the operation o1177. An exemplary non-transitory signal bearing medium version of the information storage subsystem s200 is depicted in FIG. 31 as bearing the one or more receiving information intact seafood instructions i1177 that when executed will direct performance of the operation o1177. Furthermore, the receiving information intact seafood electrical circuitry arrangement ("elec circ arrange") e1177, when activated, will perform the operation o1177. Also, the receiving information intact seafood module m1177, when executed and/or activated, will direct performance of and/or perform the operation o1177. For instance, in one or more exemplary implementations, the one or more receiving information intact seafood instructions i1177, when executed, direct performance of the operation o1177 in the illustrative depiction as follows, and/or the receiving information intact seafood electrical circuitry arrangement e1177, when activated, performs the operation o1177 in the illustrative depiction as follows, and/or the receiving information intact seafood module m1177, when executed and/or activated, directs performance of and/or performs the operation o1177 in the illustrative depiction as follows, and/or the operation o1177 is otherwise carried out in the illustrative depiction as follows: electronically receiving (e.g. 10-key, etc.) monitoring information (e.g. humidity, etc.) related to (e.g. economic conditions, etc.) one or more farming related production factors (e.g. time of sunrise, etc.) involved with (e.g. related to, etc.) farming related production of (e.g. almond harvesting, etc.) the one or more ingestible materials (e.g. whole lobster, etc.) including at least in part one or more intact seafood items (e.g. whole lobster, etc.).

In one or more implementations, as shown in FIG. 68, operation o11 includes an operation o1178 for electronically receiving monitoring information related to one or more farming related production factors involved with farming related production of the one or more ingestible materials including at least in part one or more processed plant materials. Origination of an illustratively derived receiving information processed plant component group can be accomplished through skilled in the art design choice selection of one or more of the above depicted components from one or more of the above depicted subsystems shown in FIG. 12. Components from the receiving information processed plant component group can be used in implementing execution of the one or more receiving information processed plant instructions i1178 of FIG. 31, can be used in performance of the receiving information processed plant electrical circuitry arrangement e1178 of FIG. 24, and/or can be used in otherwise fulfillment of the operation o1178. An exemplary non-transitory signal bearing medium version of the information storage subsystem s200 is depicted in FIG. 31 as bearing the one or more receiving information processed plant instructions i1178 that when executed will direct performance of the operation o1178. Furthermore, the receiving information processed plant electrical circuitry arrangement ("elec circ arrange") e1178, when activated, will perform the operation o1178. Also, the receiving information processed plant module m1178, when executed and/or activated, will direct performance of and/or perform the operation o1178. For instance, in one or more exemplary implementations, the one or more receiving information processed plant instructions i1178, when executed, direct performance of the operation o1178 in the illustrative depiction as follows, and/or the receiving information processed plant electrical circuitry arrangement e1178, when activated, performs the operation o1178 in the illustrative depiction as follows, and/or the receiving information processed plant module m1178, when executed and/or activated, directs performance of and/or performs the operation o1178 in the illustrative depiction as follows, and/or the operation o1178 is otherwise carried out in the illustrative depiction as follows: electronically receiving (e.g. USB port, etc.) monitoring information (e.g. oxygen sensor, etc.) related to (e.g. climate, etc.) one or more farming related production factors (e.g. gross capacity of vessel, etc.) involved with (e.g. relationship, etc.) farming related production of (e.g. cow butchering, etc.) the one or more ingestible materials (e.g. wheat flour, etc.) including at least in part one or more processed plant materials (e.g. wheat flour, etc.).

Figure 69:
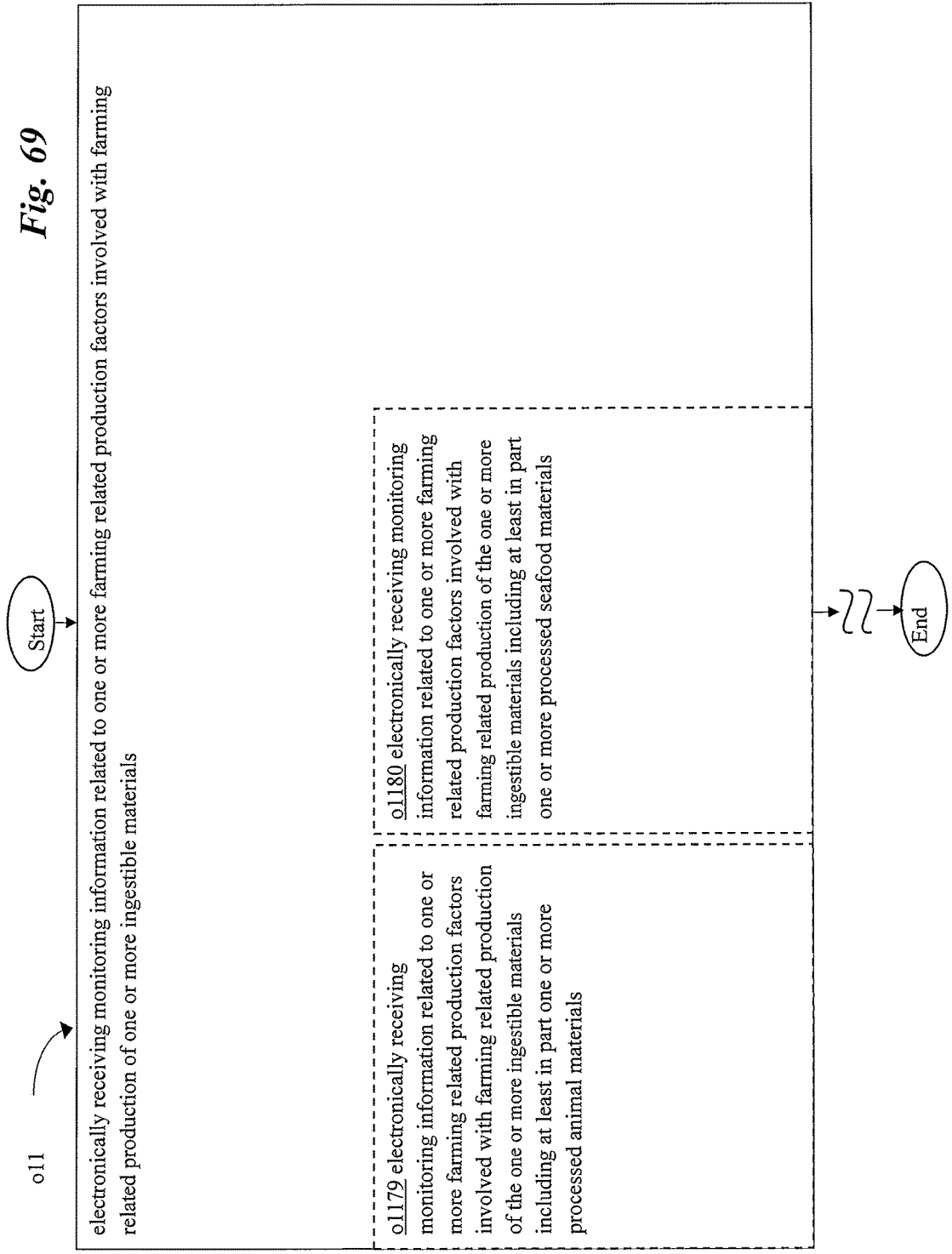
FIG. 69 is a high-level flowchart including exemplary implementations of operation o11 of FIG. 42.

In one or more implementations, as shown in FIG. 69, operation o11 includes an operation o1179 for electronically receiving monitoring information related to one or more farming related production factors involved with farming related production of the one or more ingestible materials including at least in part one or more processed animal materials. Origination of an illustratively derived receiving information animal materials component group can be accomplished through skilled in the art design choice selection of one or more of the above depicted components from one or more of the above depicted subsystems shown in FIG. 12. Components from the receiving information animal materials component group can be used in implementing execution of the one or more receiving information animal materials instructions i1179 of FIG. 31, can be used in performance of the receiving information animal materials electrical circuitry arrangement e1179 of FIG. 24, and/or can be used in otherwise fulfillment of the operation o1179. An exemplary non-transitory signal bearing medium version of the information storage subsystem s200 is depicted in FIG. 31 as bearing the one or more receiving information animal materials instructions i1179 that when executed will direct performance of the operation o1179. Furthermore, the receiving information animal materials electrical circuitry arrangement ("elec circ arrange") e1179, when activated, will perform the operation o1179. Also, the receiving information animal materials module m1179, when executed and/or activated, will direct performance of and/or perform the operation o1179. For instance, in one or more exemplary implementations, the one or more receiving information animal materials instructions i1179, when executed, direct performance of the operation o1179 in the illustrative depiction as follows, and/or the receiving information animal materials electrical circuitry arrangement e1179, when activated, performs the operation o1179 in the illustrative depiction as follows, and/or the receiving information animal materials module m1179, when executed and/or activated, directs performance of and/or performs the operation o1179 in the illustrative depiction as follows, and/or the operation o1179 is otherwise carried out in the illustrative depiction as follows: electronically receiving (e.g. FTP, etc.) monitoring information (e.g. psi, etc.) related to (e.g. sustainability, etc.) one or more farming related production factors (e.g. shipping container dimensions, etc.) involved with (e.g. suggest, etc.) farming related production of (e.g. tuna canning, etc.) the one or more ingestible materials (e.g. ground beef, etc.) including at least in part one or more processed animal materials (e.g. ground beef, etc.).

In one or more implementations, as shown in FIG. 69, operation o11 includes an operation o1180 for electronically receiving monitoring information related to one or more farming related production factors involved with farming related production of the one or more ingestible materials including at least in part one or more processed seafood materials. Origination of an illustratively derived receiving information seafood material component group can be accomplished through skilled in the art design choice selection of one or more of the above depicted components from one or more of the above depicted subsystems shown in FIG. 12. Components from the receiving information seafood material component group can be used in implementing execution of the one or more receiving information seafood material instructions i1180 of FIG. 32, can be used in performance of the receiving information seafood material electrical circuitry arrangement e1180 of FIG. 25, and/or can be used in otherwise fulfillment of the operation o1180. An exemplary non-transitory signal bearing medium version of the information storage subsystem s200 is depicted in FIG. 32 as bearing the one or more receiving information seafood material instructions i1180 that when executed will direct performance of the operation o1180. Furthermore, the receiving information seafood material electrical circuitry arrangement ("elec circ arrange") e1180, when activated, will perform the operation o1180. Also, the receiving information seafood material module m1180, when executed and/or activated, will direct performance of and/or perform the operation o1180. For instance, in one or more exemplary implementations, the one or more receiving information seafood material instructions i1180, when executed, direct performance of the operation o1180 in the illustrative depiction as follows, and/or the receiving information seafood material electrical circuitry arrangement e1180, when activated, performs the operation o1180 in the illustrative depiction as follows, and/or the receiving information seafood material module m1180, when executed and/or activated, directs performance of and/or performs the operation o1180 in the illustrative depiction as follows, and/or the operation o1180 is otherwise carried out in the illustrative depiction as follows: electronically receiving (e.g. HTTP, etc.) monitoring information (e.g. in Hg, etc.) related to (e.g. eutrophication, etc.) one or more farming related production factors (e.g. cost of vessel maintenance, etc.) involved with (e.g. entangle, etc.) farming related production of (e.g. oyster harvesting, etc.) the one or more ingestible materials (e.g. filleted salmon, etc.) including at least in part one or more processed seafood materials (e.g. filleted salmon, etc.).

As shown in FIG. 42, the operational flow o10 proceeds to operation o12 for electronically associating at least a portion of said monitoring information one or more farming related production factors involved with farming related production of one or more ingestible materials with one or more identifiers accessible through one or more tracers, said one or more tracers logged as being at least momentarily in physical proximity with said one or more ingestible materials. An exemplary version of a non-transitory signal bearing medium of information storage subsystem s200 is depicted as bearing one or more associating information instructions i12 that when executed will direct performance of the operation o12. In an implementation, the one or more associating information instructions i12 when executed direct electronically associating (e.g. wifi, laptop entry, RFID scan, etc.) at least a portion of (e.g. AVI file format, MP3 file format, audio listening, etc.) said monitoring information (e.g. efficiency, cost measures, pandemics, etc.) (e.g. fuel delivery schedule, cost of fuel, record keeping methods, etc.) one or more farming related production factors (e.g. associated, affected, affecting, etc.) involved with (e.g. blueberry cultivation, raspberry harvesting, corn growing, etc.) farming related production of (e.g. feed grain, beet pulp, water, etc.) one or more ingestible materials (e.g. filleted salmon, carrot, wheat, etc.) with one or more identifiers (e.g. protocol header, security data, phonetic alphabet, etc.) accessible through (e.g. through electromagnetic reception, through search terms, through storage retrieval, etc.) one or more tracers, (e.g. high frequency RFID, UHF emitter, ISM band emitter, etc.) said one or more tracers logged (e.g. via hard drive storage, via database object information, via database table information, etc.) as being at least momentarily (e.g. shipping time from farm to restaurant, time in storage and display after unpacking, shipping time across Pacific Ocean, etc.) in physical proximity (e.g. tied to container, stamped onto container, magnetically attached to container, etc.) with said one or more ingestible materials (e.g. ground beef, lamb meat, octopus, etc.). Furthermore, the associating information electrical circuitry arrangement e12 when activated will perform the operation o12. Also, the associating information module m12, when executed and/or activated, will direct performance of and/or perform the operation o12. In an implementation, the associating information electrical circuitry arrangement e12, when activated performs the operation o12 in the illustrative depiction as follows, and/or the associating information module m12, when executed and/or activated, directs performance of and/or performs electronically associating (e.g. wifi, laptop entry, RFID scan, etc.) at least a portion of (e.g. AVI file format, MP3 file format, audio listening, etc.) said monitoring information (e.g. efficiency, cost measures, pandemics, etc.) (e.g. fuel delivery schedule, cost of fuel, record keeping methods, etc.) one or more farming related production factors (e.g. associated, affected, affecting, etc.)

involved with (e.g. blueberry cultivation, raspberry harvesting, corn growing, etc.) farming related production of (e.g. feed grain, beet pulp, water, etc.) one or more ingestible materials (e.g. filleted salmon, carrot, wheat, etc.) with one or more identifiers (e.g. protocol header, security data, phonetic alphabet, etc.) accessible through (e.g. through electromagnetic reception, through search terms, through storage retrieval, etc.) one or more tracers, (e.g. high frequency RFID, UHF emitter, ISM band emitter, etc.) said one or more tracers logged (e.g. via hard drive storage, via database object information, via database table information, etc.) as being at least momentarily (e.g. shipping time from farm to restaurant, time in storage and display after unpacking, shipping time across Pacific Ocean, etc.) in physical proximity (e.g. tied to container, stamped onto container, magnetically attached to container, etc.) with said one or more ingestible materials (e.g. ground beef, lamb meat, octopus, etc.). In an implementation, the electronically associating at least a portion of said monitoring information one or more farming related production factors involved with farming related production of one or more ingestible materials with one or more identifiers accessible through one or more tracers, said one or more tracers logged as being at least momentarily in physical proximity with said one or more ingestible materials is carried out by electronically associating (e.g. wifi, laptop entry, RFID scan, etc.) at least a portion of (e.g. AVI file format, MP3 file format, audio listening, etc.) said monitoring information (e.g. efficiency, cost measures, pandemics, etc.) (e.g. fuel delivery schedule, cost of fuel, record keeping methods, etc.) one or more farming related production factors (e.g. associated, affected, affecting, etc.) involved with (e.g. blueberry cultivation, raspberry harvesting, corn growing, etc.) farming related production of (e.g. feed grain, beet pulp, water, etc.) one or more ingestible materials (e.g. filleted salmon, carrot, wheat, etc.) with one or more identifiers (e.g. protocol header, security data, phonetic alphabet, etc.) accessible through (e.g. through electromagnetic reception, through search terms, through storage retrieval, etc.) one or more tracers, (e.g. high frequency RFID, UHF emitter, ISM band emitter, etc.) said one or more tracers logged (e.g. via hard drive storage, via database object information, via database table information, etc.) as being at least momentarily (e.g. shipping time from farm to restaurant, time in storage and display after unpacking, shipping time across Pacific Ocean, etc.) in physical proximity (e.g. tied to container, stamped onto container, magnetically attached to container, etc.) with said one or more ingestible materials (e.g. ground beef, lamb meat, octopus, etc.).

In one or more implementations, as shown in FIG. 70, operation o12 includes an operation o1201 for the electronically associating at least a portion of said monitoring information related to one or more farming related production factors involved with farming related production of one or more ingestible materials with one or more identifiers accessible through one or more tracers, said one or more tracers logged as being at least momentarily in physical proximity with said one or more ingestible materials via at least in part one or more electronically implemented indices. Origination of an illustratively derived associating through indices component group can be accomplished through skilled in the art design choice selection of one or more of the above depicted components from one or more of the above depicted subsystems shown in FIG. 12. Components from the associating through indices component group can be used in implementing execution of the one or more associating through indices instructions i1201 of FIG. 33, can be used in performance of the associating through indices electrical circuitry arrangement e1201 of FIG. 26, and/or can be used in otherwise fulfillment of the operation o1201. An exemplary non-transitory signal bearing medium version of the information storage subsystem s200 is depicted in FIG. 33 as bearing the one or more associating through indices instructions i1201 that when executed will direct performance of the operation o1201. Furthermore, the associating through indices electrical circuitry arrangement ("elec circ arrange") e1201, when activated, will perform the operation o1201. Also, the associating through indices module m1201, when executed and/or activated, will direct performance of and/or perform the operation o1201. For instance, in one or more exemplary implementations, the one or more associating through indices instructions i1201, when executed, direct performance of the operation o1201 in the illustrative depiction as follows, and/or the associating through indices electrical circuitry arrangement e1201, when activated, performs the operation o1201 in the illustrative depiction as follows, and/or the associating through indices module m1201, when executed and/or activated, directs performance of and/or performs the operation o1201 in the illustrative depiction as follows, and/or the operation o1201 is otherwise carried out in the illustrative depiction as follows: the electronically associating (e.g. through database index, etc.) at least a portion of (e.g. entire amount, etc.) said monitoring information (e.g. video footage, etc.) related to (e.g. cost measures, etc.) one or more farming related production factors (e.g. cost of vessel maintenance, etc.) involved with (e.g. affected, etc.) farming related production of (e.g. raspberry harvesting, etc.) one or more ingestible materials (e.g. filleted salmon, etc.) with one or more identifiers (e.g. protocol header, etc.) accessible through (e.g. through electromagnetic reception, etc.) one or more tracers, (e.g. high frequency RFID, etc.) said one or more tracers logged (e.g. via hard drive storage, etc.) as being at least momentarily (e.g. shipping time from farm to restaurant, etc.) in physical proximity (e.g. tied to container, etc.) with said one or more ingestible materials (e.g. ground beef, etc.) via at least in part one or more electronically implemented indices (e.g. through database index, etc.).

In one or more implementations, as shown in FIG. 70, operation o12 includes an operation o1202 for the electronically associating at least a portion of said monitoring information related to one or more farming related production factors involved with farming related production of one or more ingestible materials with one or more identifiers accessible through one or more tracers, said one or more tracers logged as being at least momentarily in physical proximity with said one or more ingestible materials via at least in part one or more electronically implemented pointers. Origination of an illustratively derived associated through pointers component group can be accomplished through skilled in the art design choice selection of one or more of the above depicted components from one or more of the above depicted subsystems shown in FIG. 12. Components from the associated through pointers component group can be used in implementing execution of the one or more associated through pointers instructions i1202 of FIG. 33, can be used in performance of the associated through pointers electrical circuitry arrangement e1202 of FIG. 26, and/or can be used in otherwise fulfillment of the operation o1202. An exemplary non-transitory signal bearing medium version of the information storage subsystem s200 is depicted in FIG. 33 as bearing the one or more associated through pointers instructions i1202 that when executed will direct performance of the operation o1202. Furthermore, the associated through pointers electrical circuitry arrangement ("elec circ arrange") e1202, when activated, will perform the operation o1202. Also, the associated through pointers module m1202, when executed and/or activated, will direct performance of and/or perform the operation o1202. For instance, in one or more exemplary implementations, the one or more associated through pointers instructions i1202, when executed, direct performance of the operation o1202 in the illustrative depiction as follows, and/or the associated through pointers electrical circuitry arrangement e1202, when activated, performs the operation o1202 in the illustrative depiction as follows, and/or the associated through pointers module m1202, when executed and/or activated, directs performance of and/or performs the operation o1202 in the illustrative depiction as follows, and/or the operation o1202 is otherwise carried out in the illustrative depiction as follows: the electronically associating (e.g. through database pointers, etc.) at least a portion of (e.g. half amount, etc.) said monitoring information (e.g. audio information, etc.) related to (e.g. advertising, etc.) one or more farming related production factors (e.g. gross capacity of vessel, etc.) involved with (e.g. argue, etc.) farming related production of (e.g. soy bean harvesting, etc.) one or more ingestible materials (e.g. carrot, etc.) with one or more identifiers (e.g. security data, etc.) accessible through (e.g. through search terms, etc.) one or more tracers, (e.g. UHF emitter, etc.) said one or more tracers logged (e.g. via database object information, etc.) as being at least momentarily (e.g. time in storage and display after unpacking, etc.) in physical proximity (e.g. stamped onto container, etc.) with said one or more ingestible materials (e.g. lamb meat, etc.) via at least in part one or more electronically implemented pointers (e.g. through database pointers, etc.).

In one or more implementations, as shown in FIG. 70, operation o12 includes an operation o1203 for the electronically associating at least a portion of said monitoring information related to one or more farming related production factors involved with farming related production of one or more ingestible materials with one or more identifiers accessible through one or more tracers, said one or more tracers logged as being at least momentarily in physical proximity with said one or more ingestible materials through at least in part one or more electronic relational databases. Origination of an illustratively derived associating through relational component group can be accomplished through skilled in the art design choice selection of one or more of the above depicted components from one or more of the above depicted subsystems shown in FIG. 12. Components from the associating through relational component group can be used in implementing execution of the one or more associating through relational instructions i1203 of FIG. 33, can be used in performance of the associating through relational electrical circuitry arrangement e1203 of FIG. 26, and/or can be used in otherwise fulfillment of the operation o1203. An exemplary non-transitory signal bearing medium version of the information storage subsystem s200 is depicted in FIG. 33 as bearing the one or more associating through relational instructions i1203 that when executed will direct performance of the operation o1203. Furthermore, the associating through relational electrical circuitry arrangement ("elec circ arrange") e1203, when activated, will perform the operation o1203. Also, the associating through relational module m1203, when executed and/or activated, will direct performance of and/or perform the operation o1203. For instance, in one or more exemplary implementations, the one or more associating through relational instructions i1203, when executed, direct performance of the operation o1203 in the illustrative depiction as follows, and/or the associating through relational electrical circuitry arrangement e1203, when activated, performs the operation o1203 in the illustrative depiction as follows, and/or the associating through relational module m1203, when executed and/or activated, directs performance of and/or performs the operation o1203 in the illustrative depiction as follows, and/or the operation o1203 is otherwise carried out in the illustrative depiction as follows: the electronically associating (e.g. common attributes found in data set, etc.) at least a portion of (e.g. quarter amount, etc.) said monitoring information (e.g. AVI file format, etc.) related to (e.g. illnesses, etc.) one or more farming related production factors (e.g. tide schedule, etc.) involved with (e.g. commit to, etc.) farming related production of (e.g. cherry picking, etc.) one or more ingestible materials (e.g. wheat, etc.) with one or more identifiers (e.g. phonetic alphabet, etc.) accessible through (e.g. through storage retrieval, etc.) one or more tracers, (e.g. ISM band emitter, etc.) said one or more tracers logged (e.g. via database table information, etc.) as being at least momentarily (e.g. shipping time across Pacific Ocean, etc.) in physical proximity (e.g. magnetically attached to container, etc.) with said one or more ingestible materials (e.g. octopus, etc.) through at least in part one or more electronic relational databases (e.g. common attributes found in data set, etc.).

Figure 71:
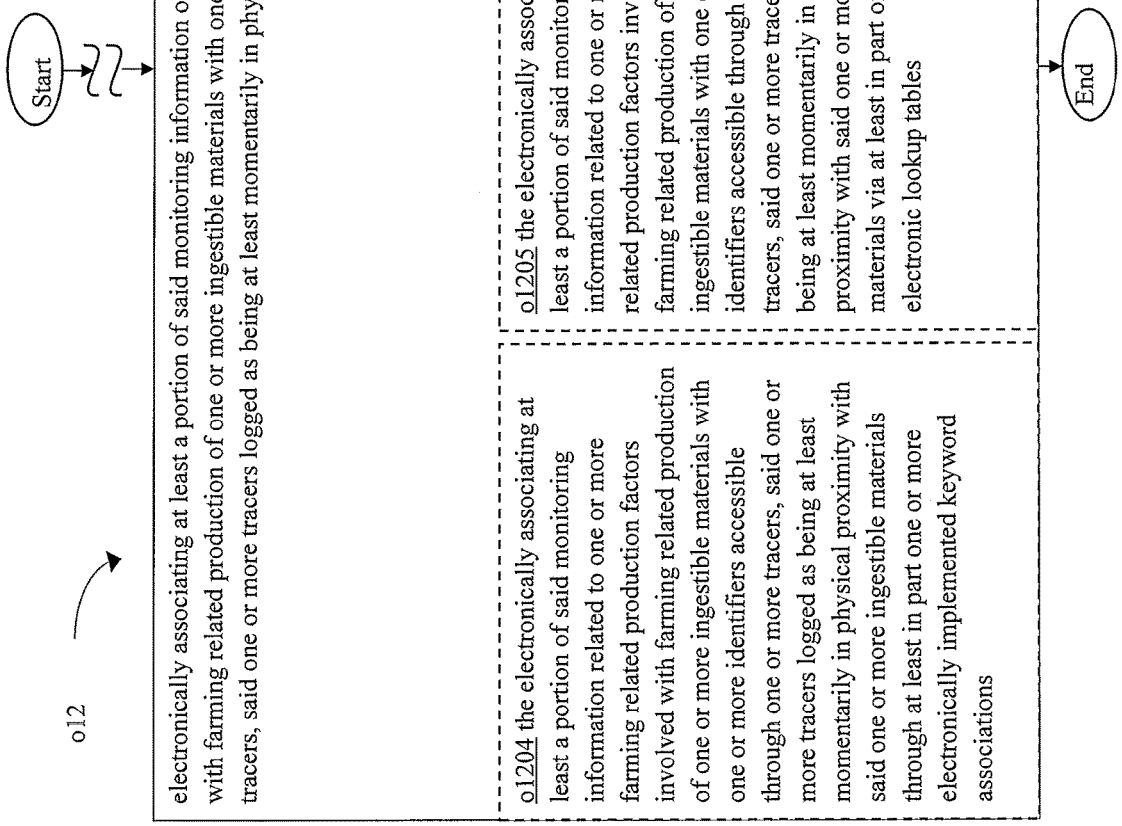
FIG. 71 is a high-level flowchart including exemplary implementations of operation o12 of FIG. 42.

In one or more implementations, as shown in FIG. 71, operation o12 includes an operation o1204 for the electronically associating at least a portion of said monitoring information related to one or more farming related production factors involved with farming related production of one or more ingestible materials with one or more identifiers accessible through one or more tracers, said one or more tracers logged as being at least momentarily in physical proximity with said one or more ingestible materials through at least in part one or more electronically implemented keyword associations. Origination of an illustratively derived associating through keywords component group can be accomplished through skilled in the art design choice selection of one or more of the above depicted components from one or more of the above depicted subsystems shown in FIG. 12. Components from the associating through keywords component group can be used in implementing execution of the one or more associating through keywords instructions i1204 of FIG. 33, can be used in performance of the associating through keywords electrical circuitry arrangement e1204 of FIG. 26, and/or can be used in otherwise fulfillment of the operation o1204. An exemplary non-transitory signal bearing medium version of the information storage subsystem s200 is depicted in FIG. 33 as bearing the one or more associating through keywords instructions i1204 that when executed will direct performance of the operation o1204. Furthermore, the associating through keywords electrical circuitry arrangement ("elec circ arrange") e1204, when activated, will perform the operation o1204. Also, the associating through keywords module m1204, when executed and/or activated, will direct performance of and/or perform the operation o1204. For instance, in one or more exemplary implementations, the one or more associating through keywords instructions i1204, when executed, direct performance of the operation o1204 in the illustrative depiction as follows, and/or the associating through keywords electrical circuitry arrangement e1204, when activated, performs the operation o1204 in the illustrative depiction as follows, and/or the associating through keywords module m1204, when executed and/or activated, directs performance of and/or performs the operation o1204 in the illustrative depiction as follows, and/or the operation o1204 is otherwise carried out in the illustrative depiction as follows: the electronically associating (e.g. through search terms, etc.) at least a portion of (e.g. fraction of, etc.) said monitoring information (e.g. MP3 file format, etc.) related to (e.g. current trends, etc.) one or more farming related production factors (e.g. tide height, etc.) involved with (e.g. embraced by, etc.) farming related production of (e.g. chicken egg laying, etc.) one or more ingestible materials (e.g. ground chicken, etc.) with one or more identifiers (e.g. Arabic alphabet, etc.) accessible through (e.g. through barcode scanning, etc.) one or more tracers, (e.g. microwave emitter, etc.) said one or more tracers logged (e.g. via index information, etc.) as being at least momentarily (e.g. time in holding bay, etc.) in physical proximity (e.g. snapped onto container, etc.) with said one or more ingestible materials (e.g. domestic goose, etc.) through at least in part one or more electronically implemented keyword associations (e.g. through search terms, etc.).

In one or more implementations, as shown in FIG. 71, operation o12 includes an operation o1205 for the electronically associating at least a portion of said monitoring information related to one or more farming related production factors involved with farming related production of one or more ingestible materials with one or more identifiers accessible through one or more tracers, said one or more tracers logged as being at least momentarily in physical proximity with said one or more ingestible materials via at least in part one or more electronic lookup tables. Origination of an illustratively derived associating through lookup component group can be accomplished through skilled in the art design choice selection of one or more of the above depicted components from one or more of the above depicted subsystems shown in FIG. 12. Components from the associating through lookup component group can be used in implementing execution of the one or more associating through lookup instructions i1205 of FIG. 33, can be used in performance of the associating through lookup electrical circuitry arrangement e1205 of FIG. 26, and/or can be used in otherwise fulfillment of the operation o1205. An exemplary non-transitory signal bearing medium version of the information storage subsystem s200 is depicted in FIG. 33 as bearing the one or more associating through lookup instructions i1205 that when executed will direct performance of the operation o1205. Furthermore, the associating through lookup electrical circuitry arrangement ("elec circ arrange") e1205, when activated, will perform the operation o1205. Also, the associating through lookup module m1205, when executed and/or activated, will direct performance of and/or perform the operation o1205. For instance, in one or more exemplary implementations, the one or more associating through lookup instructions i1205, when executed, direct performance of the operation o1205 in the illustrative depiction as follows, and/or the associating through lookup electrical circuitry arrangement e1205, when activated, performs the operation o1205 in the illustrative depiction as follows, and/or the associating through lookup module m1205, when executed and/or activated, directs performance of and/or performs the operation o1205 in the illustrative depiction as follows, and/or the operation o1205 is otherwise carried out in the illustrative depiction as follows: the electronically associating (e.g. through a query table, etc.) at least a portion of (e.g. percentage of, etc.) said monitoring information (e.g. MPEG file format, etc.) related to (e.g. technology, etc.) one or more farming related production factors (e.g. livestock inventory, etc.) involved with (e.g. engaging, etc.) farming related production of (e.g. clam digging, etc.) one or more ingestible materials (e.g. parsnip, etc.) with one or more identifiers (e.g. morse code, etc.) accessible through (e.g. through radiation detection, etc.) one or more tracers, (e.g. laser ranging tracker, etc.) said one or more tracers logged (e.g. via hard disk drive storage, etc.) as being at least momentarily (e.g. time held in port for inspection period, etc.) in physical proximity (e.g. stapled to container, etc.) with said one or more ingestible materials (e.g. shrimp, etc.) via at least in part one or more electronic lookup tables (e.g. via a query table, etc.).

In one or more implementations, as shown in FIG. 71, operation o12 includes an operation o1206 for electronically associating at least a portion of said monitoring information related to one or more farming related production factors involved with farming related production of one or more ingestible materials the with one or more identifiers accessible through one or more tracers, said one or more tracers logged as being at least momentarily in physical proximity with said one or more ingestible materials including at least in part one or more electronic identification codes. Origination of an illustratively derived associating identification codes component group can be accomplished through skilled in the art design choice selection of one or more of the above depicted components from one or more of the above depicted subsystems shown in FIG. 12. Components from the associating identification codes component group can be used in implementing execution of the one or more associating identification codes instructions i1206 of FIG. 33, can be used in performance of the associating identification codes electrical circuitry arrangement e1206 of FIG. 26, and/or can be used in otherwise fulfillment of the operation o1206. An exemplary non-transitory signal bearing medium version of the information storage subsystem s200 is depicted in FIG. 33 as bearing the one or more associating identification codes instructions i1206 that when executed will direct performance of the operation o1206. Furthermore, the associating identification codes electrical circuitry arrangement ("elec circ arrange") e1206, when activated, will perform the operation o1206. Also, the associating identification codes module m1206, when executed and/or activated, will direct performance of and/or perform the operation o1206. For instance, in one or more exemplary implementations, the one or more associating identification codes instructions i1206, when executed, direct performance of the operation o1206 in the illustrative depiction as follows, and/or the associating identification codes electrical circuitry arrangement e1206, when activated, performs the operation o1206 in the illustrative depiction as follows, and/or the associating identification codes module m1206, when executed and/or activated, directs performance of and/or performs the operation o1206 in the illustrative depiction as follows, and/or the operation o1206 is otherwise carried out in the illustrative depiction as follows: electronically associating (e.g. through data structure, etc.) at least a portion of (e.g. fraction of 1 percent, etc.) said monitoring information (e.g. WAV file format, etc.) related to (e.g. stock market, etc.) one or more farming related production factors (e.g. shipping container dimensions, etc.) involved with (e.g. incorporating, etc.) farming related production of (e.g. crab trapping, etc.) one or more ingestible materials (e.g. sheep cheese, etc.) the with one or more identifiers (e.g. binary sequence, etc.) accessible through (e.g. through isotope identification, etc.) one or more tracers, (e.g. ultrasonic emitter, etc.) said one or more tracers logged (e.g. via digital linear tape storage, etc.) as being at least momentarily (e.g. time on train between two terminals, etc.) in physical proximity (e.g. bolted to container, etc.) with said one or more ingestible materials (e.g. sturgeon eggs, etc.)

including at least in part one or more electronic identification codes (e.g. binary sequence, etc.).

Figure 72:
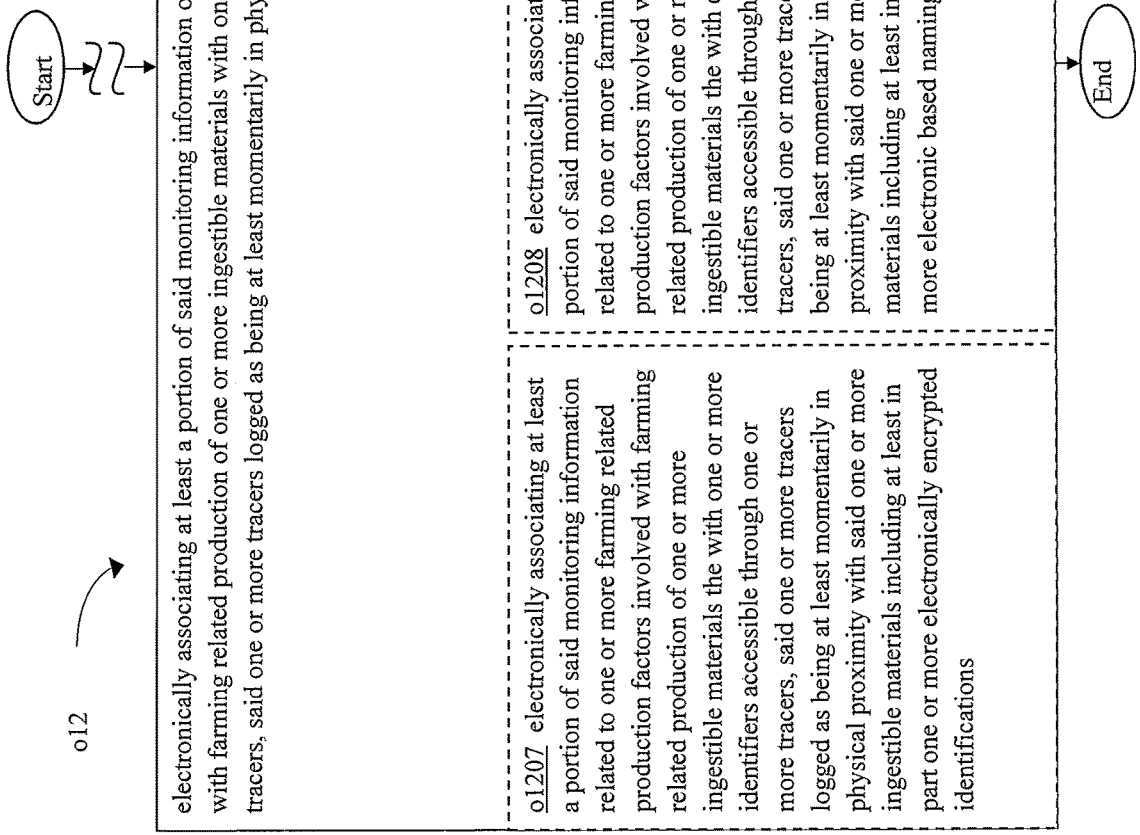
FIG. 72 is a high-level flowchart including exemplary implementations of operation o12 of FIG. 42.

In one or more implementations, as shown in FIG. 72, operation o12 includes an operation o1207 for electronically associating at least a portion of said monitoring information related to one or more farming related production factors involved with farming related production of one or more ingestible materials the with one or more identifiers accessible through one or more tracers, said one or more tracers logged as being at least momentarily in physical proximity with said one or more ingestible materials including at least in part one or more electronically encrypted identifications. Origination of an illustratively derived associating encryption information component group can be accomplished through skilled in the art design choice selection of one or more of the above depicted components from one or more of the above depicted subsystems shown in FIG. 12. Components from the associating encryption information component group can be used in implementing execution of the one or more associating encryption information instructions i1207 of FIG. 33, can be used in performance of the associating encryption information electrical circuitry arrangement e1207 of FIG. 26, and/or can be used in otherwise fulfillment of the operation o1207. An exemplary non-transitory signal bearing medium version of the information storage subsystem s200 is depicted in FIG. 33 as bearing the one or more associating encryption information instructions i1207 that when executed will direct performance of the operation o1207. Furthermore, the associating encryption information electrical circuitry arrangement ("elec circ arrange") e1207, when activated, will perform the operation o1207. Also, the associating encryption information module m1207, when executed and/or activated, will direct performance of and/or perform the operation o1207. For instance, in one or more exemplary implementations, the one or more associating encryption information instructions i1207, when executed, direct performance of the operation o1207 in the illustrative depiction as follows, and/or the associating encryption information electrical circuitry arrangement e1207, when activated, performs the operation o1207 in the illustrative depiction as follows, and/or the associating encryption information module m1207, when executed and/or activated, directs performance of and/or performs the operation o1207 in the illustrative depiction as follows, and/or the operation o1207 is otherwise carried out in the illustrative depiction as follows: electronically associating (e.g. through database table, etc.) at least a portion of (e.g. net amount, etc.) said monitoring information (e.g. visual sight, etc.) related to (e.g. time of day, etc.) one or more farming related production factors (e.g. herbicide type, etc.) involved with (e.g. implicate, etc.) farming related production of (e.g. alfalfa cutting, etc.) one or more ingestible materials (e.g. sturgeon, etc.) the with one or more identifiers (e.g. ASCII string, etc.) accessible through (e.g. through beacon signal reception, etc.) one or more tracers, (e.g. gyroscope, etc.) said one or more tracers logged (e.g. via CD-ROM storage, etc.) as being at least momentarily (e.g. partial time spent on retail display, etc.) in physical proximity (e.g. welded onto container, etc.) with said one or more ingestible materials (e.g. feed grain, etc.) including at least in part one or more electronically encrypted identifications (e.g. ASCII string, etc.).

In one or more implementations, as shown in FIG. 72, operation o12 includes an operation o1208 for electronically associating at least a portion of said monitoring information related to one or more farming related production factors involved with farming related production of one or more ingestible materials the with one or more identifiers accessible through one or more tracers, said one or more tracers logged as being at least momentarily in physical proximity with said one or more ingestible materials including at least in part one or more electronic based naming information. Origination of an illustratively derived associating naming information component group can be accomplished through skilled in the art design choice selection of one or more of the above depicted components from one or more of the above depicted subsystems shown in FIG. 12. Components from the associating naming information component group can be used in implementing execution of the one or more associating naming information instructions i1208 of FIG. 33, can be used in performance of the associating naming information electrical circuitry arrangement e1208 of FIG. 26, and/or can be used in otherwise fulfillment of the operation o1208. An exemplary non-transitory signal bearing medium version of the information storage subsystem s200 is depicted in FIG. 33 as bearing the one or more associating naming information instructions i1208 that when executed will direct performance of the operation o1208. Furthermore, the associating naming information electrical circuitry arrangement ("elec circ arrange") e1208, when activated, will perform the operation o1208. Also, the associating naming information module m1208, when executed and/or activated, will direct performance of and/or perform the operation o 1208. For instance, in one or more exemplary implementations, the one or more associating naming information instructions i1208, when executed, direct performance of the operation o1208 in the illustrative depiction as follows, and/or the associating naming information electrical circuitry arrangement e1208, when activated, performs the operation o1208 in the illustrative depiction as follows, and/or the associating naming information module m1208, when executed and/or activated, directs performance of and/or performs the operation o1208 in the illustrative depiction as follows, and/or the operation o1208 is otherwise carried out in the illustrative depiction as follows: electronically associating (e.g. through access of ordered records, etc.) at least a portion of (e.g. gross amount, etc.) said monitoring information (e.g. natural gas usage, etc.) related to (e.g. inventory supply, etc.) one or more farming related production factors (e.g. invasive plant type, etc.) involved with (e.g. necessitate, etc.) farming related production of (e.g. boot root harvesting, etc.) one or more ingestible materials (e.g. bison meat, etc.) the with one or more identifiers (e.g. alpha-numeric, etc.) accessible through (e.g. through image scanning, etc.) one or more tracers, (e.g. inertial sensor, etc.) said one or more tracers logged (e.g. via flat database, etc.) as being at least momentarily (e.g. time spent in laboratory for testing, etc.) in physical proximity (e.g. embossed on material, etc.) with said one or more ingestible materials (e.g. whole king crab, etc.) including at least in part one or more electronic based naming information (e.g. alpha-numeric data, etc.).

In one or more implementations, as shown in FIG. 72, operation o12 includes an operation o1209 for electronically associating at least a portion of said monitoring information related to one or more farming related production factors involved with farming related production of one or more ingestible materials the with one or more identifiers accessible through one or more tracers, said one or more tracers logged as being at least momentarily in physical proximity with said one or more ingestible materials including at least in part one or more electronically stored alpha-numeric text. Origination of an illustratively derived associating alpha-numeric text component group can be accomplished through skilled in the art design choice selection of one or more of the above depicted components from one or more of the above depicted subsystems shown in FIG. 12. Components from the associating alpha-numeric text component group can be used in implementing execution of the one or more associating alpha-numeric text instructions i1209 of FIG. 33, can be used in performance of the associating alpha-numeric text electrical circuitry arrangement e1209 of FIG. 26, and/or can be used in otherwise fulfillment of the operation o1209. An exemplary non-transitory signal bearing medium version of the information storage subsystem s200 is depicted in FIG. 33 as bearing the one or more associating alpha-numeric text instructions i1209 that when executed will direct performance of the operation o1209. Furthermore, the associating alpha-numeric text electrical circuitry arrangement ("elec circ arrange") e1209, when activated, will perform the operation o1209. Also, the associating alpha-numeric text module m1209, when executed and/or activated, will direct performance of and/or perform the operation o1209. For instance, in one or more exemplary implementations, the one or more associating alpha-numeric text instructions i1209, when executed, direct performance of the operation o1209 in the illustrative depiction as follows, and/or the associating alpha-numeric text electrical circuitry arrangement e1209, when activated, performs the operation o1209 in the illustrative depiction as follows, and/or the associating alpha-numeric text module m1209, when executed and/or activated, directs performance of and/or performs the operation o1209 in the illustrative depiction as follows, and/or the operation o1209 is otherwise carried out in the illustrative depiction as follows: electronically associating (e.g. via functions, etc.) at least a portion of (e.g. part of, etc.) said monitoring information (e.g. following safety protocols, etc.) related to (e.g. working conditions, etc.) one or more farming related production factors (e.g. lighting schedule, etc.) involved with (e.g. presuppose, etc.) farming related production of (e.g. oat harvesting, etc.) one or more ingestible materials (e.g. chicken feet, etc.) the with one or more identifiers (e.g. ISO basic Latin alphabet, etc.) accessible through (e.g. through audio reception, etc.) one or more tracers, (e.g. accelerometer, etc.) said one or more tracers logged (e.g. via database management layer, etc.) as being at least momentarily (e.g. shipping time from grocery store to home, etc.) in physical proximity (e.g. debossed on material, etc.) with said one or more ingestible materials (e.g. goat milk, etc.) including at least in part one or more electronically stored alpha-numeric text (e.g. ISO basic Latin alphabet, etc.).

Figure 73:
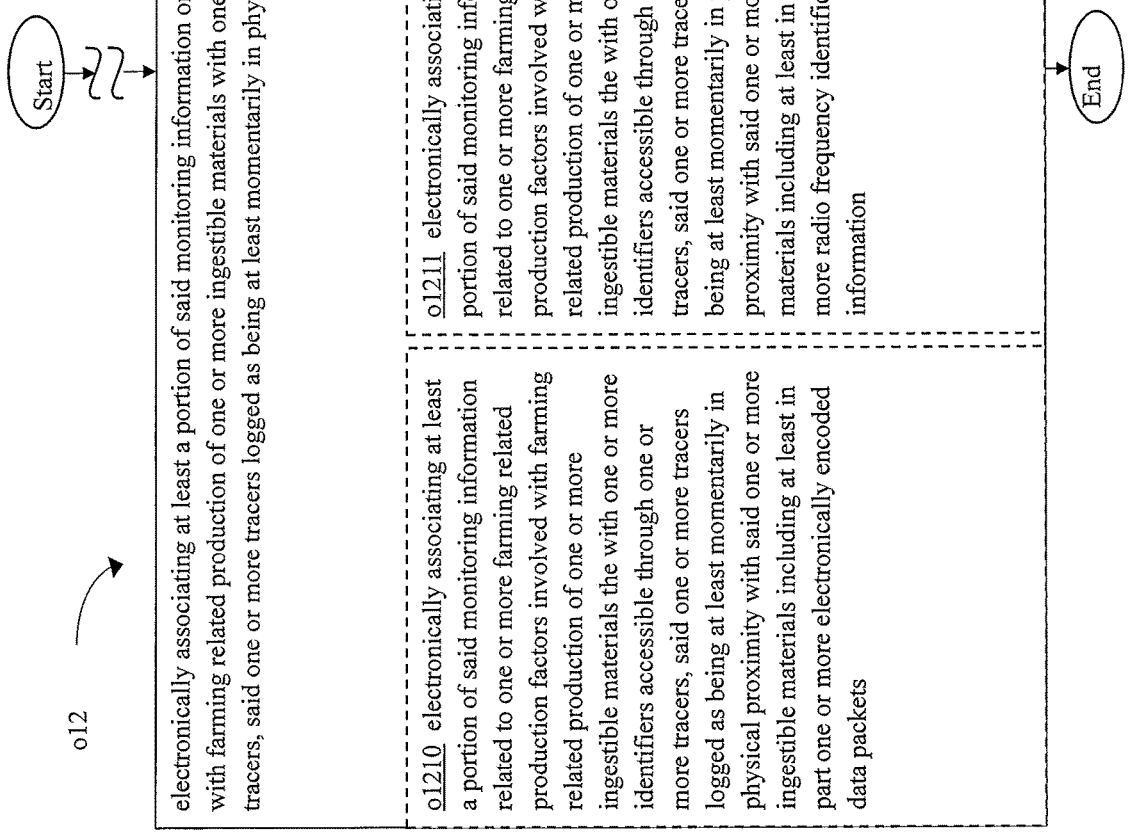
FIG. 73 is a high-level flowchart including exemplary implementations of operation o12 of FIG. 42.

In one or more implementations, as shown in FIG. 73, operation o12 includes an operation o1210 for electronically associating at least a portion of said monitoring information related to one or more farming related production factors involved with farming related production of one or more ingestible materials the with one or more identifiers accessible through one or more tracers, said one or more tracers logged as being at least momentarily in physical proximity with said one or more ingestible materials including at least in part one or more electronically encoded data packets. Origination of an illustratively derived associating encoded data packets component group can be accomplished through skilled in the art design choice selection of one or more of the above depicted components from one or more of the above depicted subsystems shown in FIG. 12. Components from the associating encoded data packets component group can be used in implementing execution of the one or more associating encoded data packets instructions i1210 of FIG. 33, can be used in performance of the associating encoded data packets electrical circuitry arrangement e1210 of FIG. 26, and/or can be used in otherwise fulfillment of the operation o1210. An exemplary non-transitory signal bearing medium version of the information storage subsystem s200 is depicted in FIG. 33 as bearing the one or more associating encoded data packets instructions i1210 that when executed will direct performance of the operation o1210. Furthermore, the associating encoded data packets electrical circuitry arrangement ("elec circ arrange") e1210, when activated, will perform the operation o1210. Also, the associating encoded data packets module m1210, when executed and/or activated, will direct performance of and/or perform the operation o1210. For instance, in one or more exemplary implementations, the one or more associating encoded data packets instructions i1210, when executed, direct performance of the operation o1210 in the illustrative depiction as follows, and/or the associating encoded data packets electrical circuitry arrangement e1210, when activated, performs the operation o1210 in the illustrative depiction as follows, and/or the associating encoded data packets module m1210, when executed and/or activated, directs performance of and/or performs the operation o1210 in the illustrative depiction as follows, and/or the operation o1210 is otherwise carried out in the illustrative depiction as follows: electronically associating via expressions, etc.) at least a portion of full amount, etc.) said monitoring information document forgery, etc.) related to labor force, etc.) one or more farming related production factors feeding schedule, etc.) involved with relationship, etc.) farming related production of silk harvesting, etc.) one or more ingestible materials ground beef, etc.) the with one or more identifiers symmetrically encrypted data packet, etc.) accessible through visual identification, etc.) one or more tracers, phase difference sensor, etc.) said one or more tracers logged via relational database, etc.) as being at least momentarily portion of time spent in ice bath, etc.) in physical proximity embossed on container, etc.) with said one or more ingestible materials cow liver including at least in part one or more electronically encoded data packets (e.g. symmetrically encrypted data packet, etc.).

In one or more implementations, as shown in FIG. 73, operation o12 includes an operation o1211 for electronically associating at least a portion of said monitoring information related to one or more farming related production factors involved with farming related production of one or more ingestible materials the with one or more identifiers accessible through one or more tracers, said one or more tracers logged as being at least momentarily in physical proximity with said one or more ingestible materials including at least in part one or more radio frequency identification information. Origination of an illustratively derived associating RFID information component group can be accomplished through skilled in the art design choice selection of one or more of the above depicted components from one or more of the above depicted subsystems shown in FIG. 12. Components from the associating RFID information component group can be used in implementing execution of the one or more associating RFID information instructions i1211 of FIG. 33, can be used in performance of the associating RFID information electrical circuitry arrangement e1211 of FIG. 26, and/or can be used in otherwise fulfillment of the operation o1211. An exemplary non-transitory signal bearing medium version of the information storage subsystem s200 is depicted in FIG. 33 as bearing the one or more associating RFID information instructions i1211 that when executed will direct performance of the operation o1211. Furthermore, the associating RFID information electrical circuitry arrangement ("elec circ arrange") e1211, when activated, will perform the operation o1211. Also, the associating RFID information module m1211, when executed and/or activated, will direct performance of and/or perform the operation o1211. For instance, in one or more exemplary implementations, the one or more associating RFID information instructions i1211, when executed, direct performance of the operation o1211 in the illustrative depiction as follows, and/or the associating RFID information electrical circuitry arrangement e1211, when activated, performs the operation o1211 in the illustrative depiction as follows, and/or the associating RFID information module m1211, when executed and/or activated, directs performance of and/or performs the operation o1211 in the illustrative depiction as follows, and/or the operation o1211 is otherwise carried out in the illustrative depiction as follows: electronically associating (e.g. via sub-linear time lookup, etc.) at least a portion of (e.g. full range, etc.) said monitoring information (e.g. scheduled feeding, etc.) related to (e.g. available credit, etc.) one or more farming related production factors (e.g. nutrient additive to diet, etc.) involved with (e.g. tangle, etc.) farming related production of (e.g. lentil harvesting, etc.) one or more ingestible materials (e.g. cod fish, etc.) the with one or more identifiers (e.g. serial number, etc.) accessible through (e.g. through light reception, etc.) one or more tracers, (e.g. magnetic field sensor, etc.) said one or more tracers logged (e.g. via hard drive storage, etc.) as being at least momentarily (e.g. time spent exposed to air before packaging, etc.) in physical proximity (e.g. debossed on container, etc.) with said one or more ingestible materials (e.g. squid, etc.) including at least in part one or more radio frequency identification information (e.g. serial number, etc.).

In one or more implementations, as shown in FIG. 73, operation o12 includes an operation o1212 for electronically associating at least a portion of said monitoring information related to one or more farming related production factors involved with farming related production of one or more ingestible materials the with one or more identifiers accessible through one or more tracers, said one or more tracers logged as being at least momentarily in physical proximity with said one or more ingestible materials including at least in part electronic optical information. Origination of an illustratively derived associating optical information component group can be accomplished through skilled in the art design choice selection of one or more of the above depicted components from one or more of the above depicted subsystems shown in FIG. 12. Components from the associating optical information component group can be used in implementing execution of the one or more associating optical information instructions i1212 of FIG. 33, can be used in performance of the associating optical information electrical circuitry arrangement e1212 of FIG. 26, and/or can be used in otherwise fulfillment of the operation o1212. An exemplary non-transitory signal bearing medium version of the information storage subsystem s200 is depicted in FIG. 33 as bearing the one or more associating optical information instructions i1212 that when executed will direct performance of the operation o1212. Furthermore, the associating optical information electrical circuitry arrangement ("elec circ arrange") e1212, when activated, will perform the operation o1212. Also, the associating optical information module m1212, when executed and/or activated, will direct performance of and/or perform the operation o1212. For instance, in one or more exemplary implementations, the one or more associating optical information instructions i1212, when executed, direct performance of the operation o1212 in the illustrative depiction as follows, and/or the associating optical information electrical circuitry arrangement e1212, when activated, performs the operation o1212 in the illustrative depiction as follows, and/or the associating optical information module m1212, when executed and/or activated, directs performance of and/or performs the operation o1212 in the illustrative depiction as follows, and/or the operation o1212 is otherwise carried out in the illustrative depiction as follows: electronically associating (e.g. through linear search, etc.) at least a portion of (e.g. a portion of the full range, etc.) said monitoring information (e.g. temperature, etc.) related to (e.g. irrigation, etc.) one or more farming related production factors (e.g. safety regulations, etc.) involved with (e.g. exclude, etc.) farming related production of (e.g. flax growing, etc.) one or more ingestible materials (e.g. barley, etc.) the with one or more identifiers (e.g. barcode, etc.) accessible through (e.g. through color spectrum identification, etc.) one or more tracers, (e.g. compass, etc.) said one or more tracers logged (e.g. via database object information, etc.) as being at least momentarily (e.g. time spent in cold storage, etc.) in physical proximity (e.g. placed inside container, etc.) with said one or more ingestible materials (e.g. edible frog, etc.) including at least in part electronic optical information (e.g. barcode, etc.).

Figure 74:
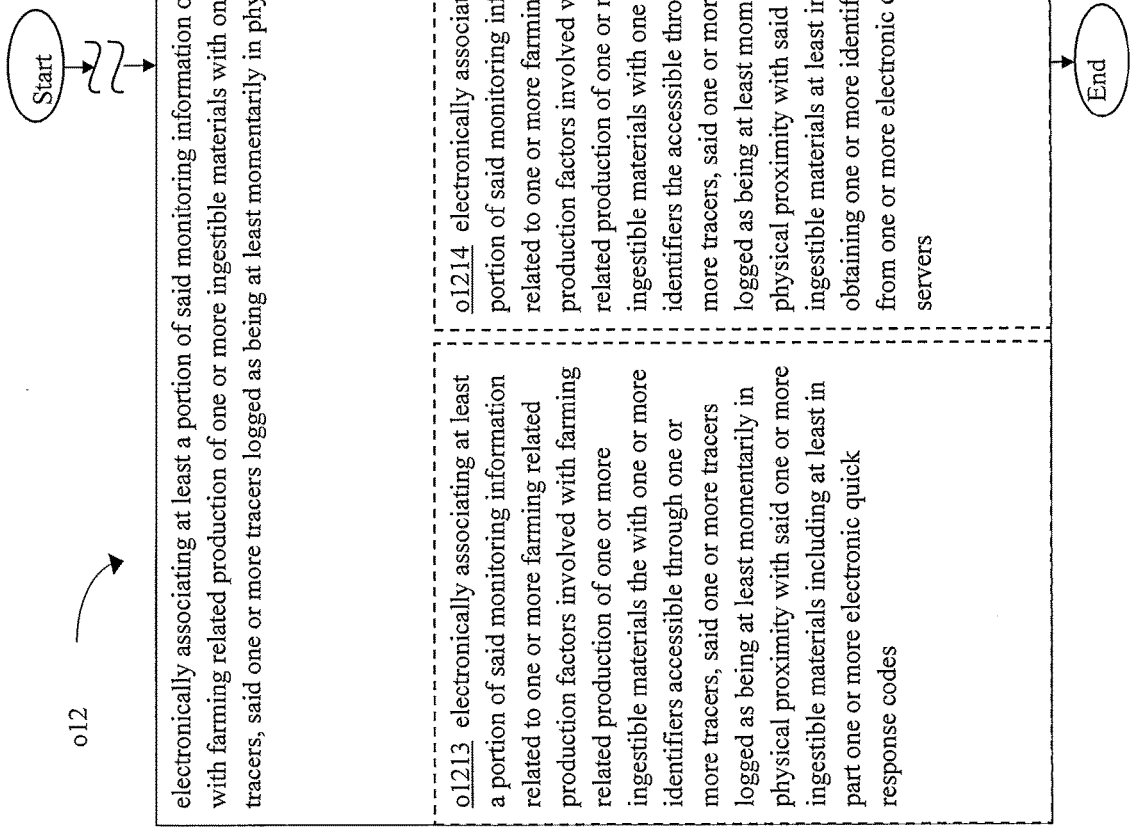
FIG. 74 is a high-level flowchart including exemplary implementations of operation o12 of FIG. 42.

In one or more implementations, as shown in FIG. 74, operation o12 includes an operation o1213 for electronically associating at least a portion of said monitoring information related to one or more farming related production factors involved with farming related production of one or more ingestible materials the with one or more identifiers accessible through one or more tracers, said one or more tracers logged as being at least momentarily in physical proximity with said one or more ingestible materials including at least in part one or more electronic quick response codes. Origination of an illustratively derived associating quick response code component group can be accomplished through skilled in the art design choice selection of one or more of the above depicted components from one or more of the above depicted subsystems shown in FIG. 12. Components from the associating quick response code component group can be used in implementing execution of the one or more associating quick response code instructions i1213 of FIG. 33, can be used in performance of the associating quick response code electrical circuitry arrangement e1213 of FIG. 26, and/or can be used in otherwise fulfillment of the operation o1213. An exemplary non-transitory signal bearing medium version of the information storage subsystem s200 is depicted in FIG. 33 as bearing the one or more associating quick response code instructions i1213 that when executed will direct performance of the operation o1213. Furthermore, the associating quick response code electrical circuitry arrangement ("elec circ arrange") e1213, when activated, will perform the operation o1213. Also, the associating quick response code module m1213, when executed and/or activated, will direct performance of and/or perform the operation o1213. For instance, in one or more exemplary implementations, the one or more associating quick response code instructions i1213, when executed, direct performance of the operation o1213 in the illustrative depiction as follows, and/or the associating quick response code electrical circuitry arrangement e1213, when activated, performs the operation o1213 in the illustrative depiction as follows, and/or the associating quick response code module m1213, when executed and/or activated, directs performance of and/or performs the operation o1213 in the illustrative depiction as follows, and/or the operation o1213 is otherwise carried out in the illustrative depiction as follows: electronically associating (e.g. through database constraints, etc.) at least a portion of (e.g. a scale of full size, etc.) said monitoring information (e.g. cold packing, etc.) related to (e.g. health issues, etc.) one or more farming related production factors (e.g. labor laws, etc.) involved with (e.g. requiring, etc.) farming related production of (e.g. strawberry picking, etc.) one or more ingestible materials (e.g. carp, etc.) the with one or more identifiers (e.g. kanji character set, etc.) accessible through (e.g. through RF reception, etc.) one or more tracers, (e.g. inclinometer, etc.) said one or more tracers logged (e.g. via database table information, etc.) as being at least momentarily (e.g. time spent in flight, etc.) in physical proximity (e.g. placed inside material, etc.) with said one or more ingestible materials (e.g. venison, etc.) including at least in part one or more electronic quick response codes (e.g. kanji character set, etc.).

In one or more implementations, as shown in FIG. 74, operation o12 includes an operation o1214 for electronically associating at least a portion of said monitoring information related to one or more farming related production factors involved with farming related production of one or more ingestible materials with one or more identifiers the accessible through one or more tracers, said one or more tracers logged as being at least momentarily in physical proximity with said one or more ingestible materials at least in part obtaining one or more identifiers directly from one or more electronic computer servers. Origination of an illustratively derived associating directly through tracer component group can be accomplished through skilled in the art design choice selection of one or more of the above depicted components from one or more of the above depicted subsystems shown in FIG. 12. Components from the associating directly through tracer component group can be used in implementing execution of the one or more associating directly through tracer instructions i1214 of FIG. 33, can be used in performance of the associating directly through tracer electrical circuitry arrangement e1214 of FIG. 26, and/or can be used in otherwise fulfillment of the operation o1214. An exemplary non-transitory signal bearing medium version of the information storage subsystem s200 is depicted in FIG. 33 as bearing the one or more associating directly through tracer instructions i1214 that when executed will direct performance of the operation o1214. Furthermore, the associating directly through tracer electrical circuitry arrangement ("elec circ arrange") e1214, when activated, will perform the operation o1214. Also, the associating directly through tracer module m1214, when executed and/or activated, will direct performance of and/or perform the operation o1214. For instance, in one or more exemplary implementations, the one or more associating directly through tracer instructions i1214, when executed, direct performance of the operation o1214 in the illustrative depiction as follows, and/or the associating directly through tracer electrical circuitry arrangement e1214, when activated, performs the operation o1214 in the illustrative depiction as follows, and/or the associating directly through tracer module m1214, when executed and/or activated, directs performance of and/or performs the operation o1214 in the illustrative depiction as follows, and/or the operation o1214 is otherwise carried out in the illustrative depiction as follows: electronically associating (e.g. through unique exclusions of data, etc.) at least a portion of (e.g. par value, etc.) said monitoring information (e.g. tractor operation, etc.) related to (e.g. energy cost, etc.) one or more farming related production factors (e.g. livestock inventory, etc.) involved with (e.g. envelope, etc.) farming related production of (e.g. rice harvesting, etc.) one or more ingestible materials (e.g. corn on cob, etc.) with one or more identifiers (e.g. matrix code, etc.) the accessible through (e.g. through scanning, etc.) one or more tracers, (e.g. hybrid positioning system, etc.) said one or more tracers logged (e.g. via ROM storage, etc.) as being at least momentarily (e.g. portion of time spent on shipping vessel, etc.) in physical proximity (e.g. enveloping material, etc.) with said one or more ingestible materials (e.g. ostrich meat, etc.) at least in part obtaining one or more identifiers directly from one or more electronic computer servers (e.g. through scanning, etc.).

In one or more implementations, as shown in FIG. 74, operation o12 includes an operation o1215 for electronically associating at least a portion of said monitoring information related to one or more farming related production factors involved with farming related production of one or more ingestible materials with one or more identifiers the accessible through one or more tracers, said one or more tracers logged as being at least momentarily in physical proximity with said one or more ingestible materials at least in part using information obtained from one or more tracers to electronically access one or more identifiers via a computer based electronic network. Origination of an illustratively derived associating through network component group can be accomplished through skilled in the art design choice selection of one or more of the above depicted components from one or more of the above depicted subsystems shown in FIG. 12. Components from the associating through network component group can be used in implementing execution of the one or more associating through network instructions i1215 of FIG. 33, can be used in performance of the associating through network electrical circuitry arrangement e1215 of FIG. 26, and/or can be used in otherwise fulfillment of the operation o1215. An exemplary non-transitory signal bearing medium version of the information storage subsystem s200 is depicted in FIG. 33 as bearing the one or more associating through network instructions i1215 that when executed will direct performance of the operation o1215. Furthermore, the associating through network electrical circuitry arrangement ("elec circ arrange") e1215, when activated, will perform the operation o1215. Also, the associating through network module m1215, when executed and/or activated, will direct performance of and/or perform the operation o1215. For instance, in one or more exemplary implementations, the one or more associating through network instructions i1215, when executed, direct performance of the operation o1215 in the illustrative depiction as follows, and/or the associating through network electrical circuitry arrangement e1215, when activated, performs the operation o1215 in the illustrative depiction as follows, and/or the associating through network module m1215, when executed and/or activated, directs performance of and/or performs the operation o1215 in the illustrative depiction as follows, and/or the operation o1215 is otherwise carried out in the illustrative depiction as follows: electronically associating (e.g. through primary key, etc.) at least a portion of (e.g. agreed amount, etc.) said monitoring information (e.g. electricity usage, etc.) related to (e.g. sustainability, etc.) one or more farming related production factors (e.g. range schedule, etc.) involved with (e.g. associate with, etc.) farming related production of (e.g. pear picking, etc.) one or more ingestible materials (e.g. wheat flour, etc.) with one or more identifiers (e.g. SPARQ Code, etc.) the accessible through (e.g. through database query, etc.) one or more tracers, (e.g. high frequency RFID, etc.) said one or more tracers logged (e.g. via floppy disk storage, etc.) as being at least momentarily (e.g. portion of time spent packaged with similar material, etc.) in physical proximity (e.g. enveloping container, etc.) with said one or more ingestible materials (e.g. beet pulp, etc.) at least in part using information obtained from one or more tracers to electronically access one or more identifiers via a computer based electronic network (e.g. through database query, etc.).

Figure 75:
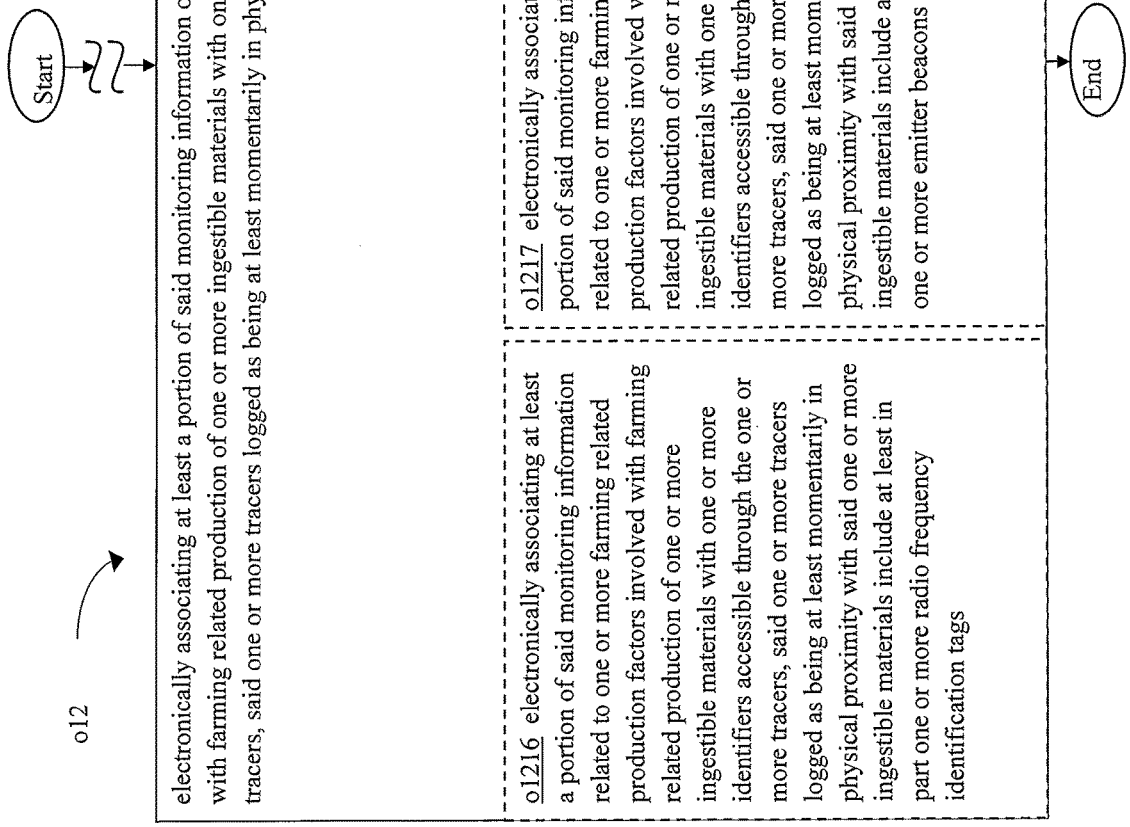
FIG. 75 is a high-level flowchart including exemplary implementations of operation o12 of FIG. 42.

In one or more implementations, as shown in FIG. 75, operation o12 includes an operation o1216 for electronically associating at least a portion of said monitoring information related to one or more farming related production factors involved with farming related production of one or more ingestible materials with one or more identifiers accessible through the one or more tracers, said one or more tracers logged as being at least momentarily in physical proximity with said one or more ingestible materials include at least in part one or more radio frequency identification tags. Origination of an illustratively derived associating re RFID tag component group can be accomplished through skilled in the art design choice selection of one or more of the above depicted components from one or more of the above depicted subsystems shown in FIG. 12. Components from the associating re RFID tag component group can be used in implementing execution of the one or more associating re RFID tag instructions i1216 of FIG. 33, can be used in performance of the associating re RFID tag electrical circuitry arrangement e1216 of FIG. 26, and/or can be used in otherwise fulfillment of the operation o1216. An exemplary non-transitory signal bearing medium version of the information storage subsystem s200 is depicted in FIG. 33 as bearing the one or more associating re RFID tag instructions i1216 that when executed will direct performance of the operation o1216. Furthermore, the associating re RFID tag electrical circuitry arrangement ("elec circ arrange") e1216, when activated, will perform the operation o1216. Also, the associating re RFID tag module m1216, when executed and/or activated, will direct performance of and/or perform the operation o1216. For instance, in one or more exemplary implementations, the one or more associating re RFID tag instructions i1216, when executed, direct performance of the operation o1216 in the illustrative depiction as follows, and/or the associating re RFID tag electrical circuitry arrangement e1216, when activated, performs the operation o1216 in the illustrative depiction as follows, and/or the associating re RFID tag module m1216, when executed and/or activated, directs performance of and/or performs the operation o1216 in the illustrative depiction as follows, and/or the operation o1216 is otherwise carried out in the illustrative depiction as follows: electronically associating (e.g. through foreign key search, etc.) at least a portion of (e.g. named amount, etc.) said monitoring information (e.g. irrigation, etc.) related to (e.g. climate, etc.) one or more farming related production factors (e.g. range area, etc.) involved with (e.g. take in, etc.) farming related production of (e.g. parsnip growing, etc.) one or more ingestible materials (e.g. pork meat, etc.) with one or more identifiers (e.g. article number, etc.) accessible through (e.g. through electromagnetic reception, etc.) the one or more tracers, (e.g. low frequency RFID, etc.) said one or more tracers logged (e.g. via DVD-ROM storage, etc.) as being at least momentarily (e.g. shipping time from vessel to factory, etc.) in physical proximity (e.g. riveted to container, etc.) with said one or more ingestible materials (e.g. goat cheese, etc.) include at least in part one or more radio frequency identification tags (e.g. low frequency RFID tag, etc.).

In one or more implementations, as shown in FIG. 75, operation o12 includes an operation o1217 for electronically associating at least a portion of said monitoring information related to one or more farming related production factors involved with farming related production of one or more ingestible materials with one or more identifiers accessible through the one or more tracers, said one or more tracers logged as being at least momentarily in physical proximity with said one or more ingestible materials include at least in part one or more emitter beacons. Origination of an illustratively derived associating re emitter beacons component group can be accomplished through skilled in the art design choice selection of one or more of the above depicted components from one or more of the above depicted subsystems shown in FIG. 12. Components from the associating re emitter beacons component group can be used in implementing execution of the one or more associating re emitter beacons instructions i1217 of FIG. 33, can be used in performance of the associating re emitter beacons electrical circuitry arrangement e1217 of FIG. 26, and/or can be used in otherwise fulfillment of the operation o1217. An exemplary non-transitory signal bearing medium version of the information storage subsystem s200 is depicted in FIG. 33 as bearing the one or more associating re emitter beacons instructions i1217 that when executed will direct performance of the operation o1217. Furthermore, the associating re emitter beacons electrical circuitry arrangement ("elec circ arrange") e1217, when activated, will perform the operation o1217. Also, the associating re emitter beacons module m1217, when executed and/or activated, will direct performance of and/or perform the operation o1217. For instance, in one or more exemplary implementations, the one or more associating re emitter beacons instructions i1217, when executed, direct performance of the operation o1217 in the illustrative depiction as follows, and/or the associating re emitter beacons electrical circuitry arrangement e1217, when activated, performs the operation o1217 in the illustrative depiction as follows, and/or the associating re emitter beacons module m1217, when executed and/or activated, directs performance of and/or performs the operation o1217 in the illustrative depiction as follows, and/or the operation o1217 is otherwise carried out in the illustrative depiction as follows: electronically associating (e.g. through a hash table search, etc.) at least a portion of (e.g. requested amount, etc.) said monitoring information (e.g. sanitized tongs, etc.) related to (e.g. economic conditions, etc.) one or more farming related production factors (e.g. cost of pollination, etc.) involved with (e.g. comprised of, etc.) farming related production of (e.g. cow birthing, etc.) one or more ingestible materials (e.g. water, etc.) with one or more identifiers (e.g. GS1 databar, etc.) accessible through (e.g. through search terms, etc.) the one or more tracers, (e.g. ultrasonic tracker, etc.) said one or more tracers logged (e.g. via food composition database, etc.) as being at least momentarily (e.g. time spent on conveyor belt in factory, etc.) in physical proximity (e.g. burned into container, etc.) with said one or more ingestible materials (e.g. potato, etc.) include at least in part one or more emitter beacons (e.g. ultrasonic tracker, etc.).

In one or more implementations, as shown in FIG. 75, operation o12 includes an operation o1218 for electronically associating at least a portion of said monitoring information related to one or more farming related production factors involved with farming related production of one or more ingestible materials with one or more identifiers accessible through the one or more tracers, said one or more tracers logged as being at least momentarily in physical proximity with said one or more ingestible materials include at least in part one or more barcode tags. Origination of an illustratively derived associating re barcode tag component group can be accomplished through skilled in the art design choice selection of one or more of the above depicted components from one or more of the above depicted subsystems shown in FIG. 12. Components from the associating re barcode tag component group can be used in implementing execution of the one or more associating re barcode tag instructions i1218 of FIG. 33, can be used in performance of the associating re barcode tag electrical circuitry arrangement e1218 of FIG. 26, and/or can be used in otherwise fulfillment of the operation o1218. An exemplary non-transitory signal bearing medium version of the information storage subsystem s200 is depicted in FIG. 33 as bearing the one or more associating re barcode tag instructions i1218 that when executed will direct performance of the operation o1218. Furthermore, the associating re barcode tag electrical circuitry arrangement ("elec circ arrange") e1218, when activated, will perform the operation o1218. Also, the associating re barcode tag module m1218, when executed and/or activated, will direct performance of and/or perform the operation o1218. For instance, in one or more exemplary implementations, the one or more associating re barcode tag instructions i1218, when executed, direct performance of the operation o1218 in the illustrative depiction as follows, and/or the associating re barcode tag electrical circuitry arrangement e1218, when activated, performs the operation o1218 in the illustrative depiction as follows, and/or the associating re barcode tag module m1218, when executed and/or activated, directs performance of and/or performs the operation o1218 in the illustrative depiction as follows, and/or the operation o1218 is otherwise carried out in the illustrative depiction as follows: electronically associating (e.g. via a SQL search, etc.) at least a portion of (e.g. portion of agreed amount, etc.) said monitoring information (e.g. DDT insecticide, etc.) related to (e.g. bioavailability, etc.) one or more farming related production factors (e.g. bee pollination schedule, etc.) involved with (e.g. comprehend, etc.) farming related production of (e.g. blueberry cultivation, etc.) one or more ingestible materials (e.g. emu meat, etc.) with one or more identifiers (e.g. bokode, etc.) accessible through (e.g. through storage retrieval, etc.) the one or more tracers, (e.g. high capacity color barcode, etc.) said one or more tracers logged (e.g. via body information, etc.) as being at least momentarily (e.g. time spent unpackaged in home environment, etc.) in physical proximity (e.g. burned into material, etc.) with said one or more ingestible materials (e.g. whole lobster, etc.) include at least in part one or more barcode tags (e.g. high capacity color barcode, etc.).

Figure 76:
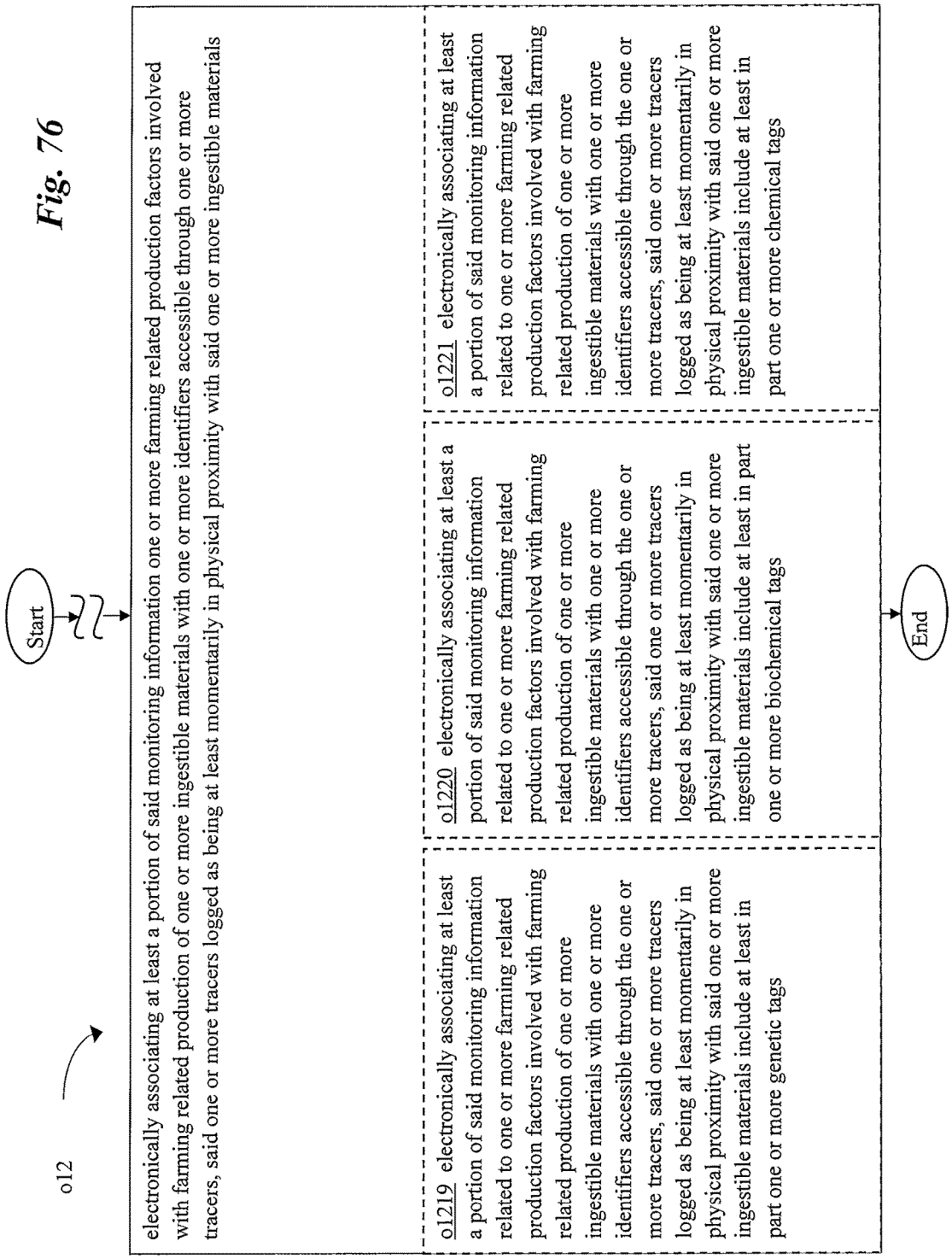
FIG. 76 is a high-level flowchart including exemplary implementations of operation o12 of FIG. 42.

In one or more implementations, as shown in FIG. 76, operation o12 includes an operation o1219 for electronically associating at least a portion of said monitoring information related to one or more farming related production factors involved with farming related production of one or more ingestible materials with one or more identifiers accessible through the one or more tracers, said one or more tracers logged as being at least momentarily in physical proximity with said one or more ingestible materials include at least in part one or more genetic tags. Origination of an illustratively derived associating re genetic tag component group can be accomplished through skilled in the art design choice selection of one or more of the above depicted components from one or more of the above depicted subsystems shown in FIG. 12. Components from the associating re genetic tag component group can be used in implementing execution of the one or more associating re genetic tag instructions i1219 of FIG. 33, can be used in performance of the associating re genetic tag electrical circuitry arrangement e1219 of FIG. 26, and/or can be used in otherwise fulfillment of the operation o1219. An exemplary non-transitory signal bearing medium version of the information storage subsystem s200 is depicted in FIG. 33 as bearing the one or more associating re genetic tag instructions i1219 that when executed will direct performance of the operation o1219. Furthermore, the associating re genetic tag electrical circuitry arrangement ("elec circ arrange") e1219, when activated, will perform the operation o1219. Also, the associating re genetic tag module m1219, when executed and/or activated, will direct performance of and/or perform the operation o1219. For instance, in one or more exemplary implementations, the one or more associating re genetic tag instructions i1219, when executed, direct performance of the operation o1219 in the illustrative depiction as follows, and/or the associating re genetic tag electrical circuitry arrangement e1219, when activated, performs the operation o1219 in the illustrative depiction as follows, and/or the associating re genetic tag module m1219, when executed and/or activated, directs performance of and/or performs the operation o1219 in the illustrative depiction as follows, and/or the operation o1219 is otherwise carried out in the illustrative depiction as follows: electronically associating (e.g. through a bitmap index, etc.) at least a portion of (e.g. the principle amount, etc.) said monitoring information (e.g. production speed, etc.) related to (e.g. antibiotics, etc.) one or more farming related production factors (e.g. livestock fertility, etc.) involved with (e.g. associated, etc.) farming related production of (e.g. corn growing, etc.) one or more ingestible materials (e.g. kangaroo meat, etc.) with one or more identifiers (e.g. number, etc.) accessible through (e.g. through barcode scanning, etc.) the one or more tracers, (e.g. expressed sequence tag, etc.) said one or more tracers logged (e.g. via index information, etc.) as being at least momentarily (e.g. shipping time on truck from distribution center to market, etc.) in physical proximity (e.g. snapped onto container, etc.) with said one or more ingestible materials (e.g. cow heart, etc.) include at least in part one or more genetic tags (e.g. expressed sequence tag, etc.).

In one or more implementations, as shown in FIG. 76, operation o12 includes an operation o1220 for electronically associating at least a portion of said monitoring information related to one or more farming related production factors involved with farming related production of one or more ingestible materials with one or more identifiers accessible through the one or more tracers, said one or more tracers logged as being at least momentarily in physical proximity with said one or more ingestible materials include at least in part one or more biochemical tags. Origination of an illustratively derived associating re histochemical tag component group can be accomplished through skilled in the art design choice selection of one or more of the above depicted components from one or more of the above depicted subsystems shown in FIG. 12. Components from the associating re histochemical tag component group can be used in implementing execution of the one or more associating re histochemical tag instructions i1220 of FIG. 34, can be used in performance of the associating re histochemical tag electrical circuitry arrangement e1220 of FIG. 27, and/or can be used in otherwise fulfillment of the operation o1220. An exemplary non-transitory signal bearing medium version of the information storage subsystem s200 is depicted in FIG. 34 as bearing the one or more associating re histochemical tag instructions i1220 that when executed will direct performance of the operation o1220. Furthermore, the associating re histochemical tag electrical circuitry arrangement ("elec circ arrange") e1220, when activated, will perform the operation o1220. Also, the associating re histochemical tag module m1220, when executed and/or activated, will direct performance of and/or perform the operation o1220. For instance, in one or more exemplary implementations, the one or more associating re histochemical tag instructions i1220, when executed, direct performance of the operation o1220 in the illustrative depiction as follows, and/or the associating re histochemical tag electrical circuitry arrangement e1220, when activated, performs the operation o1220 in the illustrative depiction as follows, and/or the associating re histochemical tag module m1220, when executed and/or activated, directs performance of and/or performs the operation o1220 in the illustrative depiction as follows, and/or the operation o1220 is otherwise carried out in the illustrative depiction as follows: electronically associating (e.g. through a dense index, etc.) at least a portion of (e.g. interest amount, etc.) said monitoring information (e.g. labor force scheduling, etc.) related to (e.g. nutrients, etc.) one or more farming related production factors (e.g. corral dimensions, etc.) involved with (e.g. affecting, etc.) farming related production of (e.g. canola harvesting, etc.) one or more ingestible materials (e.g. catfish, etc.) with one or more identifiers (e.g. text, etc.) accessible through (e.g. through radiation detection, etc.) the one or more tracers, (e.g. retrograde neuronal tracer, etc.) said one or more tracers logged (e.g. via server information, etc.) as being at least momentarily (e.g. time since introduction of oxygen absorber, etc.) in physical proximity (e.g. stapled to container, etc.) with said one or more ingestible materials (e.g. green algae, etc.) include at least in part one or more biochemical tags (e.g. retrograde neuronal tracer, etc.).

In one or more implementations, as shown in FIG. 76, operation o12 includes an operation o1221 for electronically associating at least a portion of said monitoring information related to one or more farming related production factors involved with farming related production of one or more ingestible materials with one or more identifiers accessible through the one or more tracers, said one or more tracers logged as being at least momentarily in physical proximity with said one or more ingestible materials include at least in part one or more chemical tags. Origination of an illustratively derived associating re cytochemical tag component group can be accomplished through skilled in the art design choice selection of one or more of the above depicted components from one or more of the above depicted subsystems shown in FIG. 12. Components from the associating re cytochemical tag component group can be used in implementing execution of the one or more associating re cytochemical tag instructions i1221 of FIG. 34, can be used in performance of the associating re cytochemical tag electrical circuitry arrangement e1221 of FIG. 27, and/or can be used in otherwise fulfillment of the operation o1221. An exemplary non-transitory signal bearing medium version of the information storage subsystem s200 is depicted in FIG. 34 as bearing the one or more associating re cytochemical tag instructions i1221 that when executed will direct performance of the operation o1221. Furthermore, the associating re cytochemical tag electrical circuitry arrangement ("elec circ arrange") e1221, when activated, will perform the operation o1221. Also, the associating re cytochemical tag module m1221, when executed and/or activated, will direct performance of and/or perform the operation o1221. For instance, in one or more exemplary implementations, the one or more associating re cytochemical tag instructions i1221, when executed, direct performance of the operation o1221 in the illustrative depiction as follows, and/or the associating re cytochemical tag electrical circuitry arrangement e1221, when activated, performs the operation o1221 in the illustrative depiction as follows, and/or the associating re cytochemical tag module m1221, when executed and/or activated, directs performance of and/or performs the operation o1221 in the illustrative depiction as follows, and/or the operation o1221 is otherwise carried out in the illustrative depiction as follows: electronically associating (e.g. through a sparse index, etc.) at least a portion of (e.g. current portion, etc.) said monitoring information (e.g. future market demands, etc.) related to (e.g. soil conditions, etc.) one or more farming related production factors (e.g. lease duration of equipment, etc.) involved with (e.g. connected, etc.) farming related production of (e.g. peach picking, etc.) one or more ingestible materials (e.g. green algae, etc.) with one or more identifiers (e.g. document discriminator, etc.) accessible through (e.g. through isotope identification, etc.) the one or more tracers, (e.g. macromolecule marker, etc.) said one or more tracers logged (e.g. via digital linear tape storage, etc.) as being at least momentarily (e.g. shipping time from farm to restaurant, etc.) in physical proximity (e.g. tied to container, etc.) with said one or more ingestible materials (e.g. cat fish include at least in part one or more chemical tags (e.g. macromolecule marker, etc.).

Figure 77:
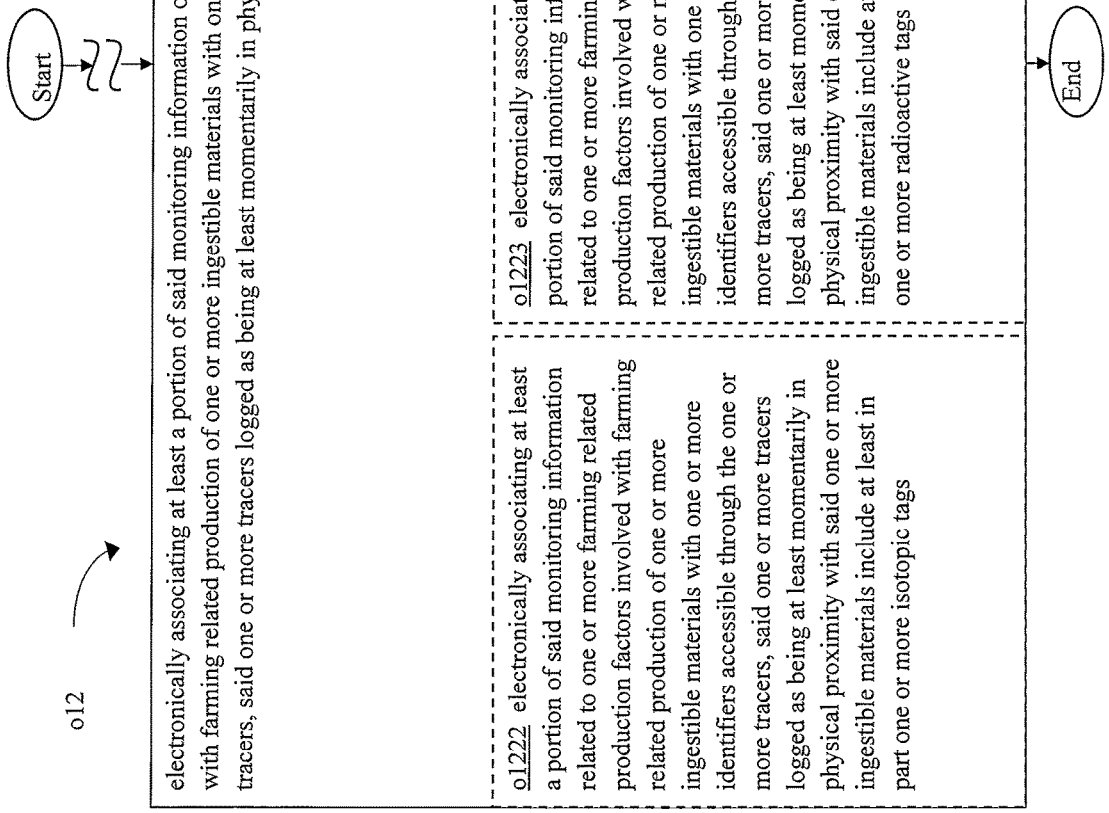
FIG. 77 is a high-level flowchart including exemplary implementations of operation o12 of FIG. 42.

In one or more implementations, as shown in FIG. 77, operation o12 includes an operation o1222 for electronically associating at least a portion of said monitoring information related to one or more farming related production factors involved with farming related production of one or more ingestible materials with one or more identifiers accessible through the one or more tracers, said one or more tracers logged as being at least momentarily in physical proximity with said one or more ingestible materials include at least in part one or more isotopic tags. Origination of an illustratively derived associating re isotopic tag component group can be accomplished through skilled in the art design choice selection of one or more of the above depicted components from one or more of the above depicted subsystems shown in FIG. 12. Components from the associating re isotopic tag component group can be used in implementing execution of the one or more associating re isotopic tag instructions i1222 of FIG. 34, can be used in performance of the associating re isotopic tag electrical circuitry arrangement e1222 of FIG. 27, and/or can be used in otherwise fulfillment of the operation o1222. An exemplary non-transitory signal bearing medium version of the information storage subsystem s200 is depicted in FIG. 34 as bearing the one or more associating re isotopic tag instructions i1222 that when executed will direct performance of the operation o1222. Furthermore, the associating re isotopic tag electrical circuitry arrangement ("elec circ arrange") e1222, when activated, will perform the operation o1222. Also, the associating re isotopic tag module m1222, when executed and/or activated, will direct performance of and/or perform the operation o1222. For instance, in one or more exemplary implementations, the one or more associating re isotopic tag instructions i1222, when executed, direct performance of the operation o1222 in the illustrative depiction as follows, and/or the associating re isotopic tag electrical circuitry arrangement e1222, when activated, performs the operation o1222 in the illustrative depiction as follows, and/or the associating re isotopic tag module m1222, when executed and/or activated, directs performance of and/or performs the operation o1222 in the illustrative depiction as follows, and/or the operation o1222 is otherwise carried out in the illustrative depiction as follows: electronically associating (e.g. through a reverse index, etc.) at least a portion of (e.g. future portion, etc.) said monitoring information (e.g.

improper data calculation, etc.) related to (e.g. scientific data, etc.) one or more farming related production factors (e.g. efficiency of tilling, etc.) involved with (e.g. absorbed by, etc.) farming related production of (e.g. sheep butchering, etc.) one or more ingestible materials (e.g. cow heart, etc.) with one or more identifiers (e.g. hologram, etc.) accessible through (e.g. through beacon signal reception, etc.) the one or more tracers, (e.g. carbon-12 marker, etc.) said one or more tracers logged (e.g. via database object information, etc.) as being at least momentarily (e.g. time in storage and display after unpacking, etc.) in physical proximity (e.g. stamped onto container, etc.) with said one or more ingestible materials (e.g. kangaroo meat, etc.) include at least in part one or more isotopic tags (e.g. carbon-12 marker, etc.).

In one or more implementations, as shown in FIG. 77, operation o12 includes an operation o1223 for electronically associating at least a portion of said monitoring information related to one or more farming related production factors involved with farming related production of one or more ingestible materials with one or more identifiers accessible through the one or more tracers, said one or more tracers logged as being at least momentarily in physical proximity with said one or more ingestible materials include at least in part one or more radioactive tags. Origination of an illustratively derived associating re radioactive tag component group can be accomplished through skilled in the art design choice selection of one or more of the above depicted components from one or more of the above depicted subsystems shown in FIG. 12. Components from the associating re radioactive tag component group can be used in implementing execution of the one or more associating re radioactive tag instructions i1223 of FIG. 34, can be used in performance of the associating re radioactive tag electrical circuitry arrangement e1223 of FIG. 27, and/or can be used in otherwise fulfillment of the operation o1223. An exemplary non-transitory signal bearing medium version of the information storage subsystem s200 is depicted in FIG. 34 as bearing the one or more associating re radioactive tag instructions i1223 that when executed will direct performance of the operation o1223. Furthermore, the associating re radioactive tag electrical circuitry arrangement ("elec circ arrange") e1223, when activated, will perform the operation o1223. Also, the associating re radioactive tag module m1223, when executed and/or activated, will direct performance of and/or perform the operation o1223. For instance, in one or more exemplary implementations, the one or more associating re radioactive tag instructions i1223, when executed, direct performance of the operation o1223 in the illustrative depiction as follows, and/or the associating re radioactive tag electrical circuitry arrangement e1223, when activated, performs the operation o1223 in the illustrative depiction as follows, and/or the associating re radioactive tag module m1223, when executed and/or activated, directs performance of and/or performs the operation o1223 in the illustrative depiction as follows, and/or the operation o1223 is otherwise carried out in the illustrative depiction as follows: electronically associating (e.g. via index concurrency control, etc.) at least a portion of (e.g. historical portion, etc.) said monitoring information (e.g. infestation, etc.) related to (e.g. crop rotation, etc.) one or more farming related production factors (e.g. genetic code of current crop, etc.) involved with (e.g. containing, etc.) farming related production of (e.g. mushroom cultivation, etc.) one or more ingestible materials (e.g. whole lobster, etc.) with one or more identifiers (e.g. color code, etc.) accessible through (e.g. through image scanning, etc.) the one or more tracers, (e.g. scintillation counter, etc.) said one or more tracers logged (e.g. via database table information, etc.) as being at least momentarily (e.g. shipping time across Pacific Ocean, etc.) in physical proximity (e.g. magnetically attached to container, etc.) with said one or more ingestible materials (e.g. emu meat, etc.) include at least in part one or more radioactive tags (e.g. scintillation counter, etc.).

In one or more implementations, as shown in FIG. 77, operation o12 includes an operation o1224 for electronically associating at least a portion of said monitoring information related to one or more farming related production factors involved with farming related production of one or more ingestible materials with one or more identifiers accessible through the one or more tracers, said one or more tracers logged as being at least momentarily in physical proximity with said one or more ingestible materials include at least in part one or more signal emitting tags. Origination of an illustratively derived associating re signal emitting tags component group can be accomplished through skilled in the art design choice selection of one or more of the above depicted components from one or more of the above depicted subsystems shown in FIG. 12. Components from the associating re signal emitting tags component group can be used in implementing execution of the one or more associating re signal emitting tags instructions i1224 of FIG. 34, can be used in performance of the associating re signal emitting tags electrical circuitry arrangement e1224 of FIG. 27, and/or can be used in otherwise fulfillment of the operation o1224. An exemplary non-transitory signal bearing medium version of the information storage subsystem s200 is depicted in FIG. 34 as bearing the one or more associating re signal emitting tags instructions i1224 that when executed will direct performance of the operation o1224. Furthermore, the associating re signal emitting tags electrical circuitry arrangement ("elec circ arrange") e1224, when activated, will perform the operation o1224. Also, the associating re signal emitting tags module m1224, when executed and/or activated, will direct performance of and/or perform the operation o1224. For instance, in one or more exemplary implementations, the one or more associating re signal emitting tags instructions i1224, when executed, direct performance of the operation o1224 in the illustrative depiction as follows, and/or the associating re signal emitting tags electrical circuitry arrangement e1224, when activated, performs the operation o1224 in the illustrative depiction as follows, and/or the associating re signal emitting tags module m1224, when executed and/or activated, directs performance of and/or performs the operation o1224 in the illustrative depiction as follows, and/or the operation o1224 is otherwise carried out in the illustrative depiction as follows: electronically associating (e.g. through index locking, etc.) at least a portion of (e.g. par value, etc.) said monitoring information (e.g. sanitizer usage, etc.) related to (e.g. pollen count, etc.) one or more farming related production factors (e.g. soil composition, etc.) involved with (e.g. engaged by, etc.) farming related production of (e.g. potato harvesting, etc.) one or more ingestible materials (e.g. potato, etc.) with one or more identifiers (e.g. visual pattern, etc.) accessible through (e.g. through audio reception, etc.) the one or more tracers, (e.g. light emitting diode, etc.) said one or more tracers logged (e.g. via ROM storage, etc.) as being at least momentarily (e.g. time in holding bay, etc.) in physical proximity (e.g. snapped onto container, etc.) with said one or more ingestible materials (e.g. water, etc.) include at least in part one or more signal emitting tags (e.g. light emitting diode, etc.).

Figure 78:
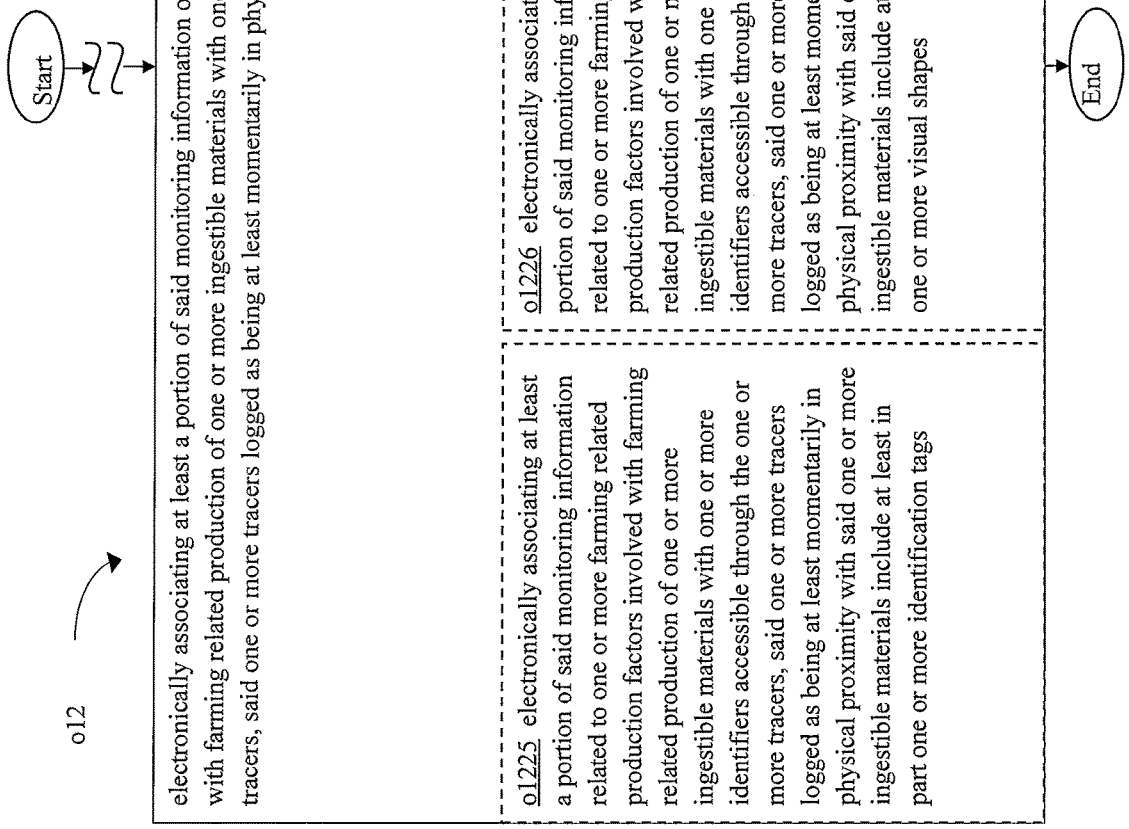
FIG. 78 is a high-level flowchart including exemplary implementations of operation o12 of FIG. 42.

In one or more implementations, as shown in FIG. 78, operation o12 includes an operation o1225 for electronically associating at least a portion of said monitoring information related to one or more farming related production factors involved with farming related production of one or more ingestible materials with one or more identifiers accessible through the one or more tracers, said one or more tracers logged as being at least momentarily in physical proximity with said one or more ingestible materials include at least in part one or more identification tags. Origination of an illustratively derived associating re identification tags component group can be accomplished through skilled in the art design choice selection of one or more of the above depicted components from one or more of the above depicted subsystems shown in FIG. 12. Components from the associating re identification tags component group can be used in implementing execution of the one or more associating re identification tags instructions i1225 of FIG. 34, can be used in performance of the associating re identification tags electrical circuitry arrangement e1225 of FIG. 27, and/or can be used in otherwise fulfillment of the operation o1225. An exemplary non-transitory signal bearing medium version of the information storage subsystem s200 is depicted in FIG. 34 as bearing the one or more associating re identification tags instructions i1225 that when executed will direct performance of the operation o1225. Furthermore, the associating re identification tags electrical circuitry arrangement ("elec circ arrange") e1225, when activated, will perform the operation o1225. Also, the associating re identification tags module m1225, when executed and/or activated, will direct performance of and/or perform the operation o1225. For instance, in one or more exemplary implementations, the one or more associating re identification tags instructions i1225, when executed, direct performance of the operation o1225 in the illustrative depiction as follows, and/or the associating re identification tags electrical circuitry arrangement e1225, when activated, performs the operation o1225 in the illustrative depiction as follows, and/or the associating re identification tags module m1225, when executed and/or activated, directs performance of and/or performs the operation o1225 in the illustrative depiction as follows, and/or the operation o1225 is otherwise carried out in the illustrative depiction as follows: electronically associating (e.g. through standardization of index, etc.) at least a portion of (e.g. percentage of, etc.) said monitoring information (e.g. mbar, etc.) related to (e.g. insect population, etc.) one or more farming related production factors (e.g. estimated rat population, etc.) involved with (e.g. engrossing, etc.) farming related production of (e.g. carrot harvesting, etc.) one or more ingestible materials (e.g. goat cheese, etc.) with one or more identifiers (e.g. morse code, etc.) accessible through (e.g. through visual identification, etc.) the one or more tracers, (e.g. asset tag, etc.) said one or more tracers logged (e.g. via relational database, etc.) as being at least momentarily (e.g. time held in port for inspection period, etc.) in physical proximity (e.g. embossed on container, etc.) with said one or more ingestible materials (e.g. pork meat, etc.) include at least in part one or more identification tags (e.g. asset tag, etc.).

In one or more implementations, as shown in FIG. 78, operation o12 includes an operation o1226 for electronically associating at least a portion of said monitoring information related to one or more farming related production factors involved with farming related production of one or more ingestible materials with one or more identifiers accessible through the one or more tracers, said one or more tracers logged as being at least momentarily in physical proximity with said one or more ingestible materials include at least in part one or more visual shapes. Origination of an illustratively derived associating re visual shape component group can be accomplished through skilled in the art design choice selection of one or more of the above depicted components from one or more of the above depicted subsystems shown in FIG. 12. Components from the associating re visual shape component group can be used in implementing execution of the one or more associating re visual shape instructions i1226 of FIG. 34, can be used in performance of the associating re visual shape electrical circuitry arrangement e1226 of FIG. 27, and/or can be used in otherwise fulfillment of the operation o1226. An exemplary non-transitory signal bearing medium version of the information storage subsystem s200 is depicted in FIG. 34 as bearing the one or more associating re visual shape instructions i1226 that when executed will direct performance of the operation o1226. Furthermore, the associating re visual shape electrical circuitry arrangement ("elec circ arrange") e1226, when activated, will perform the operation o1226. Also, the associating re visual shape module m1226, when executed and/or activated, will direct performance of and/or perform the operation o1226. For instance, in one or more exemplary implementations, the one or more associating re visual shape instructions i1226, when executed, direct performance of the operation o1226 in the illustrative depiction as follows, and/or the associating re visual shape electrical circuitry arrangement e1226, when activated, performs the operation o1226 in the illustrative depiction as follows, and/or the associating re visual shape module m1226, when executed and/or activated, directs performance of and/or performs the operation o1226 in the illustrative depiction as follows, and/or the operation o1226 is otherwise carried out in the illustrative depiction as follows: electronically associating (e.g. through data structure, etc.) at least a portion of (e.g. fraction of, etc.) said monitoring information (e.g. humidity, etc.) related to (e.g. water availability, etc.) one or more farming related production factors (e.g. known weed species population, etc.) involved with (e.g. related to, etc.) farming related production of (e.g. wool production, etc.) one or more ingestible materials (e.g. beet pulp, etc.) with one or more identifiers (e.g. tertiary code, etc.) accessible through (e.g. through light reception, etc.) the one or more tracers, (e.g. cylindrical, etc.) said one or more tracers logged (e.g. via flat database, etc.) as being at least momentarily (e.g. time on train between two terminals, etc.) in physical proximity (e.g. bolted to container, etc.) with said one or more ingestible materials (e.g. wheat flour, etc.) include at least in part one or more visual shapes (e.g. cylindrical, etc.).

In one or more implementations, as shown in FIG. 78, operation o12 includes an operation o1227 for electronically associating at least a portion of said monitoring information related to one or more farming related production factors involved with farming related production of one or more ingestible materials with one or more identifiers accessible through the one or more tracers, said one or more tracers logged as being at least momentarily in physical proximity with said one or more ingestible materials include at least in part one or more color patterns. Origination of an illustratively derived associating re color patterns component group can be accomplished through skilled in the art design choice selection of one or more of the above depicted components from one or more of the above depicted subsystems shown in FIG. 12. Components from the associating re color patterns component group can be used in implementing execution of the one or more associating re color patterns instructions i1227 of FIG. 34, can be used in performance of the associating re color patterns electrical circuitry arrangement e1227 of FIG. 27, and/or can be used in otherwise fulfillment of the operation o1227. An exemplary non-transitory signal bearing medium version of the information storage subsystem s200 is depicted in FIG. 34 as bearing the one or more associating re color patterns instructions i1227 that when executed will direct performance of the operation o1227. Furthermore, the associating re color patterns electrical circuitry arrangement ("elec circ arrange") e1227, when activated, will perform the operation o1227. Also, the associating re color patterns module m1227, when executed and/or activated, will direct performance of and/or perform the operation o1227. For instance, in one or more exemplary implementations, the one or more associating re color patterns instructions i1227, when executed, direct performance of the operation o1227 in the illustrative depiction as follows, and/or the associating re color patterns electrical circuitry arrangement e1227, when activated, performs the operation o1227 in the illustrative depiction as follows, and/or the associating re color patterns module m1227, when executed and/or activated, directs performance of and/or performs the operation o1227 in the illustrative depiction as follows, and/or the operation o1227 is otherwise carried out in the illustrative depiction as follows: electronically associating (e.g. through common search terms, etc.) at least a portion of (e.g. net amount, etc.) said monitoring information (e.g. oxygen sensor, etc.) related to (e.g. energy cost, etc.) one or more farming related production factors (e.g. shade tree type, etc.) involved with (e.g. relationship, etc.) farming related production of (e.g. squash cultivation, etc.) one or more ingestible materials (e.g. ostrich meat, etc.) with one or more identifiers (e.g. model number, etc.) accessible through (e.g. through color spectrum identification, etc.) the one or more tracers, (e.g. checkered, etc.) said one or more tracers logged (e.g. via database object information, etc.) as being at least momentarily (e.g. partial time spent on retail display, etc.) in physical proximity (e.g. welded onto container, etc.) with said one or more ingestible materials (e.g. corn on cob, etc.) include at least in part one or more color patterns (e.g. checkered, etc.).

Figure 79:
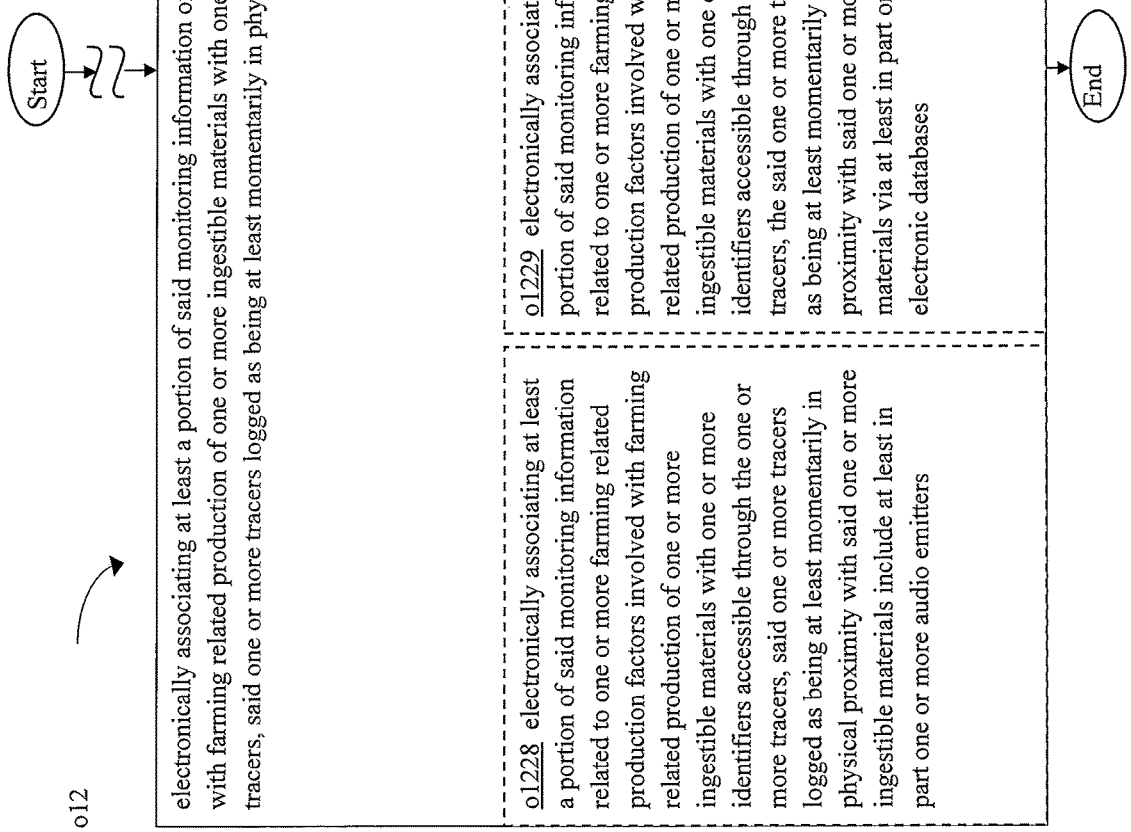
FIG. 79 is a high-level flowchart including exemplary implementations of operation o12 of FIG. 42.

In one or more implementations, as shown in FIG. 79, operation o12 includes an operation o1228 for electronically associating at least a portion of said monitoring information related to one or more farming related production factors involved with farming related production of one or more ingestible materials with one or more identifiers accessible through the one or more tracers, said one or more tracers logged as being at least momentarily in physical proximity with said one or more ingestible materials include at least in part one or more audio emitters. Origination of an illustratively derived associating re audio emitters component group can be accomplished through skilled in the art design choice selection of one or more of the above depicted components from one or more of the above depicted subsystems shown in FIG. 12. Components from the associating re audio emitters component group can be used in implementing execution of the one or more associating re audio emitters instructions i1228 of FIG. 34, can be used in performance of the associating re audio emitters electrical circuitry arrangement e1228 of FIG. 27, and/or can be used in otherwise fulfillment of the operation o1228. An exemplary non-transitory signal bearing medium version of the information storage subsystem s200 is depicted in FIG. 34 as bearing the one or more associating re audio emitters instructions i1228 that when executed will direct performance of the operation o1228. Furthermore, the associating re audio emitters electrical circuitry arrangement ("elec circ arrange") e1228, when activated, will perform the operation o1228. Also, the associating re audio emitters module m1228, when executed and/or activated, will direct performance of and/or perform the operation o1228. For instance, in one or more exemplary implementations, the one or more associating re audio emitters instructions i1228, when executed, direct performance of the operation o1228 in the illustrative depiction as follows, and/or the associating re audio emitters electrical circuitry arrangement e1228, when activated, performs the operation o1228 in the illustrative depiction as follows, and/or the associating re audio emitters module m1228, when executed and/or activated, directs performance of and/or performs the operation o1228 in the illustrative depiction as follows, and/or the operation o1228 is otherwise carried out in the illustrative depiction as follows: electronically associating (e.g. through access of ordered records, etc.) at least a portion of (e.g. gross amount, etc.) said monitoring information (e.g. psi, etc.) related to (e.g. fuel cost, etc.) one or more farming related production factors (e.g. total cost of harvest, etc.) involved with (e.g. suggest, etc.) farming related production of (e.g. rice planting, etc.) one or more ingestible materials (e.g. venison, etc.) with one or more identifiers (e.g. phonetic alphabet, etc.) accessible through (e.g. through RF reception, etc.) the one or more tracers, (e.g. speaker, etc.) said one or more tracers logged (e.g. via database table information, etc.) as being at least momentarily (e.g. time spent in laboratory for testing, etc.) in physical proximity (e.g. embossed on material, etc.) with said one or more ingestible materials (e.g. carp, etc.) include at least in part one or more audio emitters (e.g. speaker, etc.).

In one or more implementations, as shown in FIG. 79, operation o12 includes an operation o1229 for electronically associating at least a portion of said monitoring information related to one or more farming related production factors involved with farming related production of one or more ingestible materials with one or more identifiers accessible through one or more tracers, the said one or more tracers logged as being at least momentarily in physical proximity with said one or more ingestible materials via at least in part one or more electronic databases. Origination of an illustratively derived associating re databases component group can be accomplished through skilled in the art design choice selection of one or more of the above depicted components from one or more of the above depicted subsystems shown in FIG. 12. Components from the associating re databases component group can be used in implementing execution of the one or more associating re databases instructions i1229 of FIG. 34, can be used in performance of the associating re databases electrical circuitry arrangement e1229 of FIG. 27, and/or can be used in otherwise fulfillment of the operation o1229. An exemplary non-transitory signal bearing medium version of the information storage subsystem s200 is depicted in FIG. 34 as bearing the one or more associating re databases instructions i1229 that when executed will direct performance of the operation o1229. Furthermore, the associating re databases electrical circuitry arrangement ("elec circ arrange") e1229, when activated, will perform the operation o1229. Also, the associating re databases module m1229, when executed and/or activated, will direct performance of and/or perform the operation o1229. For instance, in one or more exemplary implementations, the one or more associating re databases instructions i1229, when executed, direct performance of the operation o1229 in the illustrative depiction as follows, and/or the associating re databases electrical circuitry arrangement e1229, when activated, performs the operation o1229 in the illustrative depiction as follows, and/or the associating re databases module m1229, when executed and/or activated, directs performance of and/or performs the operation o1229 in the illustrative depiction as follows, and/or the operation o1229 is otherwise carried out in the illustrative depiction as follows: electronically associating (e.g. via functions, etc.) at least a portion of (e.g. part of, etc.) said monitoring information (e.g. in Hg, etc.) related to (e.g. working capital, etc.) one or more farming related production factors (e.g. quality of feed water, etc.) involved with (e.g. entangle, etc.) farming related production of (e.g. peanut harvesting, etc.) one or more ingestible materials (e.g. edible frog, etc.) with one or more identifiers (e.g. Arabic alphabet, etc.) accessible through (e.g. through scanning, etc.) one or more tracers, (e.g. UHF emitter, etc.) the said one or more tracers logged (e.g. via food composition database, etc.) as being at least momentarily (e.g. shipping time from grocery store to home, etc.) in physical proximity (e.g. debossed on material, etc.) with said one or more ingestible materials (e.g. barley, etc.) via at least in part one or more electronic databases (e.g. via food composition database, etc.).

In one or more implementations, as shown in FIG. 79, operation o12 includes an operation o1234 for electronically associating at least a portion of said monitoring information related to one or more farming related production factors involved with farming related production of one or more ingestible materials with one or more identifiers accessible through one or more tracers, said one or more tracers logged as being at least momentarily the in physical proximity with said one or more ingestible materials including at least in part affixed to one or more ingestible materials. Origination of an illustratively derived associating re affixed to materials component group can be accomplished through skilled in the art design choice selection of one or more of the above depicted components from one or more of the above depicted subsystems shown in FIG. 12. Components from the associating re affixed to materials component group can be used in implementing execution of the one or more associating re affixed to materials instructions i1234 of FIG. 34, can be used in performance of the associating re affixed to materials electrical circuitry arrangement e1234 of FIG. 27, and/or can be used in otherwise fulfillment of the operation o1234. An exemplary non-transitory signal bearing medium version of the information storage subsystem s200 is depicted in FIG. 34 as bearing the one or more associating re affixed to materials instructions i1234 that when executed will direct performance of the operation o1234. Furthermore, the associating re affixed to materials electrical circuitry arrangement ("elec circ arrange") e1234, when activated, will perform the operation o1234. Also, the associating re affixed to materials module m1234, when executed and/or activated, will direct performance of and/or perform the operation o1234. For instance, in one or more exemplary implementations, the one or more associating re affixed to materials instructions i1234, when executed, direct performance of the operation o1234 in the illustrative depiction as follows, and/or the associating re affixed to materials electrical circuitry arrangement e1234, when activated, performs the operation o1234 in the illustrative depiction as follows, and/or the associating re affixed to materials module m1234, when executed and/or activated, directs performance of and/or performs the operation o1234 in the illustrative depiction as follows, and/or the operation o1234 is otherwise carried out in the illustrative depiction as follows: electronically associating (e.g. through unique exclusions of data, etc.) at least a portion of (e.g. agreed amount, etc.) said monitoring information (e.g. shovel, etc.) related to (e.g. market conditions, etc.) one or more farming related production factors (e.g. welding machine usage, etc.) involved with (e.g. incorporate, etc.) farming related production of (e.g. almond harvesting, etc.) one or more ingestible materials (e.g. feed grain, etc.) with one or more identifiers (e.g. ISO basic Latin alphabet, etc.) accessible through (e.g. through barcode scanning, etc.) one or more tracers, (e.g. gyroscope, etc.) said one or more tracers logged (e.g. via database management layer, etc.) as being at least momentarily (e.g. portion of time spent on shipping vessel, etc.) the in physical proximity (e.g. ink stamped directly onto material, etc.) with said one or more ingestible materials (e.g. sturgeon, etc.) including at least in part affixed to one or more ingestible materials (e.g. ink stamped directly onto material, etc.).

Figure 80:
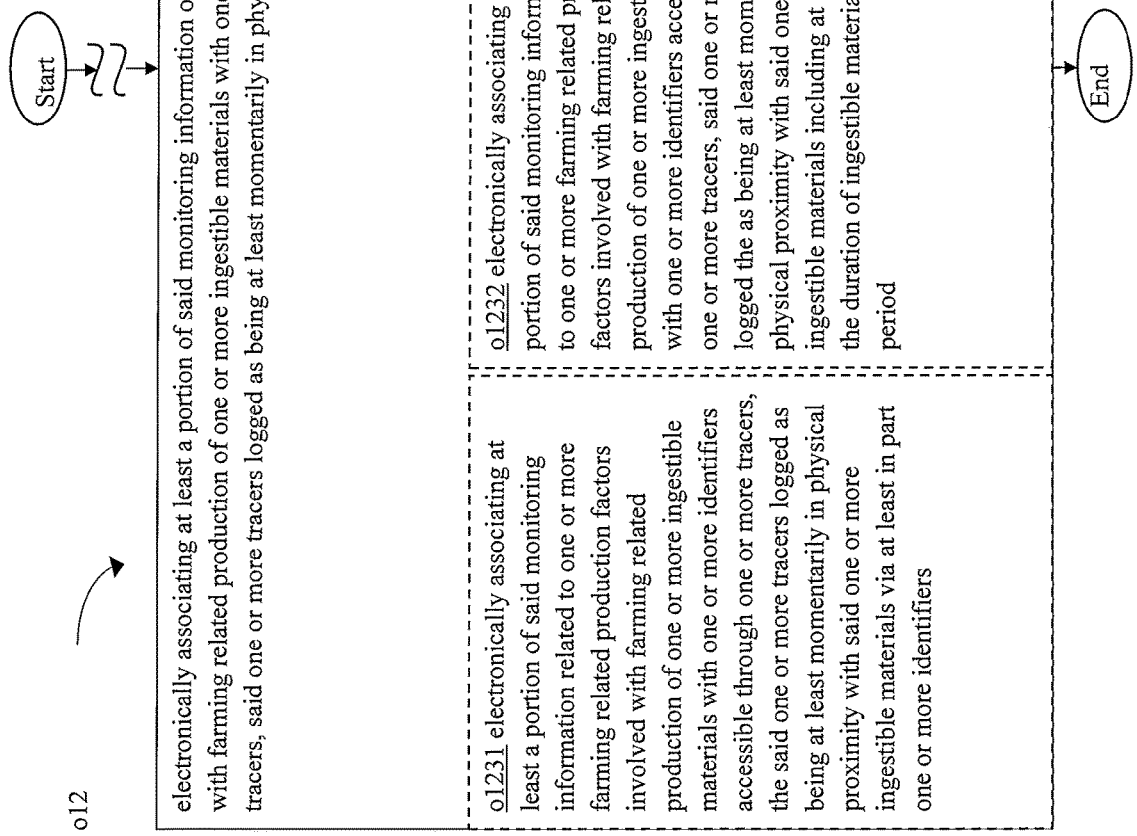
FIG. 80 is a high-level flowchart including exemplary implementations of operation o12 of FIG. 42.

In one or more implementations, as shown in FIG. 80, operation o12 includes an operation o1231 for electronically associating at least a portion of said monitoring information related to one or more farming related production factors involved with farming related production of one or more ingestible materials with one or more identifiers accessible through one or more tracers, the said one or more tracers logged as being at least momentarily in physical proximity with said one or more ingestible materials via at least in part one or more identifiers. Origination of an illustratively derived associating re identifiers component group can be accomplished through skilled in the art design choice selection of one or more of the above depicted components from one or more of the above depicted subsystems shown in FIG. 12. Components from the associating re identifiers component group can be used in implementing execution of the one or more associating re identifiers instructions i1231 of FIG. 34, can be used in performance of the associating re identifiers electrical circuitry arrangement e1231 of FIG. 27, and/or can be used in otherwise fulfillment of the operation o1231. An exemplary non-transitory signal bearing medium version of the information storage subsystem s200 is depicted in FIG. 34 as bearing the one or more associating re identifiers instructions i1231 that when executed will direct performance of the operation o1231. Furthermore, the associating re identifiers electrical circuitry arrangement ("elec circ arrange") e1231, when activated, will perform the operation o1231. Also, the associating re identifiers module m1231, when executed and/or activated, will direct performance of and/or perform the operation o1231. For instance, in one or more exemplary implementations, the one or more associating re identifiers instructions i1231, when executed, direct performance of the operation o1231 in the illustrative depiction as follows, and/or the associating re identifiers electrical circuitry arrangement e1231, when activated, performs the operation o1231 in the illustrative depiction as follows, and/or the associating re identifiers module m1231, when executed and/or activated, directs performance of and/or performs the operation o1231 in the illustrative depiction as follows, and/or the operation o1231 is otherwise carried out in the illustrative depiction as follows: electronically associating (e.g. via sub-linear time lookup, etc.) at least a portion of (e.g. entire amount, etc.) said monitoring information (e.g. nitrogen levels, etc.) related to (e.g. news, etc.) one or more farming related production factors (e.g. weather forecast, etc.) involved with (e.g. necessitate, etc.) farming related production of (e.g. oyster harvesting, etc.) one or more ingestible materials (e.g. cow liver, etc.) with one or more identifiers (e.g. binary sequence, etc.) accessible through (e.g. through electromagnetic reception, etc.) one or more tracers, (e.g. microwave emitter, etc.)

the said one or more tracers logged (e.g. via portion of packet information, etc.) as being at least momentarily (e.g. time spent exposed to air before packaging, etc.) in physical proximity (e.g. riveted to container, etc.) with said one or more ingestible materials (e.g. ground beef, etc.) via at least in part one or more identifiers (e.g. portion of packet information, etc.).

In one or more implementations, as shown in FIG. 80, operation o12 includes an operation o1232 for electronically associating at least a portion of said monitoring information related to one or more farming related production factors involved with farming related production of one or more ingestible materials with one or more identifiers accessible through one or more tracers, said one or more tracers logged the as being at least momentarily in physical proximity with said one or more ingestible materials including at least in part the duration of ingestible material transit period. Origination of an illustratively derived associating re transit duration component group can be accomplished through skilled in the art design choice selection of one or more of the above depicted components from one or more of the above depicted subsystems shown in FIG. 12. Components from the associating re transit duration component group can be used in implementing execution of the one or more associating re transit duration instructions i1232 of FIG. 34, can be used in performance of the associating re transit duration electrical circuitry arrangement e1232 of FIG. 27, and/or can be used in otherwise fulfillment of the operation o1232. An exemplary non-transitory signal bearing medium version of the information storage subsystem s200 is depicted in FIG. 34 as bearing the one or more associating re transit duration instructions i1232 that when executed will direct performance of the operation o1232. Furthermore, the associating re transit duration electrical circuitry arrangement ("elec circ arrange") e1232, when activated, will perform the operation o1232. Also, the associating re transit duration module m1232, when executed and/or activated, will direct performance of and/or perform the operation o1232. For instance, in one or more exemplary implementations, the one or more associating re transit duration instructions i1232, when executed, direct performance of the operation o1232 in the illustrative depiction as follows, and/or the associating re transit duration electrical circuitry arrangement e1232, when activated, performs the operation o1232 in the illustrative depiction as follows, and/or the associating re transit duration module m1232, when executed and/or activated, directs performance of and/or performs the operation o1232 in the illustrative depiction as follows, and/or the operation o1232 is otherwise carried out in the illustrative depiction as follows: electronically associating (e.g. through linear search, etc.) at least a portion of (e.g. half portion, etc.) said monitoring information (e.g. calcium levels, etc.) related to (e.g. season, etc.) one or more farming related production factors (e.g. adequate record keeping of weather patterns, etc.) involved with (e.g. implicated, etc.) farming related production of (e.g. tuna canning, etc.) one or more ingestible materials (e.g. goat milk, etc.) with one or more identifiers (e.g. ASCII string, etc.) accessible through (e.g. through search terms, etc.) one or more tracers, (e.g. laser ranging tracker, etc.) said one or more tracers logged (e.g. via header information, etc.) the as being at least momentarily (e.g. portion of time spent on shipping vessel, etc.) in physical proximity (e.g. placed inside container, etc.) with said one or more ingestible materials (e.g. chicken feet, etc.) including at least in part the duration of ingestible material transit period (e.g. portion of time spent on shipping vessel, etc.).

In one or more implementations, as shown in FIG. 80, operation o12 includes an operation o1233 for electronically associating at least a portion of said monitoring information related to one or more farming related production factors involved with farming related production of one or more ingestible materials with one or more identifiers accessible through one or more tracers, said one or more tracers logged the as being at least momentarily in physical proximity with said one or more ingestible materials including at least in part ingestible material shelf life. Origination of an illustratively derived associating re component group can be accomplished through skilled in the art design choice selection of one or more of the above depicted components from one or more of the above depicted subsystems shown in FIG. 12. Components from the associating re component group can be used in implementing execution of the one or more associating re instructions i1233 of FIG. 34, can be used in performance of the associating re electrical circuitry arrangement e1233 of FIG. 27, and/or can be used in otherwise fulfillment of the operation o1233. An exemplary non-transitory signal bearing medium version of the information storage subsystem s200 is depicted in FIG. 34 as bearing the one or more associating re instructions i1233 that when executed will direct performance of the operation o1233. Furthermore, the associating re electrical circuitry arrangement ("elec circ arrange") e1233, when activated, will perform the operation o1233. Also, the associating re module m1233, when executed and/or activated, will direct performance of and/or perform the operation o1233. For instance, in one or more exemplary implementations, the one or more associating re instructions i1233, when executed, direct performance of the operation o1233 in the illustrative depiction as follows, and/or the associating re electrical circuitry arrangement e1233, when activated, performs the operation o1233 in the illustrative depiction as follows, and/or the associating re module m1233, when executed and/or activated, directs performance of and/or performs the operation o1233 in the illustrative depiction as follows, and/or the operation o1233 is otherwise carried out in the illustrative depiction as follows: electronically associating (e.g. through database constraints, etc.) at least a portion of (e.g. quarter amount, etc.) said monitoring information (e.g. phosphate levels, etc.) related to (e.g. farm management, etc.) one or more farming related production factors (e.g. generator fuel type used, etc.) involved with (e.g. engross, etc.) farming related production of (e.g. cow butchering, etc.) one or more ingestible materials (e.g. whole king crab, etc.) with one or more identifiers (e.g. alphanumeric, etc.) accessible through (e.g. through storage retrieval, etc.) one or more tracers, (e.g. ultrasonic emitter, etc.) said one or more tracers logged (e.g. via footer information, etc.) the as being at least momentarily (e.g. time spent in cold storage, etc.) in physical proximity (e.g. placed inside material, etc.) with said one or more ingestible materials (e.g. bison meat, etc.) including at least in part ingestible material shelf life (e.g. time spent in cold storage, etc.).

In one or more implementations, as shown in FIG. 81, operation o12 includes an operation o1234 for electronically associating at least a portion of said monitoring information related to one or more farming related production factors involved with farming related production of one or more ingestible materials with one or more identifiers accessible through one or more tracers, said one or more tracers logged as being at least momentarily the in physical proximity with said one or more ingestible materials including at least in part affixed to one or more ingestible materials. Origination of an illustratively derived associating re affixed to materials component group can be accomplished through skilled in the art design choice selection of one or more of the above depicted components from one or more of the above depicted subsystems shown in FIG. 12. Components from the associating re affixed to materials component group can be used in implementing execution of the one or more associating re affixed to materials instructions i1234 of FIG. 34, can be used in performance of the associating re affixed to materials electrical circuitry arrangement e1234 of FIG. 27, and/or can be used in otherwise fulfillment of the operation o1234. An exemplary non-transitory signal bearing medium version of the information storage subsystem s200 is depicted in FIG. 34 as bearing the one or more associating re affixed to materials instructions i1234 that when executed will direct performance of the operation o1234. Furthermore, the associating re affixed to materials electrical circuitry arrangement ("elec circ arrange") e1234, when activated, will perform the operation o1234. Also, the associating re affixed to materials module m1234, when executed and/or activated, will direct performance of and/or perform the operation o1234. For instance, in one or more exemplary implementations, the one or more associating re affixed to materials instructions i1234, when executed, direct performance of the operation o1234 in the illustrative depiction as follows, and/or the associating re affixed to materials electrical circuitry arrangement e1234, when activated, performs the operation o1234 in the illustrative depiction as follows, and/or the associating re affixed to materials module m1234, when executed and/or activated, directs performance of and/or performs the operation o1234 in the illustrative depiction as follows, and/or the operation o1234 is otherwise carried out in the illustrative depiction as follows: electronically associating (e.g. through unique exclusions of data, etc.) at least a portion of (e.g. agreed amount, etc.) said monitoring information (e.g. shovel, etc.) related to (e.g. market conditions, etc.) one or more farming related production factors (e.g. welding machine usage, etc.) involved with (e.g. incorporate, etc.) farming related production of (e.g. almond harvesting, etc.) one or more ingestible materials (e.g. feed grain, etc.) with one or more identifiers (e.g. ISO basic Latin alphabet, etc.) accessible through (e.g. through barcode scanning, etc.) one or more tracers, (e.g. gyroscope, etc.) said one or more tracers logged (e.g. via database management layer, etc.) as being at least momentarily (e.g. portion of time spent on shipping vessel, etc.) the in physical proximity (e.g. ink stamped directly onto material, etc.) with said one or more ingestible materials (e.g. sturgeon, etc.) including at least in part affixed to one or more ingestible materials (e.g. ink stamped directly onto material, etc.).

In one or more implementations, as shown in FIG. 81, operation o12 includes an operation o1235 for electronically associating at least a portion of said monitoring information related to one or more farming related production factors involved with farming related production of one or more ingestible materials with one or more identifiers accessible through one or more tracers, said one or more tracers logged as being at least momentarily the in physical proximity with said one or more ingestible materials including at least in part affixed to pre-processed forms of one or more ingestible materials. Origination of an illustratively derived associating re affixed to preprocessed component group can be accomplished through skilled in the art design choice selection of one or more of the above depicted components from one or more of the above depicted subsystems shown in FIG. 12. Components from the associating re affixed to preprocessed component group can be used in implementing execution of the one or more associating re affixed to preprocessed instructions i1235 of FIG. 34, can be used in performance of the associating re affixed to preprocessed electrical circuitry arrangement e1235 of FIG. 27, and/or can be used in otherwise fulfillment of the operation o1235. An exemplary non-transitory signal bearing medium version of the information storage subsystem s200 is depicted in FIG. 34 as bearing the one or more associating re affixed to preprocessed instructions i1235 that when executed will direct performance of the operation o1235. Furthermore, the associating re affixed to preprocessed electrical circuitry arrangement ("elec circ arrange") e1235, when activated, will perform the operation o1235. Also, the associating re affixed to preprocessed module m1235, when executed and/or activated, will direct performance of and/or perform the operation o1235. For instance, in one or more exemplary implementations, the one or more associating re affixed to preprocessed instructions i1235, when executed, direct performance of the operation o1235 in the illustrative depiction as follows, and/or the associating re affixed to preprocessed electrical circuitry arrangement e1235, when activated, performs the operation o1235 in the illustrative depiction as follows, and/or the associating re affixed to preprocessed module m1235, when executed and/or activated, directs performance of and/or performs the operation o1235 in the illustrative depiction as follows, and/or the operation o1235 is otherwise carried out in the illustrative depiction as follows: electronically associating (e.g. through primary key, etc.) at least a portion of (e.g. starting amount, etc.) said monitoring information (e.g. audio listening, etc.) related to (e.g. advertising, etc.) one or more farming related production factors (e.g. combine run time, etc.) involved with (e.g. engaged by, etc.) farming related production of (e.g. wheat threshing, etc.) one or more ingestible materials (e.g. sturgeon eggs, etc.) with one or more identifiers (e.g. symmetrically encrypted data packet, etc.) accessible through (e.g. through radiation detection, etc.) one or more tracers, (e.g. inertial sensor, etc.) said one or more tracers logged (e.g. via relational database, etc.) as being at least momentarily (e.g. portion of time spent packaged with similar material, etc.) the in physical proximity (e.g. adhered to material, etc.) with said one or more ingestible materials (e.g. sheep cheese, etc.) including at least in part affixed to pre-processed forms of one or more ingestible materials (e.g. adhered to material awaiting processing, etc.).

In one or more implementations, as shown in FIG. 81, operation o12 includes an operation o1236 for electronically associating at least a portion of said monitoring information related to one or more farming related production factors involved with farming related production of one or more ingestible materials with one or more identifiers accessible through one or more tracers, said one or more tracers logged as being at least momentarily the in physical proximity with said one or more ingestible materials including at least in part affixed to another portion of a biological structure that is physically connected with the ingestible material. Origination of an illustratively derived associating re affixed to another component group can be accomplished through skilled in the art design choice selection of one or more of the above depicted components from one or more of the above depicted subsystems shown in FIG. 12. Components from the associating re affixed to another component group can be used in implementing execution of the one or more associating re affixed to another instructions i1236 of FIG. 34, can be used in performance of the associating re affixed to another electrical circuitry arrangement e1236 of FIG. 27, and/or can be used in otherwise fulfillment of the operation o1236. An exemplary non-transitory signal bearing medium version of the information storage subsystem s200 is depicted in FIG. 34 as bearing the one or more associating re affixed to another instructions i1236 that when executed will direct performance of the operation o1236. Furthermore, the associating re affixed to another electrical circuitry arrangement ("elec circ arrange") e1236, when activated, will perform the operation o1236. Also, the associating re affixed to another module m1236, when executed and/or activated, will direct performance of and/or perform the operation o1236. For instance, in one or more exemplary implementations, the one or more associating re affixed to another instructions i1236, when executed, direct performance of the operation o1236 in the illustrative depiction as follows, and/or the associating re affixed to another electrical circuitry arrangement e1236, when activated, performs the operation o1236 in the illustrative depiction as follows, and/or the associating re affixed to another module m1236, when executed and/or activated, directs performance of and/or performs the operation o1236 in the illustrative depiction as follows, and/or the operation o1236 is otherwise carried out in the illustrative depiction as follows: electronically associating (e.g. through foreign key search, etc.) at least a portion of (e.g. final amount, etc.) said monitoring information (e.g. water usage, etc.) related to (e.g. pandemics, etc.) one or more farming related production factors (e.g. acreage available, etc.) involved with (e.g. contain, etc.) farming related production of (e.g. apple harvesting, etc.) one or more ingestible materials (e.g. shrimp, etc.) with one or more identifiers (e.g. serial number, etc.) accessible through (e.g. through genetic testing, etc.) one or more tracers, (e.g. accelerometer, etc.) said one or more tracers logged (e.g. via DVD-ROM storage, etc.) as being at least momentarily (e.g. portion of time since sealed in carton, etc.) the in physical proximity (e.g. subdermally injected into material, etc.) with said one or more ingestible materials (e.g. parsnip, etc.) including at least in part affixed to another portion of a biological structure that is physically connected with the ingestible material (e.g. subdermally injected into material, etc.).

In one or more implementations, as shown in FIG. 82, operation o12 includes an operation o1237 for electronically associating at least a portion of said monitoring information related to one or more farming related production factors involved with farming related production of one or more ingestible materials with one or more identifiers accessible through one or more tracers, said one or more tracers logged as being at least momentarily the in physical proximity with said one or more ingestible materials including at least in part affixed to one or more containers logged as at least momentarily containing one or more ingestible materials. Origination of an illustratively derived associating re affixed to container component group can be accomplished through skilled in the art design choice selection of one or more of the above depicted components from one or more of the above depicted subsystems shown in FIG. 12. Components from the associating re affixed to container component group can be used in implementing execution of the one or more associating re affixed to container instructions i1237 of FIG. 34, can be used in performance of the associating re affixed to container electrical circuitry arrangement e1237 of FIG. 27, and/or can be used in otherwise fulfillment of the operation o1237. An exemplary non-transitory signal bearing medium version of the information storage subsystem s200 is depicted in FIG. 34 as bearing the one or more associating re affixed to container instructions i1237 that when executed will direct performance of the operation o1237. Furthermore, the associating re affixed to container electrical circuitry arrangement ("elec circ arrange") e1237, when activated, will perform the operation o1237. Also, the associating re affixed to container module m1237, when executed and/or activated, will direct performance of and/or perform the operation o1237. For instance, in one or more exemplary implementations, the one or more associating re affixed to container instructions i1237, when executed, direct performance of the operation o1237 in the illustrative depiction as follows, and/or the associating re affixed to container electrical circuitry arrangement e1237, when activated, performs the operation o1237 in the illustrative depiction as follows, and/or the associating re affixed to container module m1237, when executed and/or activated, directs performance of and/or performs the operation o1237 in the illustrative depiction as follows, and/or the operation o1237 is otherwise carried out in the illustrative depiction as follows: electronically associating (e.g. through a hash table search, etc.) at least a portion of (e.g. net amount, etc.) said monitoring information (e.g. UV index, etc.) related to (e.g. cost measure, etc.) one or more farming related production factors (e.g. land terrain, etc.) involved with (e.g. embraced, etc.) farming related production of (e.g. salmon fishing, etc.) one or more ingestible materials (e.g. domestic goose, etc.) with one or more identifiers (e.g. barcode, etc.) accessible through (e.g. through beacon signal reception, etc.) one or more tracers, (e.g. compass, etc.) said one or more tracers logged (e.g. via food composition database, etc.) as being at least momentarily (e.g. time spent on conveyor belt, etc.) the in physical proximity (e.g. laser etched onto container, etc.) with said one or more ingestible materials (e.g. ground chicken, etc.) including at least in part affixed to one or more containers logged as at least momentarily containing one or more ingestible materials (e.g. laser etched onto container, etc.).

Those skilled in the art will appreciate that the foregoing specific exemplary processes and/or devices and/or technologies are representative of more general processes and/or devices and/or technologies taught elsewhere herein, such as in the claims filed herewith and/or elsewhere in the present application.

The one or more instructions discussed herein may be, for example, computer executable and/or logic-implemented instructions. In some implementations, signal-bearing medium as articles of manufacture may store the one or more instructions. In some implementations, the signal bearing medium may include a computer-readable medium. In some implementations, the signal-bearing medium may include a recordable medium. In some implementations, the signal-bearing medium may include a communication medium.

Those having skill in the art will recognize that the state of the art has progressed to the point where there is little distinction left between hardware and software implementations of aspects of systems; the use of hardware or software is generally (but not always, in that in certain contexts the choice between hardware and software can become significant) a design choice representing cost vs. efficiency tradeoffs. Those having skill in the art will appreciate that there are various vehicles by which processes and/or systems and/or other technologies described herein can be effected (e.g., hardware, software, and/or firmware in one or more machines or articles of manufacture), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation that is implemented in one or more machines or articles of manufacture; or, yet again alternatively, the implementer may opt for some combination of hardware, software, and/or firmware in one or more machines or articles of manufacture (limited to patentable subject matter under 35 USC 101). Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will typically employ optically-oriented hardware, software, and or firmware in one or more machines or articles of manufacture.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof (limited to patentable subject matter under 35 U.S.C. 101). In one embodiment, several portions of the subject matter described herein may be implemented via Application Specific Integrated Circuitry (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuitry, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure (limited to patentable subject matter under 35 USC 101). In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link, (e.g., transmitter, receiver, transmission logic, reception logic, etc.), etc.).

Electro-Mechanical System Support

In a general sense, those skilled in the art will recognize that the various embodiments described herein can be implemented, individually and/or collectively, by various types of electro-mechanical systems having a wide range of electrical components such as hardware, software, firmware, and/or virtually any combination thereof; and a wide range of components that may impart mechanical force or motion such as rigid bodies, spring or torsional bodies, hydraulics, electro-magnetically actuated devices, and/or virtually any combination thereof. Consequently, as used herein "electro-mechanical system" includes, but is not limited to, electrical circuitry operably coupled with a transducer (e.g., an actuator, a motor, a piezoelectric crystal, a Micro Electro Mechanical System (MEMS), etc.), electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of memory (e.g., random access, flash, read only, etc.)), electrical circuitry forming a communications device (e.g., a modem, communications switch, optical-electrical equipment, etc.), and/or any non-electrical analog thereto, such as optical or other analogs (e.g., graphene based circuitry). Those skilled in the art will also appreciate that examples of electro-mechanical systems include but are not limited to a variety of consumer electronics systems, medical devices, as well as other systems such as motorized transport systems, factory automation systems, security systems, and/or communication/computing systems. Those skilled in the art will recognize that electro-mechanical as used herein is not necessarily limited to a system that has both electrical and mechanical actuation except as context may dictate otherwise.

Electrical Circuitry Support

In a general sense, those skilled in the art will recognize that the various aspects described herein which can be implemented, individually and/or collectively, by a wide range of hardware, software, firmware, and/or any combination thereof can be viewed as being composed of various types of "electrical circuitry." Consequently, as used herein "electrical circuitry" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of memory (e.g., random access, flash, read only, etc.)), and/or electrical circuitry forming a communications device (e.g., a modem, communications switch, optical-electrical equipment, etc.). Those having skill in the art will recognize that the subject matter described herein may be implemented in an analog or digital fashion or some combination thereof.

Image Processing System Support

Those skilled in the art will recognize that at least a portion of the devices and/or processes described herein can be integrated into an image processing system. Those having skill in the art will recognize that a typical image processing system generally includes one or more of a system unit housing, a video display device, memory such as volatile or non-volatile memory, processors such as microprocessors or digital signal processors, computational entities such as operating systems, drivers, applications programs, one or more interaction devices (e.g., a touch pad, a touch screen, an antenna, etc.), control systems including feedback loops and control motors (e.g., feedback for sensing lens position and/or velocity; control motors for moving/distorting lenses to give desired focuses). An image processing system may be implemented utilizing suitable commercially available components, such as those typically found in digital still systems and/or digital motion systems.

Data Processing System Support

Those skilled in the art will recognize that at least a portion of the devices and/or processes described herein can be integrated into a data processing system. Those having skill in the art will recognize that a data processing system generally includes one or more of a system unit housing, a video display device, memory such as volatile or non-volatile memory, processors such as microprocessors or digital signal processors, computational entities such as operating systems, drivers, graphical user interfaces, and applications programs, one or more interaction devices (e.g., a touch pad, a touch screen, an antenna, etc.), and/or control systems including feedback loops and control motors (e.g., feedback for sensing position and/or velocity; control motors for moving and/or adjusting components and/or quantities). A data processing system may be implemented utilizing suitable commercially available components, such as those typically found in data computing/communication and/or network computing/communication systems.

Software as Patentable Subject Matter Support

The claims, description, and drawings of this application may describe one or more of the instant technologies in operational/functional language, for example as a set of operations to be performed by a computer. Such operational/functional description in most instances would be understood by one skilled the art as specifically-configured hardware (e.g., because a general purpose computer in effect becomes a special purpose computer once it is programmed to perform particular functions pursuant to instructions from program software).

Importantly, although the operational/functional descriptions described herein are understandable by the human mind, they are not abstract ideas of the operations/functions divorced from computational implementation of those operations/functions. Rather, the operations/functions represent a specification for the massively complex computational machines or other means. As discussed in detail below, the operational/functional language must be read in its proper technological context, i.e., as concrete specifications for physical implementations.

The logical operations/functions described herein are a distillation of machine specifications or other physical mechanisms specified by the operations/functions such that the otherwise inscrutable machine specifications may be comprehensible to the human mind. The distillation also allows one of skill in the art to adapt the operational/functional description of the technology across many different specific vendors' hardware configurations or platforms, without being limited to specific vendors' hardware configurations or platforms.

Some of the present technical description (e.g., detailed description, drawings, claims, etc.) may be set forth in terms of logical operations/functions. As described in more detail in the following paragraphs, these logical operations/functions are not representations of abstract ideas, but rather representative of static or sequenced specifications of various hardware elements. Differently stated, unless context dictates otherwise, the logical operations/functions will be understood by those of skill in the art to be representative of static or sequenced specifications of various hardware elements. This is true because tools available to one of skill in the art to implement technical disclosures set forth in operational/functional formats—tools in the form of a high-level programming language (e.g., C, java, visual basic), etc.), or tools in the form of Very high speed Hardware Description Language ("VHDL," which is a language that uses text to describe logic circuits)—are generators of static or sequenced specifications of various hardware configurations. This fact is sometimes obscured by the broad term "software," but, as shown by the following explanation, those skilled in the art understand that what is termed "software" is a shorthand for a massively complex interchaining/specification of ordered-matter elements. The term "ordered-matter elements" may refer to physical components of computation, such as assemblies of electronic logic gates, molecular computing logic constituents, quantum computing mechanisms, etc.

For example, a high-level programming language is a programming language with strong abstraction, e.g., multiple levels of abstraction, from the details of the sequential organizations, states, inputs, outputs, etc., of the machines that a high-level programming language actually specifies. See, e.g., Wikipedia, High-level programming language, http://en.wikipedia.org/wiki/High-level_programming_language (as of Jun. 5, 2012, 21:00 GMT). In order to facilitate human comprehension, in many instances, high-level programming languages resemble or even share symbols with natural languages. See, e.g., Wikipedia, Natural language, http://en.wikipedia.org/wiki/Natural_language (as of Jun. 5, 2012, 21:00 GMT).

It has been argued that because high-level programming languages use strong abstraction (e.g., that they may resemble or share symbols with natural languages), they are therefore a "purely mental construct." (e.g., that "software"—a computer program or computer programming—is somehow an ineffable mental construct, because at a high level of abstraction, it can be conceived and understood in the human mind). This argument has been used to characterize technical description in the form of functions/operations as somehow "abstract ideas." In fact, in technological arts (e.g., the information and communication technologies) this is not true.

The fact that high-level programming languages use strong abstraction to facilitate human understanding should not be taken as an indication that what is expressed is an abstract idea. In fact, those skilled in the art understand that just the opposite is true. If a high-level programming language is the tool used to implement a technical disclosure in the form of functions/operations, those skilled in the art will recognize that, far from being abstract, imprecise, "fuzzy," or "mental" in any significant semantic sense, such a tool is instead a near incomprehensibly precise sequential specification of specific computational machines—the parts of which are built up by activating/selecting such parts from typically more general computational machines over time (e.g., clocked time). This fact is sometimes obscured by the superficial similarities between high-level programming languages and natural languages. These superficial similarities also may cause a glossing over of the fact that high-level programming language implementations ultimately perform valuable work by creating/controlling many different computational machines.

The many different computational machines that a high-level programming language specifies are almost unimaginably complex. At base, the hardware used in the computational machines typically consists of some type of ordered matter (e.g., traditional electronic devices (e.g., transistors), deoxyribonucleic acid (DNA), quantum devices, mechanical switches, optics, fluidics, pneumatics, optical devices (e.g., optical interference devices), molecules, etc.) that are arranged to form logic gates. Logic gates are typically physical devices that may be electrically, mechanically, chemically, or otherwise driven to change physical state in order to create a physical reality of Boolean logic.

Logic gates may be arranged to form logic circuits, which are typically physical devices that may be electrically, mechanically, chemically, or otherwise driven to create a physical reality of certain logical functions. Types of logic circuits include such devices as multiplexers, registers, arithmetic logic units (ALUs), computer memory, etc., each type of which may be combined to form yet other types of physical devices, such as a central processing unit (CPU)—the best known of which is the microprocessor. A modern microprocessor will often contain more than one hundred million logic gates in its many logic circuits (and often more than a billion transistors). See, e.g., Wikipedia, Logic gates, http://en.wikipedia.org/wiki/Logic_gates (as of Jun. 5, 2012, 21:03 GMT). The logic circuits forming the microprocessor are arranged to provide a microarchitecture that will carry out the instructions defined by that microprocessor's defined Instruction Set Architecture. The Instruction Set Architecture is the part of the microprocessor architecture related to programming, including the native data types, instructions, registers, addressing modes, memory architecture, interrupt and exception handling, and external Input/Output. See, e.g., Wikipedia, Computer architecture, http://en.wikipedia.org/wiki/Computer_architecture (as of Jun. 5, 2012, 21:03 GMT). The Instruction Set Architecture includes a specification of the machine language that can be used by programmers to use/control the microprocessor. Since the machine language instructions are such that they may be executed directly by the microprocessor, typically they consist of strings of binary digits, or bits. For example, a typical machine language instruction might be many bits long (e.g., 32, 64, or 128 bit strings are currently common). A typical machine language instruction might take the form "1110000101011110000111100111111" (a 32 bit instruction).

It is significant here that, although the machine language instructions are written as sequences of binary digits, in actuality those binary digits specify physical reality. For example, if certain semiconductors are used to make the operations of Boolean logic a physical reality, the apparently mathematical bits "1" and "0" in a machine language instruction actually constitute a shorthand that specifies the application of specific voltages to specific wires. For example, in some semiconductor technologies, the binary number "1" (e.g., logical "1") in a machine language instruction specifies around +5 volts applied to a specific "wire" (e.g., metallic traces on a printed circuit board) and the binary number "0" (e.g., logical "0") in a machine language instruction specifies around −5 volts applied to a specific "wire." In addition to specifying voltages of the machines' configuration, such machine language instructions also select out and activate specific groupings of logic gates from the millions of logic gates of the more general machine. Thus, far from abstract mathematical expressions, machine language instruction programs, even though written as a string of zeros and ones, specify many, many constructed physical machines or physical machine states.

Machine language is typically incomprehensible by most humans (e.g., the above example was just ONE instruction, and some personal computers execute more than two billion instructions every second). See, e.g., Wikipedia, Instructions per second, http://en.wikipedia.org/wiki/Instructions_per_second (as of Jun. 5, 2012, 21:04 GMT). Thus, programs written in machine language—which may be tens of millions of machine language instructions long—are incomprehensible. In view of this, early assembly languages were developed that used mnemonic codes to refer to machine language instructions, rather than using the machine language instructions' numeric values directly (e.g., for performing a multiplication operation, programmers coded the abbreviation "mult," which represents the binary number "011000" in MIPS machine code). While assembly languages were initially a great aid to humans controlling the microprocessors to perform work, in time the complexity of the work that needed to be done by the humans outstripped the ability of humans to control the microprocessors using merely assembly languages.

At this point, it was noted that the same tasks needed to be done over and over, and the machine language necessary to do those repetitive tasks was the same. In view of this, compilers were created. A compiler is a device that takes a statement that is more comprehensible to a human than either machine or assembly language, such as "add 2+2 and output the result," and translates that human understandable statement into a complicated, tedious, and immense machine language code (e.g., millions of 32, 64, or 128 bit length strings). Compilers thus translate high-level programming language into machine language.

This compiled machine language, as described above, is then used as the technical specification which sequentially constructs and causes the interoperation of many different computational machines such that humanly useful, tangible, and concrete work is done. For example, as indicated above, such machine language—the compiled version of the higher-level language—functions as a technical specification which selects out hardware logic gates, specifies voltage levels, voltage transition timings, etc., such that the humanly useful work is accomplished by the hardware.

Thus, a functional/operational technical description, when viewed by one of skill in the art, is far from an abstract idea. Rather, such a functional/operational technical description, when understood through the tools available in the art such as those just described, is instead understood to be a humanly understandable representation of a hardware specification, the complexity and specificity of which far exceeds the comprehension of most any one human. With this in mind, those skilled in the art will understand that any such operational/functional technical descriptions—in view of the disclosures herein and the knowledge of those skilled in the art—may be understood as operations made into physical reality by (a) one or more interchained physical machines, (b) interchained logic gates configured to create one or more physical machine(s) representative of sequential/combinatorial logic(s), (c) interchained ordered matter making up logic gates (e.g., interchained electronic devices (e.g., transistors), DNA, quantum devices, mechanical switches, optics, fluidics, pneumatics, molecules, etc.) that create physical reality representative of logic(s), or (d) virtually any combination of the foregoing. Indeed, any physical object which has a stable, measurable, and changeable state may be used to construct a machine based on the above technical description. Charles Babbage, for example, constructed the first computer out of wood and powered by cranking a handle.

Thus, far from being understood as an abstract idea, those skilled in the art will recognize a functional/operational technical description as a humanly-understandable representation of one or more almost unimaginably complex and time sequenced hardware instantiations. The fact that functional/operational technical descriptions might lend themselves readily to high-level computing languages (or high-level block diagrams for that matter) that share some words, structures, phrases, etc. with natural language simply cannot be taken as an indication that such functional/operational technical descriptions are abstract ideas, or mere expressions of abstract ideas. In fact, as outlined herein, in the technological arts this is simply not true. When viewed through the tools available to those of skill in the art, such functional/operational technical descriptions are seen as specifying hardware configurations of almost unimaginable complexity.

As outlined above, the reason for the use of functional/operational technical descriptions is at least twofold. First, the use of functional/operational technical descriptions allows near-infinitely complex machines and machine operations arising from interchained hardware elements to be described in a manner that the human mind can process (e.g., by mimicking natural language and logical narrative flow). Second, the use of functional/operational technical descriptions assists the person of skill in the art in understanding the described subject matter by providing a description that is more or less independent of any specific vendor's piece(s) of hardware.

The use of functional/operational technical descriptions assists the person of skill in the art in understanding the described subject matter since, as is evident from the above discussion, one could easily, although not quickly, transcribe the technical descriptions set forth in this document as trillions of ones and zeroes, billions of single lines of assembly-level machine code, millions of logic gates, thousands of gate arrays, or any number of intermediate levels of abstractions. However, if any such low-level technical descriptions were to replace the present technical description, a person of skill in the art could encounter undue difficulty in implementing the disclosure, because such a low-level technical description would likely add complexity without a corresponding benefit (e.g., by describing the subject matter utilizing the conventions of one or more vendor-specific pieces of hardware). Thus, the use of functional/operational technical descriptions assists those of skill in the art by separating the technical descriptions from the conventions of any vendor-specific piece of hardware.

In view of the foregoing, the logical operations/functions set forth in the present technical description are representative of static or sequenced specifications of various ordered-matter elements, in order that such specifications may be comprehensible to the human mind and adaptable to create many various hardware configurations. The logical operations/functions disclosed herein should be treated as such, and should not be disparagingly characterized as abstract ideas merely because the specifications they represent are presented in a manner that one of skill in the art can readily understand and apply in a manner independent of a specific vendor's hardware implementation.

Mote System Support

Those skilled in the art will recognize that at least a portion of the devices and/or processes described herein can be integrated into a mote system. Those having skill in the art will recognize that a typical mote system generally includes one or more memories such as volatile or non-volatile memories, processors such as microprocessors or digital signal processors, computational entities such as operating systems, user interfaces, drivers, sensors, actuators, applications programs, one or more interaction devices (e.g., an antenna USB ports, acoustic ports, etc.), control systems including feedback loops and control motors (e.g., feedback for sensing or estimating position and/or velocity; control motors for moving and/or adjusting components and/or quantities). A mote system may be implemented utilizing suitable components, such as those found in mote computing/communication systems. Specific examples of such components entail such as Intel Corporation's and/or Crossbow Corporation's mote components and supporting hardware, software, and/or firmware.

Licensing System Support Language

Those skilled in the art will recognize that it is common within the art to implement devices and/or processes and/or systems, and thereafter use engineering and/or other practices to integrate such implemented devices and/or processes and/or systems into more comprehensive devices and/or processes and/or systems. That is, at least a portion of the devices and/or processes and/or systems described herein can be integrated into other devices and/or processes and/or systems via a reasonable amount of experimentation. Those having skill in the art will recognize that examples of such other devices and/or processes and/or systems might include—as appropriate to context and application—all or part of devices and/or processes and/or systems of (a) an air conveyance (e.g., an airplane, rocket, helicopter, etc.), (b) a ground conveyance (e.g., a car, truck, locomotive, tank, armored personnel carrier, etc.), (c) a building (e.g., a home, warehouse, office, etc.), (d) an appliance (e.g., a refrigerator, a washing machine, a dryer, etc.), (e) a communications system (e.g., a networked system, a telephone system, a Voice over IP system, etc.), (f) a business entity (e.g., an Internet Service Provider (ISP) entity such as Comcast Cable, Qwest, Southwestern Bell, etc.), or (g) a wired/wireless services entity (e.g., Sprint, Cingular, Nextel, etc.), etc.

Extraterritorial Use Language

In certain cases, use of a system or method may occur in a territory even if components are located outside the territory. For example, in a distributed computing context, use of a distributed computing system may occur in a territory even though parts of the system may be located outside of the territory (e.g., relay, server, processor, signal-bearing medium, transmitting computer, receiving computer, etc. located outside the territory).

A sale of a system or method may likewise occur in a territory even if components of the system or method are located and/or used outside the territory. Further, implementation of at least part of a system for performing a method in one territory does not preclude use of the system in another territory.

Residual Incorporation Language

All of the above U.S. patents, U.S. patent application publications, U.S. patent applications, foreign patents, foreign patent applications and non-patent publications referred to in this specification and/or listed in any Application Data Sheet, are incorporated herein by reference, to the extent not inconsistent herewith.

Not Limited to Implementations Described Language

One skilled in the art will recognize that the herein described components (e.g., operations), devices, objects, and the discussion accompanying them are used as examples for the sake of conceptual clarity and that various configuration modifications are contemplated. Consequently, as used herein, the specific exemplars set forth and the accompanying discussion are intended to be representative of their more general classes. In general, use of any specific exemplar is intended to be representative of its class, and the non-inclusion of specific components (e.g., operations), devices, and objects should not be taken limiting.

Not Limited to Human User Language

Although user XXX is shown/described herein as a single illustrated figure, those skilled in the art will appreciate that user XXX may be representative of a human user, a robotic user (e.g., computational entity), and/or substantially any combination thereof (e.g., a user may be assisted by one or more robotic agents) unless context dictates otherwise. Those skilled in the art will appreciate that, in general, the same may be said of "sender" and/or other entity-oriented terms as such terms are used herein unless context dictates otherwise.

Plural Terms Language

With respect to the use of substantially any plural and/or singular terms herein, those having skill in the art can translate from the plural to the singular and/or from the singular to the plural as is appropriate to the context and/or application. The various singular/plural permutations are not expressly set forth herein for sake of clarity.

Operably-Coupled Language

The herein described subject matter sometimes illustrates different components contained within, or connected with, different other components. It is to be understood that such depicted architectures are merely exemplary, and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components, and/or wirelessly interactable, and/or wirelessly interacting components, and/or logically interacting, and/or logically interactable components.

Active/Inactive Component Language

In some instances, one or more components may be referred to herein as "configured to," "configured by," "configurable to," "operable/operative to," "adapted/adaptable," "able to," "conformable/conformed to," etc. Those skilled in the art will recognize that such terms (e.g. "configured to") generally encompass active-state components and/or inactive-state components and/or standby-state components, unless context requires otherwise.

Cloud Computing Standard Language

For the purposes of this application, "cloud" computing may be understood as described in the cloud computing literature. For example, cloud computing may be methods and/or systems for the delivery of computational capacity and/or storage capacity as a service. The "cloud" may refer to one or more hardware and/or software components that deliver or assist in the delivery of computational and/or storage capacity, including, but not limited to, one or more of a client, an application, a platform, an infrastructure, and/or a server The cloud may refer to any of the hardware and/or software associated with a client, an application, a platform, an infrastructure, and/or a server. For example, cloud and cloud computing may refer to one or more of a computer, a processor, a storage medium, a router, a switch, a modem, a virtual machine (e.g., a virtual server), a data center, an operating system, a middleware, a firmware, a hardware back-end, a software back-end, and/or a software application. A cloud may refer to a private cloud, a public cloud, a hybrid cloud, and/or a community cloud. A cloud may be a shared pool of configurable computing resources, which may be public, private, semi-private, distributable, scaleable, flexible, temporary, virtual, and/or physical. A cloud or cloud service may be delivered over one or more types of network, e.g., a mobile communication network, and the Internet.

As used in this application, a cloud or a cloud service may include one or more of infrastructure-as-a-service ("IaaS"), platform-as-a-service ("PaaS"), software-as-a-service ("SaaS"), and/or desktop-as-a-service ("DaaS"). As a non-exclusive example, IaaS may include, e.g., one or more virtual server instantiations that may start, stop, access, and/or configure virtual servers and/or storage centers (e.g., providing one or more processors, storage space, and/or network resources on-demand, e.g., EMC and Rackspace). PaaS may include, e.g., one or more software and/or development tools hosted on an infrastructure (e.g., a computing platform and/or a solution stack from which the client can create software interfaces and applications, e.g., Microsoft Azure). SaaS may include, e.g., software hosted by a service provider and accessible over a network (e.g., the software for the application and/or the data associated with that software application may be kept on the network, e.g., Google Apps, SalesForce). DaaS may include, e.g., providing desktop, applications, data, and/or services for the user over a network (e.g., providing a multi-application framework, the applications in the framework, the data associated with the applications, and/or services related to the applications and/or the data over the network, e.g., Citrix). The foregoing is intended to be exemplary of the types of systems and/or methods referred to in this application as "cloud" or "cloud computing" and should not be considered complete or exhaustive.

Use of Trademarks in Specification Language

This application may make reference to one or more trademarks, e.g., a word, letter, symbol, or device adopted by one manufacturer or merchant and used to identify and/or distinguish his or her product from those of others. Trademark names used herein are set forth in such language that makes clear their identity, that distinguishes them from common descriptive nouns, that have fixed and definite meanings, or, in many if not all cases, are accompanied by other specific identification using terms not covered by trademark. In addition, trademark names used herein have meanings that are well-known and defined in the literature, or do not refer to products or compounds for which knowledge of one or more trade secrets is required in order to divine their meaning All trademarks referenced in this application are the property of their respective owners, and the appearance of one or more trademarks in this application does not diminish or otherwise adversely affect the validity of the one or more trademarks. All trademarks, registered or unregistered, that appear in this application are assumed to include a proper trademark symbol, e.g., the circle R or bracketed capitalization (e.g., [trademark name]), even when such trademark symbol does not explicitly appear next to the trademark. To the extent a trademark is used in a descriptive manner to refer to a product or process, that trademark should be interpreted to represent the corresponding product or process as of the date of the filing of this patent application.

Caselaw-Driven Clarification Language

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B."

With respect to the appended claims, those skilled in the art will appreciate that recited operations therein may generally be performed in any order. Also, although various operational flows are presented in a sequence(s), it should be understood that the various operations may be performed in other orders than those which are illustrated, or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

What is claimed is:

1. A system comprising:
   circuitry for electronically generating provenance information including one or more details concerning one or more farming output aspects of one or more food items; and
   circuitry for electronically correlating the provenance information including the one or more details concerning the one or more farming output aspects of the one or more food items with one or more identifiers received from one or more signal-emitting tracers having memory for storing information, the one or more signal-emitting tracers being at least momentarily in physical proximity with the one or more food items and storing in the memory information at least in part regarding duration of transit period.

2. The system of claim 1, wherein the circuitry for electronically generating provenance information including one or more details concerning one or more farming output aspects of one or more food items comprises:
- circuitry for electronically generating provenance information regarding chemical sensing of one or more farming related production factors.

3. The system of claim 1, wherein the circuitry for electronically generating provenance information including one or more details concerning one or more farming output aspects of one or more food items comprises:
- circuitry for electronically generating provenance information related to one or more climate aspects of one or more farming related production factors.

4. The system of claim 1, wherein the circuitry for electronically generating provenance information including one or more details concerning one or more farming output aspects of one or more food items comprises:
- circuitry for electronically generating provenance information related to one or more fertilizer use factors involved with food output by farming.

5. The system of claim 1, wherein the circuitry for electronically generating provenance information including one or more details concerning one or more farming output aspects of one or more food items comprises:
- circuitry for electronically generating provenance information regarding one or more seed selection factors involved with food output by farming.

6. The system of claim 1, wherein the circuitry for electronically generating provenance information including one or more details concerning one or more farming output aspects of one or more food items comprises:
- circuitry for electronically generating provenance information regarding one or more animal population factors involved with food output by farming.

7. The system of claim 1, wherein the circuitry for electronically generating provenance information including one or more details concerning one or more farming output aspects of one or more food items comprises:
- circuitry for electronically generating provenance information regarding one or more tree variety factors involved with food output by farming.

8. The system of claim 1, wherein the circuitry for electronically generating provenance information including one or more details concerning one or more farming output aspects of one or more food items comprises:
- circuitry for electronically generating provenance information regarding one or more equipment use factors involved with food output by farming.

9. The system of claim 1, wherein the circuitry for electronically generating provenance information including one or more details concerning one or more farming output aspects of one or more food items comprises:
- circuitry for electronically generating provenance information regarding one or more production hindrance factors involved with food output by farming.

10. The system of claim 1, wherein the circuitry for electronically generating provenance information including one or more details concerning one or more farming output aspects of one or more food items comprises:
- circuitry for electronically generating provenance information regarding one or more aspects regarding one or more bodies of water involved with food output by farming.

11. The system of claim 1, wherein the circuitry for electronically generating provenance information including one or more details concerning one or more farming output aspects of one or more food items comprises:
- circuitry for electronically generating provenance information regarding one or more compliance factors for food output by farming.

12. The system of claim 1, wherein the circuitry for electronically generating provenance information including one or more details concerning one or more farming output aspects of one or more food items comprises:
- circuitry for electronically generating provenance information regarding one or more predator associated factors involved with food output by farming.

13. The system of claim 1, wherein the circuitry for electronically generating provenance information including one or more details concerning one or more farming output aspects of one or more food items comprises:
- circuitry for electronically generating provenance information regarding one or more genetically modified organism factors involved with food output by farming.

14. The system of claim 1, wherein the circuitry for electronically generating provenance information including one or more details concerning one or more farming output aspects of one or more food items comprises:
- circuitry for electronically generating provenance information regarding one or more fishing related activities involved with food output by farming.

15. The system of claim 1, wherein the circuitry for electronically generating provenance information including one or more details concerning one or more farming output aspects of one or more food items comprises:
- circuitry for electronically generating provenance information regarding one or more grain cultivation activities involved with food output by farming.

16. The system of claim 1, wherein the circuitry for electronically generating provenance information including one or more details concerning one or more farming output aspects of one or more food items comprises:
- circuitry for electronically generating provenance information regarding one or more livestock husbandry related activities involved with food output by farming.

17. The system of claim 1, wherein the circuitry for electronically generating provenance information including one or more details concerning one or more farming output aspects of one or more food items comprises:
- circuitry for electronically generating provenance information regarding one or more aquaculture related activities involved with food output by farming.

18. The system of claim 1, wherein the circuitry for electronically generating provenance information including one or more details concerning one or more farming output aspects of one or more food items comprises:
- circuitry for electronically generating provenance information regarding one or more vegetable gardening related activities involved with food output by farming.

19. The system of claim 1, wherein the circuitry for electronically generating provenance information including one or more details concerning one or more farming output aspects of one or more food items comprises:
- circuitry for electronically generating provenance information regarding one or more slaughtering related activities involved with food output by farming.

20. The system of claim 1, wherein the circuitry for electronically generating provenance information including one or more details concerning one or more farming output aspects of one or more food items comprises:
- circuitry for electronically generating provenance information regarding one or more diary related activities involved with food output by farming.

21. The system of claim 1, wherein the circuitry for electronically generating provenance information including one or more details concerning one or more farming output aspects of one or more food items comprises:
   circuitry for electronically generating provenance information regarding one or more plant raising related activities involved with food output by farming.

22. The system of claim 1, wherein the circuitry for electronically generating provenance information including one or more details concerning one or more farming output aspects of one or more food items comprises:
   circuitry for electronically generating provenance information regarding one or more materials that will be processed to be ingested by a biological organism.

23. The system of claim 1, wherein the circuitry for electronically generating provenance information including one or more details concerning one or more farming output aspects of one or more food items comprises:
   circuitry for electronically generating provenance information regarding one or more food items including at least in part one or more plant based materials.

24. The system of claim 1, wherein the circuitry for electronically generating provenance information including one or more details concerning one or more farming output aspects of one or more food items comprises:
   circuitry for electronically generating provenance information regarding one or more food items including at least in part one or more seafood based materials.

25. The system of claim 1, wherein the circuitry for electronically generating provenance information including one or more details concerning one or more farming output aspects of one or more food items comprises:
   circuitry for electronically generating provenance information regarding one or more food items including at least in part one or more whole animal items.

26. The system of claim 1, wherein the circuitry for electronically generating provenance information including one or more details concerning one or more farming output aspects of one or more food items comprises:
   circuitry for electronically generating provenance information regarding one or more food items including at least in part one or more processed plant materials.

27. The system of claim 1, wherein the circuitry for electronically generating provenance information including one or more details concerning one or more farming output aspects of one or more food items comprises:
   circuitry for electronically generating provenance information regarding one or more food items including at least in part one or more processed seafood materials.

28. The system of claim 1, wherein the one or more signal-emitting tracers include one or more electronically implemented pointers.

29. The system of claim 1, wherein the one or more signal-emitting tracers include one or more electronically implemented keywords.

30. The system of claim 1, wherein the one or more signal-emitting tracers include one or more electronic identification codes.

31. The system of claim 1, wherein the one or more signal-emitting tracers include electronic based naming information.

32. The system of claim 1, wherein the one or more signal-emitting tracers include one or more electronically encoded data packets.

33. The system of claim 1, wherein the one or more signal-emitting tracers include optical information.

34. The system of claim 1, wherein the one or more signal-emitting tracers include one or more radio frequency identification tags.

35. The system of claim 1, wherein the one or more signal-emitting tracers are configured to emit one or more of the following: electromagnetic signal, sonic signal, or electronic signal.

36. The system of claim 1, wherein the one or more signal-emitting tracers include one or more audio emitters.

37. The system of claim 1, wherein the one or more signal-emitting tracers include one or more electronic memories.

38. The system of claim 1, wherein the one or more signal-emitting tracers are at least in part affixed to one or more ingestible materials.

39. The system of claim 1, wherein the one or more signal-emitting tracers include at least in part affixed to a portion of a biological structure that is physically connected with the one or more food items.

40. An article of manufacture comprising:
   one or more non-transitory signal bearing storage medium bearing:
   one or more instructions for electronically generating provenance information including one or more details concerning one or more farming output aspects of one or more food items; and
   one or more instructions for electronically correlating the provenance information including the one or more details concerning the one or more farming output aspects of the one or more food items with one or more identifiers received from one or more signal-emitting tracers, the one or more signal-emitting tracers being at least momentarily in physical proximity with the one or more food items and storing in memory information at least in part regarding duration of transit period.

41. A system comprising:
   one or more computing devices; and
   one or more instructions that when executed on the one or more computing devices cause the one or more computing devices to perform operations including at least:
   electronically generating provenance information including one or more details concerning one or more farming output aspects of one or more food items; and
   electronically correlating the provenance information including the one or more details concerning the one or more farming output aspects of the one or more food items with one or more identifiers received from one or more signal-emitting tracers having memory for storing information, the one or more signal-emitting tracers being at least momentarily in physical proximity with the one or more food items and storing in memory information at least in part regarding duration of transit period.

* * * * *

UNITED STATES PATENT AND TRADEMARK OFFICE
CERTIFICATE OF CORRECTION

PATENT NO. : 9,704,122 B2
APPLICATION NO. : 13/663137
DATED : July 11, 2017
INVENTOR(S) : Jung et al.

Page 1 of 1

It is certified that error appears in the above-identified patent and that said Letters Patent is hereby corrected as shown below:

In the Specification

In Column 1, Line 11 "Robert W. Lord, and Mark A. Malamud as" should be -- and Mark A. Malamud as --

In the Claims

In Column 140, Line 66, Claim 20 "regarding one or more diary related activities" should be -- regarding one or more dairy related activities --

Signed and Sealed this
Nineteenth Day of December, 2017

Joseph Matal
*Performing the Functions and Duties of the
Under Secretary of Commerce for Intellectual Property and
Director of the United States Patent and Trademark Office*